US012777297B2

(12) United States Patent
Goldstein

(10) Patent No.: US 12,777,297 B2
(45) **Date of Patent: *Oct. 27, 2026**

(54) AUDIO LEVEL CONTROL

(71) Applicant: ST EarTech, LLC, Delray Beach, FL (US)

(72) Inventor: Steven Wayne Goldstein, Delray Beach, FL (US)

(73) Assignee: ST Portfolio Holdings, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,791

(22) Filed: Aug. 9, 2023

(65) Prior Publication Data

US 2023/0388728 A1 Nov. 30, 2023

Related U.S. Application Data

(63) Continuation of application No. 17/467,168, filed on Sep. 3, 2021, now Pat. No. 11,818,552, which is a (Continued)

(51) Int. Cl.

| | |
|---|---|
| ***H04R 29/00*** | (2006.01) |
| ***G01H 3/14*** | (2006.01) |
| ***H04R 3/00*** | (2006.01) |

(52) U.S. Cl.

CPC ............... *H04R 29/00* (2013.01); *G01H 3/14* (2013.01); *H04R 3/007* (2013.01); *H04R 29/008* (2013.01); *H04R 2460/15* (2013.01)

(58) Field of Classification Search

CPC ...... H04R 29/00; H04R 3/007; H04R 29/008; H04R 2460/15; G01H 3/14

(Continued)

(56) References Cited

U.S. PATENT DOCUMENTS

| | | | |
|---|---|---|---|
| 2,803,308 | A | 8/1957 | Alfred |
| 3,028,454 | A | 4/1962 | Henry |

(Continued)

FOREIGN PATENT DOCUMENTS

| | | | |
|---|---|---|---|
| AU | 2006200446 | A1 | 2/2006 |
| CA | 1169969 | A | 6/1984 |

(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

(Continued)

*Primary Examiner* — Vivian C Chin
*Assistant Examiner* — Con P Tran
(74) *Attorney, Agent, or Firm* — Akerman LLP; Peter A. Chiabotti

(57) ABSTRACT

A monitoring system can include an earpiece, a database with stored earpiece characteristics data, and a microphone to receive a plurality of signals where each signal of the plurality of signals can represents a respective sound pressure level of sound pressure values over a time duration. The system can also include a processor and a memory coupled processor, the memory having computer instructions winch when executed by the processor causes the processor to perform the operations. The operations can include determining exposure time duration when a signal of the plurality of signals exceeds a sound pressure level threshold value, retrieving a subset of data of the stored earpiece characteristics data, and modifying an acoustic output of the earpiece in accordance with the subset of data of the stored earpiece characteristics data.

15 Claims, 10 Drawing Sheets

Related U.S. Application Data continuation of application No. 16/816,390, filed on Mar. 12, 2020, now Pat. No. 11,277,700, which is a continuation of application No. 16/055,553, filed on Aug. 6, 2018, now Pat. No. 10,667,067, which is a continuation of application No. 14/574,567, filed on Dec. 18, 2014, now Pat. No. 10,045,134, which is a continuation of application No. 11/763,281, filed on Jun. 14, 2007, now Pat. No. 8,917,876, which is a continuation-in-part of application No. 11/757,152, filed on Jun. 1, 2007, now Pat. No. 8,311,228.

(60) Provisional application No. 60/804,650, filed on Jun. 14, 2006.

(58) Field of Classification Search
USPC .. 381/56, 57, 58, 59, 60, 61, 312, 314, 316; 73/646, 584, 645; 704/258; 997/952; 345/82, 83; 362/23.07, 23.08
See application file for complete search history.

(56) References Cited

U.S. PATENT DOCUMENTS 3,729,598 A 4/1973 Tegt et al.
3,876,843 A 4/1975 Moen
4,041,256 A 8/1977 Ohta et al.
4,054,749 A 10/1977 Suzuki et al.
4,088,849 A 5/1978 Usami et al.
4,455,677 A 6/1984 Fox
4,533,795 A 8/1985 Baumhauer et al.
4,555,677 A 11/1985 Beesley
4,596,902 A 6/1986 Gilman
4,827,458 A 5/1989 D'Alayer de Costemore D'Arc
4,891,841 A 1/1990 Bohn
4,941,187 A 7/1990 Slater
4,947,432 A 8/1990 Topholm
4,947,440 A 8/1990 Bateman et al.
5,002,151 A 3/1991 Oliveira et al.
5,027,410 A 6/1991 Williamson et al.
5,033,090 A 7/1991 Weinrich
5,182,774 A 1/1993 Bourk
5,202,927 A 4/1993 Topholm
5,204,906 A 4/1993 Nohara et al.
5,208,867 A 5/1993 Stites, III
5,251,263 A 10/1993 Andrea
5,259,033 A 11/1993 Goodings et al.
5,267,321 A 11/1993 Langberg
5,276,740 A 1/1994 Inanaga et al.
5,298,692 A 3/1994 Ikeda et al.
5,317,273 A 5/1994 Hanson
5,327,506 A 7/1994 Stites
5,345,430 A 9/1994 Moe
5,390,254 A 2/1995 Adelman
5,430,826 A 7/1995 Webster et al.
5,473,684 A 12/1995 Bartlett et al.
5,479,522 A 12/1995 Lindemann et al.
5,524,056 A 6/1996 Killion et al.
5,526,819 A 6/1996 Lonsbury-Martin et al.
5,528,739 A 6/1996 Lucas et al.
5,539,831 A 7/1996 Harley
5,550,923 A 8/1996 Hotvet
5,557,659 A 9/1996 Hyde-Thomson
5,577,511 A 11/1996 Killion
5,606,621 A 2/1997 Reiter et al.
5,632,002 A 5/1997 Hashimoto et al.
5,636,351 A 6/1997 Lee
5,647,011 A 7/1997 Garvis
5,649,055 A 7/1997 Gupta et al.
5,692,059 A 11/1997 Kruger
5,740,262 A 4/1998 Yoshida et al.
5,748,754 A 5/1998 Maag et al.
5,764,778 A 6/1998 Zurek
5,787,187 A 7/1998 Bouchard et al.
5,799,273 A 8/1998 Mitchell et al.
5,826,064 A 10/1998 Loring et al.
5,862,065 A 1/1999 Muthusamy
5,887,070 A 3/1999 Iseberg et al.
5,903,868 A 5/1999 Yuen et al.
5,909,667 A 6/1999 Leontiades et al.
5,920,835 A 7/1999 Huzenlaub et al.
5,923,624 A 7/1999 Groeger
5,930,751 A 7/1999 Cohrs et al.
5,933,506 A 8/1999 Aoki et al.
5,933,510 A 8/1999 Bryant
5,937,070 A 8/1999 Todter et al.
5,946,050 A 8/1999 Wolff
5,953,392 A 9/1999 Rhie et al.
5,956,681 A 9/1999 Yamakita
5,991,417 A 11/1999 Topholm
6,005,525 A 12/1999 Kivela
6,021,205 A 2/2000 Yamada et al.
6,021,207 A 2/2000 Puthuff et al.
6,021,325 A 2/2000 Hall
6,028,514 A 2/2000 Lemelson et al.
6,048,320 A 4/2000 Brainard, II
6,056,698 A 5/2000 Iseberg
6,069,963 A 5/2000 Martin et al.
6,072,645 A 6/2000 Sprague
6,072,884 A 6/2000 Kates
6,094,492 A 7/2000 Boesen
6,094,494 A 7/2000 Haroldson
6,101,256 A 8/2000 Steelman
6,118,877 A 9/2000 Lindemann
6,118,878 A 9/2000 Jones
6,141,426 A 10/2000 Stobba et al.
6,151,571 A 11/2000 Pertrushin
6,160,758 A 12/2000 Spiesberger
6,163,338 A 12/2000 Johnson et al.
6,163,508 A 12/2000 Kim et al.
6,167,139 A * 12/2000 Kim .......................... H04S 7/40
348/E5.122
6,173,259 B1 1/2001 Bijl et al.
6,175,633 B1 1/2001 Morrill et al.
6,198,971 B1 3/2001 Leysieffer
6,226,389 B1 5/2001 Lemelson et al.
6,263,147 B1 7/2001 Tognazzini
6,269,161 B1 7/2001 McLaughlin et al.
6,298,323 B1 10/2001 Kaemmerer
6,308,158 B1 10/2001 Kuhnen et al.
6,311,092 B1 10/2001 Yamada
6,338,038 B1 1/2002 Hanson
6,359,993 B2 3/2002 Brimhall
6,400,652 B1 6/2002 Goldberg et al.
6,405,165 B1 6/2002 Blum et al.
6,408,272 B1 6/2002 White et al.
6,415,034 B1 7/2002 Hietanen
6,424,721 B1 7/2002 Hohn
6,445,799 B1 9/2002 Taenzer et al.
6,456,975 B1 9/2002 Chang
6,463,413 B1 10/2002 Applebaum et al.
6,475,163 B1 11/2002 Smits et al.
6,483,899 B2 11/2002 Agraharam et al.
6,490,557 B1 12/2002 Jeppesen
6,513,621 B1 2/2003 Deslauriers et al.
6,526,148 B1 2/2003 Jourjine et al.
6,526,381 B1 2/2003 Wilson
6,554,761 B1 4/2003 Puria et al.
6,567,524 B1 5/2003 Svean et al.
6,593,848 B1 7/2003 Atkins, III
6,597,787 B1 7/2003 Lindgren et al.
6,606,598 B1 8/2003 Holthouse
6,639,987 B2 10/2003 McIntosh
6,647,123 B2 11/2003 Kandel et al.
6,647,368 B2 11/2003 Nemirovski
6,648,368 B2 11/2003 Smith et al.
RE38,351 E 12/2003 Iseberg et al.
6,658,122 B1 12/2003 Westermann et al.
6,661,886 B1 12/2003 Huart et al.
6,661,901 B1 12/2003 Svean et al.
6,671,379 B2 12/2003 Nemirovski
6,671,643 B2 12/2003 Kachler et al.
6,674,862 B1 1/2004 Magilen
6,687,339 B2 2/2004 Martin

(56) References Cited

U.S. PATENT DOCUMENTS 6,687,377 B2 2/2004 Voix et al.
6,687,671 B2 2/2004 Gudorf et al.
6,717,991 B1 4/2004 Gustafsson et al.
6,725,194 B1 4/2004 Bartosik et al.
6,728,385 B2 4/2004 Kval et al.
6,738,482 B1 5/2004 Jaber
6,738,485 B1 5/2004 Boesen
6,741,707 B2 * 5/2004 Ray .................. G10K 11/17854 381/71.11
6,748,238 B1 6/2004 Lau
6,754,359 B1 6/2004 Svean et al.
6,760,754 B1 7/2004 Isaacs et al.
6,775,206 B2 8/2004 Karhu
6,782,106 B1 8/2004 Kong et al.
6,785,394 B1 8/2004 Olsen et al.
6,789,060 B1 9/2004 Wolfe et al.
6,804,638 B2 10/2004 Fiedler
6,804,643 B1 10/2004 Kiss
6,826,286 B1 11/2004 Arndt et al.
6,826,515 B2 * 11/2004 Bernardi .................. G01H 3/14 702/191
6,837,857 B2 1/2005 Stirnemann
6,879,692 B2 4/2005 Nielsen et al.
6,910,013 B2 6/2005 Allegro et al.
6,912,289 B2 6/2005 Vonlanthen et al.
6,941,161 B1 9/2005 Bobisuthi et al.
6,987,992 B2 1/2006 Hundal et al.
7,003,099 B1 2/2006 Zhang
7,003,123 B2 2/2006 Kanevsky et al.
7,020,297 B2 3/2006 Fang et al.
7,037,274 B2 5/2006 Thornton et al.
7,039,195 B1 5/2006 Svean
7,039,585 B2 5/2006 Wilmot
7,043,037 B2 5/2006 Lichtblau
7,050,592 B1 5/2006 Iseberg
7,050,966 B2 5/2006 Schneider et al.
7,050,971 B1 5/2006 Kaufholz
7,072,482 B2 7/2006 Van et al.
7,082,393 B2 7/2006 Lahr
7,092,532 B2 8/2006 Luo et al.
7,103,188 B1 9/2006 Jones
7,107,109 B1 9/2006 Nathan et al.
7,110,554 B2 9/2006 Brennan et al.
7,130,437 B2 10/2006 Stonikas et al.
7,158,643 B2 1/2007 Lavoie et al.
7,158,933 B2 1/2007 Balan
7,162,041 B2 1/2007 Haapapuro et al.
7,174,022 B1 2/2007 Zhang et al.
7,177,433 B2 2/2007 Sibbald
7,181,020 B1 2/2007 Riley
7,181,030 B2 2/2007 Rasmussen et al.
7,209,569 B2 4/2007 Boesen
7,215,766 B2 5/2007 Wurtz
7,223,245 B2 5/2007 Zoth et al.
7,246,058 B2 7/2007 Burnett
7,277,722 B2 10/2007 Rosenzweig
7,280,849 B1 10/2007 Bailey
7,312,699 B2 12/2007 Chornenky
7,346,504 B2 3/2008 Liu et al.
7,359,504 B1 4/2008 Reuss et al.
7,383,178 B2 6/2008 Msser et al.
7,395,090 B2 7/2008 Alden
7,430,299 B2 9/2008 Armstrong et al.
7,430,300 B2 9/2008 Vosburgh et al.
7,433,463 B2 10/2008 Alves et al.
7,433,714 B2 10/2008 Howard et al.
7,444,353 B1 10/2008 Chen
7,450,730 B2 11/2008 Berg et al.
7,464,029 B2 12/2008 Visser
7,477,754 B2 1/2009 Rasmussen et al.
7,477,756 B2 1/2009 Wickstrom et al.
7,477,922 B2 1/2009 Lewis
7,502,484 B2 3/2009 Ngia et al.
7,512,245 B2 3/2009 Rasmussen
7,519,193 B2 4/2009 Fretz
7,529,379 B2 5/2009 Zurek
7,532,734 B2 5/2009 Pham et al.
7,536,006 B2 5/2009 Patel et al.
7,562,020 B2 7/2009 Le et al.
7,574,917 B2 8/2009 Von Dach
7,590,254 B2 9/2009 Olsen
7,617,099 B2 11/2009 Yang et al.
7,623,823 B2 11/2009 Zito et al.
7,634,094 B2 12/2009 Reber
7,659,827 B2 2/2010 Gunderson et al.
7,680,465 B2 3/2010 Zad-Issa
7,702,482 B2 4/2010 Graepel et al.
7,710,654 B2 5/2010 Ashkenazi et al.
7,715,568 B2 5/2010 Nakano
7,715,577 B2 5/2010 Allen et al.
7,729,912 B1 6/2010 Bacchiani et al.
7,756,281 B2 7/2010 Goldstein et al.
7,756,283 B2 7/2010 Lars
7,756,285 B2 7/2010 Sjursen et al.
7,773,743 B2 8/2010 Stokes et al.
7,773,759 B2 8/2010 Alves et al.
7,773,763 B2 8/2010 Pedersen
7,774,202 B2 8/2010 Spengler et al.
7,778,434 B2 8/2010 Juneau et al.
7,801,318 B2 9/2010 Barthel
7,801,726 B2 9/2010 Ariu
7,804,974 B2 9/2010 Paludan-Muller et al.
7,813,520 B2 10/2010 Von et al.
7,817,808 B2 10/2010 Konchitsky et al.
7,844,070 B2 11/2010 Abolfathi
7,844,248 B2 11/2010 Sotack
7,853,031 B2 12/2010 Hamacher
7,861,008 B2 12/2010 Batson et al.
7,861,723 B2 1/2011 Dedrick et al.
7,869,606 B2 1/2011 Fichtl et al.
7,903,825 B1 3/2011 Melanson
7,903,826 B2 3/2011 Boersma
7,903,833 B2 3/2011 Goldberg et al.
7,920,557 B2 4/2011 Moote
7,925,007 B2 4/2011 Stokes et al.
7,929,713 B2 4/2011 Victorian et al.
7,933,423 B2 4/2011 Baekgaard et al.
7,936,885 B2 5/2011 Frank
7,953,241 B2 5/2011 Jorgensen et al.
7,983,433 B2 7/2011 Nemirovski
7,983,907 B2 7/2011 Visser
7,986,791 B2 7/2011 Bostick et al.
7,986,802 B2 7/2011 Ziller
7,995,773 B2 8/2011 Mao
8,014,553 B2 9/2011 Radivojevic et al.
8,018,337 B2 9/2011 Jones et al.
8,019,091 B2 9/2011 Burnett et al.
8,027,481 B2 9/2011 Beard
8,045,840 B2 10/2011 Murata
8,047,207 B2 11/2011 Perez et al.
8,050,143 B2 11/2011 Bufi et al.
8,068,627 B2 11/2011 Zhang et al.
8,077,872 B2 12/2011 Dyer et al.
8,081,780 B2 12/2011 Goldstein et al.
8,085,943 B2 12/2011 Bizjak
8,086,093 B2 12/2011 Stuckman
8,111,839 B2 2/2012 Goldstein et al.
8,111,840 B2 2/2012 Haulick et al.
8,111,849 B2 2/2012 Tateno et al.
8,116,472 B2 2/2012 Mizuno
8,116,489 B2 2/2012 Mejia et al.
8,121,301 B2 2/2012 Suzuki et al.
8,140,325 B2 3/2012 Kanevsky
8,144,881 B2 3/2012 Crockett et al.
8,144,891 B2 3/2012 Her et al.
8,150,044 B2 4/2012 Goldstein et al.
8,150,084 B2 4/2012 Jessen et al.
8,160,261 B2 4/2012 Schulein
8,160,273 B2 4/2012 Visser
8,162,846 B2 4/2012 Epley
8,180,078 B2 5/2012 Zellner
8,184,823 B2 5/2012 Itabashi et al.
8,186,478 B1 5/2012 Grason
8,189,803 B2 5/2012 Bergeron

(56) References Cited

U.S. PATENT DOCUMENTS 8,194,864 B2 6/2012 Goldstein et al.
8,194,865 B2 6/2012 Goldstein et al.
8,199,919 B2 6/2012 Goldstein et al.
8,199,942 B2 6/2012 Mao
8,204,435 B2 6/2012 Seshadri et al.
8,208,609 B2 6/2012 Harris et al.
8,208,642 B2 6/2012 Edwards
8,208,644 B2 6/2012 Goldstein et al.
8,208,652 B2 6/2012 Keady
8,209,181 B2 6/2012 Heckerman et al.
8,213,629 B2 7/2012 Goldstein et al.
8,218,784 B2 7/2012 Schulein
8,221,861 B2 7/2012 Keady
8,229,127 B2 7/2012 Jorgensen et al.
8,229,128 B2 7/2012 Keady
8,229,148 B2 7/2012 Rasmussen et al.
8,229,513 B2 7/2012 Ibe
8,251,925 B2 8/2012 Keady et al.
8,254,586 B2 8/2012 Voix et al.
8,254,591 B2 8/2012 Goldstein et al.
8,270,629 B2 9/2012 Bothra
8,270,634 B2 9/2012 Harney et al.
8,306,235 B2 11/2012 Mahowald
8,312,960 B2 11/2012 Keady
8,315,400 B2 11/2012 Goldstein et al.
8,322,222 B2 12/2012 Goldberg et al.
8,340,309 B2 12/2012 Burnett et al.
8,351,634 B2 1/2013 Khenkin
8,369,901 B2 2/2013 Haulick et al.
8,374,361 B2 2/2013 Moon et al.
8,385,560 B2 2/2013 Solbeck et al.
8,391,534 B2 3/2013 Ambrose et al.
8,401,198 B2 3/2013 Oh et al.
8,401,200 B2 3/2013 Tiscareno
8,411,880 B2 4/2013 Wang et al.
8,437,492 B2 5/2013 Goldstein et al.
8,447,370 B2 5/2013 Ueda et al.
8,462,969 B2 6/2013 Claussen et al.
8,462,974 B2 6/2013 Jeong et al.
8,472,616 B1 6/2013 Jiang
8,477,955 B2 7/2013 Engle et al.
8,488,799 B2 7/2013 Goldstein et al.
8,493,204 B2 7/2013 Wong et al.
8,515,089 B2 8/2013 Nicholson
8,522,916 B2 9/2013 Keady
8,548,181 B2 10/2013 Kraemer
8,550,206 B2 10/2013 Keady et al.
8,554,350 B2 10/2013 Keady et al.
8,577,062 B2 11/2013 Goldstein
8,594,341 B2 11/2013 Rothschild
8,600,067 B2 12/2013 Usher et al.
8,611,548 B2 12/2013 Bizjak
8,611,560 B2 12/2013 Goldstein
8,625,818 B2 1/2014 Stultz
8,625,819 B2 1/2014 Goldstein et al.
8,631,801 B2 1/2014 Keady
8,649,540 B2 2/2014 Killion et al.
8,652,040 B2 2/2014 Leboeuf et al.
8,657,064 B2 2/2014 Staab et al.
8,678,011 B2 3/2014 Goldstein et al.
8,693,704 B2 4/2014 Kim et al.
8,718,288 B2 5/2014 Woods et al.
8,718,305 B2 5/2014 Usher
8,718,313 B2 5/2014 Keady
8,744,091 B2 6/2014 Chen et al.
8,750,295 B2 6/2014 Liron
8,774,433 B2 7/2014 Goldstein
8,774,435 B2 7/2014 Ambrose et al.
8,792,669 B2 7/2014 Harsch
8,798,278 B2 8/2014 Isabelle
8,798,279 B2 8/2014 Ranta
8,798,289 B1 8/2014 Every et al.
8,804,974 B1 8/2014 Melanson
8,848,939 B2 9/2014 Keady et al.
8,851,372 B2 10/2014 Zhou et al.
8,855,343 B2 10/2014 Usher
8,903,113 B2 12/2014 Gebert
8,917,880 B2 12/2014 Goldstein et al.
8,917,892 B2 12/2014 Poe et al.
8,917,894 B2 12/2014 Goldstein
8,942,370 B2 1/2015 Li et al.
8,942,405 B2 1/2015 Jones et al.
8,948,428 B2 2/2015 Kates
8,983,081 B2 3/2015 Bayley
8,992,710 B2 3/2015 Keady
9,002,023 B2 4/2015 Gauger, Jr.
9,013,351 B2 4/2015 Park et al.
9,037,458 B2 5/2015 Park et al.
9,053,697 B2 6/2015 Park
9,076,427 B2 7/2015 Alderson et al.
9,112,701 B2 8/2015 Sano et al.
9,113,240 B2 8/2015 Ramakrishman
9,113,267 B2 8/2015 Usher et al.
9,123,323 B2 9/2015 Keady
9,123,343 B2 9/2015 Kurki-Suonio
9,124,982 B2 9/2015 Goldstein et al.
9,135,797 B2 9/2015 Couper et al.
9,135,809 B2 9/2015 Chang et al.
9,137,597 B2 9/2015 Usher et al.
9,138,353 B2 9/2015 Keady
9,142,207 B2 9/2015 Hendrix et al.
9,165,567 B2 10/2015 Visser et al.
9,185,481 B2 11/2015 Goldstein et al.
9,191,732 B2 11/2015 Wurtz
9,191,740 B2 11/2015 McIntosh
9,196,247 B2 11/2015 Harada
9,216,237 B2 12/2015 Keady
9,270,244 B2 2/2016 Usher et al.
9,288,592 B2 3/2016 Basseas
9,338,568 B2 5/2016 Van Hal
9,357,288 B2 5/2016 Goldstein et al.
9,369,814 B2 6/2016 Victorian et al.
9,445,183 B2 9/2016 Dahl
9,462,100 B2 10/2016 Usher et al.
9,491,542 B2 11/2016 Usher
9,497,423 B2 11/2016 Moberly
9,539,147 B2 1/2017 Keady et al.
9,554,733 B2 1/2017 Henriksen et al.
9,609,424 B2 3/2017 Goldstein
9,628,896 B2 4/2017 Ichimura
9,653,869 B1 5/2017 Hersman et al.
9,684,778 B2 6/2017 Tharappel et al.
9,685,921 B2 6/2017 Smith et al.
9,757,069 B2 9/2017 Keady et al.
9,763,003 B2 9/2017 Usher et al.
9,779,716 B2 10/2017 Gadonniex et al.
9,781,530 B2 10/2017 Usher et al.
9,843,854 B2 12/2017 Keady
9,894,452 B1 2/2018 Termeulen et al.
9,943,185 B2 4/2018 Chen
10,012,529 B2 7/2018 Goldstein et al.
10,045,107 B2 8/2018 Kirsch et al.
10,142,332 B2 11/2018 Ravindran et al.
10,190,904 B2 1/2019 Goldstein et al.
10,284,939 B2 5/2019 Radin et al.
10,297,246 B2 5/2019 Asada et al.
10,365,883 B2 7/2019 Goldstein et al.
10,413,197 B2 9/2019 Leboeuf et al.
10,506,320 B1 12/2019 Lott
10,709,339 B1 7/2020 Lusted
10,760,948 B2 9/2020 Goldstein et al.
10,848,827 B2 11/2020 Sengupta et al.
10,917,711 B2 2/2021 Higgins
10,966,015 B2 3/2021 Usher
10,970,375 B2 4/2021 Shila et al.
10,979,836 B2 4/2021 Usher et al.
11,006,198 B2 5/2021 Lott
11,012,770 B2 5/2021 Hatfield et al.
11,039,259 B2 6/2021 Goldstein et al.
11,051,704 B1 7/2021 Tran
11,057,701 B2 7/2021 Goldstein et al.
11,115,750 B2 9/2021 Monsarrat-Chanon et al.
11,122,357 B2 9/2021 Burnett
11,172,298 B2 11/2021 Carrigan et al.

(56) References Cited

U.S. PATENT DOCUMENTS 11,217,237 B2 1/2022 Usher et al.
11,244,666 B2 2/2022 Goldstein et al.
11,277,682 B2 3/2022 Usher
11,277,700 B2 3/2022 Goldstein
11,294,619 B2 4/2022 Usher et al.
11,383,158 B2 7/2022 Bonanno
11,393,486 B1 7/2022 Woodruff et al.
11,610,587 B2 3/2023 Goldstein et al.
11,659,315 B2 5/2023 Perez et al.
11,665,493 B2 5/2023 Usher et al.
11,710,473 B2 7/2023 Goldstein et al.
11,750,965 B2 9/2023 Usher et al.
2001/0041559 A1 11/2001 Salabaschew
2001/0046304 A1 11/2001 Rast
2002/0003889 A1 1/2002 Fischer
2002/0009203 A1 1/2002 Erten
2002/0018798 A1 2/2002 Sewing et al.
2002/0026311 A1 2/2002 Okitsu
2002/0057817 A1 5/2002 Darbut
2002/0069056 A1 6/2002 Nofsinger
2002/0076057 A1 6/2002 Voix
2002/0076059 A1 6/2002 Joynes
2002/0085690 A1 7/2002 Davidson et al.
2002/0098878 A1 7/2002 Mooney
2002/0106091 A1 8/2002 Furst et al.
2002/0111798 A1 8/2002 Huang
2002/0116541 A1 8/2002 Parker et al.
2002/0118798 A1 8/2002 Langhart et al.
2002/0123893 A1 9/2002 Woodward
2002/0133513 A1 9/2002 Townsend et al.
2002/0141599 A1 10/2002 Trajkovic et al.
2002/0141602 A1 10/2002 Nemirovski
2002/0143534 A1 10/2002 Hol
2002/0165719 A1 11/2002 Wang
2002/0169596 A1 11/2002 Brill et al.
2002/0169615 A1 11/2002 Kruger et al.
2002/0191799 A1 12/2002 Nordqvist et al.
2002/0191952 A1 12/2002 Fiore et al.
2002/0193130 A1 12/2002 Yang
2003/0008633 A1 1/2003 Bartosik
2003/0026438 A1 2/2003 Ray et al.
2003/0032447 A1 2/2003 Bulthuis
2003/0033152 A1 2/2003 Cameron
2003/0035551 A1 2/2003 Ligh
2003/0048882 A1 3/2003 Smith
2003/0050777 A1 3/2003 Donald
2003/0055627 A1 3/2003 Balan et al.
2003/0061032 A1 3/2003 Gonopolskiy
2003/0065512 A1 4/2003 Walker
2003/0065620 A1 4/2003 Gailey et al.
2003/0069002 A1 4/2003 Hunter et al.
2003/0083879 A1 5/2003 Cyr et al.
2003/0083883 A1 5/2003 Cyr et al.
2003/0110040 A1 6/2003 Holland et al.
2003/0130016 A1 7/2003 Matsuura
2003/0138118 A1 7/2003 Stahl
2003/0152359 A1 8/2003 Kim
2003/0156725 A1 8/2003 Boone et al.
2003/0161097 A1 8/2003 Le et al.
2003/0165246 A1 9/2003 Kvaloy et al.
2003/0165319 A1 9/2003 Barber
2003/0198357 A1 10/2003 Schneider et al.
2003/0198359 A1 10/2003 Killion et al.
2003/0200096 A1 10/2003 Asai
2003/0228019 A1 12/2003 Eichler et al.
2003/0228023 A1 12/2003 Burnett et al.
2004/0008850 A1 1/2004 Gustavsson
2004/0019482 A1 1/2004 Holub
2004/0042103 A1 3/2004 Mayer
2004/0047474 A1 3/2004 Vries et al.
2004/0047486 A1 3/2004 Van et al.
2004/0049385 A1 3/2004 Lovance et al.
2004/0086138 A1 5/2004 Kuth
2004/0088162 A1 5/2004 He et al.
2004/0109579 A1 6/2004 Izuchi et al.
2004/0109668 A1 6/2004 Stuckman
2004/0125965 A1 7/2004 Alberth et al.
2004/0128136 A1 7/2004 Irani
2004/0133421 A1 7/2004 Burnett
2004/0150717 A1 8/2004 Page et al.
2004/0160573 A1 8/2004 Jannard et al.
2004/0165742 A1 8/2004 Shennib et al.
2004/0175005 A1 9/2004 Roeck
2004/0179694 A1 9/2004 Alley
2004/0185804 A1 9/2004 Kanamori et al.
2004/0190737 A1 9/2004 Kuhnel et al.
2004/0196992 A1 10/2004 Ryan
2004/0202333 A1 10/2004 Csermak et al.
2004/0202339 A1 10/2004 OBrien
2004/0202340 A1 10/2004 Armstrong et al.
2004/0203351 A1 10/2004 Shearer et al.
2004/0252852 A1 12/2004 Taenzer
2004/0258263 A1 12/2004 Saxton et al.
2004/0264938 A1 12/2004 Felder
2005/0008167 A1 1/2005 Gleissner et al.
2005/0028212 A1 2/2005 Laronne
2005/0033384 A1 2/2005 Sacha
2005/0033571 A1 2/2005 Huang et al.
2005/0047611 A1 3/2005 Mao
2005/0049854 A1 3/2005 Reding et al.
2005/0058300 A1 3/2005 Suzuki et al.
2005/0058313 A1 3/2005 Victorian
2005/0060142 A1 3/2005 Msser et al.
2005/0068171 A1 3/2005 Kelliher
2005/0070337 A1 3/2005 Byford et al.
2005/0071158 A1 3/2005 Byford
2005/0071626 A1 3/2005 Bear et al.
2005/0077102 A1 4/2005 Banter et al.
2005/0078838 A1 4/2005 Simon
2005/0078842 A1 4/2005 Vonlanthen et al.
2005/0090295 A1 4/2005 Ali et al.
2005/0096764 A1 5/2005 Weiser
2005/0096899 A1 5/2005 Padhi et al.
2005/0102142 A1 5/2005 Soufflet et al.
2005/0114124 A1 5/2005 Liu et al.
2005/0123146 A1 6/2005 Voix et al.
2005/0134710 A1 6/2005 Nomura et al.
2005/0157891 A1 7/2005 Johansen
2005/0163289 A1 7/2005 Caspi et al.
2005/0175194 A1 8/2005 Anderson
2005/0182620 A1 8/2005 Kabi et al.
2005/0207605 A1 9/2005 Dehe
2005/0215907 A1 9/2005 Toda et al.
2005/0216531 A1 9/2005 Blandford
2005/0222820 A1 10/2005 Chung
2005/0227674 A1 10/2005 Kopra
2005/0254640 A1 11/2005 Ohki et al.
2005/0254676 A1 11/2005 Rass et al.
2005/0258942 A1 11/2005 Manasseh et al.
2005/0260978 A1 11/2005 Rader et al.
2005/0264425 A1 12/2005 Sato et al.
2005/0281422 A1 12/2005 Armstrong
2005/0281423 A1 12/2005 Armstrong
2005/0283369 A1 12/2005 Clauser et al.
2005/0288057 A1 12/2005 Lai et al.
2006/0013410 A1 1/2006 Wurtz
2006/0018496 A1 1/2006 Niederdrank et al.
2006/0053007 A1 3/2006 Niemisto
2006/0064037 A1 3/2006 Shalon et al.
2006/0067551 A1 3/2006 Cartwright et al.
2006/0074895 A1 4/2006 Belknap
2006/0083387 A1 4/2006 Emoto
2006/0083388 A1 4/2006 Rothschild
2006/0083390 A1 4/2006 Kaderavek
2006/0083395 A1 4/2006 Allen et al.
2006/0088176 A1 4/2006 Werner
2006/0092043 A1 5/2006 Lagassey
2006/0095199 A1 5/2006 Lagassey
2006/0116175 A1 6/2006 Chu
2006/0116877 A1 6/2006 Pickering et al.
2006/0120545 A1 6/2006 Rasmussen
2006/0126821 A1 6/2006 Sahashi
2006/0126865 A1 6/2006 Blamey et al.
2006/0140425 A1 6/2006 Berg

(56) References Cited

U.S. PATENT DOCUMENTS

| | | | |
|---|---|---|---|
| 2006/0147063 | A1 | 7/2006 | Chen |
| 2006/0153394 | A1 | 7/2006 | Beasley |
| 2006/0154642 | A1 | 7/2006 | Scannell |
| 2006/0167687 | A1 | 7/2006 | Kates |
| 2006/0173563 | A1 | 8/2006 | Borovitski |
| 2006/0182287 | A1 | 8/2006 | Schulein |
| 2006/0182295 | A1 | 8/2006 | Dijkstra et al. |
| 2006/0184983 | A1 | 8/2006 | Casey |
| 2006/0188075 | A1 | 8/2006 | Peterson |
| 2006/0188105 | A1 | 8/2006 | Baskerville et al. |
| 2006/0195322 | A1 | 8/2006 | Broussard et al. |
| 2006/0204014 | A1 | 9/2006 | Iseberg et al. |
| 2006/0223547 | A1 | 10/2006 | Chin et al. |
| 2006/0233413 | A1 | 10/2006 | Nam |
| 2006/0241948 | A1 | 10/2006 | Abrash et al. |
| 2006/0258325 | A1 | 11/2006 | Tsutaichi et al. |
| 2006/0262935 | A1 | 11/2006 | Goose et al. |
| 2006/0262938 | A1 | 11/2006 | Gauger et al. |
| 2006/0262944 | A1 | 11/2006 | Rasmussen et al. |
| 2006/0264176 | A1 | 11/2006 | Hong |
| 2006/0274166 | A1 | 12/2006 | Lee et al. |
| 2006/0285709 | A1 | 12/2006 | Barthel |
| 2006/0287014 | A1 | 12/2006 | Matsuura et al. |
| 2007/0003090 | A1 | 1/2007 | Anderson |
| 2007/0009122 | A1 | 1/2007 | Hamacher |
| 2007/0009127 | A1 | 1/2007 | Klemenz et al. |
| 2007/0014423 | A1 | 1/2007 | Darbut et al. |
| 2007/0019817 | A1 | 1/2007 | Siltmann |
| 2007/0021148 | A1 | 1/2007 | Mahini |
| 2007/0021958 | A1 | 1/2007 | Visser et al. |
| 2007/0027676 | A1 | 2/2007 | Chambers et al. |
| 2007/0036377 | A1 | 2/2007 | Stirnemann |
| 2007/0041589 | A1 | 2/2007 | Patel et al. |
| 2007/0043563 | A1 | 2/2007 | Comerford et al. |
| 2007/0076896 | A1 | 4/2007 | Hosaka et al. |
| 2007/0086600 | A1 | 4/2007 | Boesen |
| 2007/0092087 | A1 | 4/2007 | Bothra |
| 2007/0100637 | A1 | 5/2007 | McCune |
| 2007/0127660 | A1 | 6/2007 | Roberts et al. |
| 2007/0143820 | A1 | 6/2007 | Pawlowski |
| 2007/0147635 | A1 | 6/2007 | Dijkstra et al. |
| 2007/0160243 | A1 | 7/2007 | Dijkstra |
| 2007/0172087 | A1 | 7/2007 | Olsen |
| 2007/0177743 | A1 | 8/2007 | Mertens |
| 2007/0185601 | A1 | 8/2007 | Lee et al. |
| 2007/0189544 | A1 | 8/2007 | Rosenberg |
| 2007/0194893 | A1 | 8/2007 | Deyoe |
| 2007/0201705 | A1 | 8/2007 | Dorogusker et al. |
| 2007/0206825 | A1 | 9/2007 | Thomasson |
| 2007/0206826 | A1 | 9/2007 | Gerhard |
| 2007/0223717 | A1 | 9/2007 | Boersma |
| 2007/0225035 | A1 | 9/2007 | Gauger et al. |
| 2007/0230734 | A1 | 10/2007 | Beard |
| 2007/0233487 | A1 | 10/2007 | Cohen et al. |
| 2007/0239294 | A1 | 10/2007 | Brueckner et al. |
| 2007/0253569 | A1 | 11/2007 | Bose |
| 2007/0255435 | A1 | 11/2007 | Cohen |
| 2007/0260460 | A1 | 11/2007 | Hyatt |
| 2007/0274531 | A1 | 11/2007 | Camp |
| 2007/0281744 | A1 | 12/2007 | Andreasson |
| 2007/0291953 | A1 | 12/2007 | Ngia et al. |
| 2008/0037801 | A1 | 2/2008 | Alves et al. |
| 2008/0063228 | A1 | 3/2008 | Mejia |
| 2008/0069369 | A1 | 3/2008 | Dyer |
| 2008/0079571 | A1 | 4/2008 | Samadani |
| 2008/0089530 | A1 | 4/2008 | Bostick et al. |
| 2008/0091421 | A1 | 4/2008 | Gustavsson |
| 2008/0101638 | A1 | 5/2008 | Ziller |
| 2008/0107282 | A1 | 5/2008 | Asada |
| 2008/0107297 | A1 | 5/2008 | Fischer et al. |
| 2008/0123866 | A1 | 5/2008 | Rule et al. |
| 2008/0129520 | A1 | 6/2008 | Lee |
| 2008/0130908 | A1 | 6/2008 | Cohen |
| 2008/0137873 | A1 | 6/2008 | Goldstein |
| 2008/0145032 | A1 | 6/2008 | Lindroos |
| 2008/0152167 | A1 | 6/2008 | Taenzer |
| 2008/0152169 | A1 | 6/2008 | Asada et al. |
| 2008/0159547 | A1 | 7/2008 | Schuler |
| 2008/0162133 | A1 | 7/2008 | Couper et al. |
| 2008/0165988 | A1 | 7/2008 | Terlizzi et al. |
| 2008/0175411 | A1 | 7/2008 | Greve |
| 2008/0181419 | A1 | 7/2008 | Goldstein et al. |
| 2008/0201138 | A1 | 8/2008 | Visser et al. |
| 2008/0221880 | A1 | 9/2008 | Cerra et al. |
| 2008/0240458 | A1 | 10/2008 | Goldstein et al. |
| 2008/0257047 | A1 | 10/2008 | Pelecanos et al. |
| 2008/0260180 | A1 | 10/2008 | Goldstein et al. |
| 2008/0269926 | A1 | 10/2008 | Xiang et al. |
| 2009/0010456 | A1 | 1/2009 | Goldstein et al. |
| 2009/0016501 | A1 | 1/2009 | May et al. |
| 2009/0016541 | A1 | 1/2009 | Goldstein et al. |
| 2009/0024234 | A1 | 1/2009 | Archibald |
| 2009/0034748 | A1 | 2/2009 | Sibbald |
| 2009/0046867 | A1 | 2/2009 | Clemow |
| 2009/0067661 | A1 | 3/2009 | Keady et al. |
| 2009/0071487 | A1 | 3/2009 | Keady |
| 2009/0076821 | A1 | 3/2009 | Brenner |
| 2009/0085873 | A1 | 4/2009 | Betts et al. |
| 2009/0087003 | A1 | 4/2009 | Zurek et al. |
| 2009/0122996 | A1 | 5/2009 | Klein |
| 2009/0175474 | A1 | 7/2009 | Salvetti et al. |
| 2009/0180631 | A1 | 7/2009 | Michael et al. |
| 2009/0192688 | A1 | 7/2009 | Padmanabhan et al. |
| 2009/0227888 | A1 | 9/2009 | Salmi et al. |
| 2009/0238386 | A1 | 9/2009 | Usher et al. |
| 2009/0274314 | A1 | 11/2009 | Arndt et al. |
| 2009/0286515 | A1 | 11/2009 | Othmer |
| 2010/0061564 | A1 | 3/2010 | Clemow et al. |
| 2010/0119077 | A1 | 5/2010 | Platz et al. |
| 2010/0150367 | A1 | 6/2010 | Mizuno |
| 2010/0166203 | A1 | 7/2010 | Peissig et al. |
| 2010/0223223 | A1 | 9/2010 | Sandler et al. |
| 2010/0241256 | A1 | 9/2010 | Goldstein et al. |
| 2010/0296668 | A1 | 11/2010 | Lee et al. |
| 2010/0316033 | A1 | 12/2010 | Atwal |
| 2010/0328224 | A1 | 12/2010 | Kerr et al. |
| 2011/0026724 | A1 | 2/2011 | Doclo |
| 2011/0055256 | A1 | 3/2011 | Phillips |
| 2011/0079227 | A1 | 4/2011 | Turcot et al. |
| 2011/0096939 | A1 | 4/2011 | Ichimura |
| 2011/0116643 | A1 | 5/2011 | Tiscareno |
| 2011/0125063 | A1 | 5/2011 | Shalon et al. |
| 2011/0135120 | A1 | 6/2011 | Larsen et al. |
| 2011/0187640 | A1 | 8/2011 | Jacobsen et al. |
| 2011/0264447 | A1 | 10/2011 | Visser et al. |
| 2011/0288860 | A1 | 11/2011 | Schevciw et al. |
| 2011/0293103 | A1 | 12/2011 | Park et al. |
| 2011/0299695 | A1 | 12/2011 | Nicholson |
| 2012/0076317 | A1 | 3/2012 | Fratti et al. |
| 2012/0170412 | A1 | 7/2012 | Calhoun |
| 2013/0056295 | A1 | 3/2013 | Campbell et al. |
| 2013/0098706 | A1 | 4/2013 | Keady |
| 2013/0136285 | A1 | 5/2013 | Naumann |
| 2013/0149192 | A1 | 6/2013 | Keady |
| 2013/0219345 | A1 | 8/2013 | Saukko et al. |
| 2013/0251172 | A1 | 9/2013 | Mosseri |
| 2014/0003644 | A1 | 1/2014 | Keady et al. |
| 2014/0010378 | A1 | 1/2014 | Voix et al. |
| 2014/0023203 | A1 | 1/2014 | Rotschild |
| 2014/0026665 | A1 | 1/2014 | Keady |
| 2014/0072165 | A1 | 3/2014 | Gebert et al. |
| 2014/0089672 | A1 | 3/2014 | Luna et al. |
| 2014/0122092 | A1 | 5/2014 | Goldstein |
| 2014/0126748 | A1 | 5/2014 | Usher et al. |
| 2014/0148101 | A1 | 5/2014 | Seshadri et al. |
| 2014/0163976 | A1 | 6/2014 | Park |
| 2014/0166122 | A1 | 6/2014 | Goldstein et al. |
| 2014/0205123 | A1 | 7/2014 | Lafort et al. |
| 2014/0238774 | A1 | 8/2014 | Blendinger |
| 2014/0270200 | A1 | 9/2014 | Usher et al. |
| 2014/0373854 | A1 | 12/2014 | Keady |
| 2015/0150728 | A1 | 6/2015 | Duvall |
| 2015/0170645 | A1 | 6/2015 | Di et al. |
| 2015/0195641 | A1 | 7/2015 | Di et al. |

(56) References Cited

U.S. PATENT DOCUMENTS

| | | | |
|---|---|---|---|
| 2015/0215701 | A1 | 7/2015 | Usher |
| 2015/0358730 | A1 | 12/2015 | Kirsch et al. |
| 2016/0012714 | A1 | 1/2016 | Patenaude et al. |
| 2016/0015568 | A1 | 1/2016 | Keady |
| 2016/0019024 | A1 | 1/2016 | Suzuki et al. |
| 2016/0050483 | A1 | 2/2016 | Kulavik et al. |
| 2016/0057551 | A1 | 2/2016 | Higgins et al. |
| 2016/0058378 | A1 | 3/2016 | Wisby et al. |
| 2016/0104452 | A1 | 4/2016 | Guan et al. |
| 2016/0127818 | A1 | 5/2016 | Ambrose |
| 2016/0192077 | A1 | 6/2016 | Keady |
| 2016/0249128 | A1 | 8/2016 | Goldstein |
| 2016/0269817 | A1 | 9/2016 | Basseas et al. |
| 2016/0277854 | A1 | 9/2016 | Puria et al. |
| 2016/0295311 | A1 | 10/2016 | Keady et al. |
| 2017/0134865 | A1 | 5/2017 | Goldstein et al. |
| 2017/0142511 | A1 | 5/2017 | Dennis |
| 2017/0223451 | A1 | 8/2017 | Kirsch et al. |
| 2018/0054668 | A1 | 2/2018 | Keady |
| 2018/0115818 | A1 | 4/2018 | Asada et al. |
| 2018/0132048 | A1 | 5/2018 | Usher et al. |
| 2018/0160211 | A1 | 6/2018 | Kirsch et al. |
| 2018/0220239 | A1 | 8/2018 | Keady et al. |
| 2018/0233125 | A1 | 8/2018 | Mitchell et al. |
| 2019/0038224 | A1 | 2/2019 | Zhang et al. |
| 2019/0082272 | A9 | 3/2019 | Goldstein et al. |
| 2019/0387305 | A1 | 12/2019 | Keady |
| 2020/0379717 | A1 | 12/2020 | Mazur et al. |
| 2020/0380945 | A1 | 12/2020 | Woodruff et al. |
| 2021/0014597 | A1 | 1/2021 | Andersen et al. |
| 2021/0152924 | A1 | 5/2021 | Keady |
| 2022/0061767 | A1 | 3/2022 | Goldstein et al. |

FOREIGN PATENT DOCUMENTS

| | | | |
|---|---|---|---|
| CA | 2215764 | A1 | 11/1996 |
| CA | 2448669 | A1 | 12/2002 |
| DE | 4312155 | A1 | 10/1994 |
| DE | 102012221233 | A1 | 3/2014 |
| DE | 102013203334 | B3 | 5/2014 |
| EP | 0495653 | A1 | 7/1992 |
| EP | 0643881 | A1 | 3/1995 |
| EP | 0692169 | A1 | 1/1996 |
| EP | 0935236 | A1 | 8/1999 |
| EP | 1033063 | B1 | 5/2003 |
| EP | 1320281 | A2 | 6/2003 |
| EP | 1385324 | | 1/2004 |
| EP | 1385324 | A1 | 1/2004 |
| EP | 1401240 | | 3/2004 |
| EP | 1483591 | A2 | 12/2004 |
| EP | 1489596 | A1 | 12/2004 |
| EP | 1519625 | A2 | 3/2005 |
| EP | 1570244 | A1 | 9/2005 |
| EP | 1594344 | A2 | 11/2005 |
| EP | 1638079 | A2 | 3/2006 |
| EP | 1640972 | | 3/2006 |
| EP | 1640972 | A1 | 3/2006 |
| EP | 1674061 | A1 | 6/2006 |
| EP | 1681903 | A2 | 7/2006 |
| EP | 1800950 | A2 | 6/2007 |
| EP | 1841283 | A2 | 10/2007 |
| EP | 1322268 | B1 | 1/2009 |
| EP | 1313417 | B1 | 2/2009 |
| EP | 1313418 | B1 | 3/2009 |
| EP | 2749043 | A1 | 7/2014 |
| EP | 2991381 | A1 | 3/2016 |
| EP | 3068142 | A1 | 9/2016 |
| EP | 1415505 | A1 | 12/2022 |
| FR | 2560520 | A1 | 9/1985 |
| GB | 1518299 | A | 7/1978 |
| GB | 2082820 | A | 3/1982 |
| GB | 2155276 | A | 9/1985 |
| GB | 2441835 | A | 3/2008 |
| JP | 02-097362 | A | 4/1990 |
| JP | 05-145623 | A | 6/1993 |
| JP | 05-199590 | A | 8/1993 |
| JP | 05-336599 | A | 12/1993 |
| JP | H0877468 | | 3/1996 |
| JP | H10162283 | | 6/1998 |
| JP | 10-294989 | A | 11/1998 |
| JP | 11-331990 | A | 11/1999 |
| JP | 3085237 | B2 | 9/2000 |
| JP | 2001-045585 | A | 2/2001 |
| JP | 2001-054184 | A | 2/2001 |
| JP | 2002-204500 | A | 7/2002 |
| JP | 3353701 | | 12/2002 |
| JP | 2003-304599 | A | 10/2003 |
| JP | 3556987 | B2 | 8/2004 |
| JP | 2004-289762 | A | 10/2004 |
| JP | 2005-064744 | A | 3/2005 |
| JP | 2005-130205 | A | 5/2005 |
| JP | 2005-168888 | A | 6/2005 |
| JP | 2005-227511 | A | 8/2005 |
| JP | 2005-260944 | A | 9/2005 |
| JP | 2005-295175 | A | 10/2005 |
| JP | 2006-107044 | A | 4/2006 |
| JP | 2009-003040 | A | 1/2009 |
| JP | 2017-147677 | A | 8/2017 |
| KR | 10-2002-0086433 | A | 11/2002 |
| KR | 10-0366231 | B1 | 12/2002 |
| KR | 10-2003-0013732 | A | 2/2003 |
| KR | 10-2003-0058432 | A | 7/2003 |
| KR | 10-2003-0068021 | A | 8/2003 |
| KR | 10-2003-0069471 | A | 8/2003 |
| KR | 10-0607492 | B1 | 8/2006 |
| KR | 10-0783099 | B1 | 12/2007 |
| KR | 10-1154948 | B1 | 6/2012 |
| KR | 10-1194923 | B1 | 10/2012 |
| TW | 200615862 | A | 5/2006 |
| WO | 86/00133 | A1 | 1/1986 |
| WO | 93/26084 | A1 | 12/1993 |
| WO | WO9326085 | | 12/1993 |
| WO | 94/23520 | A1 | 10/1994 |
| WO | 97/25790 | A2 | 7/1997 |
| WO | 98/54878 | A1 | 12/1998 |
| WO | 99/43185 | A1 | 8/1999 |
| WO | 01/01731 | A1 | 1/2001 |
| WO | 01/57852 | A1 | 8/2001 |
| WO | 01/89083 | A1 | 11/2001 |
| WO | 02/13522 | A2 | 2/2002 |
| WO | 02/17835 | A1 | 3/2002 |
| WO | 02/17836 | A1 | 3/2002 |
| WO | 02/93891 | A1 | 11/2002 |
| WO | 2002/101720 | A1 | 12/2002 |
| WO | 03/23766 | A2 | 3/2003 |
| WO | 03/73790 | A1 | 9/2003 |
| WO | 03/96031 | A2 | 11/2003 |
| WO | 2004/016037 | A1 | 2/2004 |
| WO | 2004/053435 | A1 | 6/2004 |
| WO | 2004114722 | | 12/2004 |
| WO | 2005/029468 | A1 | 3/2005 |
| WO | 2005/073875 | A1 | 8/2005 |
| WO | 2005/107320 | A1 | 11/2005 |
| WO | 2006/026812 | A2 | 3/2006 |
| WO | 2006/034029 | A2 | 3/2006 |
| WO | 2006/036262 | A2 | 4/2006 |
| WO | 2006/037156 | A1 | 4/2006 |
| WO | 2006/054205 | A1 | 5/2006 |
| WO | 2006054698 | | 5/2006 |
| WO | 2006/074082 | A1 | 7/2006 |
| WO | 2006/097099 | A1 | 9/2006 |
| WO | 2006/114101 | A1 | 11/2006 |
| WO | 2007/007916 | A1 | 1/2007 |
| WO | 2007/017809 | A1 | 2/2007 |
| WO | 2007/017810 | A2 | 2/2007 |
| WO | 2007/028250 | A2 | 3/2007 |
| WO | 2007/073818 | A1 | 7/2007 |
| WO | 2007/082579 | A2 | 7/2007 |
| WO | 2007092660 | | 8/2007 |
| WO | 2007/112838 | A1 | 10/2007 |
| WO | 2007/147077 | A2 | 12/2007 |
| WO | 2008/017326 | A1 | 2/2008 |
| WO | 2008050583 | | 5/2008 |
| WO | 2008/067454 | A2 | 6/2008 |

(56) References Cited

FOREIGN PATENT DOCUMENTS

| | | |
|---|---|---|
| WO | 2008/096125 A2 | 8/2008 |
| WO | 2009/023633 A1 | 2/2009 |
| WO | 2009023784 | 2/2009 |
| WO | 2009/097009 A1 | 8/2009 |
| WO | 2011/110901 A1 | 9/2011 |
| WO | 2011/161487 A1 | 12/2011 |
| WO | 2012/097150 A1 | 7/2012 |
| WO | 2012097150 | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

*Samsung Electronics Co., Ltd., and Samsung Electronics, America, Inc.,* v. *Staton Techiya, LLC,* IPR2022-00282, Dec. 21, 2021.

*Samsung Electronics Co., Ltd., and Samsung Electronics, America, Inc.,* v. *Staton Techiya, LLC,* IPR2022-00242, Dec. 23, 2021.

*Samsung Electronics Co., Ltd., and Samsung Electronics, America, Inc.,* v. *Staton Techiya, LLC,* IPR2022-00243, Dec. 23, 2021.

*Samsung Electronics Co., Ltd., and Samsung Electronics, America, Inc.,* v. *Staton Techiya, LLC,* IPR2022-00234, Dec. 21, 2021.

*Samsung Electronics Co., Ltd., and Samsung Electronics, America, Inc.,* v. *Staton Techiya, LLC,* IPR2022-00253, Jan. 18, 2022.

*Samsung Electronics Co., Ltd., and Samsung Electronics, America, Inc.,* v. *Staton Techiya, LLC,* IPR2022-00324, Jan. 13, 2022.

*Samsung Electronics Co., Ltd., and Samsung Electronics, America, Inc.,* v. *Staton Techiya, LLC,* IPR2022-00281, Jan. 18, 2022.

*Samsung Electronics Co., Ltd., and Samsung Electronics, America, Inc.,* v. *Staton Techiya, LLC,* IPR2022-00302, Jan. 13, 2022.

*Samsung Electronics Co., Ltd., and Samsung Electronics, America, Inc.,* v. *Staton Techiya, LLC,* IPR2022-00369, Feb. 18, 2022.

*Samsung Electronics Co., Ltd., and Samsung Electronics, America, Inc.,* v. *Staton Techiya, LLC,* IPR2022-00388, Feb. 18, 2022.

*Samsung Electronics Co., Ltd., and Samsung Electronics, America, Inc.,* v. *Staton Techiya, LLC,* IPR2022-00410, Feb. 18, 2022.

*Samsung Electronics Co., Ltd., and Samsung Electronics, America, Inc.,* v. *Staton Techiya, LLC,* IPR2022-01078, Jun. 9, 2022.

*Samsung Electronics Co., Ltd., and Samsung Electronics, America, Inc.,* v. *Staton Techiya, LLC,* IPR2022-01099, Jun. 9, 2022.

*Samsung Electronics Co., Ltd., and Samsung Electronics, America, Inc.,* v. *Staton Techiya, LLC,* IPR2022-01106, Jun. 9, 2022.

*Samsung Electronics Co., Ltd., and Samsung Electronics, America, Inc.,* v. *Staton Techiya, LLC,* IPR2022-01098, Jun. 9, 2022.

U.S. Appl. No. 90/015,146, Samsung Electronics Co., Ltd. and Samsung Electronics, America, Inc., Request for Ex Parte Reexamination of U.S. Pat. No. 10,979,836, Oct. 28, 2022.

U.S. Appl. No. 90/019,169, Samsung Electronics Co., Ltd. and Samsung Electronics, America, Inc., Request for Ex Parte Reexamination of U.S. Pat. No. 11,244,666, Feb. 24, 2023.

Nov. 3, 2022 [16] Notice of Deposition of David Kleinschmidt, Exhibit—16, Filed on Nov. 3, 2022—Cited in IPR2022-00282, challenging U.S. Pat. No. 8,315,400, 3 pages.

3M/Aearo Technologies' E-A-RFitTM Dual-Ear Validation System ("E-A-RFit"), Sep. 4, 2015 WayBack Machine capture of 3M's website contains an image of the E-A-RFit and states "[t]he 3M™ E-A-Rfit™ Dual Ear Validation System makes . . . " https://web.archive.org/web/20150904132810/ http:/solutions.3m.com/wps/portal/3M/en_US/3M-PPE-Safety-Solutions/Personal- Protective-Equipment/safety-management/safety-training/hearing- protection-fit-testing/?WT.mc_id=www.3m.com/EARfitDe mo/ (SAM-TECH_00052276; SAM-Tech ; SAM-TECH 00052239), 2 pgs.

3M/Aearo Technologies' E-A-RFitTM Validation System ("E-A-RFit"), 2010 brochure from 3M's website describes the E-A-RFit and identifies model 393-1000 as an available mode. https://multimedia.3m.com/mws/media/62914 90/3m-e-a-rfit-validation-system- brochure.pdf (SAM-TECH 00052186), 5 pages.

3M/Aearo Technologies' E-A-RFitTM Validation System ("E-A-RFit"), Abstract titled "New from ISEA member 3M Company (www.3m.com] is the E-A-Rfit Validation System a quantitative hearing protector fittest", publ. in Jul. 2012. New from ISEA member 3M Company (www.3m.com] is the E-A-Rfit Validation System a quantitative hearing. Protector fittest, EHS today, vol. 5, Iss.7, ISSN 1945-9599, Gale Group Trade & Industry Database (Jul. 2012), avail. at https://dialog. proquest.com/professional/docview/1095272736?accountid=154502 (SAM-TECH_00052203), 1 pg.

3M/Aearo Technologies' E-A-RFitTM Validation System ("E-A-RFit"), Apr. 24, 2007 article publ. by E.H. Berger from Aearo Technologies discusses E- A-RFit and notes that "[t]he E-A-RFitTM Validation System is a quick and accurate method of estimating real-ear attenuation for a given fitting of a pair of earplugs" and "has been designed and built to be an integral . . . " See E.H. Berger, Recommended Applications for the E-A- RFitTM Validation System in a Workplace Hearing Conservation Program, Aearo Company (2007) (SAM-TECH_00056087-SAM-TECH_0005609), 6 pgs.

3M/Aearo Technologies' E-A-RFitTM Validation System ("E-A-RFit"), Mar. 16, 2016 WayBack Machine capture of 3M's website lists the E-A-RFit for purchase. https://web.archive.org/web/20160316180537/ http://www.3m.com/3M/en_US/company- us/all-3m-products/-/All-3M- Products/Personal-Protective- Equipment/Hearing- Protection/Safety/ Worker- Health-Safety/E- A-R-Fit-Validation- Tools/?N=5002385+8709322+8711017+8711405+8720539+8720546 +8720770+ 329 4857497&rt=r3 (SAM-TECH 00052201), 1 pages.

3M/Aearo Technologies' E-A-RFitTM Validation System ("E-A-RFit"), Mar. 20, 2016 WayBack Machine capture of 3M's website describes the Validation System and protection that the system offers. https://web.archive.org/ web/20160320080156/ http:/www.3m.com/3M/en_US/company-us/all-3m-products/-/All-3M- Products/Personal-Protective- Equipment/Hearing- Protection/Safety/Worker- Health- Safety/?N=5002385+8709322+8711017+871 1405 +8720539+8720546+3294857497&rt=r3 (SAM-TECH_00052278; SAM-Tech 00052292), 2 pages.

3M/Aearo Technologies' E-A-RFitTM Validation System ("E-A-RFit"), Sep. 10, 2015 WayBack Machine capture of 3M's website depicts a brochure describing the E-A-RFit and "Individual Fit Testing Using F-Mire." https://web.archive.org/web/20150910084252/ http:/multimedia.3m.com/mws/media/ 10622 670/earfit-dual-ear-brochure- us.pdf? fn=EARfit%20Dual- Ear%20Brochure%20US.pdf (SAM-TECH_00052333-SAM-TECH_00052336; SAM-Tech 00052339-SAM-TECH 00052339), 5 pages.

400 Patent Family Tree, Exhibit—1009, Filed on Dec. 10, 2021—Cited in IPR2022-00282, challenging U.S. Pat. No. 8,315,400, 1 pages.

A binaural processor for missing data speech recognition in the presence of noise and small-room reverberation, Kalle Palomaki, Guy Brown & Deliang Wang, Speech Communication, 43, Sep. 2004, pp. 361-378.

A compact multi-sensor headset for hands-free communication, Liu, Zicheng & Seltzer, Michael & Acero, A. & Tashev, Ivan & Zhang, Zhengyou & Sinclair, Michael, IEEE Workshop on Applications of Signal Processing to Audio and Acoustics, 138-141. 10.1109/ASPAA.2005.1540188, 5 pages.

A Dual—Mode Human—Machine Interface for Robotic Control Based on Acoustic Sensitivity of the Aural Cavity—Ravi Vaidyanathan, et al., Feb. 2006, 7 pages.

A Dual-Mode Human-Machine Interface for Robotic Control Based on Acoustic Sensitivity of the Aural Cavity Claim Chart (Exhibit N49 to Samsung's Invalidity Contentions), 2006, 7 pages.

A Local Active Noise Control System for Locomotive Drivers, internoise 2000, the 29th International Congress and Exhibition on Noise Control Enginerring, Nielsen, Saebo, Ottesen, Reinen, Sorsdal, Aug. 2000, 4 pages.

(56) References Cited

OTHER PUBLICATIONS

A MFCC-based CELP speech coder for server-based speech recognition in network environments, Yoon, Jae Sam, Gil Ho Lee, and Hong Kook Kim, Ieice Transactions on Fundamentals of Electronics, Communications and Computer Sciences 90.3, 626-632, Mar. 2007, 7 pages.
A Modified Coherence Based Method for Dual Microphone Speech Enhancement, M. Rahmani, et al., Signal Processing and Communications, 2007, 4 pages.
A New Two—Sensor Active Noise Cancellation Algorithm, K.C. Zangi, 1993 IEEE International Conference on Acoustics, Speech, and Signal Processing, Minneapolis, MN, USA, 1993, pp. 351-354 vol. 2, doi: 10, 4 pages.
A Pattern Recognition Approach to Voiced-Unvoiced-Silence Classification with Applications to Speech Recognition, B. Atal and L. Rabiner, IEEE Transactions on Acoustics, Speech, and Signal Processing, vol. 24, No. 3, pp. 201-212, Jun. 1976, 12 pages.
Aarts, Exhibit—1015, Filed on Jan. 14, 2022—Cited in IPR2022-00410, challenging U.S. Pat. No. 10,979,836, 12 pages.
Active Noise Attenuation Using LQG/LTR Control, Garcia, Jose & Bortoloto, Edson & Ribeiro, Jean & Garcia, Eletronica de Potencia. 9. 23-27, Eletronica de Potencia. 9. 23-27. 10.18618/REP.2005.2. 023027, Nov. 2004, 5 pages.
Active Noise Cancellation for Headphones Used in High Noise Environments Using Conventional Analog Circuitry, Mark C. Flohr, May 1, 1987, 74 pages.
Active Noise Control System for Headphone Applications Sen M. Kuo, et al. 2006, 5 pages.
Active Noise Control: Low—Frequency Techniques for Suppressing Acoustic Noise Leap Forward with Signal Processing, S.J. Elliott and P.A. Nelson, Oct. 1993, 24 pages.
Active Noise Reduction Headphone Measurement: Comparison Of Physical And Psychophysical Protocols And Effects Of Microphone Placement, PERALA, Apr. 10, 2006, 204 pages.
Active noise Reduction in an ear terminal, OTTESEN, The Journal of the Acoustical Society of America, vol. 105, Issue 2, Feb. 1999, 4 pages.
Adaptive Feedback Active Noise Control Headset: Implementation, Evaluation, and its Extensions, Woon S. Gan, et al. 2005, 8 pages.
Adaptive Filtering (Dentino), Exhibit-1012, Filed on Dec. 10, 2021—Cited in IPR2022-00282, challenging U.S. Pat. No. 8,315,400, 2 pages.
Adaptive Filtering Algorithims (Diniz), Exhibit-1013, Filed on Dec. 10, 2021—Cited in IPR2022-00282, challenging U.S. Pat. No. 8,315,400, 74 pages.
Adaptive Filtering in the Frequency Domain, M. Dentino, J. Mccool & B. Widrow, Proceedings of the IEEE, vol. 66, No. 12, pp. 1658-1659, Dec. 1978, 2 pages.
Adaptive Noise Cancellation in a Multimicrophone System for Distortion Product Otoacoustic Emission Acquisition, Rafael E. Delgado, et al., 2000, 11 pages.
Adaptive Noise Cancelling (Widrow), Exhibit-1011, Filed on Dec. 21,2021—Cited in IPR2022-00282, challenging U.S. Pat. No. 8,315,400, 26 pages.
Adaptive Noise Cancelling In Headsets, Per Rubak, Henrik D. Green & Lars G. Johansen, Proceedings of IEEE Nordic Signal Processing Symposium, NORSIG'96, Sep. 24-27, 1996, Espoo, Finland, 8 pages.
Air- and Bone-Conductive Integrated Microphones for Robust Speech Detection and Enhancement, Yanli Zheng, et al., 2003 IEEE Workshop on Automatic Speech Recognition and Understanding, 6 pages.
AirPods (1st generation)—Technical Specifications, Exhibit-2009, Filed on Sep. 13, 2022—Cited in IPR2022-00243, challenging U.S. Pat. No. 8,111,839, 4 pages.
Amended Complaint, *Techiya* v. *Samsung*, E.D. Tex, Exhibit—1014, Filed on Jan. 14, 2022—Cited in IPR2022-00410, challenging U.S. Pat. No. 10,979,836, 52 pages.
Amended Complaint, *Techiya* v. *Samsung*, E.D. Tex, Exhibit—1014, Filed on Dec. 21, 2021—Cited in IPR2022-00302, challenging U.S. Pat. No. 9,609,424, 52 pages.
Amended Complaint, *Techiya* v. *Samsung*, E.D. Tex, Exhibit—1017, Filed on Jan. 4, 2022—Cited in IPR2022-00388, challenging U.S. Pat. No. 10,966,015, 52 pages.
Amended Complaint, *Techiya* v. *Samsung*, E.D. Tex, Exhibit—1017, Filed on Dec. 30, 2021—Cited in IPR2022-00369, challenging U.S. Pat. No. 10,405,082, 52 pages.
Amended Docket Control Order, DN 156 from E.D. Tex, Exhibit-1023, Filed on Nov. 10, 2022—Cited in IPR2022-01099, challenging U.S. Pat. No. 11,244,666, 6 pages.
Amended Docket Control Order, DN 156 from E.D. Tex, Exhibit-1026, Filed on Nov. 10, 2022—Cited in IPR2022-01078, challenging U.S. Pat. No. 11,057,701, 6 pages.
Amended Docket Control Order, DN 156 from E.D. Tex, Exhibit-1032, Filed on Nov. 10, 2022—Cited in IPR2022-01106, challenging U.S. Pat. No. 11,039,259, 6 pages.
Amended Docket Control Order, DN 156 from E.D. Tex. 21-cv-00413, Exhibit-1029, Filed on Nov. 15, 2022—Cited in IPR2022-01098, challenging U.S. Pat. No. 11,217,237, 6 pages.
Amended Notice of Deposition of Les E. Atlas, Ph.D, Exhibit-15, Filed on Mar. 14, 2023—Cited in IPR2022-01106, challenging U.S. Pat. No. 11,039,259, 3 pages.
Amendment in U.S. Appl. No. 11/616,973, dated Apr. 13, 2015, Exhibit-2009, Filed on Oct. 11, 2022—Cited in IPR2022-01106, challenging U.S. Pat. No. 11,039,259, 10 pages.
An Integrated Audio And Active Noise Control Headsets, W. S. Gan & S. M. Kuo, IEEE Transactions on Consumer Electronics, vol. 48, No. 2, pp. 242-247, May 2002, 6 pages.
Anderson Declaration ISO MSJ of No Infringement of '259 Patent, Exhibit-2019, Filed on Aug. 14, 2023—Cited in IPR2022-01106, challenging U.S. Pat. No. 11,039,259, 2 pages.
Anderson Non-Infringement Report (excerpt, redacted), Exhibit-2020, Filed on Aug. 14, 2023—Cited in IPR2022-01106, challenging U.S. Pat. No. 11,039,259, 1 pages.
Anderson Rebuttal Report (Redacted, Excerpt), Exhibit-2017, Filed on Apr. 10, 2023—Cited in IPR2022-01106, challenging U.S. Pat. No. 11,039,259, 39 pages.
Android Central, The History of True Wireless Earbuds, Exhibit-2009, Filed on Oct. 17, 2022—Cited in IPR2022-00324, challenging U.S. Pat. No. 8,254,591, 19 pages.
Android Central, The History of True Wireless Earbuds, Exhibit-2011, Filed on Sep. 13, 2022—Cited in IPR2022-00243, challenging U.S. Pat. No. 8,111,839, 19 pages.
Appendix 10A-10C for U.S. Pat. No. 10,979,836 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Appendix 11A-11C for U.S. Pat. No. 11,039,259 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 12 pages.
Appendix 12A-12C for U.S. Pat. No. 11,057,701 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 14 pages.
Appendix 13A-13C for U.S. Pat. No. 11,217,237 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 23 pages.
Appendix 14A-14C for U.S. Pat. No. 11,244,666 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 15 pages.
Appendix 1A-1C for U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542,

(56) References Cited

OTHER PUBLICATIONS 9,609,424, 10,405,082, 10,966,015 (Case No. 2:22-CV-00053-JRG-RSP), served May 18, 2022, 29 pages.
Appendix 2A-2C for U.S. Pat. No. 8,254,591 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 31 pages.
Appendix 3A-3C for U.S. Pat. No. 8,315,400 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.
Appendix 4A-4C for U.S. Pat. No. 9, 124,982 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Appendix 5A-5C for U.S. Pat. No. 9,270,244 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 22 pages.
Appendix 6A-6C for U.S. Pat. No. 9,491,542 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.
Appendix 7A-7C for U.S. Pat. No. 9,609,424 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 45 pages.
Appendix 8A-8C for U.S. Pat. No. 10,405,082 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 13 pages.
Appendix 9A-9Cfor U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 14 pages.
Apple's AirPods Pro ("AirPods Pro"), Article on Apple's website published Apr. 15, 2020 mentions the AirPods Pro has an Ear Tip Fit test available. https://support.apple.com/en-us/HT210633 (SAMTECH_00072120-SAM-TECH_00072123), 4 pages.
Apple's AirPods Pro ("AirPods Pro"), article published by Dan Seifert on Mar. 29, 2019 reviews the AirPods Pro and states Apple is selling the second-gen AirPods in two ways: with the new wireless charging case for $199 or with the standard case for the same $159 as before. https://www.theverge.com/2019/3/29/182860 12/apple-airpods-2-new-2nd-gen-review-price-specs-features; (SAM-TECH_00057262-SAM-TECH_00057275), 14 pages.
Apple's AirPods Pro ("AirPods Pro"), Dec 21, 2019 WayBack Machine capture of Apple's website displays an image of the AirPods Pro and states "[u]se the Ear Tip Fit Test to create the optimal listening experience—you'll get the right tip size for your ears, and the best seal for noise cancellation." https://web.archive.org/web/20191221170719/ https://www.apple.com/airpods-pro/ (SAM-TECH_00054447; SAM-TECH_00054134), 12 pages.
Apple's AirPods Pro ("AirPods Pro"), Nov. 2, 2019 article by Karisa Bell published on mashable.com discusses whether Apple's AirPods Pro are compatible with Androids. https://mashable.com/article/do-airpods-pro-work-with-android. (SAM-TECH_00052378-SAM-TECH_00052390), 13 pages.
Apple's AirPods Pro ("AirPods Pro"), Oct. 29, 2019 artcile by Sarah Rense also discusses testing out the AirPods Pro with active-noise cancellation. https://www.esquire.com/lifestyle/a29612084/apple-airpods-pro-active-noise-cancellation-review/ (SAM-TECH_00058067-SAM-TECH_00058080), 14 pages.
Apple's AirPods Pro ("AirPods Pro"), The specs of the AirPods Pro can be found here https://web.archive.org/web/20191224065355/ https://www.apple.com/airpods-pro/specs/ (SAM-TECH_00052343-SAM-TECH_00052352; SAM-TECH_00053159), May 6, 2022, 11 pages.
Apple's iPhone 11 (iPhone 11), Oct. 11, 2019 article published by Jake Peterson discusses the eartip fit test using AirPods Pro and an iPhone running iOS 13.2. https://ios.gadgethacks.com/how-to/make-your-airpods-pro-fit-better-by-testing-rubber-tips-0210500/ (SAM-TECH_00056564-SAM-TECH_00056569), 6 pages.
Apple's iPhone 11 (iPhone 11), Press release from Apple's website dated Sep. 10, 2019 states "Apple introduces dual camera iPhone 11" and that "Customers in the US, Puerto Rico, the US Virgin Islands and more than 30 other countries and regions will be able to pre-order iPhone 11 beginning at 5 a.m. PDT on Friday, Sep. 13 with availability beginning Friday, Sep. 20." https://www.apple.com/newsroom/2019/09/a pple-introduces-dual-camera-iphone-11/ (SAM-TECH_00056571-SAM-TECH_00056588), 18 pages.
Apple's iPhone 11 (iPhone 11), Sep. 15, 2019 WayBack Machine capture of Apple's website has an image of the iPhone 11 and lists it for sale on the website. https://web.archive.org/web/20190915061032 /https://www.apple.com/shop/buy- iphone/iphone-11; (SAM-TECH_00055106-SAM-TECH_00055123), 18 pages.
Apple's iPhone 11 (iPhone 11), WayBack Machine capture from Sep. 16, 2019 of Apple's website, displays the iPhone and states "Available 9.20." https://web.archive.org/web/20190916102733/ https://www.apple.com/iphone-11/ specs/. (SAM-TECH_00056907), 1 pages.
Audiometric Ear Canal Probe with Active Ambient Noise Control, B. Rafaely & M. Furst, IEEE Transactions on Speech and Audio Processing, vol. 4, No. 3, pp. 224-230, May 1996, 7 pages.
Bang and Olufsen EarSet 2 Bluetooth Headset, At least by 2006, https://www .dexigner.com/news/9935 (SAM-TECH 00094865), 7 pages.
Bang and Olufsen EarSet 2 Bluetooth Headset, At least by 2006, https://www.beoworld. org/prod details.asp?pid=733 (SAM-TECH 00094798), 3 pages.
Berger, Preferred Methods for Measuring Hearing Protector Attenuation, Environmental Noise Control, 2005, The 2005 Congress and Exposition on Noise Control Engineering, 2005, 11 pages.
Brian Hobbs et al., Wideband Hearing, Intelligibility, and Sound Protection, Jan. 10, 2008 Final Report AFRL-RH-WP-TR-2009-0031 at 2 (SAM-TECH_00053002-116), 115 pages.
Build These Noise-Cancelling Headphones, Jules Ryckebusch, 1997, 10 pages.
C.V. of Richard Stern, Ph.D, Exhibit-1003, Filed on Jan. 4, 2022—Cited in IPR2022-00388, challenging U.S. Pat. No. 10,966,015, 30 pages.
C.V. of Richard Stern, Ph.D, Exhibit-1003, Filed on Dec. 10, 2021—Cited in IPR2022-00282, challenging U.S. Pat. No. 8,315,400, 27 pages.
CDC, What Noises Cause Hearing Loss?, Exhibit-2009, Filed on Sep. 13, 2022—Cited in IPR2022-00242, challenging U.S. Pat. No. 8,111,839, 3 pages.
Christopher J. Struck CV, Exhibit-2002, Filed on Apr. 13, 2022—Cited in IPR2022-00302, challenging U.S. Pat. No. 9,609,424, 5 pages.
Chung, Challenges and Recent Developments in Hearing Aids, Trends in Amplification, 2004, pp. 125-164, vol. 8, No. 4.
Claim Construction Order, Exhibit-2008, Filed on Feb. 22, 2023—Cited in IPR2022-00253, challenging U.S. Pat. No. 9,491,542, 51 pages.
Claim Construction Order, Exhibit-2008, Filed on Apr. 18, 2023—Cited in IPR2022-00281, challenging U.S. Pat. No. 9,270,244, 51 pages.
Claim Construction Order, Exhibit-2013, Filed on Apr. 10, 2023—Cited in IPR2022-01106, challenging U.S. Pat. No. 11,039,259, 51 pages.
Combined feedback-feedforward active noise-reducing headset-The effect of the acoustics on broadband performance, Boaz Rafaely & Matthew Jones, J. Acoust. Soc. Am. Sep. 1, 2002; 112 (3): 981-989, 10 pages.

(56) References Cited

OTHER PUBLICATIONS

Complaint, DN 1 from E.D. Tex. 21-cv-00413, Exhibit-1022, Filed on Nov. 10, 2022—Cited in IPR2022-01099, challenging U.S. Pat. No. 11,244,666, 49 pages.
Complaint, DN 1 from E.D. Tex. 21-cv-00413, Exhibit-1025, Filed on Nov. 10, 2022—Cited in IPR2022-01078, challenging U.S. Pat. No. 11,057,701, 49 pages.
Complaint, DN 1 from E.D. Tex. 21-cv-00413, Exhibit-1028, Filed on Nov. 2022—Cited in IPR2022-01098, challenging U.S. Pat. No. 11,217,237, 49 pages.
Complaint, DN 1 from E.D. Tex. 21-cv-00413, Exhibit-1031, Filed on Nov. 10, 2022—Cited in IPR2022-01106, challenging U.S. Pat. No. 11,039,259, 2 pages.
Complaint, E.D. Tex, 22-cv-53, Exhibit-1024, Filed on May 10, 2022—Cited in IPR2022-00302, challenging U.S. Pat. No. 9,609,424, 28 pages.
Complaint, E.D. Tex, 22-cv-53, Exhibit-1032, Filed on May 11, 2022—Cited in IPR2022-00324, challenging U.S. Pat. No. 8,254,591, 28 pages.
Complaint, E.D. Tex. 22-53, Exhibit-1020, Filed on Jun. 14, 2022—Cited in IPR2022-00369, challenging U.S. Pat. No. 10,405,082, 28 pages.
Complaint, E.D. Tex. 22-53, Exhibit-1020, Filed on Jun. 14, 2022—Cited in IPR2022-00388, challenging U.S. Pat. No. 10,966,015, 28 pages.
Complaint, E.D. Tex. 22-53, Exhibit-1021, Filed on Jun. 14, 2022—Cited in IPR2022-00410, challenging U.S. Pat. No. 10,979,836, 28 pages.
Complaint, *Techiya* v. *Samsung*, E.D. Tex, Exhibit-1008, Filed on Jan. 14, 2022—Cited in IPR2022-00410, challenging U.S. Pat. No. 10,979,836, 49 pages.
Complaint, *Techiya* v. *Samsung*, E.D. Tex, Exhibit-1008, Filed on Dec. 21, 2021—Cited in IPR2022-00302, challenging U.S. Pat. No. 9,609,424, 49 pages.
Consolidation Order, E.D. Tex, Exhibit-1025, Filed on May 10, 2022—Cited in IPR2022-00302, challenging U.S. Pat. No. 9,609,424, 2 pages.
Consolidation Order, E.D. Tex, Exhibit-1033, Filed on May 11, 2022—Cited in IPR2022-00324, challenging U.S. Pat. No. 8,254,591, 7 pages.
Consolidation Order, E.D. Tex. 21-413 & 22-53, Exhibit-1021, Filed on Jun. 14, 2022—Cited in IPR2022-00369, challenging U.S. Pat. No. 10,405,082, 2 pages.
Consolidation Order, E.D. Tex. 21-413 & 22-53, Exhibit-1021, Filed on Jun. 14, 2022—Cited in IPR2022-00388, challenging U.S. Pat. No. 10,966,015, 2 pages.
Consolidation Order, E.D. Tex. 21-413 & 22-53, Exhibit-1022, Filed on Jun. 14, 2022—Cited in IPR2022-00410, challenging U.S. Pat. No. 10,979,836, 2 pages.
Corrected Declaration of Richard Stern, Ph.D, Exhibit-1002, Filed on Jan. 4, 2022—Cited in IPR2022-00388, challenging U.S. Pat. No. 10,966,015, 173 pages.
Corrected Declaration of Richard Stern, Ph.D, Exhibit-1002, Filed on Dec. 10, 2021—Cited in IPR2022-00282, challenging U.S. Pat. No. 8,315,400, 123 pages.
Corrected Petition for Inter Partes Review of U.S. Pat. No. 8,111,839, Exhibit-11, Filed on Feb. 3, 2022—Cited in IPR2022-00243, challenging U.S. Pat. No. 8,111,839, 58 pages.
Corrected Petition for Inter Partes Review of U.S. Pat. No. 8,111,839, Exhibit-12, Filed on Feb. 3, 2022—Cited in IPR2022-00242, challenging U.S. Pat. No. 8,111,839, 84 pages.
Corrected Petition for IPR of U.S. Pat. No. 8,315,400, Exhibit-4, Filed on Dec. 10, 2021—Cited in IPR2022-00282, challenging U.S. Pat. No. 8,315,400, 79 pages.
Curriculum Vitae of Christopher J. Struck, Exhibit-2002, Filed on Oct. 7, 2022—Cited in IPR2022-01078, challenging U.S. Pat. No. 11,057,701, 5 pages.
Curriculum Vitae of Christopher J. Struck, Exhibit-2002, Filed on Oct. 7, 2022—Cited in IPR2022-01098, challenging U.S. Pat. No. 11,217,237, 5 pages.
Curriculum Vitae of David Kleinschmidt, Exhibit-2002, Filed on Oct. 11, 2022—Cited in IPR2022-01106, challenging U.S. Pat. No. 11,039,259, 3 pages.
Curriculum Vitae of David Kleinschmidt, Exhibit-2002, Filed on Oct. 7, 2022—Cited in IPR2022-01099, challenging U.S. Pat. No. 11,244,666, 3 pages.
CV for Marshall Buck, Ph.D, Exhibit-2002, Filed on May 18, 2022—Cited in IPR2022-00369, challenging U.S. Pat. No. 10,405,082, 6 pages.
CV of Chris Kyriakakis, Ph.D, Exhibit-1003, Filed on Dec. 21, 2021—Cited in IPR2022-00302, challenging U.S. Pat. No. 9,609,424, 17 pages.
CV of Christopher J. Struck, Exhibit-2002, Filed on May 18, 2022—Cited in IPR2022-00410, challenging U.S. Pat. No. 10,979,836, 5 pages.
CV of Daniel P. Anagnos, Exhibit-2002, Filed on Mar. 23, 2022—Cited in IPR2022-00242, challenging U.S. Pat. No. 8,111,839, 7 pages.
CV of Daniel P. Anagnos, Exhibit-2002, Filed on Mar. 23, 2022—Cited in IPR2022-00243, challenging U.S. Pat. No. 8,111,839, 7 pages.
CV of Daniel P. Anagnos; Exhibit-2002, Filed on Mar. 21, 2022—Cited in IPR2022-00234, challenging U.S. Pat. No. 9124982, 7 pages.
CV of Dr. Chris Kyriakakis, Exhibit-1003, Filed on Jan. 14, 2022—Cited in IPR2022-00410, challenging U.S. Pat. No. 10,979,836, 17 pages.
CV of Les E. Atlas, Ph.D, Exhibit-1003, Filed on Dec. 20,2021—Cited in IPR2022-00324, challenging U.S. Pat. No. 8,254,591, 25 pages.
CV of Les E. Atlas, Ph.D, Exhibit-1004, Filed on Dec. 13, 2021—Cited in IPR2022-00242, challenging U.S. Pat. No. 8,111,839, 25 pages.
CV of Les E. Atlas, Ph.D, Exhibit-1004, Filed on Dec. 13, 2021—Cited in IPR2022-00243, challenging U.S. Pat. No. 8,111,839, 25 pages.
CV of Marshall Buck, Ph.D, Exhibit-2002, Filed on May 18, 2022—Cited in IPR2022-00388, challenging U.S. Pat. No. 10,966,015, 6 pages.
CV of Nathaniel Polish, Ph.D, Exhibit-1003, Filed on Dec. 17, 2021—Cited in IPR2022-00253, challenging U.S. Pat. No. 9,491,542, 15 pages.
CV of Nathaniel Polish, Ph.D, Exhibit-1003, Filed on Dec. 21, 2021—Cited in IPR2022-00281, challenging U.S. Pat. No. 9,270,244, 15 pages.
CV of of Les E. Atlas, Ph.D.; Exhibit-1003, Filed on Dec. 13, 2021—Cited in IPR2022-00234, challenging U.S. Pat. No. 9124982, 25 pages.
CV of Richard Stern, Ph.D, Exhibit-1003, Filed on Dec. 30, 2021—Cited in IPR2022-00369, challenging U.S. Pat. No. 10,405,082, 30 pages.
Daniel P. Anagnos CV, Exhibit-2002, Filed on Apr. 13, 2022—Cited in IPR2022-00324, challenging U.S. Pat. No. 8,254,591, 7 pages.
David Kleinschmidt CV, Exhibi-2002, Filed on Mar. 21, 2022—Cited in IPR2022-00282, challenging U.S. Pat. No. 8,315,400, 3 pages.
David Kleinschmidt CV, Exhibit-2002, Filed on Apr. 18, 2022—Cited in IPR2022-00253, challenging U.S. Pat. No. 9,491,542, 3 pages.
David Kleinschmidt CV, Exhibit-2002, Filed on Apr. 18, 2022—Cited in IPR2022-00281, challenging U.S. Pat. No. 9,270,244, 3 pages.
Dec. 25, 2005 WayBack Machine Capture of Maico's website has an image of the Maico MI26 and discusses the products features. https://web.archive.org/web/20051225200404/http:/www.maico- diagnostics.com/eprise/main/Maico/Products/ Files/MI26/SpecSheet.MI24- 26.NEW.pdf (SAM-TECH 00051161 - SAM- Tech 00051162), 2 pages.
Decision Denying Institution of Inter Partes Review 35 U.S.C § 314, Exhibit-10, Filed on Jan. 3, 2023—Cited in IPR2022-01099, challenging U.S. Pat. No. 11,244,666, 31 pages.

(56) References Cited

OTHER PUBLICATIONS

Decision Denying Institution of Inter Partes Review 35 U.S.C § 314, Exhibit-11, Filed on Jan. 3, 2023—Cited in IPR2022-01098, challenging U.S. Pat. No. 11,217,237, 22 pages.
Decision Granting Institution of Inter Partes Review 35 U.S.C. sec 314, Exhibit-10, Filed on Dec. 29, 2022—Cited in IPR2022-01078, challenging U.S. Pat. No. 11,057,701, 41 pages.
Declaration and Affirmation of Debbie Montgomery, as presented in *Samsung* v. *Techiya*, IPR2022-00410 as Exhibit 1018, including that Declaration's attached Exhibit A (2022), 10 pages.
Declaration of Chris Kyriakakis, Ph.D, Exhibit-1002, Filed on Dec. 21, 2021—Cited in IPR2022-00302, challenging U.S. Pat. No. 9,609,424, 154 pages.
Declaration of Christopher J. Struck in Support of Patent Owner's Preliminary Response, Exhibit-2001, Filed on Oct. 7, 2022—Cited in IPR2022-01078, challenging U.S. Pat. No. 11,057,701, 48 pages.
Declaration of Christopher J. Struck in Support of Patent Owner's Preliminary Response, Exhibit-2001, Filed on Oct. 7, 2022—Cited in IPR2022-01098, challenging U.S. Pat. No. 11,217,237, 30 pages.
Declaration of Christopher J. Struck in Support of Patent Owner's Preliminary Response, Exhibit-2001, Filed on Apr. 13, 2022—Cited in IPR2022-00302, challenging U.S. Pat. No. 9,609,424, 50 pages.
Declaration of Christopher J. Struck in Support of Patent Owner's Preliminary Response, Exhibit-2001, Filed on May 18, 2022—Cited in IPR2022-00410, challenging U.S. Pat. No. 10,979,836, 38 pages.
Declaration of Christopher J. Struck in Support of Patent Owner's Response, Exhibit-2006, Filed on Oct. 17, 2022—Cited in IPR2022-00302, challenging U.S. Pat. No. 9,609,424, 53 pages.
Declaration of Christopher Struck in Support of POR, Exhibit-2013, Filed on Mar. 23, 2023—Cited in IPR2022-01078, challenging U.S. Pat. No. 11,057,701, 52 pages.
Declaration of Daniel P. Anagnos in Support of Patent Owner Response; Exhibit-2006, Filed on Sep. 9, 2022—Cited in IPR2022-00234, challenging U.S. Pat. No. 9,124,982, 57 pages.
Declaration of Daniel P. Anagnos in Support of Patent Owner's Preliminary Response, Exhibit-2001, Filed on Apr. 13, 2022—Cited in IPR2022-00324, challenging U.S. Pat. No. 8,254,591, 61 pages.
Declaration of Daniel P. Anagnos in Support of Patent Owner's Response, Exhibit-2006, Filed on Oct. 17, 2022—Cited in IPR2022-00324, challenging U.S. Pat. No. 8,254,591, 66 pages.
Declaration of Daniel P. Anagnos in Support of Patent Owner's Response, Exhibit-2006, Filed on Sep. 13, 2022—Cited in IPR2022-00242, challenging U.S. Pat. No. 8,111,839, 60 pages.
Declaration of Daniel P. Anagnos in Support of Patent Owner's Response, Exhibit-2006, Filed on Sep. 13, 2022—Cited in IPR2022-00243, challenging U.S. Pat. No. 8,111,839, 45 pages.
Declaration of Daniel P. Anagnos, Exhibit-2001, Filed on Mar. 23, 2022—Cited in IPR2022-00242, challenging U.S. Pat. No. 8,111,839, 63 pages.
Declaration of Daniel P. Anagnos, Exhibit-2001, Filed on Mar. 23, 2022—Cited in IPR2022-00243, challenging U.S. Pat. No. 8,111,839, 48 pages.
Declaration of Daniel P. Anagnos; Exhibit-2001, Filed on Mar. 21, 2022—Cited in IPR2022-00234, challenging U.S. Pat. No. 9,124,982, 64 pages.
Declaration of David Kleinschmidt in Support of Patent Owner's Preliminary Response, Exhibit-2001, Filed on Oct. 11, 2022—Cited in IPR2022-01106, challenging U.S. Pat. No. 11,039,259, 39 pages.
Declaration of David Kleinschmidt in Support of Patent Owner's Preliminary Response, Exhibit-2001, Filed on Oct. 7, 2022—Cited in IPR2022-01099, challenging U.S. Pat. No. 11,244,666, 24 pages.
Declaration of David Kleinschmidt in Support of Patent Owner's Preliminary Response, Exhibit-2001, Filed on Apr. 18, 2022—Cited in IPR2022-00253, challenging U.S. Pat. No. 9,491,542, 47 pages.
Declaration of David Kleinschmidt in Support of Patent Owner's Preliminary Response, Exhibit-2001, Filed on Apr. 18, 2022—Cited in IPR2022-00281, challenging U.S. Pat. No. 9,270,244, 52 pages.
Declaration of David Kleinschmidt in Support of Patent Owner's Response, Exhibit-2006, Filed on Oct. 19, 2022—Cited in IPR2022-00253, challenging U.S. Pat. No. 9,491,542, 66 pages.
Declaration of David Kleinschmidt in Support of Patent Owner's Response, Exhibit-2006, Filed on Oct. 19, 2022—Cited in IPR2022-00281, challenging U.S. Pat. No. 9,270,244, 54 pages.
Declaration of David Kleinschmidt in Support of Patent Owner's Response, Exhibit-2009, Filed on Sep. 9, 2022—Cited in IPR2022-00282, challenging U.S. Pat. No. 8,315,400, 66 pages.
Declaration of Dr. Chris Kyriakakis, Exhibit-1002, Filed on Jan. 14, 2022—Cited in IPR2022-00410, challenging U.S. Pat. No. 10,979,836, 123 pages.
Declaration of Dr. David Anderson Regarding Claim Construction dated Oct. 21, 2022, Exhibit-2011, Filed on Nov. 8, 2022—Cited in IPR2022-00388, challenging U.S. Pat. No. 10,966,015, 81 pages.
Declaration of Dr. Eric Tarr, Exhibit-2001, Filed on Dec. 6, 2024—Cited in IPR2024-00559, challenging U.S. Pat. No. 11,610,587, 36 pages.
Declaration of Les E. Atlas, Ph.D, Exhibit-1002, Filed on Dec. 13, 2021—Cited in IPR2022-00242, challenging U.S. Pat. No. 8,111,839, 181 pages.
Declaration of Les E. Atlas, Ph.D, Exhibit-1002, Filed on Dec. 20, 2021—Cited in IPR2022-00324, challenging U.S. Pat. No. 8,254,591, 174 pages.
Declaration of Les E. Atlas, Ph.D, Exhibit-1003, Filed on Dec. 13, 2021—Cited in IPR2022-00243, challenging U.S. Pat. No. 8,111,839, 160 pages.
Declaration of Les E. Atlas, Ph.D.; Exhibit-1002, Filed on Dec. 13, 2021—Cited in IPR2022-00234, challenging U.S. Pat. No. 9,124,982, 202 pages.
Declaration of Marshall Buck in Support of Patent Owner's Preliminary Response, Exhibit-2001, Filed on May 18, 2022—Cited in IPR2022-00369, challenging U.S. Pat. No. 10,405,082, 40 pages.
Declaration of Marshall Buck in Support of Patent Owner's Preliminary Response, Exhibit-2001, Filed on May 18, 2022—Cited in IPR2022-00388, challenging U.S. Pat. No. 10,966,015, 37 pages.
Declaration of Marshall D. Buck, Ph.D. in Support of Patent Owner Response, Exhibit-2008, Filed on Nov. 8, 2022—Cited in IPR2022-00369, challenging U.S. Pat. No. 10,405,082, 43 pages.
Declaration of Marshall D. Buck, Ph.D. in Support of Patent Owner's Response, Exhibit-2008, Filed on Nov. 8, 2022—Cited in IPR2022-00388, challenging U.S. Pat. No. 10,966,015, 41 pages.
Declaration of Nathaniel Polish, Ph.D, Exhibit-1002, Filed on Dec. 17, 2021—Cited in IPR2022-00253, challenging U.S. Pat. No. 9,491,542, 192 pages.
Declaration of Nathaniel Polish, Ph.D, Exhibit-1002, Filed on Dec. 21, 2021—Cited in IPR2022-00281, challenging U.S. Pat. No. 9,270,244, 163 pages.
Declaration of Richard Stern, Ph.D, Exhibit-1002, Filed on Dec. 20, 2021—Cited in IPR2022-00369, challenging U.S. Pat. No. 10,405,082, 165 pages.
Declaration of Roy Falik In Support of Motion for the Pro Hac Vice Admission, Exhibit-2001, Filed on Jul. 5, 2024—Cited in IPR2024-01003, challenging U.S. Pat. No. 9,191,083, 3 pages.
Declaration of Roy Falik In Support of Motion for the Pro Hac Vice Admission, Exhibit-2001, Filed on Jul. 5, 2024—Cited in IPR2024-01004, challenging U.S. Pat. No. 9,614,943, 3 pages.
Declaration of Roy Falik In Support of Motion for the Pro Hac Vice AdmissionExhibit2001, Jul. 5, 2024—Cited in IPR2024-01033, challenging U.S. Pat. No. 8,434,966, 3 pages.
Declaration of Roy Falik, Exhibit-2001, Filed on Jul. 18, 2024—Cited in IPR2024-01031, challenging U.S. Pat. No. 7,049,850, 3 pages.
Declaration of Roy Falik, Exhibit-2001, Filed on Jul. 18, 2024—Cited in IPR2024-01034, challenging U.S. Pat. No. 9,279,263, 3 pages.
Declaration of Scott Delman with attached exhibit, Exhibit-1024, Filed on Dec. 21, 2021—Cited in IPR2022-00281, challenging U.S. Pat. No. 9,270,244, 6 pages.
Deposition Transcript of David Kleinschmidt, dated Jun. 9, 2023, Exhibit-1034, Filed on Jun. 30, 2023—Cited in IPR2022-01106, challenging U.S. Pat. No. 11,039,259, 111 pages.

(56) References Cited

OTHER PUBLICATIONS

Determining All Challenged Claims Unpatentable 35 U.S.C § 318(a), Exhibit-31, Filed on Aug. 11, 2023—Cited in IPR2022-00388, challenging U.S. Pat. No. 10,966,015, 82 pages.
Determining All Challenged Claims Unpatentable 35 U.S.C § 318(a), Exhibit-32, Filed on Aug. 11, 2023—Cited in IPR2022-00369, challenging U.S. Pat. No. 10,405,082, 81 pages.
Determining All Challenged Claims Unpatentable 35 U.S.C § 318(a), Exhibit-26, Filed on Nov. 13, 2023—Cited in IPR2022-01078, challenging U.S. Pat. No. 11,057,701, 44 pages.
Determining Some Challenged Claims Unpatentable 35 U.S.C § 318(a), Exhibit-37, Filed on Jul. 7, 2023—Cited in IPR2022-00302, challenging U.S. Pat. No. 9,609,424, 69 pages.
Direct filtering for air- and bone-conductive microphones, Zicheng Liu, Zhengyou Zhang, A. Acero, J. Droppo and Xuedong Huang , IEEE 6th Workshop on Multimedia Signal Processing, 2004, Siena, Italy, 2004, pp. 363-366, 6 pages.
Docket Control Order, E.D. Tex, Exhibi-1014, Filed on Apr. 20, 2022—Cited in IPR2022-00282, challenging U.S. Pat. No. 8,315,400, 7 pages.
Docket Control Order, E.D. Tex, Exhibit-1043, Filed on Apr. 20, 2022—Cited in IPR2022-00242, challenging U.S. Pat. No. 8,111,839, 7 pages.
Docket Control Order, E.D. Tex, Exhibit-1043, Filed on Apr. 20, 2022—Cited in IPR2022-00243, challenging U.S. Pat. No. 8,111,839, 7 pages.
Docket Control Order, E.D. Tex.; Exhibit-1033, Filed on Apr. 20, 2022—Cited in IPR2022-00234, challenging U.S. Pat. No. 9,124,982, 7 pages.
E-3 In-Flight Acoustic Exposure Studies and Mitigation Via Active Noise Reduction Headset, Frank Mobley, John Allen Hall, & Donald Yeager, Dec. 2002, 73 pages.
Edwards, The Future of Hearing Aid Technology, Exhibit-2008, Filed on Sep. 13, 2022—Cited in IPR2022-00243, challenging U.S. Pat. No. 8,111,839, 15 pages.
Etymotic ER-6 Earphones, At least by Feb. 7, 2005, https://www.cnet.com/reviews/etymoti c-er-6-review/ (SAM-Tech 00095121), 5 pages.
Etymotic ER-6 Earphones, At least by Feb. 7, 2005, https://www.etymotic.com/ephp/er6i- ts. aspx (SAM-TECH 00095178), 1 pages.
Etymotic's ER-33 Occlusion Effect Meter ("ER-33"), Apr. 9, 2001 WayBack Machine capture of Etymotic's website contains an image of the ER-33 and states that "[t]he ER-33 Occlusion Effect Meter quickly quantifies the occlusion effect and earmold leakage" and was on sale for $350.00. https://web.archive. org/web/20010404224259/ https://www. etymoticcom/ (SAM-TECH_00054976), 1 pages.
Etymotic's ER-33 Occlusion Effect Meter ("ER-33"), Aug. 2003 article by H. Gustav Mueller in the Hearing Journal, Mueller describes the ER-33 as a product manufactured by Etymotic that "costs No. more than a few bottles of good wine." See H. Gustav Mueller, There's less talking in barrels, but the occlusion effect is still with US, 56 Hearing J. 10, 14 (2003) (SAM-TECH_00054761-SAM-TECH_00054764), 4 pages.
Etymotic's ER-33 Occlusion Effect Meter ("ER-33"), Dec. 5, 2004 article submitted by Wayne J. Staab to The Hearing Review, discusses the ER-33 and notes "[t]he occlusion effect was measured with the ER-33 Occlusion Effect meter (Figure 5) using a probe tube extending 2 mm beyond the receiver tip. The ER-33 is a hand-held device that measures both . . . " https://hearingreview.com/practice-building/practice-management/measuring-the-occlusion-effect-in-a-deep-fitting- hearing-device (SAM-TECH_00060339-SAM-TECH_00060350), 12 pgs.
Etymotic's ER-33 Occlusion Effect Meter ("ER-33"), Mar. 3, 2005 capture of Etymotic's website contains a description of the ER-33 which includes a sale price for $350.00. https://web.archive.org/web/20050303170952/ http://www.etymoticcom/pro/er33.asp (SAM-TECH_00054986), 1 pages.
Etymotic's ER-33 Occlusion Effect Meter ("ER-33"), Mar. 4, 2005 WayBack Machine capture of Etymotic's website contains a user manual for the ER-33 which was on sale at that time. https://web.archive.org/web/20050304030715/ http://www.etymoticcom/pdf/er33-oem- usermanual.pdf (SAM-TECH_00055001; SAM-TECH_00060165), 11 pages.
EX 1032-Protective Order (*Staton Techiya, LLC* v. *Samsung Electronics Co, Ltd*, 21-CV-00413-JRG-RSP), Exhibit-1032, Filed on Apr. 13, 2023—Cited in IPR2022-00302, challenging U.S. Pat. No. 9,609,424, 16 pages.
Ex 1045-Nov. 18, 2022, Deposition Transcript of Daniel P Anagnos, Exhibit-1045, Filed on Dec. 6, 2022—Cited in IPR2022-00242, challenging U.S. Pat. No. 8,111,839, 65 pages.
Ex 1045-Nov. 18, 2022, Deposition Transcript of Daniel P Anagnos, Exhibit-1045, Filed on Dec. 6, 2022—Cited in IPR2022-00243, challenging U.S. Pat. No. 8,111,839, 65 pages.
Ex 1046-Patent Owner's Response in IPR2022-00243, Paper 21, Exhibit-1046, Filed on Dec. 6, 2022—Cited in IPR2022-00242, challenging U.S. Pat. No. 8,111,839, 46 pages.
Ex 1047-Patent Owner Response for IPR2022-00234, Paper 17, Exhibit-1047, Filed on Dec. 6, 2022—Cited in IPR2022-00242, challenging U.S. Pat. No. 8,111,839, 57 pages.
Ex 1047-Patent Owner Response for IPR2022-00234, Paper 17, Exhibit-1047, Filed on Dec. 6, 2022—Cited in IPR2022-00243, challenging U.S. Pat. No. 8,111,839, 57 pages.
Ex 1048—Institution Decision for IPR2022-00234, Paper 12, Exhibit-1048, Filed on Dec. 6, 2022—Cited in IPR2022-00242, challenging U.S. Pat. No. 8,111,839, 58 pages.
Ex 1049—File History for 382 Patent, Exhibit-1049, Filed on Dec. 6, 2022—Cited in IPR2022-00242, challenging U.S. Pat. No. 8,111,839, 502 pages.
Ex 1053—Excerpts from The Authoritative Dictionary of IEEE Standards Terms, Exhibit-1053, Filed on Dec. 6, 2022—Cited in IPR2022-00242, challenging U.S. Pat. No. 8,111,839, 4 pages.
Ex 1054—Supplemental Declaration of Les E Atlas PhD (Atlas-Supp), Exhibit-1054, Filed on Dec. 6, 2022—Cited in IPR2022-00243, challenging U.S. Pat. No. 8,111,839, 42 pages.
Ex. 1002—Declaration of Dr. Les Atlas, Ph.D, Exhibit-1002, Filed on Jun. 9, 2022—Cited in IPR2022-01106, challenging U.S. Pat. No. 11,039,259, 185 pages.
Ex. 1002—Declaration of Nathaniel Polish, Ph.D, Exhibit-1002, Filed on Jun. 9, 2022—Cited in IPR2022-01098, challenging U.S. Pat. No. 11,217,237, 174 pages.
Ex. 1002—Declaration of Nathaniel Polish, Ph.D, Exhibit-1002, Filed on Jun. 9, 2022—Cited in IPR2022-01099, challenging U.S. Pat. No. 11,244,666, 185 pages.
Ex. 1002—Kyriakakis DeclarationExhibit1002, Jun. 18, 2024—Cited in IPR2024-01033, challenging U.S. Pat. No. 8,434,966, 145 pages.
Ex. 1002 Declaration of Chris Kyriakakis, Exhibit-1002, Filed on Jul. 1, 2024—Cited in IPR2024-01034, challenging U.S. Pat. No. 9,279,263, 221 pages.
Ex. 1002 Declaration of Dr. Richard M. Stern, Exhibit-1002, Filed on Jun. 9, 2022—Cited in IPR2022-01078, challenging U.S. Pat. No. 11,057,701, 150 pages.
Ex. 1003—CV of Dr. Les Atlas, Ph.D, Exhibit-1003, Filed on Jun. 9, 2022—Cited in IPR2022-01106, challenging U.S. Pat. No. 11,039,259, 24 pages.
Ex. 1003—CV of Nathaniel Polish, Ph.D, Exhibit-1003, Filed on Jun. 9, 2022—Cited in IPR2022-01098, challenging U.S. Pat. No. 11,217,237, 15 pages.
Ex. 1003—CV of Nathaniel Polish, Ph.D, Exhibit-1003, Filed on Jun. 9, 2022—Cited in IPR2022-01099, challenging U.S. Pat. No. 11,244,666, 15 pages.
Ex. 1003—Kyriakakis CVExhibit1003,Jun. 18, 2024—Cited in IPR2024-01033, challenging U.S. Pat. No. 8,434,966, 17 pages.
Ex. 1003 Chris Kyriakakis CV, Exhibit-1003, Filed on Jul. 1, 2024—Cited in IPR2024-01034, challenging U.S. Pat. No. 9,279,263, 17 pages.
Ex. 1003 CV of Dr. Richard M. Stern, Exhibit-1003, Filed on Jun. 9, 2022—Cited in IPR2022-01078, challenging U.S. Pat. No. 11,057,701, 27 pages.
Ex. 1004—16_571,973 File History for 259, Exhibit-1004, Filed on Jun. 9, 2022—Cited in IPR2022-01106, challenging U.S. Pat. No. 11,039,259, 662 pages.

(56) References Cited

OTHER PUBLICATIONS

Ex. 1004—File History for U.S. Pat. No. 11,750,965Exhibit1004,Jun. 18, 2024—Cited in IPR2024-01033, challenging U.S. Pat. No. 8,434,966, 1041 pages.
Ex. 1004—File History of U.S. Appl. No. 11/217,237, Exhibit-1004, Filed on Jun. 9, 2022—Cited in IPR2022-01098, challenging U.S. Pat. No. 11,217,237, 291 pages.
Ex. 1004—File History of U.S. Appl. No. 11/244,666, Exhibit-1004, Filed on Jun. 9, 2022—Cited in IPR2022-01099, challenging U.S. Pat. No. 11,244,666, 249 pages.
Ex. 1004 File History for U.S. Pat. No. 11,665,493, Exhibit-1004, Filed on Jul. 1, 2024—Cited in IPR2024-01034, challenging U.S. Pat. No. 9,279,263, 387 pages.
Ex. 1004 File History of US Pat 11,057,701, Exhibit-1004, Filed on Jun. 9, 2022—Cited in IPR2022-01078, challenging U.S. Pat. No. 11,057,701, 221 pages.
Ex. 1005 Provisional Application 61_098,250, Exhibit-1005, Filed on Jul. 1, 2024—Cited in IPR2024-01034, challenging U.S. Pat. No. 9,279,263, 55 pages.
Ex. 1006—12_555,570 File History, Exhibit-1006, Filed on Jun. 9, 2022—Cited in IPR2022-01106, challenging U.S. Pat. No. 11,039,259, 272 pages.
Ex. 1006 12115349 File History, Exhibit-1006, Filed on Jun. 9, 2022—Cited in IPR2022-01078, challenging U.S. Pat. No. 11,057,701, 168 pages.
Ex. 1006 Publication of Application 12_555,864, Exhibit-1006, Filed on Jul. 1, 2024—Cited in IPR2024-01034, challenging U.S. Pat. No. 9,279,263, 28 pages.
Ex. 1007—61_096,128 File History, Exhibit-1007, Filed on 6/9/2022—Cited in IPR2022-01106, challenging U.S. Pat. No. 11,039,259, 46 pages.
Ex. 1007 60916271 File History, Exhibit-1007, Filed on Jun. 9, 2022—Cited in IPR2022-01078, challenging U.S. Pat. No. 11,057,701, 46 pages.
Ex. 1008—JP3353701B2 to Kondo with Translation, Exhibit-1008, Filed on Jun. 9, 2022—Cited in IPR2022-01098, challenging U.S. Pat. No. 11,217,237, 34 pages.
Ex. 1009 Translation of JPA 2002-204500 (Hayashi), Exhibit-1009, Filed on Jul. 1, 2024—Cited in IPR2024-01034, challenging U.S. Pat. No. 9,279,263, 6 pages.
Ex. 1010—Redline—965 versus parentExhibit1010,Jun. 18, 2024—Cited in IPR2024-01033, challenging U.S. Pat. No. 8,434,966, 32 pages.
Ex. 1012—Prov60893617Exhibit1012,Jun. 18, 2024—Cited in IPR2024-01033, challenging U.S. Pat. No. 8,434,966, 43 pages.
Ex. 1013—150139_14109987 NOA referred to in 965 NOAExhibit1013,Jun. 18, 2024—Cited in IPR2024-01033, challenging U.S. Pat. No. 8,434,966, 67 pages.
Ex. 1013 Deterministic Broad-Band Signal (Chu), Exhibit-1013, Filed on Jul. 1, 2024—Cited in IPR2024-01034, challenging U.S. Pat. No. 9,279,263, 4 pages.
Ex. 1013 IPR2022-00282 Patent Owner Preliminary Response, Exhibit-1013, Filed on Jun. 9, 2022—Cited in IPR2022-01078, challenging U.S. Pat. No. 11,057,701, 77 pages.
Ex. 1014—Mulgrew 2002, Exhibit-1014, Filed on Jun. 9, 2022—Cited in IPR2022-01099, challenging U.S. Pat. No. 11,244,666, 14 pages.
Ex. 1014—Redline—682 parent versus ultimate parent 812Exhibit1014,Jun. 18, 2024—Cited in IPR2024-01033, challenging U.S. Pat. No. 8,434,966, 18 pages.
Ex. 1014 701 Patent Family Tree, Exhibit-1014, Filed on Jun. 9, 2022—Cited in IPR2022-01078, challenging U.S. Pat. No. 11,057,701, 1 pages.
Ex. 1015-666 Family Tree, Exhibit-1015, Filed on Jun. 9, 2022—Cited in IPR2022-01099, challenging U.S. Pat. No. 11,244,666, 1 pages.
Ex. 1015—Letter re 965 IPR StipulationExhibit1015,Jun. 18, 2024—Cited in IPR2024-01033, challenging U.S. Pat. No. 8,434,966, 2 pages.
Ex. 1015 Complaint, E.D. Tex. 22-53, Exhibit-1015, Filed on Jun. 9, 2022—Cited in IPR2022-01078, challenging U.S. Pat. No. 11,057,701, 28 pages.
Ex. 1016—Complaint, E.D. Tex, 22-53, Exhibit-1016, Filed on Jun. 9, 2022—Cited in IPR2022-01099, challenging U.S. Pat. No. 11,244,666, 28 pages.
Ex. 1016 GSM 6.31, Exhibit-1016, Filed on Jun. 9, 2022—Cited in IPR2022-01078, challenging U.S. Pat. No. 11,057,701, 14 pages.
Ex. 1016 Reply Declaration of Richard Stern, PhD, Exhibit-1016, Filed on Dec. 2, 2022—Cited in IPR2022-00282, challenging U.S. Pat. No. 8,315,400, 30 pages.
Ex. 1017—Amended Complaint, E.D. Tex, 21-413, Exhibit-1017, Filed on Jun. 9, 2022—Cited in IPR2022-01099, challenging U.S. Pat. No. 11,244,666, 52 pages.
Ex. 1017—Rose 2003, Exhibit-1017, Filed on Jun. 9, 2022—Cited in IPR2022-01106, challenging U.S. Pat. No. 11,039,259, 6 pages.
Ex. 1017 David Kleinschmidt Depo Transcript, Exhibit-1017, Filed on Dec. 2, 2022—Cited in IPR2022-00282, challenging U.S. Pat. No. 8,315,400, 173 pages.
Ex. 1017 Final Rejection from Reexam 90_015,146, Exhibit-1017, Filed on Jul. 1, 2024—Cited in IPR2024-01034, challenging U.S. Pat. No. 9,279,263, 94 pages.
Ex. 1017 GSM 6.12, Exhibit-1017, Filed on Jun. 9, 2022—Cited in IPR2022-01078, challenging U.S. Pat. No. 11,057,701, 7 pages.
Ex. 1018—Consolidation Order, E.D. Tex, 21-413 & 22-53, Exhibit-1018, Filed on Jun. 9, 2022—Cited in IPR2022-01099, challenging U.S. Pat. No. 11,244,666, 2 pages.
Ex. 1018 Consolidation Order, E.D. Tex. 21-413 & 22-53, Exhibit-1018, Filed on Jun. 9, 2022—Cited in IPR2022-01078, challenging U.S. Pat. No. 11,057,701, 2 pages.
Ex. 1018 Excerpts from Wiley Electrical & Electronics Engineering Dictionary, Exhibit-1018, Filed on Dec. 2, 2022—Cited in IPR2022-00282, challenging U.S. Pat. No. 8,315,400, 6 pages.
Ex. 1019—Docket Control Order, E.D. Tex, 21-413, Exhibit-1019, Filed on Jun. 9, 2022—Cited in IPR2022-01099, challenging U.S. Pat. No. 11,244,666, 7 pages.
Ex. 1019—Duffner 2006, Exhibit-1019, Filed on Jun. 9, 2022—Cited in IPR2022-01098, challenging U.S. Pat. No. 11,217,237, 262 pages.
Ex. 1019 Docket Control Order, E.D. Tex. 21-413, Exhibit-1019, Filed on Jun. 9, 2022—Cited in IPR2022-01078, challenging U.S. Pat. No. 11,057,701, 7 pages.
Ex. 1019 Dual-Channel MLS-Based Test System (Schneider), Exhibit-1019, Filed on Jul. 1, 2024—Cited in IPR2024-01034, challenging U.S. Pat. No. 9,279,263, 12 pages.
Ex. 1020—Letter re IPR Stipulation, Exhibit-1020, Filed on Jun. 9, 2022—Cited in IPR2022-01099, challenging U.S. Pat. No. 11,244,666, 2 pages.
Ex. 1020 Letter re IPR Stipulation, Exhibit-1020, Filed on Jun. 9, 2022—Cited in IPR2022-01078, challenging U.S. Pat. No. 11,057,701, 2 pages.
Ex. 1021—Complaint. E.D. Tex, 22-00053, Exhibit-1021, Filed on Jun. 9, 2022—Cited in IPR2022-01098, challenging U.S. Pat. No. 11,217,237, 28 pages.
Ex. 1021—Hsu 2005, Exhibit-1021, Filed on Jun. 9, 2022—Cited in IPR2022-01106, challenging U.S. Pat. No. 11,039,259, 2 pages.
Ex. 1021—Stipulation Letter, Exhibit-1021, Filed on May 20, 2022—Cited in IPR2022-00253, challenging U.S. Pat. No. 9,491,542, 8 pages.
Ex. 1021 Amended Complaint, E.D. Tex. 21-413, Exhibit-1021, Filed on Jun. 9, 2022—Cited in IPR2022-01078, challenging U.S. Pat. No. 11,057,701, 52 pages.
Ex. 1021 Claim Construction Order, ED Tex, Exhibit-1021, Filed on Jul. 1, 2024—Cited in IPR2024-01034, challenging U.S. Pat. No. 9,279,263, 51 pages.
Ex. 1022—Amended Complaint, E.D.Tex, 21-00413, Exhibit-1022, Filed on Jun. 9, 2022—Cited in IPR2022-01098, challenging U.S. Pat. No. 11,217,237, 52 pages.
Ex. 1022—Complaint, E.D. Tex, Exhibit-1022, Filed on May 20, 2022—Cited in IPR2022-00253, challenging U.S. Pat. No. 9,491,542, 28 pages.

(56) References Cited

OTHER PUBLICATIONS

Ex. 1022 Letter to Techiya re 493 IPR Stipulation, Exhibit-1022, Filed on Jul. 1, 2024—Cited in IPR2024-01034, challenging U.S. Pat. No. 9,279,263, 3 pages.
Ex. 1023—Consolidation Order, E.D. Tex, Exhibit-1023, Filed on May 20, 2022—Cited in IPR2022-00253, challenging U.S. Pat. No. 9,491,542, 2 pages.
Ex. 1023—Consolidation Order, E.D.Tex, 21-00413 & 22-00053, Exhibit-1023, Filed on Jun. 9, 2022—Cited in IPR2022-01098, challenging U.S. Pat. No. 11,217,237, 2 pages.
Ex. 1023 Techiya Appeal Brief from Reexam 90_015, 146, Exhibit-1023, Filed on Jul. 1, 2024—Cited in IPR2024-01034, challenging U.S. Pat. No. 9,279,263, 59 pages.
Ex. 1024-259 Family Tree, Exhibit-1024, Filed on Jun. 9, 2022—Cited in IPR2022-01106, challenging U.S. Pat. No. 11,039,259, 1 pages.
Ex. 1024—Docket Control Order, E.D. Tex, 21-00413, Exhibit-1024, Filed on Jun. 9, 2022—Cited in IPR2022-01098, challenging U.S. Pat. No. 11,217,237, 7 pages.
Ex. 1024 Judicial Caseload Profile, Exhibit-1024, Filed on Jul. 1, 2024—Cited in IPR2024-01034, challenging U.S. Pat. No. 9,279,263, 95 pages.
Ex. 1025—Complaint, E.D. Tex. 22-53, Exhibit-1025, Filed on Jun. 9, 2022—Cited in IPR2022-01106, challenging U.S. Pat. No. 11,039,259, 28 pages.
Ex. 1025—Letter re IPR Stipulation, Exhibit-1025, Filed on Jun. 9, 2022—Cited in IPR2022-01098, challenging U.S. Pat. No. 11,217,237, 2 pages.
Ex. 1025—Stipulation Letter, Exhibit-1025, Filed on May 27, 2022—Cited in IPR2022-00281, challenging U.S. Pat. No. 9,270,244, 8 pages.
Ex. 1026-237 Family Tree, Exhibit-1026, Filed on Jun. 9, 2022—Cited in IPR2022-01098, challenging U.S. Pat. No. 11,217,237, 1 pages.
Ex. 1026—Amended Complaint, E.D. Tex. 21-413, Exhibit-1026, Filed on Jun. 9, 2022—Cited in IPR2022-01106, challenging U.S. Pat. No. 11,039,259, 52 pages.
Ex. 1026—Complaint, E.D. Tex, Exhibit-1026, Filed on May 27, 2022—Cited in IPR2022-00281, challenging U.S. Pat. No. 9,270,244, 28 pages.
Ex. 1027—Consolidation Order, E.D. Tex, Exhibit-1027, Filed on May 27, 2022—Cited in IPR2022-00281, challenging U.S. Pat. No. 9,270,244, 2 pages.
Ex. 1027—Docket Control Order, E.D. Tex. 21-413, Exhibit-1027, Filed on Jun. 9, 2022—Cited in IPR2022-01106, challenging U.S. Pat. No. 11,039,259, 7 pages.
Ex. 1027—Transcript of Deposition of Christopher Struck, Exhibit-1027, Filed on Jan. 10, 2023—Cited in IPR2022-00302, challenging U.S. Pat. No. 9,609,424, 182 pages.
Ex. 1028—Errata Sheet for Deposition of Christopher Struck, Exhibit-1028, Filed on Jan. 10, 2023—Cited in IPR2022-00302, challenging U.S. Pat. No. 9,609,424, 2 pages.
Ex. 1029—Letter re IPR Stipulation, Exhibit-1029, Filed on Jun. 9, 2022—Cited in IPR2022-01106, challenging U.S. Pat. No. 11,039,259, 2 pages.
Ex. 1029—Patent Owner's Opening Claim Construction Brief, E.D. Tex, Exhibit-1029, Filed on Jan. 10, 2023—Cited in IPR2022-00302, challenging U.S. Pat. No. 9,609,424, 39 pages.
Ex. 1029 Petitioners' Oral Hearing Demonstratives, Exhibit-1029, Filed on Sep. 26, 2023—Cited in IPR2022-01078, challenging U.S. Pat. No. 11,057,701, 88 pages.
Ex. 1030—Petitioners' Oral Hearing Demonstratives, Exhibit-1030, Filed on Apr. 11, 2023—Cited in IPR2022-00302, challenging U.S. Pat. No. 9,609,424, 63 pages.
Ex. 1034—Redacted Deposition of Christopher Struck, E.D. Tex, Exhibit-1034, Filed on May 15, 2023—Cited in IPR2022-00302, challenging U.S. Pat. No. 9,609,424, 309 pages.
Ex. 1037—Petitioners' Oral Hearing Demonstratives, Exhibit-1037, Filed on Oct. 11, 2023—Cited in IPR2022-01106, challenging U.S. Pat. No. 11,039,259, 67 pages.
Ex. 3001, Exhibit-3001, Filed on Nov. 8, 2024—Cited in IPR2024-01003, challenging U.S. Pat. No. 9,191,083, 1 pages.
Ex. 3001, Exhibit-3001, Filed on Nov. 8, 2024—Cited in IPR2024-01004, challenging U.S. Pat. No. 9,614,943, 1 pages.
Ex. 3001, Exhibit-3001, Filed on Nov. 8, 2024—Cited in IPR2024-01031, challenging U.S. Pat. No. 7,049,850, 1 pages.
Ex. 3001, Exhibit-3001, Filed on Nov. 8, 2024—Cited in IPR2024-01033, challenging U.S. Pat. No. 8,434,966, 1 pages.
Ex. 3001, Exhibit-3001, Filed on Nov. 8, 2024—Cited in IPR2024-01034, challenging U.S. Pat. No. 9,279,263, 1 pages.
Ex. 3001, Exhibit-3001, Filed on Apr. 6, 2023—Cited in IPR2022-00388, challenging U.S. Pat. No. 10,966,015, 2 pages.
Ex. A1 (Nacre QuietPro) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 49 pages.
Ex. A10 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.
Ex. A11 (NaturalRecorder) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. A12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Ex. A13 to Samsung's Invalidity Contentions and P.R. 3-3 And 3-4 Disclosures for U.S. Pat.t Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 20 pages.
Ex. A14 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.
Ex. A15 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.
Ex. A16 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022, 26 pages.
Ex. A17 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 37 pages.
Ex. A18 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.
Ex. A19 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 42 pages.
Ex. A2 (Silynx QuietOps) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.

(56) References Cited

OTHER PUBLICATIONS

Ex. A20 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. A21 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 52 pages.

Ex. A22 to Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.

Ex. A23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 45 pages.

Ex. A24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. A25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 16 pages.

Ex. A26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.

Ex. A28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.

Ex. A29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.

Ex. A3 (Motorola H5) to Samsung's Invalidity Contentions and P.R. 3-3 And 3-4 Disclosures for U.S. Pat. Nos. 8,111,839, 8,254,591, 8,315,400, 9, 124,982, 9,270,244, 9,491,542, 9,609,424, 10,405,082, 10,966,015 (Case No. 2:22-CV-00053-JRG-RSP), served May 18, 2022, 55 pages.

Ex. A30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.

Ex. A31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 343 pages.

Ex. A32 (Olympus WS-320M) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 97 pages.

Ex. A33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.

Ex. A34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 27 pages.

Ex. A35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 65 pages.

Ex. A4 (Jawbone Aliph) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 50 pages.

Ex. A5 (Snooper) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.

Ex. A6 (NCH Swift) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.

Ex. A7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.

Ex. A8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 35 pages.

Ex. A9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.

Ex. B1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.

Ex. B10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. B11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 127 pages.

Ex. B12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 67 pages.

Ex. B13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.

(56) References Cited

OTHER PUBLICATIONS

Ex. B14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.
Ex. B15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 76 pages.
Ex. B16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.
Ex. B17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 77 pages.
Ex. B18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 110 pages.
Ex. B19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.
Ex. B2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 104 pages.
Ex. B3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.
Ex. B4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. B5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.
Ex. B6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 80 pages.
Ex. B7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. B8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.
Ex. B9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 72 pages.
Ex. C1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 65 pages.
Ex. C10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 96 pages.
Ex. C11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 140 pages.
Ex. C12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.
Ex. C13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. C14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 115 pages.
Ex. C15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 112 pages.
Ex. C2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 144 pages.
Ex. C3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 103 pages.
Ex. C4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 123 pages.
Ex. C5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 97 pages.
Ex. C6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.
Ex. C7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 89 pages.
Ex. C8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 169 pages.

(56) References Cited

OTHER PUBLICATIONS

Ex. C9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.
Ex. D1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 47 pages.
Ex. D10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.
Ex. D11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.
Ex. D12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. D13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. D14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Ex. D15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.
Ex. D16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 38 pages.
Ex. D17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 38 pages.
Ex. D18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 34 pages.
Ex. D19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 42 pages.
Ex. D2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 30 pages.
Ex. D20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Ex. D21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 25 pages.
Ex. D22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Ex. D23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 67 pages.
Ex. D24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.
Ex. D25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 24 pages.
Ex. D26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 17 pages.
Ex. D27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. D28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 26 pages.
Ex. D29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 28 pages.
Ex. D3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. D30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 20 pages.
Ex. D31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 21 pages.
Ex. D32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 254 pages.
Ex. D4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 128 pages.

(56) References Cited

OTHER PUBLICATIONS

Ex. D5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 120 pages.
Ex. D6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 77 pages.
Ex. D7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 62 pages.
Ex. D8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.
Ex. D9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 61 pages.
Ex. E1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 136 pages.
Ex. E10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.
Ex. E11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. E12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.
Ex. E13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 123 pages.
Ex. E14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 101 pages.
Ex. E15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 147 pages.
Ex. E16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 95 pages.
Ex. E17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 23 pages.
Ex. E18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. E2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.
Ex. E3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.
Ex. E4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.
Ex. E5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 101 pages.
Ex. E6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 49 pages.
Ex. E7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.
Ex. E8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.
Ex. E9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.
Ex. F1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 192 pages.
Ex. F10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 133 pages.
Ex. F11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.
Ex. F12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 82 pages.
Ex. F13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 174 pages.

(56) References Cited

OTHER PUBLICATIONS

Ex. F14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 151 pages.
Ex. F15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 221 pages.
Ex. F16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 139 pages.
Ex. F17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 27 pages.
Ex. F18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 39 pages.
Ex. F2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 80 pages.
Ex. F3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 105 pages.
Ex. F4 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.
Ex. F5 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.
Ex. F6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 61 pages.
Ex. F7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 116 pages.
Ex. F8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. F9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.
Ex. G1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 143 pages.
Ex. G10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 51 pages.
Ex. G11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 47 pages.
Ex. G12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 35 pages.
Ex. G13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. G15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 259 pages.
Ex. G16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 96 pages.
Ex. G17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 74 pages.
Ex. G18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 58 pages.
Ex. G19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Ex. G2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 41 pages.
Ex. G20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 29 pages.
Ex. G22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 83 pages.

(56) References Cited

OTHER PUBLICATIONS

Ex. G23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 94 pages.
Ex. G24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 166 pages.
Ex. G25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 69 pages.
Ex. G26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 134 pages.
Ex. G27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 64 pages.
Ex. G28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 54 pages.
Ex. G29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 35 pages.
Ex. G3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 40 pages.
Ex. G30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 50 pages.
Ex. G31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 52 pages.
Ex. G32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 242 pages.
Ex. G33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 166 pages.
Ex. G34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 185 pages.
Ex. G35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 56 pages.
Ex. G4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 212 pages.
Ex. G5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 114 pages.
Ex. G6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 92 pages.
Ex. G7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.
Ex. G8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 81 pages.
Ex. G9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. H1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 187 pages.
Ex. H10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 124 pages.
Ex. H11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 159 pages.
Ex. H12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.
Ex. H15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 175 pages.
Ex. H16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 92 pages.
Ex. H17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 44 pages.
Ex. H18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 32 pages.

(56) References Cited

OTHER PUBLICATIONS

Ex. H19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 114 pages.

Ex. H2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 138 pages.

Ex. H20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 78 pages.

Ex. H3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 93 pages.

Ex. H4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 59 pages.

Ex. H6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. H7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. H8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 55 pages.

Ex. H9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.

Ex. 11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 209 pages.

Ex. 110 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 161 pages.

Ex. 111 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 219 pages.

Ex. 112 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 182 pages.

Ex. 115 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 219 pages.

Ex. 116 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 112 pages.

Ex. 117 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 190 pages.

Ex. 118 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 120 pages.

Ex. 12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 183 pages.

Ex. 13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 121 pages.

Ex. 14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 73 pages.

Ex. 15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 138 pages.

Ex. 16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 79 pages.

Ex. 17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 87 pages.

Ex. 18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 48 pages.

Ex. 19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 86 pages.

Ex. J1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 91 pages.

Ex. J10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.

Ex. J11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 129 pages.

(56) References Cited

OTHER PUBLICATIONS

Ex. J12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 340 pages.
Ex. J13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 331 pages.
Ex. J14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 134 pages.
Ex. J15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 63 pages.
Ex. J16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 253 pages.
Ex. J17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 62 pages.
Ex. J18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 57 pages.
Ex. J19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 154 pages.
Ex. J2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.
Ex. J20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 102 pages.
Ex. J21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 88 pages.
Ex. J22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 66 pages.
Ex. J23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 85 pages.
Ex. J24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 82 pages.
Ex. J25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 89 pages.
Ex. J26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 103 pages.
Ex. J27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 83 pages.
Ex. J28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 239 pages.
Ex. J29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 172 pages.
Ex. J3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 199 pages.
Ex. J30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 240 pages.
Ex. J4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 145 pages.
Ex. J5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 141 pages.
Ex. J6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 98 pages.
Ex. J7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 75 pages.
Ex. J8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 68 pages.
Ex. J9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022, 71 pages.
EX1002—Declaration of Christopher Schmandt, Exhibit-1002, Filed on Feb. 9, 2024—Cited in IPR2024-00559, challenging U.S. Pat. No. 11,610,587, 161 pages.

(56) References Cited

OTHER PUBLICATIONS

EX1002—Declaration of Nathaniel Polish, Exhibit-1002, Filed on Jun. 25, 2024—Cited in IPR2024-01031, challenging U.S. Pat. No. 7,049,850, 129 pages.
EX1002—Kyriakakis Declaration, Exhibit-1002, Filed on Jun. 12, 2024—Cited in IPR2024-01003, challenging U.S. Pat. No. 9,191,083, 256 pages.
EX1002—Kyriakakis Declaration, Exhibit-1002, Filed on Jun. 12, 2024—Cited in IPR2024-01004, challenging U.S. Pat. No. 9,614,943, 151 pages.
EX1003—Kyriakakis CV, Exhibit-1003, Filed on Jun. 12, 2024—Cited in IPR2024-01003, challenging U.S. Pat. No. 9,191,083, 17 pages.
EX1003—Kyriakakis CV, Exhibit-1003, Filed on Jun. 12, 2024—Cited in IPR2024-01004, challenging U.S. Pat. No. 9,614,943, 17 pages.
EX1003—Nathaniel Polish CV, Exhibit-1003, Filed on Jun. 25, 2024—Cited in IPR2024-01031, challenging U.S. Pat. No. 7,049,850.
EX1003—Schmandt CV, Exhibit-1003, Filed on Feb. 9, 2024—Cited in IPR2024-00559, challenging U.S. Pat. No. 11,610,587, 7 pages.
EX1004—File History for U.S. Pat. No. 11,710,473_Part 1 of 3, Exhibit-1004, Filed on Jun. 12, 2024—Cited in IPR2024-01003, challenging U.S. Pat. No. 9,191,083, 369 pages. See in first 1001 total pages.
EX1004—File History for U.S. Pat. No. 11,710,473_Part 1 of 3, Exhibit-1004, Filed on Jun. 12, 2024—Cited in IPR2024-01004, challenging U.S. Pat. No. 9,614,943, 369 pages. See in second 1001 total pages.
EX1004—File History for U.S. Pat. No. 11,710,473_Part 2 of 3, Exhibit-1004, Filed on Jun. 12, 2024—Cited in IPR2024-01003, challenging U.S. Pat. No. 9,191,083, 373 pages. See in first 1001 total pages.
EX1004—File History for U.S. Pat. No. 11,710,473_Part 2 of 3, Exhibit-1004, Filed on Jun. 12, 2024—Cited in IPR2024-01004, challenging U.S. Pat. No. 9,614,943, 373 pages. See in second 1001 total pages.
EX1004—File History for U.S. Pat. No. 11,710,473_Part 3 of 3, Exhibit-1004, Filed on Jun. 12, 2024—Cited in IPR2024-01003, challenging U.S. Pat. No. 9,191,083, 259 pages. See in first 1001 total pages.
EX1004—File History for U.S. Pat. No. 11,710,473_Part 3 of 3, Exhibit-1004, Filed on Jun. 12, 2024—Cited in IPR2024-01004, challenging U.S. Pat. No. 9,614,943, 259 pages. See in second 1001 total pages.
EX1004—USFH11610587 Part 1 of 2, Exhibit-1004, Filed on Feb. 9, 2024—Cited in IPR2024-00559, challenging U.S. Pat. No. 11,610,587, 398 pages. See in 779 total pages.
EX1004—USFH11610587 Part 2 of 2, Exhibit-1004, Filed on Feb. 9, 2024—Cited in IPR2024-00559, challenging U.S. Pat. No. 11,610,587, 381 pages. See in 779 total pages,.
EX1005—U.S. Appl. No. 60/885,917, Exhibit-1005, Filed on Jun. 12, 2024—Cited in IPR2024-01003, challenging U.S. Pat. No. 9,191,083, 39 pages.
EX1005—U.S. Appl. No. 60/885,917, Exhibit-1005, Filed on Jun. 12, 2024—Cited in IPR2024-01004, challenging U.S. Pat. No. 9,614,943, 39 pages.
EX1005—U.S. Appl. No. 61/737,932, Exhibit-1005, Filed on Jun. 25, 2024—Cited in IPR2024-01031, challenging U.S. Pat. No. 7,049,850, 37 pages.
EX1005—U.S. Appl. No. 61/098,914 (Provisional Application), Exhibit-1005, Filed on Feb. 9, 2024—Cited in IPR2024-00559, challenging U.S. Pat. No. 11,610,587, 86 pages.
EX1006—16266829 (829 App), Exhibit-1006, Filed on Jun. 25, 2024—Cited in IPR2024-01031, challenging U.S. Pat. No. 7,049,850, 85 pages.
EX1006—U.S. Appl. 17/321,892, Exhibit-1006, Filed on Jun. 12, 2024—Cited in IPR2024-01003, challenging U.S. Pat. No. 9,191,083, 55 pages.
EX1006—U.S. Appl. 17/321,892, Exhibit-1006, Filed on Jun. 12, 2024—Cited in IPR2024-01004, challenging U.S. Pat. No. 9,614,943, 55 pages.
EX1006—U.S. Appl. No. 17/203,731, Exhibit-1006, Filed on Feb. 9, 2024—Cited in IPR2024-00559, challenging U.S. Pat. No. 11,610,587, 70 pages.
EX1007-315 Patent Family Tree, Exhibit-1007, Filed on Jun. 25, 2024—Cited in IPR2024-01031, challenging U.S. Pat. No. 7,049,850, 1 pages.
EX1008—Docket Control Order, Exhibit-1008, Filed on Jun. 25, 2024—Cited in IPR2024-01031, challenging U.S. Pat. No. 7,049,850, 6 pages.
EX1008—File History for U.S. Pat. No. 11,244,666, Exhibit-1008, Filed on Jun. 12, 2024—Cited in IPR2024-01003, challenging U.S. Pat. No. 9,191,083, 288 pages.
EX1008—File History for U.S. Pat. No. 11,244,666, Exhibit-1008, Filed on Jun. 12, 2024—Cited in IPR2024-01004, challenging U.S. Pat. No. 9,614,943, 288 pages.
EX1009—Letter from Nikhil Krishnan to Thomas J. Friel, Jr, Exhibit-1009, Filed on Jun. 12, 2024—Cited in IPR2024-01031, challenging U.S. Pat. No. 7,049,850, 2 pages.
EX1009—USSN 90_019, 169 RE of U.S. Pat. No. 11,244,666_Part 1 of 5, Exhibit-1009, Filed on Jun. 12, 2024—Cited in IPR2024-01003, challenging U.S. Pat. No. 9,191,083, 494 pages. See in first 2198 total pages.
EX1009—USSN 90_019, 169 RE of U.S. Pat. No. 11,244,666_Part 1 of 5, Exhibit-1009, Filed on Jun. 12, 2024—Cited in IPR2024-01004, challenging U.S. Pat. No. 9,614,943, 494 pages. See in second 2198 total pages.
EX1009—USSN 90_019, 169 RE of U.S. Pat. No. 11,244,666_Part 2 of 5, Exhibit-1009, Filed on Jun. 12, 2024—Cited in IPR2024-01003, challenging U.S. Pat. No. 9,191,083, 466 pages. See in first 2198 total pages.
EX1009—USSN 90_019, 169 RE of U.S. Pat. No. 11,244,666_Part 2 of 5, Exhibit-1009, Filed on Jun. 12, 2024—Cited in IPR2024-01004, challenging U.S. Pat. No. 9,614,943, 466 pages. see in second 2198 total pages .
EX1009—USSN 90_019, 169 RE of U.S. Pat. No. 11,244,666_Part 3 of 5, Exhibit-1009, Filed on Jun. 12, 2024—Cited in IPR2024-01003, challenging U.S. Pat. No. 9,191,083, 361 pages. See in first 2198 total pages.
EX1009—USSN 90_019, 169 RE of U.S. Pat. No. 11,244,666_Part 3 of 5, Exhibit-1009, Filed on Jun. 12, 2024—Cited in IPR2024-01004, challenging U.S. Pat. No. 9,614,943, 361 pages. See in second 2198 total pages,.
EX1009—USSN 90_019, 169 RE of U.S. Pat. No. 11,244,666_Part 4 of 5, Exhibit-1009, Filed on Jun. 12, 2024—Cited in IPR2024-01003, challenging U.S. Pat. No. 9,191,083, 456 pages. See in first 2198 total pages.
EX1009—USSN 90_019, 169 RE of U.S. Pat. No. 11,244,666_Part 4 of 5, Exhibit-1009, Filed on Jun. 12, 2024—Cited in IPR2024-01004, challenging U.S. Pat. No. 9,614,943, 456 pages. See in second 2198 total pages,.
EX1009—USSN 90_019, 169 RE of U.S. Pat. No. 11,244,666_Part 5 of 5, Exhibit-1009, Filed on Jun. 12, 2024—Cited in IPR2024-01003, challenging U.S. Pat. No. 9,191,083, 421 pages. See in first 2198 total pages.
EX1009—USSN 90_019, 169 RE of U.S. Pat. No. 11,244,666_Part 5 of 5, Exhibit-1009, Filed on Jun. 12, 2024—Cited in IPR2024-01004, challenging U.S. Pat. No. 9,614,943, 421 pages. See in second 2198 total pages.
EX1010-473 Patent Family Tree, Exhibit-1010, Filed on Jun. 12, 2024—Cited in IPR2024-01003, challenging U.S. Pat. No. 9,191,083, 1 pages.
EX1010-473 Patent Family Tree, Exhibit-1010, Filed on Jun. 12, 2024—Cited in IPR2024-01004, challenging U.S. Pat. No. 9,614,943, 1 pages.
EX1011—Claim Construction Order, ED Tex, Exhibit-1011, Filed on Jun. 12, 2024—Cited in IPR2024-01003, challenging U.S. Pat. No. 9,191,083, 51 pages.
EX1011—Claim Construction Order, ED Tex, Exhibit-1011, Filed on Jun. 12, 2024—Cited in IPR2024-01004, challenging U.S. Pat. No. 9,614,943, 51 pages.

(56) References Cited

OTHER PUBLICATIONS

EX1012—Docket Control Order, ED Tex, Exhibit-1012, Filed on Jun. 12, 2024—Cited in IPR2024-01003, challenging U.S. Pat. No. 9,191,083, 6 pages.
EX1012—Docket Control Order, ED Tex, Exhibit-1012, Filed on Jun. 12, 2024—Cited in IPR2024-01004, challenging U.S. Pat. No. 9,614,943, 6 pages.
EX1013—Letter from Nikhil Krishnan to Thomas J Friel, Jr, Exhibit-1013, Filed on Jun. 12, 2024—Cited in IPR2024-01003, challenging U.S. Pat. No. 9,191,083, 3 pages.
EX1013—Letter from Nikhil Krishnan to Thomas J Friel, Jr, Exhibit-1013, Filed on Jun. 12, 2024—Cited in IPR2024-01004, challenging U.S. Pat. No. 9,614,943, 3 pages.
EX1016—Stay Order from E.D. Tex.Exhibit1016, Nov. 20, 2024—Cited in IPR2024-01033, challenging U.S. Pat. No. 8,434,966, 2 pages.
EX1019—US Provisional App 60-841990 (Rosenberg Provisional) (annotated), Exhibit-1019, Filed on Jun. 12, 2024—Cited in IPR2024-01003, challenging U.S. Pat. No. 9,191,083, 26 pages.
EX1023—Preliminary Constructions, E.D. Tex, Exhibit-1023, Filed on Jan. 31, 2023—Cited in IPR2022-00369, challenging U.S. Pat. No. 10,405,082, 5 pages.
EX1023—Preliminary Constructions, E.D. Tex, Exhibit-1023, Filed on Jan. 31, 2023—Cited in IPR2022-00388, challenging U.S. Pat. No. 10,966,015, 5 pages.
EX1024—Cohen, Exhibit-1024, Filed on Feb. 9, 202—Cited in IPR2024-00559, challenging U.S. Pat. No. 11,610,587, 16 pages.
EX1024—Transcript of Deposition of Marshall Buck, Exhibit-1024, Filed on Jan. 31, 2023—Cited in IPR2022-00369, challenging U.S. Pat. No. 10,405,082, 213 pages.
EX1024—Transcript of Deposition of Marshall Buck, Exhibit-1024, Filed on Jan. 31, 2023—Cited in IPR2022-00388, challenging U.S. Pat. No. 10,966,015, 213 pages.
EX1025—Blattner et al., Earcons and Icons, Exhibit-1025, Filed on Jun. 25, 2024—Cited in IPR2024-01031, challenging U.S. Pat. No. 7,049,850, 34 pages.
Ex1025—Deposition Transcript of David Kleinschmidt, Exhibit-1025, Filed on Jan. 11, 2023—Cited in IPR2022-00253, challenging U.S. Pat. No. 9,491,542, 171 pages.
EX1025—Stay Order from E.D. Tex, Exhibit-1025, Filed on Nov. 20, 2024—Cited in IPR2024-01034, challenging U.S. Pat. No. 9,279,263, 2 pages.
EX1025—Tanenbaum, Exhibit-1025, Filed on Feb 9, 2024—Cited in IPR2024-00559, challenging U.S. Pat. No. 11,610,587, 21 pages.
EX1025 Petitioners' Oral Hearing Demonstratives, Exhibit-1025, Filed on May 9, 2023—Cited in IPR2022-00369, challenging U.S. Pat. No. 10,405,082, 51 pages.
EX1025 Petitioners' Oral Hearing Demonstratives, Exhibit-1025, Filed on May 9, 2023—Cited in IPR2022-00388, challenging U.S. Pat. No. 10,966,015, 51 pages.
Ex1026—Cessation from Merriam-Webster's Collegiate Dictionary, 10th Ed, Exhibit-1026, Filed on Jan. 11, 2023—Cited in IPR2022-00253, challenging U.S. Pat. No. 9,491,542, 4 pages.
EX1026—Computer Dictionary 2nd Ed, Exhibit-1026, Filed on Feb. , 2024—Cited in IPR2024-00559, challenging U.S. Pat. No. 11,610,587, 5 pages.
Ex1027—Cessation from New World Dictionary, 2d College Ed, Exhibit-1027, Filed on Jan. 11, 2023- Cited in IPR2022-00253, challenging U.S. Pat. No. 9,491,542, 2 pages.
EX1028—Basu, Exhibit-1028, Filed on Jun. 12, 2024—Cited in IPR2024-01003, challenging U.S. Pat. No. 9, 191,083, 4 pages.
EX1028—Basu, Smart Headphones, Exhibit-1028, Filed on Jun. 12, 2024—Cited in IPR2024-01004, challenging U.S. Pat. No. 9,614,943, 4 pages.
Ex1028—Supplemental Declaration of Nathanial Polish, Ph.D, Exhibit-1028, Filed on Jan. 11, 2023—Cited in IPR2022-00253, challenging U.S. Pat. No. 9,491,542, 20 pages.
EX1029—Declaration of Nathanial Polish, Exhibit-1029, Filed on Jan. 11, 2023—Cited in IPR2022-00281, challenging U.S. Pat. No. 9,270,244, 23 pages.
EX1029—Mueller, Transparent Hearing, Exhibit-1029, Filed on Jun. 12, 2024—Cited in IPR2024-01003, challenging U.S. Pat. No. 9,191,083, 2 pages.
EX1029—Mueller, Transparent Hearing, Exhibit-1029, Filed on Jun. 12, 2024—Cited in IPR2024-01004, challenging U.S. Pat. No. 9,614,943, 2 pages.
EX1030—Deposition Transcript of David Kleinschmidt, Exhibit-1030, Filed on Jan. 11, 2023—Cited in IPR2022-00281, challenging U.S. Pat. No. 9,270,244, 171 pages.
EX1031—587 Patent Family Tree, Exhibit-1031, Filed on Feb. 9, 2024—Cited in IPR2024-00559, challenging U.S. Pat. No. 11,610,587, 1 pages.
EX1031—Basu, et al., Smart Headphones, Exhibit-1031, Filed on Jun. 25, 2024—Cited in IPR2024-01031, challenging U.S. Pat. No. 7,049,850, 4 pages.
EX1031—Cessation from Merriam-Webster's Collegiate Dictionary, 10th Ed, Exhibit-1031, Filed on Jan. 11, 2023—Cited in IPR2022-00281, challenging U.S. Pat. No. 9,270,244, 4 pages.
EX1031—Patent Rule 4-3 Joint Claim Construction and Prehearing Statement, E.D. TX, Exhibit-1031, Filed on Mar. 7, 2023—Cited in IPR2022-00253, challenging U.S. Pat. No. 9,491,542, 32 pages.
EX1032—Cessation from New World Dictionary, 2d College Ed, Exhibit-1032, Filed on Jan. 11, 2023—Cited in IPR2022-00281, challenging U.S. Pat. No. 9,270,244, 3 pages.
EX1032—Ex. A-01_U.S. Appl. No. 11/610,587 Samsung Infringement Claim Chart, Exhibit-1032, Filed on Feb. 9, 2024—Cited in IPR2024-00559, challenging U.S. Pat. No. 11,610,587, 96 pages.
EX1032—Excerpts from Microsoft Computer Dictionary, 4th ed, Exhibit-1032, Filed on Jun. 25, 2024—Cited in IPR2024-01031, challenging U.S. Pat. No. 7,049,850, 3 pages.
Ex1032—Petitioners' Oral Hearing Demonstratives, Exhibit-1032, Filed on Apr. 12, 2023—Cited in IPR2022-00253, challenging U.S. Pat. No. 9,491,542, 66 pages.
EX1033—Order Granting Proposed Docket Control Order, Exhibit-1033, Filed on Feb. 9, 2024—Cited in IPR2024-00559, challenging U.S. Pat. No. 11,610,587, 6 pages.
EX1033—Pending from Merriam-Webster's Collegiate Dictionary, 10th Ed, Exhibit-1033, Filed on Jan. 11, 2023—Cited in IPR2022-00281, challenging U.S. Pat. No. 9,270,244, 3 pages.
EX1034—Computer Dictionary 2nd Ed, Exhibit-1034, Filed on Jun. 12, 2024—Cited in IPR2024-01003, challenging U.S. Pat. No. 9,191,083, 5 pages.
EX1034—D Del Statistics, Exhibit-1034, Filed on Feb. 9, 2024—Cited in IPR2024-00559, challenging U.S. Pat. No. 11,610,587, 1 pages.
EX1034—Pause from Merriam-Webster's Collegiate Dictionary, 10th Ed, Exhibit-1034, Filed on Jan. 11, 2023—Cited in IPR2022-00281, challenging U.S. Pat. No. 9,270,244, 3 pages.
EX1035—Deposition Transcript for Daniel P. Anagnos, Exhibit-1035, Filed on Jan. 10, 2023—Cited in IPR2022-00324, challenging U.S. Pat. No. 8,254,591, 75 pages.
EX1035—File History of U.S. Pat. No. 10,635,382; Exhibit-1035, Filed on Dec. 2, 2022—Cited in IPR2022-00234, challenging U.S. Pat. No. 9124982, 502 pages.
EX1035—Letter to Techiya re 587 IPR Stipulation, Exhibit-1035, Filed on Feb. 9, 2024—Cited in IPR2024-00559, challenging U.S. Pat. No. 11,610,587, 3 pages.
EX1035—National Judicial Caseload Profile, Exhibit-1035, Filed on Jun. 25, 2024—Cited in IPR2024-01031, challenging U.S. Pat. No. 7,049,850, 95 pages.
EX1035—Patent Rule 4-3 Joint Claim Construction and Prehearing Statement, E.D. Tx, Exhibit-1035, Filed on Mar. 7, 2023—Cited in IPR2022-00281, challenging U.S. Pat. No. 9,270,244, 32 pages.
EX1035—Tanenbaum Excerpt, Exhibit-1035, Filed on Jun. 12, 2024—Cited in IPR2024-01003, challenging U.S. Pat. No. 9,191,083, 18 pages.
EX1036—Linkedin Profile for Harish Jonnalagadda, Exhibit-1036, Filed on Jan. 10, 2023—Cited in IPR2022-00324, challenging U.S. Pat. No. 8,254,591, 3 pages.
EX1036—Oshana excerpt, Exhibit-1036, Filed on Jun. 12, 2024—Cited in IPR2024-01003, challenging U.S. Pat. No. 9,191,083, 16 pages.

(56) References Cited

OTHER PUBLICATIONS

EX1036—Oshana excerpt, Exhibit-1036, Filed on Jun. 12, 2024—Cited in IPR2024-01004, challenging U.S. Pat. No. 9,614,943, 16 pages.
EX1036—Petitioners' Oral Hearing Demonstratives, Exhibit-1036, Filed on Apr. 13, 2023—Cited in IPR2022-00281, challenging U.S. Pat. No. 9,270,244, 70 pages.
EX1036—Stay Order from E.D. Tex, Exhibit-1036, Filed on Nov. 20, 2024—Cited in IPR2024-01031, challenging U.S. Pat. No. 7,049,850, 2 pages.
EX1038—Handbook for Sound Engineers_Part 1 of 2, Exhibit-1038, Filed on Jun. 12, 2024—Cited in IPR2024-01003, challenging U.S. Pat. No. 9,191,083, 18 pages.
EX1038—Handbook for Sound Engineers_Part 2 of 2, Exhibit-1038, Filed on Jun. 12, 2024—Cited in IPR2024-01003, challenging U.S. Pat. No. 9,191,083, 14 pages.
EX1040—IPR2022-00234, Ex 2001, Declaration of Daniel P Anagnos; Exhibit-1040, Filed on Dec. 2, 2022—Cited in IPR2022-00234, challenging U.S. Pat. No. 9124982, 63 pages.
EX1041—Nov. 18, 2022, Deposition Transcript of Daniel P Anagnos; Exhibit-1041, Filed on Dec. 2, 2022—Cited in IPR2022-00234, challenging U.S. Pat. No. 9,124,982, 15 pages.
EX1041—Supplemental Declaration of Les E. Atlas, Ph.D, Exhibit-1041, Filed on Jan. 10, 2023—Cited in IPR2022-00324, challenging U.S. Pat. No. 8,254,591, 36 pages.
EX1042—Excerpts from the Authoritative Dictionary of IEEE Standards Terms; Exhibit-1042, Filed on Dec. 2,2022—Cited in IPR2022-00234, challenging U.S. Pat. No. 9,124,982, 4 pages.
Ex1042—Petitioners' Oral Hearing Demonstratives, Exhibit-1042, Filed on Apr. 4, 2023—Cited in IPR2022-00324, challenging U.S. Pat. No. 8,254,591, 63 pages.
EX1043—Institution Decision, IPR2022-00234, Paper 16; Exhibit-1043, Filed on Dec. 2, 2022—Cited in IPR2022-00234, challenging U.S. Pat. No. 9,124,982, 73 pages.
EX1045—Excerpt of Prosecution History of U.S. Appl. No. 17/483,190, Exhibit-1045, Filed on Jun. 12, 2024—Cited in IPR2024-01003, challenging U.S. Pat. No. 9,191,083, 20 pages.
EX1056—USP11710473 Samsung Infringement Claim Chart, Ex. A-06, Exhibit-1056, Filed on Jun. 12, 2024—Cited in IPR2024-01003, challenging U.S. Pat. No. 9,191,083, 167 pages.
EX1056—USP11710473 Samsung Infringement Claim Chart, Ex. A-06, Exhibit-1056, Filed on Jun. 12, 2024—Cited in IPR2024-01004, challenging U.S. Pat. No. 9,614,943, 167 pages.
EX1058—Kuo, Active Noise Control, Exhibit-1058, Filed on Jun. 12, 2024—Cited in IPR2024-01004, challenging U.S. Pat. No. 9,614,943, 31 pages.
Ex1058—Petitioners' Oral Hearing Demonstratives, Exhibit-1058, Filed on Mar. 16, 2023—Cited in IPR2022-00242, challenging U.S. Pat. No. 8,111,839, 110 pages.
Ex1058—Petitioners' Oral Hearing Demonstratives, Exhibit-1058, Filed on Mar. 16, 2023—Cited in IPR2022-00243, challenging U.S. Pat. No. 8,111,839, 110 pages.
EX1059—Stay Order from E.D. Tex, Exhibit-1059, Filed on Nov. 20, 2024—Cited in IPR2024-01003, challenging U.S. Pat. No. 9,191,083, 2 pages.
EX1059—Stay Order from E.D. Tex, Exhibit-1059, Filed on Nov. 20, 2024—Cited in IPR2024-01004, challenging U.S. Pat. No. 9,614,943, 2 pages.
Excerpt from Computer Dictionary, 2d ed, Exhibit-1027, Filed on Dec. 13, 2021—Cited in IPR2022-00242, challenging U.S. Pat. No. 8,111,839, 5 pages.
Excerpt from Computer Dictionary, 2d ed, Exhibit-1027, Filed on Dec. 13, 2021—Cited in IPR2022-00243, challenging U.S. Pat. No. 8,111,839, 5 pages.
Excerpt from Computer Dictionary, 2d ed.; Exhibit-1029, Filed on Dec. 13, 2021—Cited in IPR2022-00234, challenging U.S. Pat. No. 9124982, 5 pages.
Excerpt from Dictionary of Scientific and Technical Terms, 5th ed, Exhibit-1026, Filed on Dec. 20, 2021—Cited in IPR2022-00324, challenging U.S. Pat. No. 8,254,591, 5 pages.
Excerpt from McGraw Hill Dictionary of Scientific and Technical Terms, 5th ed, Exhibit-1025, Filed on Dec. 13, 2021—Cited in IPR2022-00242, challenging U.S. Pat. No. 8,111,839, 5 pages.
Excerpt from McGraw-Hill Dictionary of Scientific and Technical Terms, 5th ed, Exhibit-1025, Filed on Dec. 13, 2021—Cited in IPR2022-00243, challenging U.S. Pat. No. 8,111,839, 5 pages.
Excerpt from Oshana; Exhibit-1030, Filed on Dec. 13, 2021—Cited in IPR2022-00234, challenging U.S. Pat. No. 9,124,982, 160 pages.
Excerpt of File History of U.S. Appl. No. 12/100,281; Exhibit-1006, Filed on Dec. 13, 2021—Cited in IPR2022-00234, challenging U.S. Pat. No. 9,124,982, 85 pages.
Excerpt of File History of U.S. Appl. No. 13/352,694; Exhibit-1007, Filed on Dec. 13, 2021—Cited in IPR2022-00234, challenging U.S. Pat. No. 9,124,982, 58 pages.
Excerpts from Discrete-Time Signal Processing, Third Edition, Alan V. Oppenheim & Ronald W. Schafer, Aug. 18, 2009, 161 pages.
Excerpts from Federal Court Management Statistics, Exhibit-1022, Filed on Jul. 1, 2022—Cited in IPR2022-00369, challenging U.S. Pat. No. 10,405,082, 2 pages.
Excerpts from Federal Court Management Statistics, Exhibit-1022, Filed on Jul. 1, 2022—Cited in IPR2022-00388, challenging U.S. Pat. No. 10,966,015, 2 pages.
Excerpts from Federal Court Management Statistics, Exhibit-1023, Filed on Jul. 1, 2022—Cited in IPR2022-00410, challenging U.S. Pat. No. 10,979,836, 2 pages.
Excerpts from Federal Court Management Statistics, Exhibit-1024, Filed on Jul. 1, 2022—Cited in IPR2022-00253, challenging U.S. Pat. No. 9,491,542, 2 pages.
Excerpts from Federal Court Management Statistics, Exhibit-1026, Filed on Jul. 1, 2022—Cited in IPR2022-00302, challenging U.S. Pat. No. 9,609,424, 2 pages.
Excerpts from Federal Court Management Statistics, Exhibit-1028, Filed on Jul. 1, 2022—Cited in IPR2022-00281, challenging U.S. Pat. No. 9,270,244, 2 pages.
Excerpts from Federal Court Management Statistics, Exhibit-1034, Filed on Jul. 1, 2022—Cited in IPR2022-00324, challenging U.S. Pat. No. 8,254,591, 2 pages.
Excerpts from McGraw-Hill Dictionary of Scientific and Technical Terms, 5th ed.; Exhibit-1021, Filed on Dec. 13, 2021—Cited in IPR2022-00234, challenging U.S. Pat. No. 9124982, 5 pages.
Excerpts from Openheim, Exhibit-1016, Filed on Jan. 4, 2022—Cited in IPR2022-00388, challenging U.S. Pat. No. 10,966,015, 161 pages.
Excerpts from Oppenheim & Schafer, 3rd ed, Exhibit-1016, Filed on Dec. 30, 2021—Cited in IPR2022-00369, challenging U.S. Pat. No. 10,405,082, 161 pages.
Excerpts from Oshana, Exhibit-1027, Filed on Dec. 20, 2021—Cited in IPR2022-00324, challenging U.S. Pat. No. 8,254,591, 160 pages.
Excerpts from Oshana, Exhibit-1028, Filed on Dec. 13, 2021—Cited in IPR2022-00242, challenging U.S. Pat. No. 8,111,839, 160 pages.
Excerpts from Oshana, Exhibit-1028, Filed on Dec. 13, 2021—Cited in IPR2022-00243, challenging U.S. Pat. No. 8,111,839, 160 pages.
Exhibit 3001, Exhibit-3001, Filed on Jan. 5, 2023—Cited in IPR2022-00282, challenging U.S. Pat. No. 8,315,400, 2 pages.
Exhibit 3001, Exhibit-3001, Filed on Nov. 3, 2022—Cited in IPR2022-01078, challenging U.S. Pat. No. 11,057,701, 2 pages.
Exhibit 3001, Exhibit-3001, Filed on Nov. 3, 2022—Cited in IPR2022-01106, challenging U.S. Pat. No. 11,039,259, 2 pages.
Exhibit 3001, Exhibit-3001, Filed on Apr. 6, 2023—Cited in IPR2022-00369, challenging U.S. Pat. No. 10,405,082, 2 pages.
Exhibit E9-Invalidity of U.S. Pat. No. 9,270,244 ("the '244 Patent") in view of U.S. Pat. App. Pub. 6,567,524 ("Svean"), pp. 1-55 (date not available), 55 pages.
Exhibit F5-Invalidity of U.S. Pat. No. 9,491,542 ("the '542 Patent") in view of U.S. Pat. App. Pub. 2011/0293103 ("Park"), pp. 1-81 (date not available), 81 pages.
Exhibit H5-Invalidity of U.S. Pat. No. 10,405,082 ("the '082 Patent") in view of U.S. Pat. Appl. Pub. No. 2014/0163976, pp. 1-151 (date not available), 151 pages.

(56) References Cited

OTHER PUBLICATIONS

Exhibit K1 (Calhoun) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 469 pages.
Exhibit K10 (Kelliher) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 157 pages.
Exhibit K11 (Kopra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 285 pages.
Exhibit K12 (Lagassey '043) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 332 pages.
Exhibit K13 (Lemelson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 206 pages.
Exhibit K14 (Pickering) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 45 pages.
Exhibit K15 (Schuler) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 281 pages.
Exhibit K16 (Soufflet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 64 pages.
Exhibit K17 (White) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 186 pages.
Exhibit K18 (BlueAnt V1) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 266 pages.
Exhibit K19 (Lg Chocolate) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 168 pages.
Exhibit K2 (Cerra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 279 pages.
Exhibit K20 (Midomi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 262 pages.
Exhibit K21 (Promptu) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 219 pages.
Exhibit K22 (Samsung SCH-a950) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 288 pages.
Exhibit K23 (W850) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 170 pages.
Exhibit K24 (Ears) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 98 pages.
Exhibit K25 (Motorola Pebl) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 110 pages.
Exhibit K26 (Silynx QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 218 pages.
Exhibit K27 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 306 pages.
Exhibit K28 (Shazam) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 174 pages.
Exhibit K29 (Vlingo) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 69 pages.
Exhibit K3 (Chen '353) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 269 pages.
Exhibit K30 (Yoon) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 78 pages.
Exhibit K4 (Comerford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 136 pages.
Exhibit K5 (Couper) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 170 pages.
Exhibit K6 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 157 pages.
Exhibit K7 (Zaykovskiy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 124 pages.
Exhibit K8 (Hunter) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 114 pages.
Exhibit K9 (Jones) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 115 pages.
Exhibit L1 (Alves 801) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.
Exhibit L10 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 38 pages.
Exhibit L11 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 54 pages.
Exhibit L12 (Visser '958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 162 pages.
Exhibit L13 (Zhang 099) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.

(56) References Cited

OTHER PUBLICATIONS

Exhibit L14 (Byford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 61 pages.
Exhibit L15 (Mejia '156) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 135 pages.
Exhibit L16 (Yang '130) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.
Exhibit L2 (Burnett 421) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 71 pages.
Exhibit L3 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 70 pages.
Exhibit L4 (Huang 798) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 30 pages.
Exhibit L5 (Jaber) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 70 pages.
Exhibit L6 (LG HBM-730) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 93 pages.
Exhibit L7 (Nokia BH-600) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 57 pages.
Exhibit L8 (Nokia BH-900) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 75 pages.
Exhibit L9 (Pedersen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 83 pages.
Exhibit M1 (Armstrong) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.
Exhibit M10 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 82 pages.
Exhibit M11 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 66 pages.
Exhibit M12 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 57 pages.
Exhibit M13 (Rasmussen 245) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 44 pages.
Exhibit M14 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.
Exhibit M15 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.
Exhibit M16 (Zurek 379) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 60 pages.
Exhibit M17 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 164 pages.
Exhibit M18 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.
Exhibit M19 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.
Exhibit M2 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 68 pages.
Exhibit M20 (SenSay) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 110 pages.
Exhibit M21 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 65 pages.
Exhibit M22 (Darbut) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 88 pages.
Exhibit M23 (Ramakrishnan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 96 pages.
Exhibit M3 (Dijsktra 972) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 56 pages.
Exhibit M4 (Hamacher 031) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 52 pages.
Exhibit M5 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 80 pages.
Exhibit M6 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 35 pages.
Exhibit M7 (Kondo 701) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.
Exhibit M8 (Kvalgy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 81 pages.
Exhibit M9 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 87 pages.
Exhibit N1 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 104 pages.

(56) References Cited

OTHER PUBLICATIONS

Exhibit N10 (Bose) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 67 pages.
Exhibit N11 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 96 pages.
Exhibit N12 (Dijkstra 243) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 117 pages.
Exhibit N13 (Cohen 908) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 115 pages.
Exhibit N14 (Rast) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.
Exhibit N15 (Bothra 629) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 53 pages.
Exhibit N16 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 139 pages.
Exhibit N17 (Engle) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 90 pages.
Exhibit N18 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 128 pages.
Exhibit N19 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 73 pages.
Exhibit N2 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 79 pages.
Exhibit N20 (Killion 056) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 74 pages.
Exhibit N21 (Bothra 087) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 72 pages.
Exhibit N22 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 86 pages.
Exhibit N23 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 90 pages.
Exhibit N24 (Hohman) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 82 pages.
Exhibit N25 (Bergeron) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 100 pages.
Exhibit N26 (Frank) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 116 pages.
Exhibit N27 (Darbut 423) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.
Exhibit N28 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.
Exhibit N29 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.
Exhibit N3 (Inanaga) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 100 pages.
Exhibit N30 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 189 pages.
Exhibit N31 (EarSet 2) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.
Exhibit N32 (Etymotic ER-6) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 256 pages.
Exhibit N33 (Zen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 188 pages.
Exhibit N34 (Motorola H605) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 121 pages.
Exhibit N35 (Peltor Lite-Com II) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 223 pages.
Exhibit N36 (Discovery 655) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 308 pages.
Exhibit N37 (MX200 Series) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 121 pages.
Exhibit N38 (Sony S700) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 155 pages.
Exhibit N39 (H5 Miniblue) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 172 pages.
Exhibit N4 (Rosenberg) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 92 pages.
Exhibit N40 (3D Active Ambient IEM) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 291 pages.
Exhibit N41 (Armstrong 422) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 232 pages.

(56) References Cited

OTHER PUBLICATIONS

Exhibit N42 (Hohn) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 160 pages.
Exhibit N43 (Mejia 228) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 180 pages.
Exhibit N44 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 264 pages.
Exhibit N45 (Thomasson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 95 pages.
Exhibit N46 (Zurek 003) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 230 pages.
Exhibit N47 (Kurcan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 444 pages.
Exhibit N48 (Rafaely) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 205 pages.
Exhibit N49 (Vaidyanathan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 155 pages.
Exhibit N5 (Visser 958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 117 pages.
Exhibit N50 (Westerlund) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 154 pages.
Exhibit N51 (Zhang) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 138 pages.
Exhibit N6 (Terlizzi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 123 pages.
Exhibit N7 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 103 pages.
Exhibit N8 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 107 pages.
Exhibit N9 (McCune) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 118 pages.
Experimentation To Address Appropriate Test Techniques For Measuring The Attenuation Provided By Double ANR Hearing Protectors, Susan E. Mercy, Christopher Tubb and Soo H. James, New Directions for Improving Audio Effectiveness (pp. 18-1-18-14). Meeting Proceedings RTO-MP-HFM-123, Paper 18. Neuilly-sur-seine, France: RTO, Apr. 1, 2005, 15 pages.
Extract from Federal Court Management Statistics, Exhibit-1021, Filed on Nov. 10, 2022—Cited in IPR2022-01099, challenging U.S. Pat. No. 11,244,666, 2 pages.
Extract from Federal Court Management Statistics, Exhibit-1024, Filed on Nov. 10, 2022—Cited in IPR2022-01078, challenging U.S. Pat. No. 11,057,701, 2 pages.
Extract from Federal Court Management Statistics, Exhibit-1027, Filed on Nov. 15, 2022—Cited in IPR2022-01098, challenging U.S. Pat. No. 11,217,237, 2 pages.
Extract from Federal Court Management Statistics, Exhibit-1030, Filed on Nov. 10, 2022—Cited in IPR2022-01106, challenging U.S. Pat. No. 11,039,259, 2 pages.
Federal Court Management Statistics (excerpt), Exhibit-2004, Filed on Jul. 1, 2022—Cited in IPR2022-00253, challenging U.S. Pat. No. 9,491,542, 1 pages.
Federal Court Management Statistics (excerpt), Exhibit-2004, Filed on Jul. 1, 2022—Cited in IPR2022-00281, challenging U.S. Pat. No. 9,270,244, 1 pages.
Federal Court Management Statistics (excerpt), Exhibit-2004, Filed on Jul. 1, 2022—Cited in IPR2022-00302, challenging U.S. Pat. No. 9,609,424, 1 pages.
Federal Court Management Statistics (excerpt), Exhibit-2004, Filed on Jul. 1, 2022—Cited in IPR2022-00324, challenging U.S. Pat. No. 8,254,591, 1 pages.
Federal Court Management Statistics (excerpt), Exhibit-2004, Filed on Jul. 1, 2022—Cited in IPR2022-00369, challenging U.S. Pat. No. 10,405,082, 1 pages.
Federal Court Management Statistics (excerpt), Exhibit-2004, Filed on Jul. 1, 2022—Cited in IPR2022-00410, challenging U.S. Pat. No. 10,979,836, 1 pages.
Federal Court Management Statistics (excerpt), Exhibit-2004, Filed on Jul. 1, 2022—Cited in IPR2022-00388, challenging U.S. Pat. No. 10,966,015, 1 pages.
File History for U.S. Pat. No. 9,491,542, Exhibit-1004, Filed on Dec. 17, 2021—Cited in IPR2022-00253, challenging U.S. Pat. No. 9,491,542, 206 pages.
File History of U.S. Appl. No. 16/168,752, Exhibit-2005, Filed on May 18, 2022—Cited in IPR2022-00388, challenging U.S. Pat. No. 10,966,015, 172 pages.
File History of corresponding Reexamination U.S. Patent Application No. 90/019,169, filed Feb. 24, 2023, Reexamination Certificate Issued Oct. 11, 2023 as U.S. Pat. No. 11,244,666 C1., 998 pages.
File History of U.S. Appl. No. 14/054,015, Exhibit-1011, filed Jan. 14, 2022—Cited in IPR2022-00410, challenging U.S. Pat. No. 10,979,836, 140 pages.
File History of U.S. Appl. No. 14/827,332, Exhibit-1010, filed Jan. 14, 2022—Cited in IPR2022-00410, challenging U.S. Pat. No. 10,979,836, 253 pages.
File History of U.S. Appl. No. 15/700,511, Exhibit-1009, filed Jan. 14, 2022—Cited in IPR2022-00410, challenging U.S. Pat. No. 10,979,836, 162 pages.
File History of U.S. Appl. No. 16/414,136, Exhibit-1013, filed Jan. 14, 2022—Cited in IPR2022-00410, challenging U.S. Pat. No. 10,979,836, 220 pages.
File History of U.S. Pat. No. 8,111,839, Exhibit-1005, Filed on Dec. 13, 2021—Cited in IPR2022-00242, challenging U.S. Pat. No. 8,111,839, 244 pages.
File History of U.S. Pat. No. 8,111,839, Exhibit-1005, Filed on Dec. 13, 2021—Cited in IPR2022-00243, challenging U.S. Pat. No. 8,111,839, 244 pages.
File History of U.S. Pat. No. 8,254,591, Exhibit-1004, Filed on Dec. 20, 2021—Cited in IPR2022-00324, challenging U.S. Pat. No. 8,254,591, 263 pages.
File History of U.S. Pat. 9,124,982; Exhibit-1004, Filed on Dec. 13, 2021—Cited in IPR2022-00234, challenging U.S. Pat. No. 9,124,982, 152 pages.
File History of U.S. Pat. No. 10,405,082, Exhibit-1004, Filed on Dec. 30, 2021—Cited in IPR2022-00369, challenging U.S. Pat. No. 10,405,082, 172 pages.
File History of U.S. Pat. No. 10,966,015, Exhibit-1005, Filed on Jan. 4, 2022—Cited in IPR2022-00388, challenging U.S. Pat. No. 10,966,015, 139 pages.
File History of U.S. Pat. No. 10,979,836,, U.S. Appl. No. 16/838,277, Exhibit-1004, Filed on Jan. 14, 2022—Cited in IPR2022-00410, challenging U.S. Pat. No. 10,979,836, 263 pages.

(56) References Cited

OTHER PUBLICATIONS

File History of U.S. Pat. No. 8,315,400, Exhibit-1004, Filed on Dec. 10, 2021—Cited in IPR2022-00282, challenging U.S. Pat. No. 8,315,400, 237 pages.
File History of U.S. Pat. No. 8,774,433, Exhibit-1009, Filed on Dec. 21, 2021—Cited in IPR2022-00302, challenging U.S. Pat. No. 9,609,424, 275 pages.
File History of U.S. Pat. No. 9,270,244, Exhibit-1004, Filed on Dec. 21, 2021—Cited in IPR2022-00281, challenging U.S. Pat. No. 9,270,244, 195 pages.
File History of U.S. Pat. No. 9,332,364, Exhibit-1005, Filed on Dec. 21, 2021—Cited in IPR2022-00302, challenging U.S. Pat. No. 9,609,424, 194 pages.
File History of U.S. Pat. No. 9,609,424, Exhibit-1004, Filed on Dec. 21, 2021—Cited in IPR2022-00302, challenging U.S. Pat. No. 9,609,424, 151 pages.
File History of U.S. Appl. No. 60/910,808; Exhibi-1005, Filed on Dec. 13, 2021—Cited in IPR2022-00234, challenging U.S. Pat. No. 9,124,982, 45 pages.
File History of U.S. Appl. No. 61/098,250, Exhibit-1005, Filed on Jan. 14, 2022—Cited in IPR2022-00410, challenging U.S. Pat. No. 10,979,836, 55 pages.
File History of U.S. Appl. No. 60/619,517 (Allen Provisional), Exhibit-1020, filed Dec. 21, 2021—Cited in IPR2022-00302, challenging U.S. Pat. No. 9,609,424, 41 pages.
File History of U.S. Appl. No. 60/866,420, Exhibit-1010, filed Dec. 21, 2021—Cited in IPR2022-00302, challenging U.S. Pat. No. 9,609,424, 81 pages.
Final Written Decision, IPR2022-00282 (Paper No. 28, Jun. 14, 2023), Exhibit-1035, Filed on Jun. 30, 2023—Cited in IPR2022-01106, challenging U.S. Pat. No. 11,039,259, 96 pages.
Final Written Decision: Final Written Decision Determining All Challenged Claims Unpatentable 35 U.S.C. sec. 318a, Exhibit-32, Filed on Jan. 5, 2024—Cited in IPR2022-01106, challenging U.S. Pat. No. 11,039,259, 104 pages.
Final Written Decision: original, Exhibit-28, Filed on Jun. 14, 2023—Cited in IPR2022-00282, challenging U.S. Pat. No. 8,315,400, 96 pages.
Final Written Decision: original, Exhibit-31, Filed on Jul. 13, 2023—Cited in IPR2022-00281, challenging U.S. Pat. No. 9,270,244, 37 pages.
Final Written Decision: original, Exhibit-33, Filed on Jul. 10, 2023—Cited in IPR2022-00324, challenging U.S. Pat. No. 8,254,591, 90 pages.
Final Written Decision: original, Exhibit-33, Filed on Jul. 14, 2023—Cited in IPR2022-00253, challenging U.S. Pat. No. 9,491,542, 92 pages.
Final Written Decision: original, Exhibit-36, Filed on Jun. 16, 2023—Cited in IPR2022-00242, challenging U.S. Pat. No. 8,111,839, 86 pages.
Final Written Decision: original; Exhibit-29, Filed on Jun. 14, 2023—Cited in IPR2022-00234, challenging U.S. Pat. No. 9,124,982, 85 pages.
Final Written Decision: Judgment Final Written Decision Determining All Challenged Claims Unpatentable 35 U.S. C § 318(a), Exhibit-35, Filed on Jun. 20, 2023—Cited in IPR2022-00243, challenging U.S. Pat. No. 8,111,839, 59 pages.
First Amended Complaint, *Staton Techiya* v. *Samsung*, E.D. Tex, Exhibit-1008, Filed on Dec. 10, 2021—Cited in IPR2022-00282, challenging U.S. Pat. No. 8,315,400, 52 pages.
First Amended Complaint, *Techiya* v. *Samsung*, E.D. Tex, Exhibit-1018, Filed on Dec. 21, 2021—Cited in IPR2022-00281, challenging U.S. Pat. No. 9,270,244, 52 pages.
First Amended Complaint, *Techiya* v. *Samsung*, E.D. Tex, Exhibit-1020, Filed on Dec. 17, 2021—Cited in IPR2022-00253, challenging U.S. Pat. No. 9,491,542, 52 pages.
First Amended Complaint, *Techiya* v. *Samsung*, E.D. Tex, Exhibit-1029, Filed on Dec. 20, 2021—Cited in IPR2022-00324, challenging U.S. Pat. No. 8,254,591, 52 pages.
First Amended Complaint, *Techiya* v. *Samsung*, E.D. Tex, Exhibit-1040, Filed on Dec. 13, 2021—Cited in IPR2022-00242, challenging U.S. Pat. No. 8,111,839, 52 pages.
First Amended Complaint,*Techiya* v. *Samsung*, E.D. Tex, Exhibi-1040, Filed on Dec. 13, 2021—Cited in IPR2022-00243, challenging U.S. Pat. No. 8,111,839, 52 pages.
First Amended Complaint, *Techiya* v. *Samsung*, E.D. Tex.; Exhibit-1031, Filed on Dec. 13, 2021—Cited in IPR2022-00234, challenging U.S. Pat. No. 9,124,982, 52 pages.
Fit-Testing of Hearing Protection, WITT, The Hearing Review, May 21, 2008, 9 pages.
Gennum Zen Digital Wireless Headset ("Zen"), At least by 2004, CNET Article - Gennum Zen Bluetooth Headset Review (SAM-TECH 00098419), 4 pages.
Gennum Zen Digital Wireless Headset ("Zen"), At least by 2004, Gennum Zen User Manual (SAM-TECH 00098432), 2005, 44 pages.
Gennum Zen Digital Wireless Headset ("Zen"), At least by 2004, Globe and Mail Article - Gennum Z-E- N Headset for Bluetooth (SAM- TECH 00098485), 5 pages.
Granting Institution of Inter Partes Review 35 U.S.C § 314, Exhibit-13, Filed on Jul. 15, 2022—Cited in IPR2022-00253, challenging U.S. Pat. No. 9,491,542, 26 pages.
Granting Institution of Inter Partes Review 35 U.S.C § 314, Exhibit-13, Filed on Jul. 15, 2022—Cited in IPR2022-00281, challenging U.S. Pat. No. 9,270,244, 25 pages.
Granting Institution of Inter Partes Review 35 U.S.C § 314, Exhibit-13, Filed on Aug. 16, 2022—Cited in IPR2022-00388, challenging U.S. Pat. No. 10,966,015, 42 pages.
Granting Institution of Inter Partes Review 35 U.S.C § 314, Exhibit-14, Filed on Aug. 16, 2022—Cited in IPR2022-00369, challenging U.S. Pat. No. 10,405,082, 39 pages.
Harman Q&As about Microphone Windscreens, Exhibit-2013, Filed on Sep. 13, 2022—Cited in IPR2022-00242, challenging U.S. Pat. No. 8,111,839, 6 pages.
Harman, Q&As about Microphone Screens; Exhibit-2012, Filed on Sep. 9, 2022—Cited in IPR2022-00234, challenging U.S. Pat. No. 9,124,982, 6 pages.
Huseyin Dogan, Trym Holter, & Ingrid Svagard, Trial of a special end user terminal that aids field operators during emergency rescue operations, Proceedings of the 3rd International !Scram China Workshop, Harbin, China, at 4 (Aug. 2008) discusses the PARAT as well (SAM-TECH_00051920- SAM-TECH_00051931), 12 pages.
IEEE Dictionary of Standards Terms (excerpts), Exhibit-2006, Filed on Mar. 21, 2022—Cited in IPR2022-00282, challenging U.S. Pat. No. 8,315,400, 3 pages.
In-Ear Microphone Speech Data Recognition using HMMs, R. S. Kurcan, M. P. Fargues and R. Vaidyanathan, 2006 IEEE 12th Digital Signal Processing Workshop & 4th IEEE Signal Processing Education Workshop, Teton National Park, WY, USA, 2006, 5 pages.
In-Ear Microphone Speech Data Segmentation and Recognition using Neural Networks, G. Bulbuller, Monique Fargues & Ravi Vaidyanathan, IEEE 12th Digital Signal Processing Workshop and 4th IEEE Signal Processing Education Workshop, 2006, 6 pages.
In-Ear Microphone Techniques For Severe Noise Situations, N. Westerlund, M. Dahl, I. Claesson, Nov. 2005, 39 pages.
Institution Decision: Deny, Exhibit-12, Filed on Aug. 12, 2022—Cited in IPR2022-00410, challenging U.S. Pat. No. 10,979,836, 23 pages.
Institution Decision: Grant, Exhibit-10, Filed on Jan. 9, 2023—Cited in IPR2022-01106, challenging U.S. Pat. No. 11,039,259, 68 pages.
Institution Decision: Grant, Exhibit-12, Filed on Jun. 17, 2022—Cited in IPR2022-00282, challenging U.S. Pat. No. 8,315,400, 60 pages.
Institution Decision: Grant, Exhibit-13, Filed on Jul. 11, 2022—Cited in IPR2022-00302, challenging U.S. Pat. No. 9,609,424, 61 pages.
Institution Decision: Grant, Exhibit-13, Filed on Jul. 11, 2022—Cited in IPR2022-00324, challenging U.S. Pat. No. 8,254,591, 64 pages.

(56) References Cited

OTHER PUBLICATIONS

Institution Decision: Grant, Exhibit-16, Filed on Jun. 21, 2022—Cited in IPR2022-00242, challenging U.S. Pat. No. 8,111,839, 73 pages.
Institution Decision: Grant, Exhibit-8, Filed on Aug. 16, 2024—Cited in IPR2024-00559, challenging U.S. Pat. No. 11,610,587, 10 pages.
Institution Decision: Grant; Exhibit-12, Filed on Jun. 17, 2022—Cited in IPR2022-00234, challenging U.S. Pat. No. 9,124,982, 58 pages.
Isolated Word Recognition from In-Ear Microphone Data Using Hidden Markov Models (HMM), Remzi Serdar Kurcan, Mar. 2006, 179 pages.
Jawbone Aliph, At least by Sep. 9, 2004, https://www.capecodtimes.com/story/news/20 06/12/24/new-earphones-let-you- go/50845129007 (SAM-TECH 00062054), 2 pages.
Jawbone Aliph, At least by Sep. 9, 2004, https://www.cnet.com/reviews/aliph- jawbone-bluetooth-headset-review/ (SAM- TECH 00060121), 3 pages.
Jawbone Aliph, At least by Sep. 9, 2004, https://www.wired.com/2004/09/military- headset-reaches-masses (SAM- TECH 00062036), 7 pages.
Jawbone Aliph, At least by Sep. 9, 2004, Jawbone User Manual (SAM- TECH_00061992), 16 pages.
Joint Motion to Consolidate; Exhibit-2005, Filed on Apr. 29, 2022—Cited in IPR2022-00234, challenging U.S. Pat. No. 9,124,982, 7 pages.
Joint Motion to Terminate Proceeding, Exhibit-17, Filed on Dec. 9, 2024—Cited in IPR2024-00559, challenging U.S. Pat. No. 11,610,587, 7 pages.
Joint Request to Treat Settlement Agreement as Business Confidential Information, Exhibit-14, Filed on Dec. 9, 2024—Cited in IPR2024-01003, challenging U.S. Pat. No. 9,191,083, 5 pages.
Joint Request to Treat Settlement Agreement as Business Confidential Information, Exhibit-14, Filed on Dec. 9, 2024—Cited in IPR2024-01004, challenging U.S. Pat. No. 9,614,943, 5 pages.
Joint Request to Treat Settlement Agreement as Business Confidential Information, Exhibit-14, Filed on Dec. 9, 2024—Cited in IPR2024-01031, challenging U.S. Pat. No. 7,049,850, 5 pages.
Joint Request to Treat Settlement Agreement as Business Confidential Information, Exhibit-15, Filed on Dec. 9, 2024—Cited in IPR2024-01034, challenging U.S. Pat. No. 9,279,263, 5 pages.
Joint Request to Treat Settlement Agreement as Business Confidential Information, Exhibit-18, Filed on Dec. 9, 2024—Cited in IPR2024-00559, challenging U.S. Pat. No. 11,610,587, 5 pages.
Joint Request to Treat Settlement Agreement as Business Confidential InformationPaper13, Dec. 9, 2024—Cited in IPR2024-01033, challenging U.S. Pat. No. 8,434,966, 5 pages.
Joint Statement Regarding Oral Argument, Exhibit-15, Filed on Jul. 29, 2022—Cited in IPR2022-00253, challenging U.S. Pat. No. 9,491,542, 3 pages.
Joint Statement Regarding Oral Argument, Exhibit-15, Filed on Jul. 29, 2022—Cited in IPR2022-00281, challenging U.S. Pat. No. 9,270,244, 3 pages.
Joint Statement Regarding Oral Argument, Exhibit-15, Filed on Jul. 29, 2022—Cited in IPR2022-00302, challenging U.S. Pat. No. 9,609,424, 3 pages.
Joint Statement Regarding Oral Argument, Exhibit-15, Filed on Aug. 24, 2022—Cited in IPR2022-00388, challenging U.S. Pat. No. 10,966,015, 3 pages.
Joint Statement Regarding Oral Argument, Exhibit-16, Filed on Jul. 29, 2022—Cited in IPR2022-00324, challenging U.S. Pat. No. 8,254,591, 3 pages.
Joint Statement Regarding Oral Argument, Exhibit-16, Filed on Aug. 24, 2022—Cited in IPR2022-00369, challenging U.S. Pat. No. 10,405,082, 3 pages.
Joint Statement Regarding Oral Argument, Exhibit-18, Filed on Jul. 29, 2022—Cited in IPR2022-00243, challenging U.S. Pat. No. 8,111,839, 3 pages.
Joint Statement Regarding Oral Argument, Exhibit-19, Filed on Jul. 29, 2022—Cited in IPR2022-00242, challenging U.S. Pat. No. 8,111,839, 3 pages.
Joint Stipulation To Modify Due Dates 1-3, Exhibit-10, Filed on Oct. 25, 2024—Cited in IPR2024-00559, challenging U.S. Pat. No. 11,610,587, 4 pages.
Joint Stipulation To Modify Due Dates 1-3, Exhibit-12, Filed on Nov. 22, 2024—Cited in IPR2024-00559, challenging U.S. Pat. No. 11,610,587, 4 pages.
Joint Stipulation to Modify Scheduling Order, Exhibit-14, Filed on Mar. 14, 2023—Cited in IPR2022-01106, challenging U.S. Pat. No. 11,039,259, 3 pages.
Joint Stipulation to Modify the Scheduling Order, Exhibit-16, Filed on Aug. 16, 2022—Cited in IPR2022-00253, challenging U.S. Pat. No. 9,491,542, 3 pages.
Joint Stipulation to Modify the Scheduling Order, Exhibit-16, Filed on Aug. 16, 2022—Cited in IPR2022-00281, challenging U.S. Pat. No. 9,270,244, 3 pages.
Joint Stipulation to Modify the Scheduling Order, Exhibit-16, Filed on Aug. 16, 2022—Cited in IPR2022-00302, challenging U.S. Pat. No. 9,609,424, 3 pages.
Kleinschmidt Declaration in Support of Patent Owner Response, Exhibit-2018, Filed on Apr. 10, 2023—Cited in IPR2022-01106, challenging U.S. Pat. No. 11,039,259, 41 pages.
LEAP Practitioner Request and Verification Form (Patent Owner), Exhibit-30, Filed on Feb. 28, 2023—Cited in IPR2022-00242, challenging U.S. Pat. No. 8,111,839, 4 pages.
LEAP Practitioner Request and Verification Form (Petitioner), Exhibit-30, Filed on Mar. 13, 2023—Cited in IPR2022-00243, challenging U.S. Pat. No. 8,111,839, 4 pages.
LEAP Practitioner Request and Verification Form (Petitioner), Exhibit-31, Filed on Mar. 13, 2023—Cited in IPR2022-00242, challenging U.S. Pat. No. 8,111,839, 4 pages.
Learning-Based Three Dimensional Sound Localization Using a Compact Non- Coplanar Array of Microphones, Kamen Y. Guentchev and John J. Weng, AAAI Technical Report SS-98-02, 1998, 10 pages.
Letter from Petitioners' Counsel to PO's Counsel Apr. 20, 2022, Exhibit-2004, Filed on May 18, 2022—Cited in IPR2022-00369, challenging U.S. Pat. No. 10,405,082, 8 pages.
Letter from Petitioners' Counsel to PO's Counsel Apr. 20, 2022, Exhibit-2004, Filed on May 18, 2022—Cited in IPR2022-00388, challenging U.S. Pat. No. 10,966,015, 8 pages.
Letter from Petitioners' Counsel to PO's Counsel Apr. 20, 2022, Exhibit-2004, Filed on May 18, 2022—Cited in IPR2022-00410, challenging U.S. Pat. No. 10,979,836, 8 pages.
Maico MI26 Tymp/audiometer combo ("Maico MI26"), Aug. 12, 2004 WayBack Machine Capture of Maico's website has an image of the Maico MI26 and lists the Maico MI26 as a product available for purchase. https://web.archive.org/web/20040422090329/http://www.maico- diagnostics.com:80/eprise/main/Maico/US_en/ProductCategories/LSTO1_Tympanometers (SAM-TECH_00060329- SAM- TECH 00060331), 3 pages.
Mar. 17, 2006 Wayback Machine capture of Maico's website has a user manual available for the Maico MI26 https://web.archive.org/web/20060317092410/ http:/www.maico-diagnostics.com/eprise/main/Maico/Products/ Files/ MI26/1162- 0322REVD.pdf (SAM-Tech 00051168-SAM-TECH 00051215), 48 pages.
Mar. 17, 2006 WayBack Machine Capture of Maico's website discusses frequently asked questions about the Maico MI26 andis' features. https://web.archive.org/web/20060317092109/http://www.maico- diagnostics.com/eprise/main/Maico/Products/Files/MI24/FAQ.MI24-26.pdf (SAM- Tech 00051250-SAM-TECH 00051251), 2 pages.
Markman Hearing Transcript (excerpts), Exhibit-2022, Filed on Oct. 19, 2023—Cited in IPR2022-01106, challenging U.S. Pat. No. 11,039,259, 10 pages.
Mauer, Embedded Indexing, Exhibit-2008, Filed on Sep. 13, 2022—Cited in IPR2022-00242, challenging U.S. Pat. No. 8,111,839, 2 pages.
Mauer, Embedded Indexing: Pros and Cons for the Indexer; Exhibit-2008, Filed on Sep. 9, 2022—Cited in IPR2022-00234, challenging U.S. Pat. No. 9,124,982, 2 pages.

(56) References Cited

OTHER PUBLICATIONS

McGraw-Hill Dictionary of Scientific and Technical Terms, Exhibit-2010, Filed on Sep. 13, 2022—Cited in IPR2022-00242, challenging U.S. Pat. No. 8,111,839, 5 pages.
McGraw-Hill Dictionary of Scientific and Technical Terms; Exhibit-2009, Filed on Sep. 9, 2022—Cited in IPR2022-00234, challenging U.S. Pat. No. 9,124,982, 5 pages.
Merriam-Webster's Collegiate Dictionary (excerpt), Exhibit-2010, Filed on Oct. 11, 2022—Cited in IPR2022-01106, challenging U.S. Pat. No. 11,039,259, 3 pages.
Methods Of Developing And Validating A Field- MIRE Approach For Measuring Hearing Protector Attenuation, Berger, Elliott & Voix, Jeremie & Kieper, R, Feb. 9, 2007, in connection with 3M/Aearo Technologies' E- A- RFitTM Validation System ("E-A-RFit"); This article was originally prepared for the 32nd Annual Conference of the National Hearing Conservation Association, held on Feb. 15-17, 2007, in Savannah, Georgia, and published in Spectrum, vol. 24, Suppl. 1, 16 pages.
Methods of measuring the attenuation of hearing protection devices, E H Berger, The Journal of the Acoustical Society of America vol. 79,6 (1986), 34 pages.
Microphone Array for Headset with Spatial Noise Suppressor, Ivan Tashev, Michael Seltzer & Alex Acero, 2005, 4 pages.
Microphone Array Processing for Robust Speech Recognition, Michael L. Seltzer, Jul. 2003, 163 pages.
Montgomery Declaration with Exhibit A, Exhibit-1018, Filed on Jan. 14, 2022—Cited in IPR2022-00410, challenging U.S. Pat. No. 10,979,836, 10 pages.
Motion for Leave to File Corrected Petition, Exhibit-10, Filed on Jan. 31, 2022—Cited in IPR2022-00242, challenging U.S. Pat. No. 8,111,839, 8 pages.
Motion: Motion to dismiss due to settlement (pre-DI), Exhibit-13, Filed on Dec. 9, 2024—Cited in IPR2024-01003, challenging U.S. Pat. No. 9,191,083, 9 pages.
Motion: Motion to dismiss due to settlement (pre-DI), Exhibit-13, Filed on Dec. 9, 2024—Cited in IPR2024-01004, challenging U.S. Pat. No. 9,614,943, 9 pages.
Motion: Motion to dismiss due to settlement (pre-DI), Exhibit-13, Filed on Dec. 9, 2024—Cited in IPR2024-01031, challenging U.S. Pat. No. 7,049,850, 8 pages.
Motion: Motion to dismiss due to settlement (pre-DI), Exhibit-14, Filed on Dec. 9, 2024—Cited in IPR2024-01034, challenging U.S. Pat. No. 9,279,263, 7 pages.
Motion: Motion to dismiss due to settlement (pre-DI)Paper12, Dec. 9, 2024—Cited in IPR2024-01033, challenging U.S. Pat. No. 8,434,966, 6 pages.
Motorola H5 Miniblue Bluetooth Headset, Jan. 14, 2005, https:// www .engadget.com/2006-01-04- motorolas-h5- miniblue-bluetooth- headset.html (SAM-TECH 00060628), 3 pages.
Motorola H5 Miniblue Bluetooth Headset, Jan. 14, 2005, https:// www.cnet.com/tech/mobile/motorola- h5-miniblue- bluetooth-headset/ (SAM- TECH_00060424) (Motorola H5 Miniblue Bluetooth Headset), 5 pages.
Motorola H5 Miniblue Headset ("Miniblue"), Jan. 2006, Motorola H9 Bluetooth Headset User Manual (SAM-TECH 00060509-14), 6 pages.
Motorola H605, At least by 2006, CNET Article—Motorola H605 Bluetooth Headset Review (SAM-TECH 00098639), 4 pages.
Motorola H605, At least by 2006, Motorola H605 User Manual (SAM-TECH 00098719), 5 pages.
Motorola H605, At least by 2006, PhoneArena Article—Motorola H605 Review (SAM-TECH 00098743), 12 pages.
Motorola Miniblue Press Release (https://web.archive.org/web/ 20060212115000/ http://www.motorola.com/motoinfo/ product/de tails/0,, 133,00.html) (SAM-TECH 00056060), 1 pages.
Motorola's XTS 2500 Digital Portable Radio ("Motorola XTS 2500"), Motorola XTS 2500's Basic Service Manual dated 2002-2003, see XTS 2500 XTS 1500 MT 1500 700-800 MHz Digital Portable Radios, Basic Service Manual at 70 (SAM_00051287-SAM-TECH_00051374), 88 pages.
Motorola's XTS 2500 Digital Portable Radio ("Motorola XTS 2500"), Nov. 9, 2001, WayBack Machine capture of Motorola's website contains an image of the XTS 2500 and states that "[t]he XTS 2500 portable radio is Motorola's high- performance, small-sized, digital two-way radio." https://web.archive.org/web/ 20020804062125/ http://www.motorola.com:80/cgiss/portables/ xts2500.shtml (SAM- TECH 00051258), 1 pages.
Mueller, There's less talking in barrels, but the occlusion effect is still with US, The Hearing Journal, Aug. 2003, pp. 10-16, vol. 56, No. 8.
Muggleton, Nacre's QUIETPRO+ Intelligent Hearing System: Delivering Performance and Hearing Protection Now for the Future of the Soldier, SoldierMod Jan. 2009, pp. 28-29, vol. 2.
Multi-Microphone Correlation-Based Processing for Robust Automatic Speech Recognition, Thomas M. Sullivan, Department of Electrical and Computer Engineering Carnegie Mellon University, Aug. 1996, 113 pages.
Multi-Microphone Signal Acquisition for Speech Recognition Systems, Kevin Fink, EE 586—Speech Recognition Systems, Dec. 16, 1993, 13 pages.
Multi-sensory microphones for robust speech detection, enhancement and recognition, Zhengyou Zhang, Zicheng Liu, M. Sinclair, A. Acero, L. Deng, J. Droppo, Xuedong Huang, Yanli Zheng, 2004 IEEE International Conference on Acoustics, Speech, and Signal Processing 3 (2004), 4 pages.
NACRE QuietPro, In a Mar. 7, 2013 presentation by Blake Martin of Honeywell Safety Products to the Alberta Industrial Fire Protection Association, Mr. Martin identifies "2005" as the "First commercial success for Quietpro." (SAM-TECH_00054652), 33 pages.
NACRE QuietPro, In Aug. 2006, Nacre won U.S. Government Contract No. W912DQ-06-D-0037 to supply the NACRE QuietPro to the U.S. military. U.S. Government Contract No. W912DQ-06-D-0037 (SAM-TECH 00055735), 3 pages.
NACRE QuietPro, In proceedings before the U.S. Trademark Trial and Appeal Board, Nacre stated that it "has used in commerce with the United States, long since prior to Apr. 28, 2006, the registered trademark QUIETPRO on one or more of headphones, earphones . . . . " *Nacre AS* v. *Silynx Communications, Inc*, Sep. 4, 2007 Notice of Opposition. (SAM-TECH_00054696), 9 pages.
NACRE QuietPro, Mar. 9, 2005, Article posted at: https://www.tu.no/artikler/quietproverner-og-forsterker-horselen/261960 (SAM-TECH 00097600), 6 pages.
NACRE QuietPro, Mar. 9, 2005, Honeywell Quietpro QP100ex Mar. 2013 presentation (SAM-TECH_00063985), 33 pages.
NACRE QuietPro, Mar. 9, 2005, NACRE QuietPro User Manual v2.0 (SAMTECH 00055181), 48 pages.
NACRE QuietPro, Mar. 9, 2005, New Scientist Article (SAMTECH_ 00064068), 2 pages.
NACRE QuietPro, Mar. 9, 2005, SoldierMod Article (SAM-TECH_ 00065729), 2 pages.
NACRE QuietPro, Mar. 9, 2005, WayBack Machine capture of Nacre's website contains an image of the NACRE QuietPro and states that "Nacre has secured MNOK 27,5 from a consortium led by Ferd Venture" and that "[m]ost of the money will be spent to boost efforts within sales and marketing of QUIETPRO in the global military market.", (SAM-TECH_00054131) 2 pages.
Nacre's PARAT earplug ("Parat"), 1999 article publ.by one of the PARAT's designers Georg E. Ottensen, discusses the PARAT system and states, "[a]n active ear terminal IS beeing designed atSEVTEF Telecom and informatics. The acronym of the consept is PARAT—Personal Active Radio/Audio Terminal." Georg E. Ottesen, Active noise reduction in an ear terminal, The Journal of the Acoustical Society of America 105, 300(1999); https://doi.org/10.1121/1.424828, SINTEF Telecom and Informatics, N-7465 (SAM-TECH 00051952-SAM-TECH 00051955), 4 pgs.
Nacre's PARAT earplug ("Parat"), Jan. 2004 publication by Fredrik Vraalsen et al., describes how "[p]articular attention has been given to voice interaction m noisy industrial scenarios, utilising the PARAT earplug." Fredrik Vraalsen, Trym Holter, Ingrid Storruste Svagard, and Oyvind Kvennas, A Multimodal Context Aware Mobile Maintenance Terminal For Noisy Environments, Sintef ICT, N-7465 Trondheim, Norway, 79, 79 (Jan. 2004) (SAM-TECH_00051938-SAM-TECH 00051951), 14 pages.

(56) References Cited

OTHER PUBLICATIONS

Noise attenuation and proper insertion of earplugs into ear canals, Markku Toivonen, Rauno Pääkkönen, Seppo Savolainen, Kyösti Lehtomäki, The Annals of occupational hygiene, vol. 46,6 (2002): 527-530, 4 pages.
Notice : Mandatory Notice, Exhibit-5, Filed on Jul. 16, 2024—Cited in IPR2024-01031, challenging U.S. Pat. No. 7,049,850, 7 pages.
Notice : Mandatory Notice, Exhibit-6, Filed on Jul. 16, 2024—Cited in IPR2024-01034, challenging U.S. Pat. No. 9,279,263, 7 pages.
Notice : Mandatory Notice, Exhibit-7, Filed on Mar. 1, 2024—Cited in IPR2024-00559, challenging U.S. Pat. No. 11,610,587, 5 pages.
Notice : Other—Notice of Ranking, Exhibit-4, Filed on Jul. 1, 2024—Cited in IPR2024-01034, challenging U.S. Pat. No. 9,279,263, 5 pages.
Notice : Power of Attorney for Harman International Industries, Exhibit-3, Filed on Feb. 9, 2024—Cited in IPR2024-00559, challenging U.S. Pat. No. 11,610,587, 4 pages.
Notice : Power of Attorney for Harman International Industries, Inc, Exhibit-3, Filed on Jun. 25, 2024—Cited in IPR2024-01031, challenging U.S. Pat. No. 7,049,850, 4 pages.
Notice : Power of Attorney for Harman International Industries, Inc, Exhibit-3, Filed on Jul. 1, 2024—Cited in IPR2024-01034, challenging U.S. Pat. No. 9,279,263, 4 pages.
Notice : Power of Attorney for Samsung Electronics America, Exhibit-2, Filed on Feb. 9, 2024—Cited in IPR2024-00559, challenging U.S. Pat. No. 11,610,587, 3 pages.
Notice : Power of Attorney for Samsung Electronics America, Inc, Exhibit-2, Filed on Jun. 12, 2024—Cited in IPR2024-01003, challenging U.S. Pat. No. 9,191,083, 3 pages.
Notice : Power of Attorney for Samsung Electronics America, Inc, Exhibit-2, Filed on Jun. 12, 2024—Cited in IPR2024-01004, challenging U.S. Pat. No. 9,614,943, 3 pages.
Notice : Power of Attorney for Samsung Electronics America, Inc, Exhibit-2, Filed on JUn. 25, 2024—Cited in IPR2024-01031, challenging U.S. Pat. No. 7,049,850, 4 pages.
Notice : Power of Attorney for Samsung Electronics America, Inc, Exhibit-2, Filed on Jul. 1, 2024—Cited in IPR2024-01034, challenging U.S. Pat. No. 9,279,263, 4 pages.
Notice : Power of Attorney for Samsung Electronics America, Inc. Paper2,JUn. 18, 2024—Cited in IPR2024-01033, challenging U.S. Pat. No. 8,434,966, 4 pages.
Notice : Power of Attorney for Samsung Electronics Co, Ltd, Exhibit-1, Filed on Feb. 9, 2024—Cited in IPR2024-00559, challenging U.S. Pat. No. 11,610,587, 3 pages.
Notice : Power of Attorney for Samsung Electronics Co, Ltd, Exhibit-1, Filed on Jun. 12, 2024—Cited in IPR2024-01003, challenging U.S. Pat. No. 9,191,083, 3 pages.
Notice : Power of Attorney for Samsung Electronics Co, Ltd, Exhibit-1, Filed on Jun. 12, 2024—Cited in IPR2024-01004, challenging U.S. Pat. No. 9,614,943, 3 pages.
Notice : Power of Attorney for Samsung Electronics Co, Ltd, Exhibit-1, Filed on Jul. 1, 2024—Cited in IPR2024-01034, challenging U.S. Pat. No. 9,279,263, 4 pages.
Notice : Power of Attorney for Samsung Electronics Co, Ltd. Paper1,Jun. 18, 2024—Cited in IPR2024-01033, challenging U.S. Pat. No. 8,434,966, 4 pages.
Notice : Power of Attorney for Samsung Electronics Corp, Exhibit-1, Filed on Jun. 25, 2024—Cited in IPR2024-01031, challenging U.S. Pat. No. 7,049,850, 4 pages.
Notice : Power of Attorney, Exhibit-6, Filed on Mar. 1, 2024—Cited in IPR2024-00559, challenging U.S. Pat. No. 11,610,587, 4 pages.
Notice : Power of Attorney, Exhibit-6, Filed on Jul. 16, 2024—Cited in IPR2024-01031, challenging U.S. Pat. No. 7,049,850, 5 pages.
Notice : Power of Attorney, Exhibit-7, Filed on Jul. 16, 2024—Cited in IPR2024-01034, challenging U.S. Pat. No. 9,279,263, 5 pages.
Notice of Deposition of Chris Kyriakakis, Ph.D, Exhibit-17, Filed on Sep. 13, 2022—Cited in IPR2022-00302, challenging U.S. Pat. No. 9,609,424, 3 pages.
Notice of Deposition of Daniel P Anagnos, Exhibit-21, Filed on Dec. 14, 2022—Cited in IPR2022-00324, challenging U.S. Pat. No. 8,254,591, 3 pages.
Notice of Deposition of David Kleinschmidt, Exhibit-20, Filed on Dec. 2, 2022—Cited in IPR2022-00253, challenging U.S. Pat. No. 9,491,542, 3 pages.rff
Notice of Deposition of David Kleinschmidt, Exhibit-20, Filed on Dec. 2, 2022—Cited in IPR2022-00281, challenging U.S. Pat. No. 9,270,244, 3 pages.
Notice of Deposition of Les E. Atlas, Ph.D, Exhibit-13, Filed on Mar.9, 2023—Cited in IPR2022-01106, challenging U.S. Pat. No. 11,039,259, 3 pages.
Notice of Deposition of Les E. Atlas, Ph.D, Exhibit-17, Filed on Aug. 8, 2022—Cited in IPR2022-00324, challenging U.S. Pat. No. 8,254,591, 3 pages.
Notice of Deposition of Les E. Atlas, Ph.D, Exhibit-19, Filed on Aug. 4, 2022—Cited in IPR2022-00243, challenging U.S. Pat. No. 8,111,839, 3 pages.
Notice of Deposition of Les E. Atlas, Ph.D, Exhibit-20, Filed on Aug. 4, 2022—Cited in IPR2022-00242, challenging U.S. Pat. No. 8,111,839, 3 pages.
Notice of Deposition of Les E. Atlas, Ph.D.; Exhibit-15, Filed on Aug. 4, 2022—Cited in IPR2022-00234, challenging U.S. Pat. No. 9,124,982, 3 pages.
Notice of Deposition of Marshall Buck, Exhibit-19, Filed on Dec. 16, 2022—Cited in IPR2022-00388, challenging U.S. Pat. No. 10,966,015, 3 pages.
Notice of Deposition of Marshall Buck, Exhibit-20, Filed on Dec. 16, 2022—Cited in IPR2022-00369, challenging U.S. Pat. No. 10,405,082, 3 pages.
Notice of Deposition of Nathaniel Polish, Ph.D, Exhibit-18, Filed on Sep. 13, 2022—Cited in IPR2022-00253, challenging U.S. Pat. No. 9,491,542, 3 pages.
Notice of Deposition of Nathaniel Polish, Ph.D, Exhibit-18, Filed on Sep. 13, 2022—Cited in IPR2022-00281, challenging U.S. Pat. No. 9,270,244, 3 pages.
Notice of Deposition of Richard M. Stern, Ph.D, Exhibit-13, Filed on Feb. 28, 2023—Cited in IPR2022-01078, challenging U.S. Pat. No. 11,057,701, 3 pages.
Notice of Deposition of Richard M. Stern, Ph.D, Exhibit-14, Filed on Aug. 5, 2022—Cited in IPR2022-00282, challenging U.S. Pat. No. 8,315,400, 3 pages.
Notice of Deposition of Richard M. Stern, Ph.D, Exhibit-17, Filed on Oct. 14, 2022—Cited in IPR2022-00388, challenging U.S. Pat. No. 10,966,015, 3 pages.
Notice of Deposition of Richard M. Stern, Ph.D, Exhibit-18, Filed on Oct. 14, 2022—Cited in IPR2022-00369, challenging U.S. Pat. No. 10,405,082, 3 pages.
Notice of Filing Date Accorded To Petition, Exhibit-5, Filed on Dec. 23, 2021—Cited in IPR2022-00242, challenging U.S. Pat. No. 8,111,839, 5 pages.
Notice of Filing Date Accorded To Petition, Exhibit-5, Filed on Dec. 23, 2021—Cited in IPR2022-00243, challenging U.S. Pat. No. 8,111,839, 5 pages.
Notice of Ranking, Exhibit-4, Filed on Dec. 13, 2021—Cited in IPR2022-00242, challenging U.S. Pat. No. 8,111,839, 6 pages.
Notice of Ranking, Exhibit-4, Filed on Dec. 13, 2021—Cited in IPR2022-00243, challenging U.S. Pat. No. 8,111, 839, 6 pages.
Notice of Ranking, Exhibit-4, Filed on Jun. 12, 2024—Cited in IPR2024-01003, challenging U.S. Pat. No. 9,191,083, 6 pages.
Notice of Ranking, Exhibit-4, Filed on Jun. 12, 2024—Cited in IPR2024-01004, challenging U.S. Pat. No. 9,614,943, 6 pages.
Notice Regarding Transcript of Markman Hearing, Exhibit-29, Filed on Oct. 19, 2023—Cited in IPR2022-01106, challenging U.S. Pat. No. 11,039,259, 3 pages.
Notice: Notice filing date accorded, Exhibit-5, Filed on Dec. 21, 202—Cited in IPR2022-00282, challenging U.S. Pat. No. 8,315,400, 5 pages.
Notice: Notice filing date accorded, Exhibit-5, Filed on Feb. 27, 2024—Cited in IPR2024-00559, challenging U.S. Pat. No. 11,610,587, 6 pages.

(56) References Cited

OTHER PUBLICATIONS

Notice: Notice filing date accorded, Exhibit-5, Filed on Jun. 17, 2024—Cited in IPR2024-01003, challenging U.S. Pat. No. 9,191,083, 6 pages.
Notice: Notice filing date accorded, Exhibit-5, Filed on Jun. 18, 2024—Cited in IPR2024-01004, challenging U.S. Pat. No. 9,614,943, 6 pages.
Notice: Notice filing date accorded, Exhibit-6, Filed on Jan.13, 2022—Cited in IPR2022-00302, challenging U.S. Pat. No. 9,609,424, 6 pages.
Notice: Notice filing date accorded, Exhibit-6, Filed on Jan. 13, 2022—Cited in IPR2022-00324, challenging U.S. Pat. No. 8,254,591, 6 pages.
Notice: Notice filing date accorded, Exhibit-6, Filed on Jan. 18, 2022—Cited in IPR2022-00253, challenging U.S. Pat. No. 9,491,542, 5 pages.
Notice: Notice filing date accorded, Exhibit-6, Filed on Jan. 18, 2022—Cited in IPR2022-00281, challenging U.S. Pat. No. 9,270,244, 5 pages.
Notice: Notice filing date accorded, Exhibit-6, Filed on Feb. 18, 2022—Cited in IPR2022-00410, challenging U.S. Pat. No. 10,979,836, 5 pages.
Notice: Notice filing date accorded, Exhibit-6, Filed on Jul. 7, 2022—Cited in IPR2022-01078, challenging U.S. Pat. No. 11,057,701, 6 pages.
Notice: Notice filing date accorded, Exhibit-6, Filed on Jul. 7, 2022—Cited in IPR2022-01099, challenging U.S. Pat. No. 11,244,666, 6 pages.
Notice: Notice filing date accorded, Exhibit-6, Filed on Jul. 8, 2022—Cited in IPR2022-01106, challenging U.S. Pat. No. 11,039,259, 6 pages.
Notice: Notice filing date accorded, Exhibit-7, Filed on Feb. 18, 2022—Cited in IPR2022-00388, challenging U.S. Pat. No. 10,966,015, 5 pages.
Notice: Notice filing date accorded, Exhibit-7, Filed on Jul. 7, 2022—Cited in IPR2022-01098, challenging U.S. Pat. No. 11,217,237, 6 pages.
Notice: Notice filing date accorded, Exhibit-8, Filed on Feb. 18, 2022—Cited in IPR2022-00369, challenging U.S. Pat. No. 10,405,082, 5 pages.
Notice: Notice filing date accorded, Exhibit-8, Filed on Jul. 24, 2024—Cited in IPR2024-01031, challenging U.S. Pat. No. 7,049,850, 6 pages.
Notice: Notice filing date accorded, Exhibit-9, Filed on Aug. 16, 2024—Cited in IPR2024-01034, challenging U.S. Pat. No. 9,279,263, 6 pages.
Notice: Notice filing date accorded; Exhibit-4, Filed on Dec. 21, 2021—Cited in IPR2022-00234, challenging U.S. Pat. No. 9,124,982, 5 pages.
Notice: Notice filing date accordedPaper4,Jun. 20, 2024—Cited in IPR2024-01033, challenging U.S. Pat. No. 8,434,966, 6 pages.
Notice: refund approved, Exhibit-13, Filed on Mar. 7, 2023—Cited in IPR2022-01099, challenging U.S. Pat. No. 11,244,666, 3 pages.
Notice: refund approved, Exhibit-14, Filed on Jan. 20, 2023—Cited in IPR2022-00410, challenging U.S. Pat. No. 10,979,836, 3 pages.
Notice: refund approved, Exhibit-14, Filed on Mar. 7, 2023—Cited in IPR2022-01098, challenging U.S. Pat. No. 11,217,237, 3 pages.
Notice: refund approved, Exhibit-18, Filed on Dec. 17, 2024—Cited in IPR2024-01003, challenging U.S. Pat. No. 9,191,083, 3 pages.
Notice: refund approved, Exhibit-18, Filed on Dec. 17, 2024—Cited in IPR2024-01004, challenging U.S. Pat. No. 9,614,943, 3 pages.
Notice: refund approved, Exhibit-18, Filed on Dec. 17, 2024—Cited in IPR2024-01031, challenging U.S. Pat. No. 7,049,850, 3 pages.
Notice: refund approved, Exhibit-19, Filed on Dec. 17, 2024—Cited in IPR2024-01034, challenging U.S. Pat. No. 9,279,263, 3 pages.
Notice: refund approvedPaper17, Dec. 17, 2024—Cited in IPR2024-01033, challenging U.S. Pat. No. 8,434,966, 3 pages.
Nov. 3, 2019 article published by Imran Hussain discusses how to use the ear tip fit test with the AirPods Pro and an iOS device such as the iPhone 11 for the best fit. https://www.esquire.com/lifestyle/a29612084/apple-airpods-pro-active-noise- cancellation-review/ (SAM-TECH_00052413-SAM-TECH_00052424), 12 pages.
Oct. 20, 2019 article by Tim Hardwick discussing how to perform an ear tip fit test using Apple's AirPods Pro with Apple's iPhone 11. https://www.macrumors.com/how- to/perform-ear-tip-fit-test-airpods-pro/; (SAM-TECH 00052357 - SAM-TECH 00052370), 14 pages.
Oct. 29, 2019 on BusinessToday.in states the AirPods Pro require Apple devices running iOS 13.2 or later, iPadOS 13.2 or later, watchOS 6.1 or later, tvOS 13.2 or later, or macOS Catalina 10.15.1 or later. https://www.businesstoday.in/technology/lau nch/story/apple-airpods-pro-with- noise- cancellation-launched-check-out-price-in-india features-235269-2019- 10-29 (SAM-TECH 00061346-SAM-TECH 00061349), 4 pages.
Oct. 31, 2019 article published by Charlie Sorrel discusses the Ear tip fit test for the AirPods Pro in the iPhone settings. https://www.cultofmac.com/662548/airpods- pro-ear-tip-fit-test/; (SAM- Tech 00056870-SAM-TECH 00056881), 12 pages.
Olwal 2005, Exhibit-1023, Filed on Dec. 21, 2021—Cited in IPR2022-00281, challenging U.S. Pat. No. 9,270,244, 3 pages.
Olympus WS-320M, At least by Nov. 25, 2005 (Olympus WS-320M) https://web.archive.org/ web/20051125000137mp_, http://www.olympusamerica.com/cpg_se ction/cpg_vr_digitalmusic.asp (SAM-TECH 00051760), 2 pages.
Olympus WS-320M, At least by Nov. 25, 2005 (Olympus WS-320M) https://web.archive.org/web/20060314095402/, http://www.olympusamerica.com/cpg_sectio n/product.asp?product= 1195&fl= 2 (SAM-TECH 00051767; SAM-TECH 00051753), 3 pages.
Olympus WS-320M, At least by Nov. 25, 2005 Olympus WS-320M Instruction Manual (SAM-TECH 00051833), 87 pages.
Optimal Feedback Control Formulation of the Active Noise Cancellation Problem: Pointwise and Distributed, Kambiz C. Zangi, RLE Technical Report No. 583, Research Laboratory of Electronics Massachusetts Institute of Technology, May 1994, 158 pages.
Order Adopting Claim Construction Order, Exhibit-2015, Filed on Apr. 10, 2023—Cited in IPR2022-01106, challenging U.S. Pat. No. 11,039,259, 2 pages.
Order Clarifying Claim Construction Order, Exhibit-2014, Filed on Apr. 10, 2023—Cited in IPR2022-01106, challenging U.S. Pat. No. 11,039,259, 1 pages.
ORDER Conditionally Granting Patent Owner's Motion to Withdraw and Substitute Counsel 37 CFR. § 42.10, Exhibit-12, Filed on Dec. 9, 2024—Cited in IPR2024-01003, challenging U.S. Pat. No. 9,191,083, 5 pages.
ORDER Conditionally Granting Patent Owner's Motion to Withdraw and Substitute Counsel 37 CFR. § 42.10, Exhibit-12, Filed on Dec. 9, 2024—Cited in IPR2024-01004, challenging U.S. Pat. No. 9,614,943, 5 pages.
ORDER Conditionally Granting Patent Owner's Motion to Withdraw and Substitute Counsel 37 CFR. § 42.10, Exhibit-12, Filed on Dec. 9, 2024—Cited in IPR2024-01031, challenging U.S. Pat. No. 7,049,850, 5 pages.
ORDER Conditionally Granting Patent Owner's Motion to Withdraw and Substitute Counsel 37 CFR. § 42.10, Exhibit-13, Filed on Dec. 9, 2024—Cited in IPR2024-01034, challenging U.S. Pat. No. 9,279,263, 5 pages.
ORDER Conditionally Granting Patent Owner's Motion to Withdraw and Substitute Counsel 37 CFR. § 42.10Paper11, Dec. 9, 2024—Cited in IPR2024-01033, challenging U.S. Pat. No. 8,434,966, 5 pages.
Order Conditionally Granting Patent Owner's Motion to Withdraw and Substitute Counsel, Exhibit-13, Filed on Dec. 5, 2024—Cited in IPR2024-00559, challenging U.S. Pat. No. 11,610,587, 4 pages.
ORDER Granting Patent Owner's Motions for Pro Hac Vice Admission of Roy Falik 37 CFR. § 42.10(c), Exhibit-9, Filed on Sep. 23, 2024—Cited in IPR2024-01031, challenging U.S. Pat. No. 7,049,850, 4 pages.
ORDER Trial Hearing 37 C.F.R. 42.70, Exhibit-23, Filed on Feb. 6, 2023—Cited in IPR2022-00282, challenging U.S. Pat. No. 8,315,400, 10 pages.
ORDER Trial Hearing 37 C.F.R. 42.70; Exhibit-24, Filed on Feb. 6, 2023—Cited in IPR2022-00234, challenging U.S. Pat. No. 9,124,982, 10 pages.

(56) References Cited

OTHER PUBLICATIONS

ORDER Trial Hearing 37 CFR. § 42.70, Exhibit-24, Filed on Mar. 1, 2023—Cited in IPR2022-00302, challenging U.S. Pat. No. 9,609,424, 10 pages.
ORDER Trial Hearing 37 CFR. § 42.70, Exhibit-26, Filed on Oct. 10, 2023—Cited in IPR2022-01106, challenging U.S. Pat. No. 11,039,259, 10 pages.
ORDER Trial Hearing 37 CFR. § 42.70, Exhibit-26, Filed on Mar. 1, 2023—Cited in IPR2022-00324, challenging U.S. Pat. No. 8,254,591, 10 pages.
ORDER Trial Hearing 37 C.F.R. sec 42.70, Exhibit-28, Filed on Feb. 8, 2023—Cited in IPR2022-00243, challenging U.S. Pat. No. 8,111,839, 10 pages.
ORDER Trial Hearing 37 C.F.R. sec 42.70, Exhibit-29, Filed on Feb. 8, 2023—Cited in IPR2022-00242, challenging U.S. Pat. No. 8,111,839, 10 pages.
ORDER Trial Hearing, Exhibit-25, Filed on Mar. 1, 2023—Cited in IPR2022-00281, challenging U.S. Pat. No. 9,270,244, 10 pages.
Order Vacating Standing Orders, Exhibit-2005, Filed on Jul. 1, 2022—Cited in IPR2022-00253, challenging U.S. Pat. No. 9,491,542, 2 pages.
Order Vacating Standing Orders, Exhibit-2005, Filed on Jul. 1, 2022—Cited in IPR2022-00281, challenging U.S. Pat. No. 9,270,244, 2 pages.
Order Vacating Standing Orders, Exhibit-2005, Filed on Jul. 1, 2022—Cited in IPR2022-00302, challenging U.S. Pat. No. 9,609,424, 2 pages.
Order Vacating Standing Orders, Exhibit-2005, Filed on Jul. 1, 2022—Cited in IPR2022-00324, challenging U.S. Pat. No. 8,254,591, 2 pages.
Order Vacating Standing Orders, Exhibit-2006, Filed on Jul. 1, 2022—Cited in IPR2022-00369, challenging U.S. Pat. No. 10,405,082, 2 pages.
Order Vacating Standing Orders, Exhibit-2006, Filed on Jul. 1, 2022—Cited in IPR2022-00410, challenging U.S. Pat. No. 10,979,836, 2 pages.
Order Vacating Standing Orders, Exhibit-2007, Filed on Jul. 1, 2022—Cited in IPR2022-00388, challenging U.S. Pat. No. 10,966,015, 2 pages.
Order: Conduct of the Proceeding 37 C.F.R. sec. 42.5, Exhibit-18, Filed on Jan. 5, 2023—Cited in IPR2022-00282, challenging U.S. Pat. No. 8,315,400, 3 pages.
Order: Granting Patent Owner's Motion for Pro Hac Vice Admission of Roy Falik 37 CFR. § 42.10, Exhibit-10, Filed on Oct. 4, 2024—Cited in IPR2024-01034, challenging U.S. Pat. No. 9,279,263, 5 pages.
Order: Granting Patent Owner's Motions for Admission Pro Hac Vice of Roy Falik 37 CFR. § 42.10, Exhibit-9, Filed on Oct. 4, 2024—Cited in IPR2024-01004, challenging U.S. Pat. No. 9,614,943, 5 pages.
Order: Granting Patent Owner's Motions for Admission Pro Hac Vice of Roy Falik 37 CFR. § 42.10Paper8, Oct. 4, 2024—Cited in IPR2024-01033, challenging U.S. Pat. No. 8,434,966, 5 pages.
Order: on Motion, Exhibit-9, Filed on Oct. 4, 2024—Cited in IPR2024-01003, challenging U.S. Pat. No. 9,191,083, 5 pages.
Order: Other, Exhibit-12, Filed on Feb. 22, 2023—Cited in IPR2022-01078, challenging U.S. Pat. No. 11,057,701, 3 pages.
Order: Scheduling Order, Exhibit-13, Filed on Jun. 17, 2022—Cited in IPR2022-00282, challenging U.S. Pat. No. 8,315,400, 14 pages.
Order: Scheduling Order; Exhibit-13, Filed on Jun. 17, 2022—Cited in IPR2022-00234, challenging U.S. Pat. No. 9124982, 14 pages.
Order: Hearing Order, Exhibit-26, Filed on Apr. 7, 2023—Cited in IPR2022-00388, challenging U.S. Pat. No. 10,966,015, 10 pages.
Order: Hearing Order, Exhibit-27, Filed on Apr. 7, 2023—Cited in IPR2022-00369, challenging U.S. Pat. No. 10,405,082, 10 pages.
Order: Order Setting Oral Argument 37 CFR. § 42.70, Exhibit-22, Filed on Aug. 21, 2023—Cited in IPR2022-01078, challenging U.S. Pat. No. 11,057,701, 10 pages.
Order: Panel Change Order, Exhibit-22, Filed on Feb. 10, 2023—Cited in IPR2022-00253, challenging U.S. Pat. No. 9,491,542, 3 pages.
Order: Trial Hearing (Revised), Exhibit-25, Filed on Mar. 3, 2023—Cited in IPR2022-00302, challenging U.S. Pat. No. 9,609,424, 10 pages.
Order: Trial Hearing (Revised), Exhibit-27, Filed on Mar. 3, 2023—Cited in IPR2022-00324, challenging U.S. Pat. No. 8,254,591, 10 pages.
Order: Trial Hearing—37 CFR 42.70, Exhibit-26, Filed on Mar. 2, 2023—Cited in IPR2022-00253, challenging U.S. Pat. No. 9,491,542, 10 pages.
Osha, Appx A to 1910.95—Noise Exposure Computation, Exhibit-2014, Filed on Sep. 13, 2022—Cited in IPR2022-00242, challenging U.S. Pat. No. 8,111,839, 8 pages.
Osha, Appx A to 1910.95—Noise Exposure Computation; Exhibit-2013, Filed on Sep. 9, 2022—Cited in IPR2022-00234, challenging U.S. Pat. No. 9,124,982, 8 pages.
Oshana, Chapters 3-4, Exhibit-1017, Filed on Jan. 14, 2022—Cited in IPR2022-00410, challenging U.S. Pat. No. 10,979,836, 95 pages.
Oshana, DSP Software Development Techniques for Embedded and Real-Time Systems, Chapters 3 and 4, pp. 35-121, Elsevier, Inc., Amsterdam, Netherlands (2006) See in 527 total pages.
Other: Hearing transcript, Exhibit-27, Filed on Apr. 18, 2023—Cited in IPR2022-00282, challenging U.S. Pat. No. 8,315,400, 79 pages.
Other: Hearing transcript, Exhibit-30, Filed on Jul. 25, 2023—Cited in IPR2022-00388, challenging U.S. Pat. No. 10,966,015, 56 pages.
Other: Hearing transcript, Exhibit-31, Filed on Jul. 25, 2023—Cited in IPR2022-00369, challenging U.S. Pat. No. 10,405,082, 56 pages.
Other: Hearing transcript, Exhibit-32, Filed on Jul. 6, 2023—Cited in IPR2022-00253, challenging U.S. Pat. No. 9,491,542, 62 pages.
Other: Hearing transcript, Exhibit-35, Filed on Jun. 1,2023—Cited in IPR2022-00242, challenging U.S. Pat. No. 8,111,839, 88 pages.
Other: Hearing transcript, Exhibit-36, Filed on Jul. 6, 2023—Cited in IPR2022-00302, challenging U.S. Pat. No. 9,609,424, 63 pages.
Other: Hearing transcript; Exhibit-28, Filed on Apr. 18, 2023—Cited in IPR2022-00234, challenging U.S. Pat. No. 9,124,982, 76 pages.
Other: Order Granting Motion for Leave to File Corrected Petition , Exhibit-10, Filed on Feb. 2, 2022—Cited in IPR2022-00243, challenging U.S. Pat. No. 8,111,839, 4 pages.
Other: Order Granting Motion for Leave to File Corrected Petition , Exhibit -11, Filed on Feb. 2, 2022—Cited in IPR2022-00242, challenging U.S. Pat. No. 8,111,839, 4 pages.
Other: Fed Circuit mandate, Exhibit-34, Filed on Jun. 27, 2024—Cited in IPR2022-01106, challenging U.S. Pat. No. 11,039,259, 2 pages.
Other: Fed Circuit mandate, Exhibit-36, Filed on Jun. 27, 2024—Cited in IPR2022-00324, challenging U.S. Pat. No. 8,254,591, 2 pages.
Other: Hearing transcript, Exhibit-25, Filed on Oct. 16, 2023—Cited in IPR2022-01078, challenging U.S. Pat. No. 11,057,701, 58 pages.
Other: Hearing transcript, Exhibit-31, Filed on Dec. 13, 2023—Cited in IPR2022-01106, challenging U.S. Pat. No. 11,039,259, 59 pages.
Other: Hearing transcript, Exhibit-32, Filed on Jul. 3, 2023—Cited in IPR2022-00324, challenging U.S. Pat. No. 8,254,591, 57 pages.
Other: Hearing transcript, Exhibit-32, Filed on Jul. 31, 2023—Cited in IPR2022-00281, challenging U.S. Pat. No. 9,270,244, 58 pages.
Other: Hearing transcript, Exhibit-34, Filed on Jun. 22, 2023—Cited in IPR2022-00302, challenging U.S. Pat. No. 9,609,424, 63 pages.
Oxford Dictionary of Elecs and Electrical Eng (excerpts), Exhibit-2005, Filed on Mar. 21, 2022—Cited in IPR2022-00282, challenging U.S. Pat. No. 8,315,400, 3 pages.
P.R. 4-5(d) Joint Claim Construction Chart, Exhibit-2009, Filed on Feb. 22, 2023—Cited in IPR2022-00253, challenging U.S. Pat. No. 9,491,542, 54 pages.
P.R. 4-5(d) Joint Claim Construction Chart, Exhibit-2009, Filed on Feb. 22, 2023—Cited in IPR2022-00281, challenging U.S. Pat. No. 9,270,244, 54 pages.

(56) References Cited

OTHER PUBLICATIONS

Panel Change Order, Exhibit-12, Filed on Feb. 3, 2023—Cited in IPR2022-01106, challenging U.S. Pat. No. 11,039,259, 3 pages.
Patent Owner Brief Regarding Interim Procedure for Discretionary Denials, Exhibit-12, Filed on Jul. 1, 2022—Cited in IPR2022-00253, challenging U.S. Pat. No. 9,491,542, 6 pages.
Patent Owner Response; Exhibit-17, Filed on Sep. 9, 2022—Cited in IPR2022-00234, challenging U.S. Pat. No. 9,124,982, 57 pages.
Patent Owner Stanton Techiya LLC's Mandatory NoticePaper6,Jul. 3, 2024—Cited in IPR2024-01033, challenging U.S. Pat. No. 8,434,966, 7 pages.
Patent Owner Staton Techiya, LLC's Mandatory Notice, Exhibit-7, Filed on Jul. 3, 2024—Cited in IPR2024-01004, challenging U.S. Pat. No. 9,614,943, 7 pages.
Patent Owner Staton Techiya, LLC's Mandatory Notices, Exhibit-7, Filed on Jul. 3, 2024—Cited in IPR2024-01003, challenging U.S. Pat. No. 9,191,083, 7 pages.
Patent Owner Staton Techiya, LLC's Motion for the Pro Hac Vice Admission of Roy Falik, Exhibit-8, Filed on Jul. 5, 2024—Cited in IPR2024-01003, challenging U.S. Pat. No. 9,191,083, 8 pages.
Patent Owner Staton Techiya, LLC's Motion for the Pro Hac Vice Admission of Roy Falik, Exhibit-8, Filed on Jul. 5, 2024—Cited in IPR2024-01004, challenging U.S. Pat. No. 9,614,943, 8 pages.
Patent Owner Staton Techiya, LLC's Motion for the Pro Hac Vice Admission of Roy FalikPaper7,Jul. 5, 2024—Cited in IPR2024-01033, challenging U.S. Pat. No. 8,434,966, 8 pages.
Patent Owner Staton Techiya, LLC's Power of Attorney, Exhibit-6, Filed on Jul. 3, 2024—Cited in IPR2024-01003, challenging U.S. Pat. No. 9,191,083, 5 pages.
Patent Owner Staton Techiya, LLC's Power of Attorney, Exhibit-6, Filed on Jul. 3, 2024—Cited in IPR2024-01004, challenging U.S. Pat. No. 9,614,943, 5 pages.
Patent Owner Staton Techiya, LLC's Power of AttorneyPaper5,Jul. 3, 2024—Cited in IPR2024-01033, challenging U.S. Pat. No. 8,434,966, 5 pages.
Patent Owner's Brief Regarding Interim Procedure for Discretionary Denials, Exhibit-11, Filed on Jul. 1, 2022—Cited in IPR2022-00410, challenging U.S. Pat. No. 10,979,836, 6 pages.
Patent Owner's Brief Regarding Interim Procedure for Discretionary Denials, Exhibit-12, Filed on Jul. 1, 2022—Cited in IPR2022-00281, challenging U.S. Pat. No. 9,270,244, 6 pages.
Patent Owner's Brief Regarding Interim Procedure for Discretionary Denials, Exhibit-12, Filed on Jul. 1, 2022—Cited in IPR2022-00302, challenging U.S. Pat. No. 9,609,424, 6 pages.
Patent Owner's Brief Regarding Interim Procedure for Discretionary Denials, Exhibit-12, Filed on Jul. 1, 2022—Cited in IPR2022-00324, challenging U.S. Pat. No. 8,254,591, 6 pages.
Patent Owner's Brief Regarding Interim Procedure for Discretionary Denials, Exhibit-12, Filed on Jul. 1, 2022—Cited in IPR2022-00388, challenging U.S. Pat. No. 10,966,015, 6 pages.
Patent Owner's Brief Regarding Interim Procedure for Discretionary Denials, Exhibit-13, Filed on Jul. 1, 2022—Cited in IPR2022-00369, challenging U.S. Pat. No. 10,405,082, 6 pages.
Patent Owner's Corrected Notice of Appeal, Exhibit-38, Filed on Aug. 15, 2023—Cited in IPR2022-00243, challenging U.S. Pat. No. 8,111,839, 64 pages.
Patent Owner's Demonstratives, Exhibit-2008, Filed on Apr. 11, 2023—Cited in IPR2022-00302, challenging U.S. Pat. No. 9,609,424, 23 pages.
Patent Owner's Demonstratives, Exhibit-2010, Filed on Apr. 12, 2023—Cited in IPR2022-00253, challenging U.S. Pat. No. 9,491,542, 27 pages.
Patent Owner's Demonstratives, Exhibit-2010, Filed on Apr. 13, 2023—Cited in IPR2022-00281, challenging U.S. Pat. No. 9,270,244, 36 pages.
Patent Owner's Demonstratives, Exhibit-2010, Filed on Apr. 4, 2023—Cited in IPR2022-00324, challenging U.S. Pat. No. 8,254,591, 14 pages.
Patent Owner's Demonstratives, Exhibit-2012, Filed on May 9, 2023—Cited in IPR2022-00369, challenging U.S. Pat. No. 10,405,082, 34 pages.
Patent Owner's Demonstratives, Exhibit-2012, Filed on May 9, 2023—Cited in IPR2022-00388, challenging U.S. Pat. No. 10,966,015, 34 pages.
Patent Owner's Demonstratives, Exhibit-2014, Filed on Mar. 14, 2023—Cited in IPR2022-00282, challenging U.S. Pat. No. 8,315,400, 52 pages.
Patent Owner's Demonstratives, Exhibit-2014, Filed on Sep. 25, 2023—Cited in IPR2022-01078, challenging U.S. Pat. No. 11,057,701, 25 pages.
Patent Owner's Demonstratives, Exhibit-2015, Filed on Mar. 16, 2023—Cited in IPR2022-00242, challenging U.S. Pat. No. 8,111,839, 44 pages.
Patent Owner's Demonstratives, Exhibit-2015, Filed on Mar. 16, 2023—Cited in IPR2022-00243, challenging U.S. Pat. No. 8,111,839, 44 pages.
Patent Owner's Demonstratives, Exhibit-2021, Filed on Oct. 11, 2023—Cited in IPR2022-01106, challenging U.S. Pat. No. 11,039,259, 48 pages.
Patent Owner's Demonstratives; Exhibit-2014, Filed on Mar. 14, 2023—Cited in IPR2022-00234, challenging U.S. Pat. No. 9,124,982, 34 pages.
Patent Owner's Mandatory Notice under 37 CFR. 42.8, Exhibit-5, Filed on Jan. 19, 2022—Cited in IPR2022-00388, challenging U.S. Pat. No. 10,966,015, 5 pages.
Patent Owner's Mandatory Notice under 37 CFR. 42.8, Exhibit-5, Filed on Jan. 19, 2022—Cited in IPR2022-00410, challenging U.S. Pat. No. 10,979,836, 4 pages.
Patent Owner's Mandatory Notice under 37 CFR. 42.8, Exhibit-5, Filed on Dec. 28, 2021—Cited in IPR2022-00253, challenging U.S. Pat. No. 9,491,542, 4 pages.
Patent Owner's Mandatory Notice under 37 CFR. 42.8, Exhibit-5, Filed on Dec. 28, 2021—Cited in IPR2022-00281, challenging U.S. Pat. No. 9,270,244, 4 pages.
Patent Owner's Mandatory Notice under 37 CFR. 42.8, Exhibit-5, Filed on Dec. 28, 2021—Cited in IPR2022-00302, challenging U.S. Pat. No. 9,609,424, 4 pages.
Patent Owner's Mandatory Notice under 37 CFR. 42.8, Exhibit-5, Filed on Dec. 28, 2021—Cited in IPR2022-00324, challenging U.S. Pat. No. 8,254,591, 4 pages.
Patent Owner's Mandatory Notice under 37 CFR. 42.8, Exhibit-5, Filed on Jun. 22, 2022—Cited in IPR2022-01078, challenging U.S. Pat. No. 11,057,701, 4 pages.
Patent Owner's Mandatory Notice under 37 CFR. 42.8, Exhibit-5, Filed on Jun. 22, 2022—Cited in IPR2022-01099, challenging U.S. Pat. No. 11,244,666, 4 pages.
Patent Owner's Mandatory Notice under 37 CFR. 42.8, Exhibit-5, Filed on Jun. 22, 2022—Cited in IPR2022-01106, challenging U.S. Pat. No. 11,039,259, 4 pages.
Patent Owner's Mandatory Notice under 37 CFR. 42.8, Exhibit-6, Filed on Jun. 22, 2022—Cited in IPR2022-01098, challenging U.S. Pat. No. 11,217,237, 4 pages.
Patent Owner's Mandatory Notice under 37 CFR. 42.8, Exhibit-7, Filed on Dec. 28, 2021—Cited in IPR2022-00242, challenging U.S. Pat. No. 8,111,839, 4 pages.
Patent Owner's Mandatory Notice under 37 CFR. 42.8, Exhibit-7, Filed on Dec. 28, 2021—Cited in IPR2022-00243, challenging U.S. Pat. No. 8,111,839, 5 pages.
Patent Owner's Mandatory Notice under 37 CFR. 42.8, Exhibit-7, Filed on Dec. 28, 2021—Cited in IPR2022-00282, challenging U.S. Pat. No. 8,315,400, 4 pages.
Patent Owner's Mandatory Notice under 37 CFR. 42.8; Exhibit-6, Filed on Dec. 28, 2021—Cited in IPR2022-00234, challenging U.S. Pat. No. 9,124,982, 5 pages.
Patent Owner's Mandatory Notice under 37 CFR 42.8, Exhibit-6, Filed on Jan. 19, 2022—Cited in IPR2022-00369, challenging U.S. Pat. No. 10,405,082, 5 pages.
Patent Owner's Notice of Appeal, Exhibit-30, Filed on Aug. 11, 2023—Cited in IPR2022-00282, challenging U.S. Pat. No. 8,315,400, 101 pages.

(56) References Cited

OTHER PUBLICATIONS

Patent Owner's Notice of Appeal, Exhibit-33, Filed on Mar. 5, 2024—Cited in IPR2022-01106, challenging U.S. Pat. No. 11,039,259, 109 pages.
Patent Owner's Notice of Appeal, Exhibit-33, Filed on Sep. 8, 2023—Cited in IPR2022-00281, challenging U.S. Pat. No. 9,270,244, 42 pages.
Patent Owner's Notice of Appeal, Exhibit-34, Filed on Sep. 8, 2023—Cited in IPR2022-00253, challenging U.S. Pat. No. 9,491,542, 97 pages.
Patent Owner's Notice of Appeal, Exhibit-34, Filed on Sep. 8, 2023—Cited in IPR2022-00324, challenging U.S. Pat. No. 8,254,591, 95 pages.
Patent Owner's Notice of Appeal, Exhibit-38, Filed on Aug. 15, 2023—Cited in IPR2022-00242, challenging U.S. Pat. No. 8,111,839, 91 pages.
Patent Owner's Notice of Appeal; Exhibit-31, Filed on Aug. 11, 2023—Cited in IPR2022-00234, challenging U.S. Pat. No. 9,124,982, 90 pages.
Patent Owner's Notice of Cross-Appeal, Exhibit-39, Filed on Aug. 23, 2023—Cited in IPR2022-00302, challenging U.S. Pat. No. 9,609,424, 74 pages.
Patent Owner's Power of Attorney, Exhibit-4, Filed on Jan. 19, 2022—Cited in IPR2022-00388, challenging U.S. Pat. No. 10,966,015, 3 pages.
Patent Owner's Power of Attorney, Exhibit-4, Filed on Jan. 19, 2022—Cited in IPR2022-00410, challenging U.S. Pat. No. 10,979,836, 3 pages.
Patent Owner's Power of Attorney, Exhibit-4, Filed on Dec. 28, 2021—Cited in IPR2022-00253, challenging U.S. Pat. No. 9,491,542, 3 pages.
Patent Owner's Power of Attorney, Exhibit-4, Filed on Dec. 28, 2021—Cited in IPR2022-00281, challenging U.S. Pat. No. 9,270,244, 3 pages.
Patent Owner's Power of Attorney, Exhibit-4, Filed on Dec. 28, 2021—Cited in IPR2022-00302, challenging U.S. Pat. No. 9,609,424, 3 pages.
Patent Owner's Power of Attorney, Exhibit-4, Filed on Dec. 28, 2021—Cited in IPR2022-00324, challenging U.S. Pat. No. 8,254,591, 3 pages.
Patent Owner's Power of Attorney, Exhibit-4, Filed on Jun. 22, 2022—Cited in IPR2022-01078, challenging U.S. Pat. No. 11,057,701, 3 pages.
Patent Owner's Power of Attorney, Exhibit-4, Filed on Jun. 22, 2022—Cited in IPR2022-01099, challenging U.S. Pat. No. 11,244,666, 3 pages.
Patent Owner's Power of Attorney, Exhibit-4, Filed on Jun. 22, 2022—Cited in IPR2022-01106, challenging U.S. Pat. No. 11,039,259, 3 pages.
Patent Owner's Power of Attorney, Exhibit-5, Filed on Jan. 19, 2022—Cited in IPR2022-00369, challenging U.S. Pat. No. 10,405,082, 3 pages.
Patent Owner's Power of Attorney, Exhibit-5, Filed on Jun. 22, 2022—Cited in IPR2022-01098, challenging U.S. Pat. No. 11,217,237, 3 pages.
Patent Owner's Power of Attorney, Exhibit-6, Filed on Dec. 28, 2021—Cited in IPR2022-00242, challenging U.S. Pat. No. 8,111,839, 3 pages.
Patent Owner's Power of Attorney, Exhibit-6, Filed on Dec. 28, 2021—Cited in IPR2022-00243, challenging U.S. Pat. No. 8,111,839, 3 pages.
Patent Owner's Power of Attorney, Exhibit-6, Filed on Dec. 28, 2021—Cited in IPR2022-00282, challenging U.S. Pat. No. 8,315,400, 3 pages.
Patent Owner's Power of Attorney; Exhibit-5, Filed on Dec. 28, 2021—Cited in IPR2022-00234, challenging U.S. Pat. No. 9124982, 3 pages.
Patent Owner's Preliminary Response, Exhibit-12, Filed on Mar. 23, 2022—Cited in IPR2022-00243, challenging U.S. Pat. No. 8,111,839, 59 pages.
Patent Owner's Preliminary Response, Exhibit-13, Filed on Mar. 23, 2022—Cited in IPR2022-00242, challenging U.S. Pat. No. 8,111,839, 68 pages.
Patent Owner's Preliminary Response, Exhibit-7, Filed on Oct. 11, 2022—Cited in IPR2022-01106, challenging U.S. Pat. No. 11,039,259, 56 pages.
Patent Owner's Preliminary Response, Exhibit-7, Filed on Oct. 7, 2022—Cited in IPR2022-01078, challenging U.S. Pat. No. 11,057,701, 51 pages.
Patent Owner's Preliminary Response, Exhibit-7, Filed on Oct. 7, 2022—Cited in IPR2022-01099, challenging U.S. Pat. No. 11,244,666, 34 pages.
Patent Owner's Preliminary Response, Exhibit-7, Filed on May 18, 2022—Cited in IPR2022-00410, challenging U.S. Pat. No. 10,979,836, 47 pages.
Patent Owner's Preliminary Response, Exhibit-8, Filed on Oct. 7, 2022—Cited in IPR2022-01098, challenging U.S. Pat. No. 11,217,237, 47 pages.
Patent Owner's Preliminary Response, Exhibit-8, Filed on Apr. 13, 2022—Cited in IPR2022-00302, challenging U.S. Pat. No. 9,609,424, 76 pages.
Patent Owner's Preliminary Response, Exhibit-8, Filed on Apr. 13, 2022—Cited in IPR2022-00324, challenging U.S. Pat. No. 8,254,591, 68 pages.
Patent Owner's Preliminary Response, Exhibit-8, Filed on Apr. 18, 2022—Cited in IPR2022-00253, challenging U.S. Pat. No. 9,491,542, 70 pages.
Patent Owner's Preliminary Response, Exhibit-8, Filed on Apr. 18, 2022—Cited in IPR2022-00281, challenging U.S. Pat. No. 9,270,244, 75 pages.
Patent Owner's Preliminary Response, Exhibit-8, Filed on May 18, 2022—Cited in IPR2022-00388, challenging U.S. Pat. No. 10,966,015, 54 pages.
Patent Owner's Preliminary Response, Exhibit-9, Filed on Mar. 21, 2022—Cited in IPR2022-00282, challenging U.S. Pat. No. 8,315,400, 77 pages.
Patent Owner's Preliminary Response, Exhibit-9, Filed on May 18, 2022—Cited in IPR2022-00369, challenging U.S. Pat. No. 10,405,082, 55 pages.
Patent Owner's Preliminary Response; Exhibit-9, Filed on Mar. 21, 2022—Cited in IPR2022-00234, challenging U.S. Pat. No. 9,124,982, 69 pages.
Patent Owner's Preliminary Sur-Reply, Exhibit-10, Filed on Nov. 22, 2022—Cited in IPR2022-01098, challenging U.S. Pat. No. 11,217,237, 8 pages.
Patent Owner's Preliminary Sur-Reply, Exhibit-10, Filed on May 19, 2022—Cited in IPR2022-00302, challenging U.S. Pat. No. 9,609,424, 8 pages.
Patent Owner's Preliminary Sur-Reply, Exhibit-10, Filed on May 20, 2022—Cited in IPR2022-00324, challenging U.S. Pat. No. 8,254,591, 8 pages.
Patent Owner's Preliminary Sur-Reply, Exhibit-10, Filed on May 31, 2022—Cited in IPR2022-00253, challenging U.S. Pat. No. 9,491,542, 8 pages.
Patent Owner's Preliminary Sur-Reply, Exhibit-10, Filed on Jun. 23, 2022—Cited in IPR2022-00388, challenging U.S. Pat. No. 10,966,015, 8 pages.
Patent Owner's Preliminary Sur-Reply, Exhibit-10, Filed on Jun. 7, 2022—Cited in IPR2022-00281, challenging U.S. Pat. No. 9,270,244, 8 pages.
Patent Owner's Preliminary Sur-Reply, Exhibit-11, Filed on Apr. 29, 2022—Cited in IPR2022-00282, challenging U.S. Pat. No. 8,315,400, 9 pages.
Patent Owner's Preliminary Sur-Reply, Exhibit-11, Filed on Jun. 23, 2022—Cited in IPR2022-00369, challenging U.S. Pat. No. 10,405,082, 8 pages.
Patent Owner's Preliminary Sur-Reply, Exhibit-14, Filed on Apr. 29, 2022—Cited in IPR2022-00243, challenging U.S. Pat. No. 8,111,839, 9 pages.
Patent Owner's Preliminary Sur-Reply, Exhibit-15, Filed on Apr. 29, 2022—Cited in IPR2022-00242, challenging U.S. Pat. No. 8,111,839, 9 pages.

(56) References Cited

OTHER PUBLICATIONS

Patent Owner's Preliminary Sur-Reply, Exhibit-9, Filed on Nov. 17, 2022—Cited in IPR2022-01099, challenging U.S. Pat. No. 11,244,666, 9 pages.
Patent Owner's Preliminary Sur-Reply, Exhibit-9, Filed on Nov. 18, 2022—Cited in IPR2022-01078, challenging U.S. Pat. No. 11,057,701, 9 pages.
Patent Owner's Preliminary Sur-Reply, Exhibit-9, Filed on Jun. 23, 2022—Cited in IPR2022-00410, challenging U.S. Pat. No. 10,979,836, 8 pages.
Patent Owner's Preliminary Sur-Reply; Exhibit-11, Filed on Apr. 29, 2022—Cited in IPR2022-00234, challenging U.S. Pat. No. 9,124,982, 9 pages.
Patent Owner's Request for Oral Argument, Exhibit-21, Filed on Feb. 3, 2023—Cited in IPR2022-00282, challenging U.S. Pat. No. 8,315,400, 4 pages.
Patent Owner's Request for Oral Argument, Exhibit-21, Filed on Aug. 17, 2023—Cited in IPR2022-01078, challenging U.S. Pat. No. 11,057,701, 3 pages.
Patent Owner's Request for Oral Argument, Exhibit-22, Filed on Feb. 28, 2023—Cited in IPR2022-00302, challenging U.S. Pat. No. 9,609,424, 4 pages.
Patent Owner's Request for Oral Argument, Exhibit-23, Filed on Mar. 1, 2023—Cited in IPR2022-00281, challenging U.S. Pat. No. 9,270,244, 4 pages.
Patent Owner's Request for Oral Argument, Exhibit-24, Filed on Feb. 28, 2023—Cited in IPR2022-00324, challenging U.S. Pat. No. 8,254,591, 4 pages.
Patent Owner's Request for Oral Argument, Exhibit-24, Filed on Mar. 1, 2023—Cited in IPR2022-00253, challenging U.S. Pat. No. 9,491,542, 4 pages.
Patent Owner's Request for Oral Argument, Exhibit-24, Filed on Apr. 4, 2023—Cited in IPR2022-00388, challenging U.S. Pat. No. 10,966,015, 4 pages.
Patent Owner's Request for Oral Argument, Exhibit-25, Filed on Apr. 4, 2023—Cited in IPR2022-00369, challenging U.S. Pat. No. 10,405,082, 4 pages.
Patent Owner's Request for Oral Argument, Exhibit-25, Filed on Aug. 28, 2023—Cited in IPR2022-01106, challenging U.S. Pat. No. 11,039,259, 3 pages.
Patent Owner's Request for Oral Argument, Exhibit-26, Filed on Feb. 7, 2023—Cited in IPR2022-00243, challenging U.S. Pat. No. 8,111,839, 4 pages.
Patent Owner's Request for Oral Argument, Exhibit-27, Filed on Feb. 7, 2023—Cited in IPR2022-00242, challenging U.S. Pat. No. 8,111,839, 4 pages.
Patent Owner's Request for Oral Argument; Exhibit-22, Filed on Feb. 3, 2023—Cited in IPR2022-00234, challenging U.S. Pat. No. 9,124,982, 4 pages.
Patent Owner's Response, Exhibit-14, Filed on Mar. 23, 2023—Cited in IPR2022-01078, challenging U.S. Pat. No. 11,057,701, 53 pages.
Patent Owner's Response, Exhibit-15, Filed on Sep. 9, 2022—Cited in IPR2022-00282, challenging U.S. Pat. No. 8,315,400, 73 pages.
Patent Owner's Response, Exhibit-16, Filed on Dec. 6, 2024—Cited in IPR2024-00559, challenging U.S. Pat. No. 11,610,587, 36 pages.
Patent Owner's Response, Exhibit-17, Filed on Apr. 10, 2023—Cited in IPR2022-01106, challenging U.S. Pat. No. 11,039,259, 59 pages.
Patent Owner's Response, Exhibit-18, Filed on Oct. 17, 2022—Cited in IPR2022-00302, challenging U.S. Pat. No. 9,609,424, 67 pages.
Patent Owner's Response, Exhibit-18, Filed on Nov. 8, 2022—Cited in IPR2022-00388, challenging U.S. Pat. No. 10,966,015, 55 pages.
Patent Owner's Response, Exhibit-19, Filed on Oct. 19, 2022—Cited in IPR2022-00253, challenging U.S. Pat. No. 9,491,542, 76 pages.
Patent Owner's Response, Exhibit-19, Filed on Oct. 19, 2022—Cited in IPR2022-00281, challenging U.S. Pat. No. 9,270,244, 71 pages.
Patent Owner's Response, Exhibit-19, Filed on Nov. 8, 2022—Cited in IPR2022-00369, challenging U.S. Pat. No. 10,405,082, 51 pages.
Patent Owner's Response, Exhibit-20, Filed on Oct. 17, 2022—Cited in IPR2022-00324, challenging U.S. Pat. No. 8,254,591, 37 pages.
Patent Owner's Response, Exhibit-21, Filed on Sep. 13, 2022—Cited in IPR2022-00243, challenging U.S. Pat. No. 8,111,839, 5 pages.
Patent Owner's Response, Exhibit-22, Filed on Sep. 13, 2022—Cited in IPR2022-00242, challenging U.S. Pat. No. 8,111,839, 58 pages.
Patent Owner's Sur-Reply, Exhibit-19, Filed on Jan. 12, 2023—Cited in IPR2022-00282, challenging U.S. Pat. No. 8,315,400, 28 pages.
Patent Owner's Sur-Reply, Exhibit-19, Filed on Jul. 26, 2023—Cited in IPR2022-01078, challenging U.S. Pat. No. 11,057,701, 29 pages.
Patent Owner's Sur-Reply, Exhibit-21, Filed on Feb. 21, 2023—Cited in IPR2022-00302, challenging U.S. Pat. No. 9,609,424, 29 pages.
Patent Owner's Sur-Reply, Exhibit-22, Filed on Feb .22, 2023—Cited in IPR2022-00281, challenging U.S. Pat. No. 9,270,244, 31 pages.
Patent Owner's Sur-Reply, Exhibit-22, Filed on Mar. 13, 2023—Cited in IPR2022-00388, challenging U.S. Pat. No. 10,966,015, 21 pages.
Patent Owner's Sur-Reply, Exhibit-23, Filed on Feb. 20, 2023—Cited in IPR2022-00324, challenging U.S. Pat. No. 8,254,591, 23 pages.
Patent Owner's Sur-Reply, Exhibit-23, Filed on Feb. 22, 2023—Cited in IPR2022-00253, challenging U.S. Pat. No. 9,491,542, 28 pages.
Patent Owner's Sur-Reply, Exhibit-23, Filed on Mar. 13, 2023—Cited in IPR2022-00369, challenging U.S. Pat. No. 10,405,082, 22 pages.
Patent Owner's Sur-Reply, Exhibit-23, Filed on Aug. 14, 2023—Cited in IPR2022-01106, challenging U.S. Pat. No. 11,039,259, 33 pages.
Patent Owner's Sur-Reply, Exhibit-25, Filed on Jan. 17, 2023—Cited in IPR2022-00243, challenging U.S. Pat. No. 8,111,839, 20 pages.
Patent Owner's Sur-Reply, Exhibit-26, Filed on Jan. 12, 2023—Cited in IPR2022-00242, challenging U.S. Pat. No. 8,111,839, 20 pages.
Patent Owner's Sur-Reply; Exhibit-21, Filed on Jan. 13, 2023—Cited in IPR2022-00234, challenging U.S. Pat. No. 9124982, 26 pages.
Patent Owner's Unopposed Motion To Withdraw and Substitute Counsel Under 37 CFR 11.116, Exhibit-11, Filed on Nov. 13, 2024—Cited in IPR2024-00559, challenging U.S. Pat. No. 11,610,587, 4 pages.
Patent Owner's Unopposed Motion to Withdraw and Substitute Counsel Under 37 CFR 11.116, Exhibit-11, Filed on Nov. 21, 2024—Cited in IPR2024-01003, challenging U.S. Pat. No. 9,191,083, 4 pages.
Patent Owner's Unopposed Motion To Withdraw and Substitute Counsel Under 37 CFR 11.116, Exhibit-11, Filed on Nov. 21, 2024—Cited in IPR2024-01004, challenging U.S. Pat. No. 9,614,943, 4 pages.
Patent Owner's Unopposed Motion To Withdraw and Substitute Counsel Under 37 CFR 11.116, Exhibit-11, Filed on Nov. 21, 2024—Cited in IPR2024-01031, challenging U.S. Pat. No. 7,049,850, 4 pages.
Patent Owner's Unopposed Motion To Withdraw and Substitute Counsel Under 37 CFR 11.116, Exhibit-12, Filed on Nov. 21, 2024—Cited in IPR2024-01034, challenging U.S. Pat. No. 9,279,263, 4 pages.

(56) References Cited

OTHER PUBLICATIONS

Patent Owner's Unopposed Motion To Withdraw and Substitute Counsel Under 37 CFR 11.116Paper10, Nov. 21, 2024—Cited in IPR2024-01033, challenging U.S. Pat. No. 8,434,966, 4 pages.
Patent Owner's Updated Exhibit List, Exhibi-23, Filed on Sep. 25, 2023—Cited in IPR2022-01078, challenging U.S. Pat. No. 11,057,701, 4 pages.
Patent Owner's Updated Mandatory Notice under 37 CFR. 42.8, Exhibit-15, Filed on Jul. 27, 2022—Cited in IPR2022-00324, challenging U.S. Pat. No. 8,254,591, 5 pages.
Patent Owner's Updated Mandatory Notice under 37 CFR. 42.8, Exhibit-17, Filed on Jul. 27, 2022—Cited in IPR2022-00243, challenging U.S. Pat. No. 8,111,839, 5 pages.
Patent Owner's Updated Mandatory Notice under 37 CFR. 42.8, Exhibit-18, Filed on Jul. 27, 2022—Cited in IPR2022-00242, challenging U.S. Pat. No. 8,111,839, 5 pages.
Patent Owner's Updated Mandatory Notice under 37 CFR. 42.8, Exhibit-8, Filed on Dec. 28, 2021—Cited in IPR2022-00242, challenging U.S. Pat. No. 8,111,839, 5 pages.
Patent Owner's Updated Mandatory Notice under 37 CFR. 42.8; Exhibit-14, Filed on Jul. 27, 2022—Cited in IPR2022-00234, challenging U.S. Pat. No. 9,124,982, 5 pages.
Patent Owner's Updated Mandatory Notice under 37 CFR. 42.8; Exhibit-7, Filed on Dec. 28, 2021—Cited in IPR2022-00234, challenging U.S. Pat. No. 9,124,982, 5 pages.
Patent Owner's Updated Mandatory Notice, Exhibit-17, Filed on Sep. 13, 2022—Cited in IPR2022-00253, challenging U.S. Pat. No. 9,491,542, 4 pages.
Patent Owner's Updated Mandatory Notice, Exhibit-17, Filed on Sep. 13, 2022—Cited in IPR2022-00281, challenging U.S. Pat. No. 9,270,244, 4 pages.
Patent Owner's Updated Mandatory Notice, Exhibit-18, Filed on Jun. 28, 2023—Cited in IPR2022-01078, challenging U.S. Pat. No. 11,057,701, 4 pages.
Patent Owner's Updated Mandatory Notice, Exhibit-20, Filed on Jun. 28, 2023—Cited in IPR2022-01106, challenging U.S. Pat. No. 11,039,259, 4 pages.
Patent Owner's Updated Mandatory Notice, Exhibit-29, Filed on Jun. 28, 2023—Cited in IPR2022-00282, challenging U.S. Pat. No. 8,315,400, 4 pages.
Patent Owner's Updated Mandatory Notice, Exhibit-29, Filed on Jun. 28, 2023—Cited in IPR2022-00388, challenging U.S. Pat. No. 10,966,015, 5 pages.
Patent Owner's Updated Mandatory Notice, Exhibit-30, Filed on Jun. 28, 2023—Cited in IPR2022-00281, challenging U.S. Pat. No. 9,270,244, 4 pages.
Patent Owner's Updated Mandatory Notice, Exhibit-30, Filed on Jun. 28, 2023—Cited in IPR2022-00369, challenging U.S. Pat. No. 10,405,082, 5 pages.
Patent Owner's Updated Mandatory Notice, Exhibit-31, Filed on Jun. 28, 2023—Cited in IPR2022-00253, challenging U.S. Pat. No. 9,491,542, 4 pages.
Patent Owner's Updated Mandatory Notice, Exhibit-31, Filed on Jun. 28, 2023—Cited in IPR2022-00324, challenging U.S. Pat. No. 8,254,591, 5 pages.
Patent Owner's Updated Mandatory Notice, Exhibit-35, Filed on Jun. 28, 2023—Cited in IPR2022-00302, challenging U.S. Pat. No. 9,609,424, 5 pages.
Patent Owner's Updated Mandatory Notice, Exhibit-37, Filed on Jun. 28, 2023—Cited in IPR2022-00242, challenging U.S. Pat. No. 8,111,839, 5 pages.
Patent Owner's Updated Mandatory Notice; Exhibit-30, Filed on Jun. 28, 2023—Cited in IPR2022-00234, challenging U.S. Pat. No. 9,124,982, 6 pages.
Patent Owner's Updated Mandatory Notices, Exhibit-15, Filed on Dec. 6, 2024—Cited in IPR2024-00559, challenging U.S. Pat. No. 11,610,587, 6 pages.
Patent Owner's Updated Power of Attorney Pursuant to 37 CFR 41.10(b), Exhibit-14, Filed on Dec. 6, 2024—Cited in IPR2024-00559, challenging U.S. Pat. No. 11,610,587, 5 pages.
Peltor Lite-Com II, At least by 1999, Peltor Lite-Com II Manual (SAM- TECH_00099254), 13 pages.
Peltor Lite-Com II, At least by 1999, Peltor Lite-Com II Brochure (SAM- Tech 00099203), 6 pages.
Performance of dual microphone in-the-ear hearing aids, Michael Valente, Gerald Schuchmant, Lisa G. Potts & Lucille B. Beck, Journal of the American Academy of Audiology, 2000, 9 pages.
Petition : as filed for Inter Partes Review of U.S. Pat. No. 11,610,587, Exhibit-4, Filed on Feb. 9, 2024—Cited in IPR2024-00559, challenging U.S. Pat. No. 11,610,587, 88 pages.
Petition : as filed, Exhibit-3, Filed on Jun. 12, 2024—Cited in IPR2024-01003, challenging U.S. Pat. No. 9, 191,083, 93 pages.
Petition : as filed, Exhibit-3, Filed on Jun. 12, 2024—Cited in IPR2024-01004, challenging U.S. Pat. No. 9,614,943, 91 pages.
Petition : as filed, Exhibit-4, Filed on Jun. 25, 2024—Cited in IPR2024-01031, challenging U.S. Pat. No. 7,049,850, 96 pages.
Petition : as filed, Exhibit-5, Filed on Jul. 1, 2024—Cited in IPR2024-01034, challenging U.S. Pat. No. 9,279,263, 107 pages.
Petition : as filedPaper3,Jun. 18, 2024—Cited in IPR2024-01033, challenging U.S. Pat. No. 8,434,966, 116 pages.
Petition for Inter Partes Review of U.S. Pat. No. 11,217,237, Exhibit-4, Filed on Jun. 9, 2022—Cited in IPR2022-01098, challenging U.S. Pat. No. 11,217,237, 84 pages.
Petition for Inter Partes Review of U.S. Pat. No. 11,244,666, Exhibit-3, Filed on Jun. 9, 2022—Cited in IPR2022-01099, challenging U.S. Pat. No. 11,244,666, 83 pages.
Petition for Inter Partes Review of U.S. Pat. No. 8,254,591, Exhibit-3, Filed on Dec. 20, 2021—Cited in IPR2022-00324, challenging U.S. Pat. No. 8,254,591, 80 pages.
Petition for Inter Partes Review of U.S. Pat. No. 10,405,082, Exhibit-3, Filed on Dec. 30, 202—Cited in IPR2022-00369, challenging U.S. Pat. No. 10,405,082, 96 pages.
Petition for Inter Partes Review of U.S. Pat. No. 10,966,015, Exhibit-3, Filed on Jan. 4, 2022—Cited in IPR2022-00388, challenging U.S. Pat. No. 10,966,015, 93 pages.
Petition for Inter Partes Review of U.S. Pat. No. 10,979,836, Exhibit-3, Filed on Jan. 14, 2022—Cited in IPR2022-00410, challenging U.S. Pat. No. 10,979,836, 88 pages.
Petition for Inter Partes Review of U.S. Pat. No. 11,039,259, Exhibit-3, Filed on Jun. 9, 2022—Cited in IPR2022-01106, challenging U.S. Pat. No. 11,039,259, 90 pages.
Petition for Inter Partes Review of U.S. Pat. No. 8,111,839, Exhibit-3, Filed on Dec. 13, 2021—Cited in IPR2022-00242, challenging U.S. Pat. No. 8,111,839, 84 pages.
Petition for Inter Partes Review of U.S. Pat. No. 8,111,839, Exhibit-3, Filed on Dec. 13, 2021—Cited in IPR2022-00243, challenging U.S. Pat. No. 8, 111,839, 58 pages.
Petition for Inter Partes Review of U.S. Pat. No. 9,124,982; Exhibit-3, Filed on Dec. 13, 2021—Cited in IPR2022-00234, challenging U.S. Pat. No. 9,124,982, 84 pages.
Petition for Inter Partes Review of U.S. Pat. No. 9,270,244, Exhibit-3, Filed on Dec. 21, 2021—Cited in IPR2022-00281, challenging U.S. Pat. No. 9,270,244, 80 pages.
Petition for Inter Partes Review of U.S. Pat. No. 9,491,542, Exhibit-3, Filed on Dec. 17, 2021—Cited in IPR2022-00253, challenging U.S. Pat. No. 9,491,542, 79 pages.
Petition for Inter Partes Review of U.S. Pat. No. 9,609,424, Exhibit-3, Filed on Dec. 21, 2021—Cited in IPR2022-00302, challenging U.S. Pat. No. 9,609,424, 91 pages.
Petition of Inter Partes Review of U.S. Pat. No. 11,057,701, Exhibit-3, Filed on Jun. 9, 2022—Cited in IPR2022-01078, challenging U.S. Pat. No. 11,057,701, 95 pages.
Petition with Proposed Corrections in Redline, Exhibit-1042, Filed on Jan. 31, 2022—Cited in IPR2022-00242, challenging U.S. Pat. No. 8,111,839, 84 pages.
Petition with Proposed Corrections in Redline, Exhibit-1042, Filed on Jan. 31, 2022—Cited in IPR2022-00243, challenging U.S. Pat. No. 8,111,839, 58 pages.
Petitioner's Power of Attorney from Samsung Electronics Co, Ltd.; Exhibit-1, Filed on Dec. 13, 2021—Cited in IPR2022-00234, challenging U.S. Pat. No. 9,124,982, 3 pages.

(56) References Cited

OTHER PUBLICATIONS

Petitioner's Power of Attorney from Samsung Electronics, America, Inc.; Exhibit-2, Filed on Dec. 13, 2021—Cited in IPR2022-00234, challenging U.S. Pat. No. 9,124,982, 3 pages.
Petitioner's Updated Mandatory Notices, Exhibit-16, Filed on Oct. 13, 2022—Cited in IPR2022-00388, challenging U.S. Pat. No. 10,966,015, 5 pages.
Petitioner's Updated Mandatory Notices, Exhibit-17, Filed on Oct. 13, 2022—Cited in IPR2022-00369, challenging U.S. Pat. No. 10,405,082, 5 pages.
Petitioner's Updated Mandatory Notices; Exhibit-27, Filed on Apr. 3, 2023—Cited in IPR2022-00234, challenging U.S. Pat. No. 9124982, 6 pages.
Petitioners Supplemental Brief on Interim Fintiv Guidance, Exhibit-10, Filed on Jul. 1, 2022—Cited in IPR2022-00410, challenging U.S. Pat. No. 10,979,836, 8 pages.
Petitioners Supplemental Brief on Interim Fintiv Guidance, Exhibit-11, Filed on Jul. 1, 2022—Cited in IPR2022-00253, challenging U.S. Pat. No. 9,491,542, 8 pages.
Petitioners Supplemental Brief on Interim Fintiv Guidance, Exhibit-11, Filed on Jul. 1, 2022—Cited in IPR2022-00281, challenging U.S. Pat. No. 9,270,244, 8 pages.
Petitioners Supplemental Brief on Interim Fintiv Guidance, Exhibit-11, Filed on Jul. 1, 2022—Cited in IPR2022-00302, challenging U.S. Pat. No. 9,609,424, 8 pages.
Petitioners Supplemental Brief on Interim Fintiv Guidance, Exhibit-11, Filed on Jul. 1, 2022—Cited in IPR2022-00324, challenging U.S. Pat. No. 8,254,591, 8 pages.
Petitioners Supplemental Brief on Interim Fintiv Guidance, Exhibit-11, Filed on Jul. 1, 2022—Cited in IPR2022-00388, challenging U.S. Pat. No. 10,966,015, 8 pages.
Petitioners Supplemental Brief on Interim Fintiv Guidance, Exhibit-12, Filed on Jul. 1, 2022—Cited in IPR2022-00369, challenging U.S. Pat. No. 10,405,082, 8 pages.
Petitioners' Demonstrative Exhibits for Oral Argument, Exhibit-1019, Filed on Mar. 14, 2023—Cited in IPR2022-00282, challenging U.S. Pat. No. 8,315,400, 53 pages.
Petitioners' Demonstrative Exhibits for Oral Argument; Exhibit-1045, Filed on Mar. 14, 2023—Cited in IPR2022-00234, challenging U.S. Pat. No. 9124982, 101 pages.
Petitioners' Motion for Leave to File Corrected Petition, Exhibit-9, Filed on Jan. 31, 2022—Cited in IPR2022-00243, challenging U.S. Pat. No. 8,111,839, 8 pages.
Petitioners' Motion to Submit Supplemental Information Pursuant to 37 CFR. §42.123(b), Exhibit-29, Filed on Apr. 13, 2023—Cited in IPR2022-00302, challenging U.S. Pat. No. 9,609,424, 6 pages.
Petitioners' Notice of Appeal, Exhibit-31, Filed on Aug. 11, 2023—Cited in IPR2022-00282, challenging U.S. Pat. No. 8,315,400, 104 pages.
Petitioners' Notice of Appeal, Exhibit-38, Filed on Aug. 11, 2023—Cited in IPR2022-00302, challenging U.S. Pat. No. 9,609,424, 77 pages.
Petitioners' Notice of Cross-Appeal, Exhibit-34, Filed on Sep. 20, 2023—Cited in IPR2022-00281, challenging U.S. Pat. No. 9,270,244, 45 pages.
Petitioners' Notice of Cross-Appeal, Exhibit-35, Filed on Sep. 20, 2023—Cited in IPR2022-00253, challenging U.S. Pat. No. 9,491,542, 100 pages.
Petitioners' Notice of Cross-Appeal, Exhibit-35, Filed on Sep. 20, 2023—Cited in IPR2022-00324, challenging U.S. Pat. No. 8,254,591, 97 pages.
Petitioners' Notice of Cross-Appeal, Exhibit-39, Filed on Aug. 24, 2023—Cited in IPR2022-00242, challenging U.S. Pat. No. 8,111,839, 94 pages.
Petitioners' Notice of Cross-Appeal; Exhibit-32, Filed on Aug. 24, 2023—Cited in IPR2022-00234, challenging U.S. Pat. No. 9124982, 93 pages.
Petitioners' Notice of Depo of Chrisotpher Struck, Exhibit-16, Filed on May 15, 2023—Cited in IPR2022-01078, challenging U.S. Pat. No. 11,057,701, 3 pages.
Petitioners' Notice of Deposition of Christopher Struck, Exhibit-19, Filed on Nov. 15, 2022—Cited in IPR2022-00302, challenging U.S. Pat. No. 9,609,424, 3 pages.
Petitioners' Notice of Deposition of Daniel P. Anagnos, Exhibit-23, Filed on Nov. 9, 2022—Cited in IPR2022-00243, challenging U.S. Pat. No. 8,111,839, 3 pages.
Petitioners' Notice of Deposition of Daniel P. Anagnos, Exhibit-24, Filed on Nov. 9, 2022—Cited in IPR2022-00242, challenging U.S. Pat. No. 8,111,839, 3 pages.
Petitioners' Notice of Deposition of Daniel P. Anagnos; Exhibit-19, Filed on Nov. 9, 2022—Cited in IPR2022-00234, challenging U.S. Pat. No. 9,124,982, 3 pages.
Petitioners' Notice of Objections to Evidence, Exhibit-18, Filed on Apr. 19, 2023—Cited in IPR2022-01106, challenging U.S. Pat. No. 11,039,259, 4 pages.
Petitioners' Notice of Objections to Evidence, Exhibit-22, Filed on Sep. 20, 2022—Cited in IPR2022-00243, challenging U.S. Pat. No. 8,111,839, 5 pages.
Petitioners' Notice of Objections to Evidence, Exhibit-23, Filed on Sep. 20, 2022—Cited in IPR2022-00242, challenging U.S. Pat. No. 8,111,839, 6 pages.
Petitioners' Notice of Objections to Evidence; Exhibit-18, Filed on Sep. 16, 2022—Cited in IPR2022-00234, challenging U.S. Pat. No. 9,124,982, 6 pages.
Petitioners' Preliminary Reply, Exhibit-10, Filed on Apr. 20, 2022—Cited in IPR2022-00282, challenging U.S. Pat. No. 8,315,400, 9 pages.
Petitioners' Preliminary Reply, Exhibit-10, Filed on Jun. 14, 2022—Cited in IPR2022-00369, challenging U.S. Pat. No. 10,405,082, 10 pages.
Petitioners' Preliminary Reply, Exhibit-13, Filed on Apr. 20, 2022—Cited in IPR2022-00243, challenging U.S. Pat. No. 8,111,839, 10 pages.
Petitioners' Preliminary Reply, Exhibit-14, Filed on Apr. 20, 2022—Cited in IPR2022-00242, challenging U.S. Pat. No. 8,111,839, 10 pages.
Petitioners' Preliminary Reply, Exhibit-8, Filed on Nov. 10, 2022—Cited in IPR2022-01078, challenging U.S. Pat. No. 11,057,701, 10 pages.
Petitioners' Preliminary Reply, Exhibit-8, Filed on Nov. 10, 2022—Cited in IPR2022-01099, challenging U.S. Pat. No. 11,244,666, 12 pages.
Petitioners' Preliminary Reply, Exhibit-8, Filed on Nov. 10, 2022—Cited in IPR2022-01106, challenging U.S. Pat. No. 11,039,259, 9 pages.
Petitioners' Preliminary Reply, Exhibit-8, Filed on Jun. 14, 2022—Cited in IPR2022-00410, challenging U.S. Pat. No. 10,979,836, 10 pages.
Petitioners' Preliminary Reply, Exhibit-9, Filed on Nov. 15, 2022—Cited in IPR2022-01098, challenging U.S. Pat. No. 11,217,237, 10 pages.
Petitioners' Preliminary Reply, Exhibit-9, Filed on May 10, 2022—Cited in IPR2022-00302, challenging U.S. Pat. No. 9,609,424, 10 pages.
Petitioners' Preliminary Reply, Exhibit-9, Filed on May 11, 2022—Cited in IPR2022-00324, challenging U.S. Pat. No. 8,254,591, 10 pages.
Petitioners' Preliminary Reply, Exhibit-9, Filed on May 20, 2022—Cited in IPR2022-00253, challenging U.S. Pat. No. 9,491,542, 9 pages.
Petitioners' Preliminary Reply, Exhibit-9, Filed on May 27, 2022—Cited in IPR2022-00281, challenging U.S. Pat. No. 9,270,244, 9 pages.
Petitioners' Preliminary Reply, Exhibit-9, Filed on Jun. 14, 2022—Cited in IPR2022-00388, challenging U.S. Pat. No. 10,966,015, 10 pages.
Petitioners' Preliminary Reply; Exhibit-10, Filed on Apr. 20, 2022—Cited in IPR2022-00234, challenging U.S. Pat. No. 9,124,982, 10 pages.
Petitioners' Reply to Patent Owner's Response, Exhibit-17, Filed on Dec. 2, 2022—Cited in IPR2022-00282, challenging U.S. Pat. No. 8,315,400, 33 pages.

(56) References Cited

OTHER PUBLICATIONS

Petitioners' Reply to Patent Owner's Response, Exhibit-17, Filed on Jun. 15, 2023—Cited in IPR2022-01078, challenging U.S. Pat. No. 11,057,701, 40 pages.
Petitioners' Reply to Patent Owner's Response, Exhibit-20, Filed on Jan. 10, 2023—Cited in IPR2022-00302, challenging U.S. Pat. No. 9,609,424, 33 pages.
Petitioners' Reply to Patent Owner's Response, Exhibit-20, Filed on Jan. 31, 2023—Cited in IPR2022-00388, challenging U.S. Pat. No. 10,966,015, 23 pages.
Petitioners' Reply to Patent Owner's Response, Exhibit-21, Filed on Jan. 11, 2023—Cited in IPR2022-00281, challenging U.S. Pat. No. 9,270,244, 32 pages.
Petitioners' Reply to Patent Owner's Response, Exhibit-21, Filed on Jan. 31, 2023—Cited in IPR2022-00369, challenging U.S. Pat. No. 10,405,082, 20 pages.
Petitioners' Reply to Patent Owner's Response, Exhibit-21, Filed on Jun. 30, 2023—Cited in IPR2022-01106, challenging U.S. Pat. No. 11,039,259, 56 pages.
Petitioners' Reply to Patent Owner's Response, Exhibit-22, Filed on Jan. 10, 2023—Cited in IPR2022-00324, challenging U.S. Pat. No. 8,254,591, 37 pages.
Petitioners' Reply to Patent Owner's Response, Exhibit-24, Filed on Dec. 6, 2023—Cited in IPR2022-00243, challenging U.S. Pat. No. 8,111,839, 37 pages.
Petitioners' Reply to Patent Owner's Response, Exhibit-25, Filed on Dec. 6, 2023—Cited in IPR2022-00242, challenging U.S. Pat. No. 8,111,839, 36 pages.
Petitioners' Reply to Patent Owner's Response; Exhibit-20, Filed on Dec. 2, 2023—Cited in IPR2022-00234, challenging U.S. Pat. No. 9,124,982, 37 pages.
Petitioners' Reply to Patent Owners Response, Exhibit-21, Filed on Jan. 11, 2023—Cited in IPR2022-00253, challenging U.S. Pat. No. 9,491,542, 36 pages.
Petitioners' Request for Oral Argument, Exhibit-20, Filed on Aug. 17, 2023—Cited in IPR2022-01078, challenging U.S. Pat. No. 11,057,701, 4 pages.
Petitioners' Request for Oral Argument, Exhibit-22, Filed on Feb. 3, 2023—Cited in IPR2022-00282, challenging U.S. Pat. No. 8,315,400, 4 pages.
Petitioners' Request for Oral Argument, Exhibit-23, Filed on Feb. 28, 2023—Cited in IPR2022-00302, challenging U.S. Pat. No. 9,609,424, 4 pages.
Petitioners' Request for Oral Argument, Exhibit-24, Filed on Mar. 1, 2023—Cited in IPR2022-00281, challenging U.S. Pat. No. 9,270,244, 4 pages.
Petitioners' Request for Oral Argument, Exhibit-24, Filed on Aug. 28, 2023—Cited in IPR2022-01106, challenging U.S. Pat. No. 11,039,259, 4 pages.
Petitioners' Request for Oral Argument, Exhibit-25, Filed on Feb. 28, 2023—Cited in IPR2022-00324, challenging U.S. Pat. No. 8,254,591, 4 pages.
Petitioners' Request for Oral Argument, Exhibit-25, Filed on Mar. 1, 2023—Cited in IPR2022-00253, challenging U.S. Pat. No. 9,491,542, 4 pages.
Petitioners' Request for Oral Argument, Exhibit-25, Filed on Apr. 4, 2023—Cited in IPR2022-00388, challenging U.S. Pat. No. 10,966,015, 4 pages.
Petitioners' Request for Oral Argument, Exhibit-26, Filed on Apr. 4, 2023—Cited in IPR2022-00369, challenging U.S. Pat. No. 10,405,082, 4 pages.
Petitioners' Request for Oral Argument, Exhibit-27, Filed on Feb. 7, 2023—Cited in IPR2022-00243, challenging U.S. Pat. No. 8,111,839, 5 pages.
Petitioners' Request for Oral Argument, Exhibit-28, Filed on Feb. 7, 2023—Cited in IPR2022-00242, challenging U.S. Pat. No. 8,111,839, 5 pages.
Petitioners' Request for Oral Argument; Exhibit-23, Filed on Feb. 3, 2023—Cited in IPR2022-00234, challenging U.S. Pat. No. 9,124,982, 4 pages.
Petitioners' Request for Refund of Post-Institution Fee, Exhibit-12, Filed on Mar. 2, 2023—Cited in IPR2022-01099, challenging U.S. Pat. No. 11,244,666, 3 pages.
Petitioners' Request for Refund of Post-Institution Fee, Exhibit-13, Filed on Jan. 18, 2023—Cited in IPR2022-00410, challenging U.S. Pat. No. 10,979,836, 3 pages.
Petitioners' Request for Refund of Post-Institution Fee, Exhibit-13, Filed on Mar. 2,2023—Cited in IPR2022-01098, challenging U.S. Pat. No. 11,217,237, 3 pages.
Petitioners' Request for Refund of Post-Institution Fees, Exhibit-17, Filed on Dec. 16, 2024—Cited in IPR2024-01003, challenging U.S. Pat. No. 9,191,083, 3 pages.
Petitioners' Request for Refund of Post-Institution Fees, Exhibit-17, Filed on Dec. 16, 2024—Cited in IPR2024-01004, challenging U.S. Pat. No. 9,614,943, 3 pages.
Petitioners' Request for Refund of Post-Institution Fees, Exhibit-17, Filed on Dec. 16, 2024—Cited in IPR2024-01031, challenging U.S. Pat. No. 7,049,850, 3 pages.
Petitioners' Request for Refund of Post-Institution Fees, Exhibit-18, Filed on Dec. 16, 2024—Cited in IPR2024-01034, challenging U.S. Pat. No. 9,279,263, 3 pages.
Petitioners' Request for Refund of Post-Institution FeesPaper16, Dec. 16, 2024—Cited in IPR2024-01033, challenging U.S. Pat. No. 8,434,966, 3 pages.
Petitioners' Submission of Supplemental Information, Exhibit-33, Filed on May 15, 2023—Cited in IPR2022-00302, challenging U.S. Pat. No. 9,609,424, 6 pages.
Petitioners' Sur-Sur-Reply to Patent Owner's Sur-Reply, Exhibit-20, Filed on Jan. 27, 2023—Cited in IPR2022-00282, challenging U.S. Pat. No. 8,315,400, 10 pages.
Petitioners' Sur-Sur-Reply to Patent Owner's Sur-Reply, Exhibit-26, Filed on Mar. 7, 2023—Cited in IPR2022-00281, challenging U.S. Pat. No. 9,270,244, 11 pages.
Petitioners' Sur-Sur-Reply to Patent Owner's Sur-Reply, Exhibit-27, Filed on Mar. 7, 2023—Cited in IPR2022-00253, challenging U.S. Pat. No. 9,491,542, 10 pages.
Petitioners' Updated Exhibit List, Exhibit-10, Filed on Nov. 20, 2024—Cited in IPR2024-01003, challenging U.S. Pat. No. 9,191,083, 6 pages.
Petitioners' Updated Exhibit List, Exhibit-10, Filed on Nov. 20, 2024—Cited in IPR2024-01004, challenging U.S. Pat. No. 9,614,943, 6 pages.
Petitioners' Updated Exhibit List, Exhibit-10, Filed on Nov. 20, 2024—Cited in IPR2024-01031, challenging U.S. Pat. No. 7,049,850, 5 pages.
Petitioners' Updated Exhibit List, Exhibit-11, Filed on Nov. 20, 2024—Cited in IPR2024-01034, challenging U.S. Pat. No. 9,279,263, 4 pages.
Petitioners' Updated Exhibit List, Exhibit-15, Filed on Nov. 11, 2024—Cited in IPR2024-01003, challenging U.S. Pat. No. 9,191,083, 6 pages.
Petitioners' Updated Exhibit List, Exhibit-15, Filed on Nov. 11, 2024—Cited in IPR2024-01004, challenging U.S. Pat. No. 9,614,943, 6 pages.
Petitioners' Updated Exhibit List, Exhibit-15, Filed on Nov. 11, 2024—Cited in IPR2024-01031, challenging U.S. Pat. No. 7,049,850, 5 pages.
Petitioners' Updated Exhibit List, Exhibit-16, Filed on Nov. 11, 2024—Cited in IPR2024-01034, challenging U.S. Pat. No. 9,279,263, 4 pages.
Petitioners' Updated Exhibit List, Exhibit-19, Filed on Nov. 11, 2024—Cited in IPR2024-00559, challenging U.S. Pat. No. 11,610,587, 5 pages.
Petitioners' Updated Exhibit List, Exhibit-24, Filed on Mar. 14, 2023—Cited in IPR2022-00282, challenging U.S. Pat. No. 8,315,400, 4 pages.
Petitioners' Updated Exhibit List, Exhibit-24, Filed on Sep. 26, 2023—Cited in IPR2022-01078, challenging U.S. Pat. No. 11,057,701, 5 pages.
Petitioners' Updated Exhibit List, Exhibit-27, Filed on May 9, 2023—Cited in IPR2022-00388, challenging U.S. Pat. No. 10,966,015, 4 pages.

(56) References Cited

OTHER PUBLICATIONS

Petitioners' Updated Exhibit List, Exhibit-28, Filed on Oct. 11, 2023—Cited in IPR2022-01106, challenging U.S. Pat. No. 11,039,259, 4 pages.
Petitioners' Updated Exhibit List, Exhibit-28, Filed on Apr. 11, 2023—Cited in IPR2022-00302, challenging U.S. Pat. No. 9,609,424, 5 pages.
Petitioners' Updated Exhibit List, Exhibit-28, Filed on Apr. 13, 2023—Cited in IPR2022-00281, challenging U.S. Pat. No. 9,270,244, 5 pages.
Petitioners' Updated Exhibit List, Exhibit-28, Filed on May 9, 2023—Cited in IPR2022-00369, challenging U.S. Pat. No. 10,405,082, 4 pages.
Petitioners' Updated Exhibit List, Exhibit-30, Filed on Apr. 12, 2023—Cited in IPR2022-00253, challenging U.S. Pat. No. 9,491,542, 5 pages.
Petitioners' Updated Exhibit List, Exhibit-30, Filed on Apr. 13, 2023—Cited in IPR2022-00302, challenging U.S. Pat. No. 9,609,424, 5 pages.
Petitioners' Updated Exhibit List, Exhibit-30, Filed on Apr. 4, 2023—Cited in IPR2022-00324, challenging U.S. Pat. No. 8,254,591, 6 pages.
Petitioners' Updated Exhibit List, Exhibit-31, Filed on Mar. 16, 2023—Cited in IPR2022-00243, challenging U.S. Pat. No. 8, 111,839, 5 pages.
Petitioners' Updated Exhibit List, Exhibit-31, Filed on Apr. 13, 2023—Cited in IPR2022-00302, challenging U.S. Pat. No. 9,609,424, 5 pages.
Petitioners' Updated Exhibit List, Exhibit-32, Filed on Mar. 16, 2023—Cited in IPR2022-00242, challenging U.S. Pat. No. 8,111,839, 4 pages.
Petitioners' Updated Exhibit List; Exhibit-25, Filed on Mar. 14, 2023—Cited in IPR2022-00234, challenging U.S. Pat. No. 9,124,982, 4 pages.
Petitioners' Updated Exhibit ListPaper14, Dec. 11, 2024—Cited in IPR2024-01033, challenging U.S. Pat. No. 8,434,966, 4 pages.
Petitioners' Updated Exhibit ListPaper9, Nov. 20, 2024—Cited in IPR2024-01033, challenging U.S. Pat. No. 8,434,966, 4 pages.
Petitioners' Updated Mandatory Notices, Exhibit-15, Filed on Apr. 3, 2023—Cited in IPR2022-01078, challenging U.S. Pat. No. 11,057,701, 6 pages.
Petitioners' Updated Mandatory Notices, Exhibit-16, Filed on Mar. 28, 2023—Cited in IPR2022-01106, challenging U.S. Pat. No. 11,039,259, 6 pages.
Petitioners' Updated Mandatory Notices, Exhibit-18, Filed on Aug. 10, 2022—Cited in IPR2022-00324, challenging U.S. Pat. No. 8,254,591, 5 pages.
Petitioners' Updated Mandatory Notices, Exhibit-20, Filed on Aug. 10, 2022—Cited in IPR2022-00243, challenging U.S. Pat. No. 8,111,839, 5 pages.
Petitioners' Updated Mandatory Notices, Exhibit-21, Filed on Feb. 8, 2023—Cited in IPR2022-00388, challenging U.S. Pat. No. 10,966,015, 5 pages.
Petitioners' Updated Mandatory Notices, Exhibit-21, Filed on Aug. 10, 2022—Cited in IPR2022-00242, challenging U.S. Pat. No. 8,111,839, 5 pages.
Petitioners' Updated Mandatory Notices, Exhibit-22, Filed on Feb. 8, 2023—Cited in IPR2022-00369, challenging U.S. Pat. No. 10,405,082, 5 pages.
Petitioners' Updated Mandatory Notices, Exhibit-23, Filed on Apr. 3, 2023—Cited in IPR2022-00388, challenging U.S. Pat. No. 10,966,015, 6 pages.
Petitioners' Updated Mandatory Notices, Exhibit-24, Filed on Apr. 3, 2023—Cited in IPR2022-00369, challenging U.S. Pat. No. 10,405,082, 6 pages.
Petitioners' Updated Mandatory Notices, Exhibit-26, Filed on Apr. 3, 2023—Cited in IPR2022-00282, challenging U.S. Pat. No. 8,315,400, 6 pages.
Petitioners' Updated Mandatory Notices, Exhibit-26, Filed on Apr. 3, 2023—Cited in IPR2022-00302, challenging U.S. Pat. No. 9,609,424, 6 pages.
Petitioners' Updated Mandatory Notices, Exhibit-27, Filed on Apr. 3, 2023—Cited in IPR2022-00281, challenging U.S. Pat. No. 9,270,244, 6 pages.
Petitioners' Updated Mandatory Notices, Exhibit-28, Filed on Apr. 3, 2023—Cited in IPR2022-00253, challenging U.S. Pat. No. 9,491,542, 6 pages.
Petitioners' Updated Mandatory Notices, Exhibit-26, Filed on Apr. 3, 2023—Cited in IPR2022-00324, challenging U.S. Pat. No. 8,254,591, 6 pages.
Petitioners' Updated Mandatory Notices, Exhibit-33, Filed on Apr. 3, 2023—Cited in IPR2022-00243, challenging U.S. Pat. No. 8,111,839, 6 pages.
Petitioners' Updated Mandatory Notices, Exhibit-34, Filed on Apr. 3, 2023—Cited in IPR2022-00242, challenging U.S. Pat. No. 8,111,839, 6 pages.
Petitioners' Updated Mandatory Notices, Exhibit-4, Filed on Jan. 6, 2022—Cited in IPR2022-00369, challenging U.S. Pat. No. 10,405,082, 4 pages.
Petitioners' Updated Mandatory Notices, Exhibit-6, Filed on Jan. 20, 2022—Cited in IPR2022-00388, challenging U.S. Pat. No. 10,966,015, 5 pages.
Petitioners' Updated Mandatory Notices, Exhibit-7, Filed on Jan. 20, 2022—Cited in IPR2022-00253, challenging U.S. Pat. No. 9,491,542, 5 pages.
Petitioners' Updated Mandatory Notices, Exhibit-7, Filed on Jan. 20, 2022—Cited in IPR2022-00281, challenging U.S. Pat. No. 9,270,244, 5 pages.
Petitioners' Updated Mandatory Notices, Exhibit-7, Filed on Jan. 20, 2022—Cited in IPR2022-00302, challenging U.S. Pat. No. 9,609,424, 5 pages.
Petitioners' Updated Mandatory Notices, Exhibit-7, Filed on Jan. 20, 2022—Cited in IPR2022-00324, challenging U.S. Pat. No. 8,254,591, 5 pages.
Petitioners' Updated Mandatory Notices, Exhibit-7, Filed on Jan. 20, 2022—Cited in IPR2022-00369, challenging U.S. Pat. No. 10,405,082, 5 pages.
Petitioners' Updated Mandatory Notices, Exhibit-8, Filed on Jan. 20, 2022—Cited in IPR2022-00243, challenging U.S. Pat. No. 8,111,839, 5 pages.
Petitioners' Updated Mandatory Notices, Exhibit-8, Filed on Jan. 20, 2022—Cited in IPR2022-00282, challenging U.S. Pat. No. 8,315,400, 5 pages.
Petitioners' Updated Mandatory Notices, Exhibit-9, Filed on Jan. 20, 2022—Cited in IPR2022-00242, challenging U.S. Pat. No. 8,111,839, 5 pages.
Petitioners' Updated Mandatory Notices; Exhibit-16, Filed on Aug. 10, 2022—Cited in IPR2022-00234, challenging U.S. Pat. No. 9,124,982, 5 pages.
Petitioners' Updated Mandatory Notices; Exhibit-8, Filed on Jan. 20, 2022—Cited in IPR2022-00234, challenging U.S. Pat. No. 9,124,982, 5 pages.
Plantronics Discovery 655, At least by 2006, CNET Article—Plantronics Discovery 655 Bluetooth Headset Review (SAM- TECH_00099287), 4 pages.
Plantronics Discovery 655, At least by 2006, Plantronics Discovery 655 Brochure (SAM-TECH_00099296), 2 pages.
Plantronics Discovery 655, At least by 2006, Plantronics Discovery 655 User Guide (SAM-TECH_00099344), 16 pages.
Plantronics Discovery 655, At least by 2006, Silicon Poip Culture Article—Plantronics Discovery 655 (SAM- TECH_00099387), 4 pages.
Plantronics MX200, At least by 2006, Plantronics MX200 Brochure (SAM-TECH_00099419), 2 pages.
Plantronics MX200, At least by 2006, Plantronics MX200 User Guide (SAM-TECH_00099435), 2 pages.
Plantronics MX200, At least by 2006, Plantronics MX250 User Guide (SAM-TECH_00099461), 2 pages.
PO's Opposition to Motion to File Supplemental Information, Exhibit-32, Filed on Apr. 17, 2023—Cited in IPR2022-00302, challenging U.S. Pat. No. 9,609,424, 6 pages.

(56) References Cited

OTHER PUBLICATIONS

PO's Updated Exhibit List, Exhibit-25, Filed on Mar. 14, 2023—Cited in IPR2022-00282, challenging U.S. Pat. No. 8,315,400, 4 pages.
PO's Updated Exhibit List, Exhibit-27, Filed on Oct. 11, 2023—Cited in IPR2022-01106, challenging U.S. Pat. No. 11,039,259, 4 pages.
PO's Updated Exhibit List, Exhibit-27, Filed on Apr. 11, 2023—Cited in IPR2022-00302, challenging U.S. Pat. No. 9,609,424, 4 pages.
PO's Updated Exhibit List, Exhibit-28, Filed on May 9, 2023—Cited in IPR2022-00388, challenging U.S. Pat. No. 10,966,015, 4 pages.
PO's Updated Exhibit List, Exhibit-29, Filed on Apr. 12, 2023—Cited in IPR2022-00253, challenging U.S. Pat. No. 9,491,542, 4 pages.
PO's Updated Exhibit List, Exhibit-29, Filed on Apr. 13, 2023—Cited in IPR2022-00281, challenging U.S. Pat. No. 9,270,244, 4 pages.
PO's Updated Exhibit List, Exhibit-29, Filed on Apr. 4, 2023—Cited in IPR2022-00324, challenging U.S. Pat. No. 8,254,591, 4 pages.
PO's Updated Exhibit List, Exhibit-29, Filed on May 9, 2023—Cited in IPR2022-00369, challenging U.S. Pat. No. 10,405,082, 4 pages.
PO's Updated Exhibit List, Exhibit-30, Filed on Oct. 19, 2023—Cited in IPR2022-01106, challenging U.S. Pat. No. 11,039,259, 4 pages.
PO's Updated Exhibit List, Exhibit-32, Filed on Mar. 16, 2023—Cited in IPR2022-00243, challenging U.S. Pat. No. 8,111,839, 4 pages.
PO's Updated Exhibit List, Exhibit-33, Filed on Mar. 16, 2023—Cited in IPR2022-00242, challenging U.S. Pat. No. 8,111,839, 5 pages.
PO's Updated Exhibit List; Exhibit-26, Filed on Mar. 14, 2023—Cited in IPR2022-00234, challenging U.S. Pat. No. 9,124,982, 4 pages.
PocketLint Article—Zen Gennum Bluetooth Headset (SAM-TECH_00098490), Feb. 3, 2005, 13 pages.
Power of Attorney for Samsung Electronics America, Inc, Exhibit-2, Filed on Dec. 30, 2021—Cited in IPR2022-00369, challenging U.S. Pat. No. 10,405,082, 4 pages.
Power of Attorney for Samsung Electronics America, Inc, Exhibit-2, Filed on Jun. 9, 2022—Cited in IPR2022-01078, challenging U.S. Pat. No. 11,057,701, 3 pages.
Power of Attorney for Samsung Electronics America, Inc, Exhibit-2, Filed on Jun. 9, 2022—Cited in IPR2022-01098, challenging U.S. Pat. No. 11,217,237, 3 pages.
Power of Attorney for Samsung Electronics America, Inc, Exhibit-2, Filed on Jun. 9, 2022—Cited in IPR2022-01099, challenging U.S. Pat. No. 11,244,666, 3 pages.
Power of Attorney for Samsung Electronics America, Inc, Exhibit-2, Filed on Jun. 9, 2022—Cited in IPR2022-01106, challenging U.S. Pat. No. 11,039,259, 3 pages.
Power of Attorney for Samsung Electronics Co, Ltd, Exhibit-1, Filed on Dec. 10, 2021—Cited in IPR2022-00282, challenging U.S. Pat. No. 8,315,400, 4 pages.
Power of Attorney for Samsung Electronics Co, Ltd, Exhibit-1, Filed on Dec. 30, 2021—Cited in IPR2022-00369, challenging U.S. Pat. No. 10,405,082, 4 pages.
Power of Attorney for Samsung Electronics Co, Ltd, Exhibit-1, Filed on Jun. 9, 2022—Cited in IPR2022-01098, challenging U.S. Pat. No. 11,217,237, 3 pages.
Power of Attorney for Samsung Electronics Co, Ltd, Exhibit-1, Filed on Jun. 9, 2022—Cited in IPR2022-01099, challenging U.S. Pat. No. 11,244,666, 3 pages.
Power of Attorney for Samsung Electronics Co, Ltd, Exhibit-1, Filed on Jun. 9, 2022—Cited in IPR2022-01106, challenging U.S. Pat. No. 11,039,259, 3 pages.
Power of Attorney for Samsung Electronics Co. Ltd, Exhibit-1, Filed on Jun. 9, 2022—Cited in IPR2022-01078, challenging U.S. Pat. No. 11,057,701, 3 pages.
Power of Attorney for Samsung Electronics, America, Inc, Exhibit-2, Filed on Dec. 10, 2021—Cited in IPR2022-00282, challenging U.S. Pat. No. 8,315,400, 4 pages.
Power of Attorney from Samsung Electronics America, Inc, Exhibit-2, Filed on Jan. 14, 2022—Cited in IPR2022-00410, challenging U.S. Pat. No. 10,979,836, 4 pages.
Power of Attorney from Samsung Electronics America, Inc, Exhibit-2, Filed on Jan. 4, 2022—Cited in IPR2022-00388, challenging U.S. Pat. No. 10,966,015, 4 pages.
Power of Attorney from Samsung Electronics America, Inc, Exhibit-2, Filed on Dec. 13, 2021—Cited in IPR2022-00242, challenging U.S. Pat. No. 8,111,839, 3 pages.
Power of Attorney from Samsung Electronics America, Inc, Exhibit - 2, Filed on 12/13/2021- Cited in IPR2022-00243, challenging U.S. Patent No. 8, 111,839, 3 pages.
Power of Attorney from Samsung Electronics America, Inc, Exhibit-2, Filed on Dec. 17, 2021—Cited in IPR2022-00253, challenging U.S. Pat. No. 9,491,542, 4 pages.
Power of Attorney from Samsung Electronics America, Inc, Exhibit-2, Filed on Dec. 20, 2021—Cited in IPR2022-00324, challenging U.S. Pat. No. 8,254,591, 4 pages.
Power of Attorney from Samsung Electronics America, Inc, Exhibit-2, Filed on Dec. 21, 2021—Cited in IPR2022-00281, challenging U.S. Pat. No. 9,270,244, 4 pages.
Power of Attorney from Samsung Electronics America, Inc, Exhibit-2, Filed on Dec. 21, 2021—Cited in IPR2022-00302, challenging U.S. Pat. No. 9,609,424, 3 pages.
Power of Attorney from Samsung Electronics Co, Ltd, Exhibit-1, Filed on Jan. 14, 2022—Cited in IPR2022-00410, challenging U.S. Pat. No. 10,979,836, 4 pages.
Power of Attorney from Samsung Electronics Co, Ltd, Exhibit-1, Filed on Jan. 4, 2021—Cited in IPR2022-00388, challenging U.S. Pat. No. 10,966,015, 4 pages.
Power of Attorney from Samsung Electronics Co, Ltd, Exhibit-1, Filed on Dec. 13, 2021—Cited in IPR2022-00242, challenging U.S. Pat. No. 8,111,839, 3 pages.
Power of Attorney from Samsung Electronics Co, Ltd, Exhibit-1, Filed on Dec. 13, 2021—Cited in IPR2022-00243, challenging U.S. Pat. No. 8,111,839, 3 pages.
Power of Attorney from Samsung Electronics Co, Ltd, Exhibit-1, Filed on Dec. 17, 2021—Cited in IPR2022-00253, challenging U.S. Pat. No. 9,491,542, 4 pages.
Power of Attorney from Samsung Electronics Co, Ltd, Exhibit-1, Filed on Dec. 20, 2021—Cited in IPR2022-00324, challenging U.S. Pat. No. 8,254,591, 4 pages.
Power of Attorney from Samsung Electronics Co, Ltd, Exhibit-1, Filed on Dec. 21, 2021—Cited in IPR2022-00281, challenging U.S. Pat. No. 9,270,244, 4 pages.
Power of Attorney from Samsung Electronics Co, Ltd, Exhibit-1, Filed on Dec. 21, 2021—Cited in IPR2022-00302, challenging U.S. Pat. No. 9,609,424, 3 pages.
PR 4-3 JCC Statement, Exhibit-2013, Filed on Jan. 12, 2023—Cited in IPR2022-00282, challenging U.S. Pat. No. 8,315,400, 6 pages.
PR 4-5(d) JCC Chart, Exhibit-2011, Filed on Jan. 12, 2023—Cited in IPR2022-00282, challenging U.S. Pat. No. 8,315,400, 17 pages.
Preferred methods for measuring hearing protector attenuation, Elliott Berger, International Congress on Noise Control Engineering 2005, INTERNOISE 2005, 10 pages.
Products of Interest, Project Muse, Computer Music Journal, vol. 30, No. 3, Fall 2006, 16 pages.
Research in Motion's BlackBerry 7520 ("BlackBerry"), At least by 2004, Blackberry 7520 Wireles Handheld Model No. RALIIIN, Version 4.1 User Guide, last modified Mar. 6, 2006 (SAM-TECH 00054461-SAM-TECH 00054618), 158 pages.
Research in Motion's BlackBerry 7520 ("BlackBerry"), At least by 2004, BlackBerry Wireless Handheld Getting Started Guide (SAM-TECH 00228841), 13 pages.
Research in Motion's BlackBerry 7520 ("BlackBerry"), Nextel Services Guide for the Blackberry is dated the year 2004; (SAM-TECH 00226708), 29 pages.

(56) References Cited

OTHER PUBLICATIONS

Revised Scheduling Order, Exhibit-22, Filed on Jul. 12, 2023—Cited in IPR2022-01106, challenging U.S. Pat. No. 11,039,259, 14 pages.
Ronald M. Aarts, Roy Irwan, and Augustus J. E . . Janssen, Efficient Tracking of the Cross-Correlation Coefficient, IEEE Transactions on Speech and Audio Processing, vol. 10, No. 6, Sep. 2002, 12 pages.
Roy Falik, Exhibit-7, Filed on Jul. 18, 2024—Cited in IPR2024-01031, challenging U.S. Pat. No. 7,049,850, 8 pages.
Roy Falik, Exhibit-8, Filed on Jul. 18, 2024—Cited in IPR2024-01034, challenging U.S. Pat. No. 9,279,263, 8 pages.
Sage Journal, The Future of Hearing Aid Technology, Exhibit-2008, Filed on Oct. 17, 2022—Cited in IPR2022-00324, challenging U.S. Pat. No. 8,254,591, 15 pages.
*Samsung Elecs. Co, Ltd, et al.* v. *Staton Techiya, LLC*, IPR2022-00302, Paper 11, Exhibit-2006, Filed on Oct. 11, 2022—Cited in IPR2022-01106, challenging U.S. Pat. No. 11,039,259, 8 pages.
*Samsung Elecs. Co, Ltd, et al.* v. *Staton Techiya, LLC*, IPR2022-00302, Paper 11, Exhibit-2006, Filed on Oct. 7, 2022—Cited in IPR2022-01078, challenging U.S. Pat. No. 11,057,701, 8 pages.
*Samsung Elecs. Co, Ltd, et al.* v. *Staton Techiya, LLC*, IPR2022-00302, Paper 11, Exhibit-2006, Filed on Oct. 7, 2022—Cited in IPR2022-01098, challenging U.S. Pat. No. 11,217,237, 8 pages.
*Samsung Elecs. Co, Ltd, et al.* v. *Staton Techiya, LLC*, IPR2022-00302, Paper 11, Exhibit-2006, Filed on Oct. 7, 2022—Cited in IPR2022-01099, challenging U.S. Pat. No. 11,244,666, 8 pages.
*Samsung Electronics Co, Ltd, And Samsung Electronics, America, Inc*, v. *Staton Techiya, LLC*, IPR2022-00559, Feb. 9, 2024, 88 pages.
Samsung's Claim Construction Brief, Exhibit-2012, Filed on Jan. 12, 2023—Cited in IPR2022-00282, challenging U.S. Pat. No. 8,315,400, 42 pages.
Samsung's Responsive Claim Construction Brief, Exhibit-2012, Filed on Apr. 10, 2023—Cited in IPR2022-01106, challenging U.S. Pat. No. 11,039,259, 42 pages.
Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022, 1009 pages.
Samsung's Invalidity Contentions and P.R. 3-3 And 3-4 Disclosures for U.S. Pat. Nos. 8, 111,839, 8,254,591, 8,315,400, 9,124,982, 9,270,244, 9,491,542, 9,609,424, 10,405,082, 10,966,015 (Case No. 2:22-CV-00053-JRG- Rsp), served May 18, 2022, 1307 pages.
Samsung's Reply in Support of Its Motion for Summary Judgment of Invalidity under 35 U.S.C § 112 of the '666 Patent (Redacted) (Dkt. No. 556), Aug. 7, 2023, 22 pages.
Scheduling Order, Exhibit-11, Filed on Jan. 9, 2023—Cited in IPR2022-01106, challenging U.S. Pat. No. 11,039,259, 13 pages.
Scheduling Order, Exhibit-11, Filed on Dec. 30, 2022—Cited in IPR2022-01078, challenging U.S. Pat. No. 11,057,701, 12 pages.
Scheduling Order, Exhibit-14, Filed on Jul. 12, 2022—Cited in IPR2022-00302, challenging U.S. Pat. No. 9,609,424, 12 pages.
Scheduling Order, Exhibit-14, Filed on Jul. 12, 2022—Cited in IPR2022-00324, challenging U.S. Pat. No. 8,254,591, 12 pages.
Scheduling Order, Exhibit-14, Filed on Jul. 15, 2022—Cited in IPR2022-00253, challenging U.S. Pat. No. 9,491,542, 12 pages.
Scheduling Order, Exhibit-14, Filed on Jul. 15, 2022—Cited in IPR2022-00281, challenging U.S. Pat. No. 9,270,244, 12 pages.
Scheduling Order, Exhibit-14, Filed on Aug. 16, 2022—Cited in IPR2022-00388, challenging U.S. Pat. No. 10,966,015, 12 pages.
Scheduling Order, Exhibit-15, Filed on Aug. 16, 2022—Cited in IPR2022-00369, challenging U.S. Pat. No. 10,405,082, 12 pages.
Scheduling Order, Exhibit-16, Filed on Jun. 21, 2022—Cited in IPR2022-00243, challenging U.S. Pat. No. 8,111,839, 12 pages.
Scheduling Order, Exhibit-17, Filed on Jun. 21, 2022—Cited in IPR2022-00242, challenging U.S. Pat. No. 8,111,839, 12 pages.
Scheduling Order, Exhibit-9, Filed on Aug. 22, 2024—Cited in IPR2024-00559, challenging U.S. Pat. No. 11,610,587, 13 pages.
SeboTek Hearing Systems' PAC (Post Auricular Canal) Instrument ("Sebotek"), Mar. 19, 2003 WayBack Machine capture of SeboTek's website contains a description of the PAC, which notes that "[t]he PAC is an exciting new hearing system by SeboTek that is significantly different from traditional hearing aids. If offers deep canal fitting, superior acoustics, incredible discreetness, and unmatched comfort." https://web.archive.org/web/20030319140205 / http://www.sebotek.com:80/ (SAM-TECH_00052377), 1 pages.
SeboTek Hearing Systems' PAC (Post Auricular Canal) Instrument ("Sebotek"), May 26, 2007 WayBack Machine capture of SeboTek's website contains a description of the PAC, and notes that "Prior to 2003, depending on the level of hearing loss, consumers could choose between four primary styles, none of which offered superior sound quality, comfort or cosmetic appeal. All that changed in 2003, when SeboTek introduced the . . . " https://web.archive.org/web/20070526135524 /http://www.sebotek.com:80/OurProducts/our Products.html (SAM-TECH 00052392), 1 pg.
SeboTek Hearing Systems' PAC (Post Auricular Canal) Instrument ("Sebotek"), Oct. 6, 2003 post by Bruce Gefvert, Director of Sales and Marketing at SeboTek Hearing Systems, on audiologyonline.com discusses the PAC, and states "PAC refers to Post Auricular Canal, an entirely new style of hearing aid that is intended to provide hearing professionals with one more option for treating hearing loss in the mild to severe ranges." https://www.audiologyonline.com/ask-th •• experts/sebotek-pac-post-auricular-canal- 601 (SAM_00052353-SAM-TECH 00052356), 4 pages.
SeboTek Hearing Systems' PAC (Post Auricular Canal) Instrument ("Sebotek"), Publication by King Chung in 2004 mentions that "SeboTek VoiceQ and Vivatone have recently launched newly designed behind-the- ear or postauricular canal (PAC, as SeboTek preferred) hearing aids that have . . . " See King Chung, Challenges and recent developments in hearing aids. Part II . . . , 8 Trends Amplif 125, 150(2004), avail. at https://www.ncbi.nlm.nih.gov/pmc/articles/PMC4111464/pdf/10.1177_108471380400800 402.pdf (SAM-TECH_00062067-SAM-TECH_00062106), 40 pgs.
Sensaphonics 3D Active Ambient In-Ear Monitor System, At least by 2006, Products of Interest Article (SAM-TECH 00096723), 16 pages.
Sensaphonics 3D Active Ambient In-Ear Monitor System, At least by 2006, Sensaphonics 3D Active Ambient In- Ear Monitor System User Guide (SA·· TECH 00100046), 16 pages.
Silynx QuietOps, Oct. 4, 2007 Applicant's Answer to Opposer's Notice of Opposition (SAM-TECH 00052371), 6 pages.
Silynx QuietOps, https://defense- update.com/20080513_c4ops.html (SAM-TECH 00057150), 2 pages.
Small-footprint keyword spotting using deep neural networks, G. Chen, C. Parada and G. Heigold, 2014 IEEE International Conference on Acoustics, Speech and Signal Processing (ICASSP), Florence, Italy, 2014, pp. 4087-4091, 5 pages.
Sonar-operator active noise reduction insert-earphone: Prototype preliminary test and evaluation, Josephs. Russotti, Naval Submarine Medical Research Laboratory, Report No. 1225, Feb. 18, 2003, 22 pages.
Sonomax's Sonomax: SonoCUstom and SonoPass ("Sonomax"), Apr. 8, 2006 WayBack Machine capture of Sonomax's website contains an image of the Sonomax and states the "[t]ens of Thousands of people around the world give the SonoCUstom a big thumbs up for comfort." https://web.archive.org/web/20060408170243 /http://sonomax.com.au/index.cfm/aboutus/so normax_solution/ (SAM-TECH 0052472; SAM-TECH 00052998), 3 pages.
Sony S700 Walkman, At least by Oct. 13, 2006, EAFIT Article—The Sony Walkman (SAM-TECH 00099514), 9 pages.
Sony S700 Walkman, At least by Oct. 13, 2006, IDG Article—Sony's New Walkman Players Pack Noise Canceling (SAM-Tech 00099533), 3 pages.
Sony S700 Walkman, At least by Oct. 13, 2006, Sony Walkman User Manual (SAM-TECH_00099557), 22 pages.
Sony S700 Walkman, At least by Oct. 13, 2006, Stuff Article—Sony NW-S700 Review (SAM-TECH_00099579), 8 pages.
Sound Source Localization and Separation, Biniyam Tesfaye Taddese, Mathematics, Statistics, and Computer Science Honors Projects (2006), 53 pages.

(56) References Cited

OTHER PUBLICATIONS

Speaker Turn Segmentation Based on Between-Channel Differences, Daniel P.W. Ellis & Jerry C. Liu, LabROSA, Dept. of Electrical Engineering, Columbia University, 2004, 6 pages.
Spectral analysis of speech by linear prediction, J. Makhoul, IEEE Transactions on Audio and Electroacoustics, vol. 21, No. 3, pp. 140-148, Jun. 1973, 9 pages.
Speech Input Hardware Investigation for Future Dismounted Soldier Computer Systems, Jeffrey C. Bos & David W. Tack, Drdc Toronto CR 2005-064, May 1, 2005, 26 pages.
Speech Modeling with Magnitude-Normalized Complex Spectra and Its Application to Multisensory Speech Enhancement, A. Subramanya, Z. Zhang, Z. Liu and A. Acero, 2006 IEEE International Conference on Multimedia and Expo, Toronto, ON, Canada, 2006, pp. 1157-1160, 4 pages.
Speech Recognition in Severely Disturbed Environments Combining Ear-Mic and Active Noise Control, N. Westerlund, M. Dahl, I. Claesson, Published 2002, Engineering, Computer Science, 7 pages.
*Staton Techiya* v *Samsung* —Docket Control Order, Exhibit-2003, Filed on Apr. 18, 2022—Cited in IPR2022-00253, challenging U.S. Pat. No. 9,491,542, 7 pages.
*Staton Techiya* v *Samsung* —Docket Control Order, Exhibit-2003, Filed on Apr. 18, 2022—Cited in IPR2022-00281, challenging U.S. Pat. No. 9,270,244, 7 pages.
*Staton Techiya* v *Samsung* , Docket Control Order, Exhibit-2003, Filed on Mar. 21, 2022—Cited in IPR2022-00282, challenging U.S. Pat. No. 8,315,400, 6 pages.
*Staton Techiya* v *Samsung* , Docket Control Order, Exhibit-2003, Filed on Apr. 13, 2022—Cited in IPR2022-00302, challenging U.S. Pat. No. 9,609,424, 7 pages.
*Staton Techiya* v *Samsung* , Docket Control Order, Exhibit-2003, Filed on Apr. 13, 2022—Cited in IPR2022-00324, challenging U.S. Pat. No. 8,254,591, 7 pages.
*Staton Techiya* v *Samsung* , Claim Construction Order, Exhibit-2012, Filed on Mar. 23, 2023—Cited in IPR2022-01078, challenging U.S. Pat. No. 11,057,701, 51 pages.
*Staton Techiya* v *Samsung* , Docket Control Order, Exhibit-2003, Filed on Mar. 23, 2022—Cited in IPR2022-00242, challenging U.S. Pat. No. 8,111,839, 6 pages.
*Staton Techiya* v *Samsung* , Docket Control Order, Exhibit-2003, Filed on Mar. 23, 2022—Cited in IPR2022-00243, challenging U.S. Pat. No. 8,111,839, 6 pages.
*Staton Techiya* v *Samsung* , Docket Control Order, Exhibit-2003, Filed on May 18, 2022—Cited in IPR2022-00369, challenging U.S. Pat. No. 10,405,082, 7 pages.
*Staton Techiya* v *Samsung* , Docket Control Order, Exhibit-2003, Filed on May 18, 2022—Cited in IPR2022-00388, challenging U.S. Pat. No. 10,966,015, 7 pages.
*Staton Techiya* v *Samsung* , Docket Control Order, Exhibit-2003, Filed on May 18, 2022—Cited in IPR2022-00410, challenging U.S. Pat. No. 10,979,836, 7 pages.
*Staton Techiya* v *Samsung* , Docket Control Order, Exhibit-2003, Filed on Mar. 23, 2022—Cited in IPR2022-00234, challenging U.S. Pat. No. 9124982, 6 pages.
*Staton Techiya* v *Samsung* , Docket Control Order, Exhibit-2003, Filed on Apr. 29, 2022—Cited in IPR2022-00242, challenging U.S. Pat. No. 8,111,839, 7 pages.
*Staton Techiya* v. *Samsung*, Joint Mtn to Consolidate, Exhibit-2005, Filed on Apr. 29, 2022—Cited in IPR2022-00243, challenging U.S. Pat. No. 8,111,839, 7 pages.
*Staton Techiya* v. *Samsung*, Joint Mtn to Consolidate, Exhibit-2008, Filed on Apr. 29, 2022—Cited in IPR2022-00282, challenging U.S. Pat. No. 8,315,400, 7 pages.
*Staton Techiya* v. *Samsung*, P.R. 4-5(d) Joint Claim Construction Chart, Exhibit -2011, Filed on Mar. 23, 2023—Cited in IPR2022-01078, challenging U.S. Pat. No. 11,057,701, 6 pages.
*Staton Techiya, LLC* v. *Samsung Elecs, Co, Ltd*, Appendix B to P.R. 4-3 Statement, Exhibit-2011, Filed on Nov. 18, 2022—Cited in IPR2022-01106, challenging U.S. Pat. No. 11,039,259, 26 pages.
*Staton Techiya, LLC* v. *Samsung Elecs, Co, Ltd*, Appendix B to P.R. 4-3 Statement, Exhibit-2007, Filed on Nov. 18, 2022—Cited in IPR2022-00369, challenging U.S. Pat. No. 10,405,082, 26 pages.
*Staton Techiya, LLC* v. *Samsung Elecs, Co, Ltd*, Appendix B to P.R. 4-3 Statement, Exhibit-2009, Filed on Nov. 18, 2022—Cited in IPR2022-01078, challenging U.S. Pat. No. 11,057,701, 26 pages.
*Staton Techiya, LLC* v. *Samsung Elecs, Co, Ltd*, Appendix B to P.R. 4-3 Statement, Exhibit-2010, Filed on Nov. 18, 2022—Cited in IPR2022-00388, challenging U.S. Pat. No. 10,966,015, 26 pages.
*Staton Techiya, LLC, et al.* v. *Samsung Elecs. Co, Ltd, et al.*, Defendants' P.R. 4-2 Disclosures, Exhibit-2004, Filed on Oct. 11, 2022—Cited in IPR2022-01106, challenging U.S. Pat. No. 11,039,259, 25 pages.
*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01078, challenging U.S. Pat. No. 11,057,701, 25 pages.
*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01098, challenging U.S. Pat. No. 11,217,237, 25 pages.
*Staton Techiya, LLC, et al.* v. *Samsung Elecs. Co, Ltd, et al.*, Defendants' P.R. 4-2 Disclosures, Exhibit-2004, Filed on Oct. 7, 2022—Cited in IPR2022-01099, challenging U.S. Pat. No. 11,244,666, 25 pages.
*Staton Techiya, LLC, et al.* v. *Samsung Elecs. Co, Ltd, et al.*, Docket Control Order (Dkt. No. 43), Exhibit-2005, Filed on Oct. 7, 2022—Cited in IPR2022-01078, challenging U.S. Pat. No. 11,057,701, 7 pages.
*Staton Techiya, LLC, et al.* v. *Samsung Elecs. Co, Ltd, et al.*, Docket Control Order (Dkt. No. 43), Exhibit-2005, Filed on Oct. 7, 2022—Cited in IPR2022-01098, challenging U.S. Pat. No. 11,217,237, 7 pages.
*Staton Techiya, LLC, et al.* v. *Samsung Elecs. Co, Ltd, et al.*, Docket Control Order (Dkt. No. 43), Exhibit-2005, Filed on Oct. 7, 2022—Cited in IPR2022-01099, challenging U.S. Pat. No. 11,244,666, 7 pages.
*Staton Techiya, LLC, et al.* v. *Samsung Elecs. Co, Ltd, et al.*, Docket Control Order, Exhibit-2005, Filed on Oct. 11, 2022—Cited in IPR2022-01106, challenging U.S. Pat. No. 11,039,259, 7 pages.
*Staton Techiya, LLC, et al.* v. *Samsung Elecs. Co, Ltd, et al.*, Joint Motion to Consolidate (Dkt. No. 39), Exhibit-2007, Filed on Oct. 7, 2022—Cited in IPR2022-01078, challenging U.S. Pat. No. 11,057,701, 7 pages.
*Staton Techiya, LLC, et al.* v. *Samsung Elecs. Co, Ltd, et al.*, Joint Motion to Consolidate (Dkt. No. 39), Exhibit-2007, Filed on Oct. 7, 2022—Cited in IPR2022-01098, challenging U.S. Pat. No. 11,217,237, 7 pages.
*Staton Techiya, LLC, et al.* v. *Samsung Elecs. Co, Ltd, et al.*, Joint Motion to Consolidate (Dkt. No. 39), Exhibit-2007, Filed on Oct. 7, 2022—Cited in IPR2022-01099, challenging U.S. Pat. No. 11,244,666, 7 pages.
*Staton Techiya, LLC, et al.* v. *Samsung Elecs. Co, Ltd, et al.*, Joint Motion to Consolidate, Exhibit-2007, Filed on Oct. 11, 2022—Cited in IPR2022-01106, challenging U.S. Pat. No. 11,039,259, 7 pages.
*Staton Techiya, LLC, et al.* v. *Samsung Elecs. Co, Ltd, et al.*, Plaintiff's Infringement Contentions, dated Apr. 6, 2022, Exhibit-2008, Filed on Oct. 7, 2022—Cited in IPR2022-01078, challenging U.S. Pat. No. 11,057,701, 7 pages.
*Staton Techiya, LLC, et al.* v. *Samsung Elecs. Co, Ltd, et al.*, Plaintiff's P.R. 4-2 Disclosures, Exhibit-2003, Filed on Oct. 7, 2022—Cited in IPR2022-01099, challenging U.S. Pat. No. 11,244,666, 12 pages.
*Staton Techiya, LLC, et al.* v. *Samsung Elecs. Co, Ltd, et al.*, Plaintiffs' Infringement Contentions dated Apr. 6, 2022, Exhibit-2008, Filed on Oct. 11, 2022—Cited in IPR2022-01106, challenging U.S. Pat. No. 11,039,259, 7 pages.
*Staton Techiya, LLC, et al.* v. *Samsung Elecs. Co, Ltd, et al.*, Plaintiffs' Infringement Contentions, dated Apr. 6, 2022, Exhibit-2008, Filed on OCt. 7, 2022—Cited in IPR2022-01098, challenging U.S. Pat. No. 11,217,237, 7 pages.

(56) References Cited

OTHER PUBLICATIONS

*Staton Techiya, LLC, et al.* v. *Samsung Elecs. Co, Ltd, et al.*, Plaintiffs' Infringement Contentions, dated Apr. 6, 2022, Exhibit-2008, Filed on OCt. 7, 2022—Cited in IPR2022-01099, challenging U.S. Pat. No. 11,244,666, 7 pages.
*Staton Techiya, LLC, et al.* v. *Samsung Elecs. Co, Ltd, et al.*, Plaintiffs' P.R. 4-2 Disclosures, Exhibit-2003, Filed on Oct. 11, 2022—Cited in IPR2022-01106, challenging U.S. Pat. No. 11,039,259, 12 pages.
*Staton Techiya, LLC, et al.* v. *Samsung Elecs. Co, Ltd, et al.*, Plaintiffs' P.R. 4-2 Disclosures, Exhibit-2003, Filed on Oct. 7, 2022—Cited in IPR2022-01078, challenging U.S. Pat. No. 11,057,701, 12 pages.
*Staton Techiya, LLC, et al.* v. *Samsung Elecs. Co, Ltd, et al.*, Plaintiffs' P.R. 4-2 Disclosures, Exhibit-2003, Filed on Oct. 7, 2022—Cited in IPR2022-01098, challenging U.S. Pat. No. 11,217,237, 12 pages.
Stipulation Letter dated Apr. 20, 2022, Exhibit-1031, Filed on May 11, 2022—Cited in IPR2022-00324, challenging U.S. Pat. No. 8,254,591, 8 pages.
Stipulation Letter from D. Rokach to J. Snodgrass, Exhibit-1025, Filed on Nov. 10,2022—Cited in IPR2022-01099, challenging U.S. Pat. No. 11,244,666, 2 pages.
Stipulation Letter from D. Rokach to J. Snodgrass, Exhibit-1027, Filed on Nov. 10, 2022—Cited in IPR2022-01078, challenging U.S. Pat. No. 11,057,701, 2 pages.
Stipulation Letter from D. Rokach to J. Snodgrass, Exhibit-1030, Filed on NOv. 15, 2022—Cited in IPR2022-01098, challenging U.S. Pat. No. 11,217,237, 2 pages.
Stipulation Letter from D. Rokach to J. Snodgrass, Exhibit-1033, Filed on Nov. 10, 2022—Cited in IPR2022-01106, challenging U.S. Pat. No. 11,039,259, 2 pages.
Stipulation Letter, Exhibit-1015, Filed on Apr. 20, 2022—Cited in IPR2022-00282, challenging U.S. Pat. No. 8,315,400, 8 pages.
Stipulation Letter, Exhibit-1019, Filed on Jun. 14, 2022—Cited in IPR2022-00369, challenging U.S. Pat. No. 10,405,082, 8 pages.
Stipulation Letter, Exhibit-1019, Filed on Jun. 14, 2022—Cited in IPR2022-00388, challenging U.S. Pat. No. 10,966,015, 8 pages.
Stipulation Letter, Exhibit-1020, Filed on Jun. 14, 2022—Cited in IPR2022-00410, challenging U.S. Pat. No. 10,979,836, 8 pages.
Stipulation Letter, Exhibit-1023, Filed on May 10, 2022—Cited in IPR2022-00302, challenging U.S. Pat. No. 9,609,424, 8 pages.
Stipulation Letter, Exhibit-1044, Filed on Apr. 20, 2022—Cited in IPR2022-00242, challenging U.S. Pat. No. 8,111,839, 8 pages.
Stipulation Letter, Exhibit-1044, Filed on Apr. 20, 2022—Cited in IPR2022-00243, challenging U.S. Pat. No. 8,111,839, 8 pages.
Stipulation Letter; Exhibit-1034, Filed on Apr. 20, 2022—Cited in IPR2022-00234, challenging U.S. Pat. No. 9124982, 8 pages.
Strand, et al. On the Feasibility of ASR in Extreme Noise Using the Parat Earplug Communication Terminal, IEEE, 2003, pp. 315-320.
Summary of all applications in the '082 patent family, Exhibit-1018, Filed on Dec. 30, 2021—Cited in IPR2022-00369, challenging U.S. Pat. No. 10,405,082, 1 pages.
Summary of all applications in the '836 patent's family, Exhibit-1019, Filed on Jan. 14, 2022—Cited in IPR2022-00410, challenging U.S. Pat. No. 10,979,836, 1 pages.
Summary of Application in '839 Patent Priority Chain, Exhibit-1041, Filed on Dec. 13, 2021—Cited in IPR2022-00243, challenging U.S. Pat. No. 8,111,839, 1 pages.
Summary of applications in '015 patent family, Exhibit-1018, Filed on Jan. 4, 2022—Cited in IPR2022-00388, challenging U.S. Pat. No. 10,966,015, 1 pages.
Summary of applications in '591 priority chain, Exhibit-1030, Filed on Dec. 20, 2021—Cited in IPR2022-00324, challenging U.S. Pat. No. 8,254,591, 1 pages.
Summary of Applications in '839 Priority Chain, Exhibit-1041, Filed on Dec. 13, 2021—Cited in IPR2022-00242, challenging U.S. Pat. No. 8,111,839, 1 pages.
Summary of Applications in '982 Priority Chain; Exhibit-1032, Filed on Dec. 13, 2021—Cited in IPR2022-00234, challenging U.S. Pat. No. 9,124,982, 1 pages.
Survey of the Speech Recognition Techniques for Mobile Devices, Dmitry Zaykovskiy, Department of Information Technology, SPECOM'2006, St. Petersburg, Jun. 2006, 6 pages.
Techiya's Opposition to Samsung's Motion for Summary Judgment of Invalidity under 35 U.S.C § 112 of the '666 Patent (Redacted) (Dkt. No. 515), Jul. 24, 2023, 30 pages.
Techiya's Sur-Reply to Samsung's Motion for Summary Judgment of Invalidity under 35 U.S.C § 112 of the '666 Patent (Dkt. No. 587), Aug. 21, 2023, 5 pages.
Techniques and applications for wearable augmented reality audio, Härmä, Aki & Turku, Julia & Tikander, Miikka & Karjalainen, M & Lokki, Tapio & Nironen, H & Vesa, Sampo (2003), 20 pages.
Techopedia, Faceplate, Exhibit-2011, Filed on Sep. 13, 2022—Cited in IPR2022-00242, challenging U.S. Pat. No. 8,111,839, 2 pages.
Techopedia, Faceplate; Exhibit-2010, Filed on Sep. 9, 2022—Cited in IPR2022-00234, challenging U.S. Pat. No. 9124982, 2 pages.
Termination Decision: Post-DI Settlement, Exhibit-20, Filed on Dec. 12, 2024—Cited in IPR2024-00559, challenging U.S. Pat. No. 11,610,587, 5 pages.
Termination Decision: Pre-DI settlement, Exhibit-16, Filed on Dec. 12, 2024—Cited in IPR2024-01003, challenging U.S. Pat. No. 9,191,083, 5 pages.
Termination Decision: Pre-DI settlement, Exhibit-16, Filed on Dec. 12, 2024—Cited in IPR2024-01004, challenging U.S. Pat. No. 9,614,943, 5 pages.
Termination Decision: Pre-DI settlement, Exhibit-16, Filed on Dec. 12, 2024—Cited in IPR2024-01031, challenging U.S. Pat. No. 7,049,850, 5 pages.
Termination Decision: Pre-DI settlement, Exhibit-17, Filed on Dec. 12, 2024—Cited in IPR2024-01034, challenging U.S. Pat. No. 9,279,263, 5 pages.
Termination Decision: Pre-DI settlementPaper15, Dec. 12, 2024—Cited in IPR2024-01033, challenging U.S. Pat. No. 8,434,966, 5 pages.
The Effect of Hearing Aid Microphone Location on the Intelligibility of Hearing Aid—Transduced Speech, John Robert Franks, Dec. 1975, 208 pages.
Transcript of Deposition of Chris Kyriakakis, Ph.D. taken Oct. 7, 2022, Exhibit-2007, Filed on Oct. 17, 2022—Cited in IPR2022-00302, challenging U.S. Pat. No. 9,609,424, 121 pages.
Transcript of Deposition of Christopher Struck, Exhibit-1028, Filed on Jun. 15, 2023—Cited in IPR2022-01078, challenging U.S. Pat. No. 11,057,701, 177 pages.
Transcript of Deposition of Dr. Les Atlas, Exhibit-2007, Filed on Oct. 17, 2022—Cited in IPR2022-00324, challenging U.S. Pat. No. 8,254,591, 88 pages.
Transcript of Deposition of Dr. Les Atlas; Exhibit-2007, Filed on Sep. 9, 2022—Cited in IPR2022-00234, challenging U.S. Pat. No. 9,124,982, 207 pages.
Transcript of Deposition of Les Atlas, Ph.D, Aug. 18, 2022, Exhibit-2007, Filed on Sep. 13, 2022—Cited in IPR2022-00242, challenging U.S. Pat. No. 8,111,839, 207 pages.
Transcript of Deposition of Les Atlas, Ph.D, Aug. 18, 2022, Exhibit-2007, Filed on Sep. 13, 2022—Cited in IPR2022-00243, challenging U.S. Pat. No. 8,111,839, 207 pages.
Transcript of Deposition of Les Atlas, Ph.D, Exhibit-2016, Filed on Apr. 10, 2023—Cited in IPR2022-01106, challenging U.S. Pat. No. 11,039,259, 105 pages.
Transcript of Deposition of Nathaniel Polish, Ph.D, taken Sep. 29, 2022, Exhibit-2007, Filed on Oct. 19, 2022—Cited in IPR2022-00253, challenging U.S. Pat. No. 9,491,542, 154 pages.
Transcript of Deposition of Nathaniel Polish, Ph.D, taken Sep. 29, 2022, Exhibit-2007, Filed on Oct. 19, 2022—Cited in IPR2022-00281, challenging U.S. Pat. No. 9,270,244, 154 pages.
Transcript of Deposition of Richard M. Stern, Exhibit-2010, Filed on Mar. 23, 2023—Cited in IPR2022-01078, challenging U.S. Pat. No. 11,057,701, 102 pages.

(56) References Cited

OTHER PUBLICATIONS

Transcript of Deposition of Richard M. Stern, Ph.D, taken Oct. 27, 2022, Exhibit-2009, Filed on Nov. 8, 2022—Cited in IPR2022-00369, challenging U.S. Pat. No. 10,405,082, 208 pages.
Transcript of Deposition of Richard M. Stern, Ph.D, taken Oct. 27, 2022, Exhibit-2009, Filed on Nov. 8, 2022—Cited in IPR2022-00388, challenging U.S. Pat. No. 10,966,015, 208 pages.
Transcript of Deposition of Richard Stern, Ph.D, Exhibit-2010, Filed on Sep. 9, 2022—Cited in IPR2022-00282, challenging U.S. Pat. No. 8,315,400, 263 pages.
U.S. Appl. No. 09/653,869, Exhibit-1007, Filed on Dec. 20, 2021—Cited in IPR2022-00324, challenging U.S. Pat. No. 8,254,591, 54 pages.
U.S. Pat. No. 10,405,082, Exhibit-1001, Filed on Dec. 30, 2021—Cited in IPR2022-00369, challenging U.S. Pat. No. 10,405,082, 10 pages.
U.S. Appl. No. 61/778,737, Exhibit-1008, Filed on Dec. 21, 2021—Cited in IPR2022-00281, challenging U.S. Pat. No. 9,270,244, 31 pages.
U.S. Appl. No. 62/575,713, Exhibit-1006, Filed on Dec. 30, 2021—Cited in IPR2022-00369, challenging U.S. Pat. No. 10,405,082, 27 pages.
U.S. Appl. 62/575/713, Exhibit-1006, Filed on Jan. 4, 2022—Cited in IPR2022-00388, challenging U.S. Pat. No. 10,966,015, 27 pages.
Using Audio-Based Signal Processing to Passively Monitor Road Traffic, Orla Duffner, Centre for Digital Video Processing and School of Electronic Engineering Dublin City University, Jul. 2006, 262 pages.
Verifying the attenuation of earplugs in situ: Method validation using artificial head and numerical simulations, Annelies Bockstael, Bram De Greve, Timothy Van Renterghem, Dick Botteldooren, Wendy D'haenens, Hannah Keppler, Leen Maes, Birgit Philips, Freya Swinnen, Bart Vinck, The Journal of the Acoustical Society of America; 124 (2): 973-981, Aug. 1, 2008, 10 pages.
Vraalsen, A Multimodal Context Aware Mobile Maintenance Terminal for Noisy Environments, 2004, pp. 79-92.
Wikipedia, Apple headphones, Exhibit-2010, Filed on Sep. 13, 2022—Cited in IPR2022-00243, challenging U.S. Pat. No. 8,111,839, 7 pages.
Wikipedia, Microphone, Exhibit-2012, Filed on Sep. 13, 2022—Cited in IPR2022-00242, challenging U.S. Pat. No. 8,111,839, 26 pages.
Wikipedia, Microphone; Exhibit-2011, Filed on Sep. 9, 2022—Cited in IPR2022-00234, challenging U.S. Pat. No. 9,124,982, 26 pages.
Wiley Elec and Elecs Eng Dictionary (excerpts), Exhibit-2004, Filed on Mar. 21, 2022—Cited in IPR2022-00282, challenging U.S. Pat. No. 8,315,400, 4 pages.
Wiley Electrical and Electronics Engineering Dictionary (excerpt), Exhibit-2009, Filed on Oct. 7, 2022—Cited in IPR2022-01098, challenging U.S. Pat. No. 11,217,237, 3 pages.
Zhengyou Zhang, et al., Multi-Sensory Microphones for Robust Speech Detection, Enhancement and Recognition, Microsoft Research, 2004, 4 pages.
Declaration of David Kleinschmidt in Support of Patent Owner's Preliminary Response, Exhibit-2001, Filed on Mar. 21, 2022—Cited in IPR2022-00282, challenging U.S. Pat. No. 8,315,400, 77 pages.
Ex. 1004 File History for U.S. Pat. No. 11,659,315—Part 1 of 2, Exhibit-1004, Filed on Jun. 25, 2024—Cited in IPR2024-01031, challenging U.S. Pat. No. 7,049,850, 396 pages.
Ex. 1005 13_917,079 File History part 1 of 2, Exhibit-1005, Filed on Jun. 9, 2022—Cited in IPR2022-01106, challenging U.S. Pat. No. 11,039,259, 350 pages.
File History of corresponding Reexamination U.S. Patent Application No. 90/015,146, filed Oct. 28, 2022, 1572 pages See in total pages of (585, 543, 422, 22) pages.
File History of U.S. Appl. No. 12/555,864, Exhibit-1012, Filed on Jan. 14, 2022—Cited in IPR2022-00410, challenging U.S. Pat. No. 10,979,836, 268 pages.
Institution Decision: Grant, Exhibit -15, Filed on Jun. 21, 2022—Cited in IPR2022-00243, challenging U.S. Pat. No. 8,111,839, 61 pages.
Motorola H5 Miniblue Bluetooth Headset, Jan. 14, 2005, https:// newatlas. com/ces-2006-bluetooth- innovations-abound-inner-ear-headset- bluetooth-keyboard-and-wireless-ipod- companion/4977 / (SAM-TECH_ 00060368) (Motorola H5 Miniblue Bluetooth Headset), 9 pages.
Motorola's Astra XTS 5000 Digital Portable Radio ("Motorola XTS 5000"), At least by Jun. 2002, Motorola's Detailed Service Manuel has a release date in 2003. See Detailed Service Manuel for Astra XTS 5000 VHF/UHF Range 1/ Range 2/700-800 MHZ, Digital Portable Radios (2003) (SAM-TECH_00051382 - SAM-TECH 00051711), 330 pages. See in total pages of 315 pages 15 pages (first page is Glossary 4).
NACRE QuietPro, Mar. 9, 2005, IEEE Explore Article (SAMTECH_ 00063687), 6 pages.
Oshana, DSP Software Development Techniques for Embedded and Real-Time Systems, Embedded Technology Series, Elsevier Inc, 2006, ISBN-10: 0-7506-7759-7, 601 pages. See in total pages of 527 pages, 74 pages.
Other: Hearing transcript, Exhibit-34, Filed on Jun. 1, 2023—Cited in IPR2022-00243, challenging U.S. Pat. No. 8,111,839, 6 pages.
Reducing the Negative Effects of Ear-Canal Occlusion, Samuel S. Job, Department of Electrical and Computer Engineering Brigham Young University, 2002, 6 pages.
Research in Motion's BlackBerry 7520 ("BlackBerry"), Jun. 28, 2006 WayBack Machine capture of the BlackBerry lists it for sale and describes the Blackberry as a "strong addition to the product line-up." https://web.archive.org/ web/20060628035351 /http://www. blackberry-7520.com (SAM-TECH_00054619; SAM-TECH_ 00054624; SAM-TECH_00054622), 3 pages.
Samsung's Motion for Summary Judgment of Invalidity under 35 U.S.C §112 of the '666 Patent (Redacted) (Dkt. No. 457), Jun. 26, 2023, 78 pages. See in total pages of (33, 13, 7, 6 (PageID # 19721) , 19) pages.
Silynx QuietOps, QuietOps Pocket Guide (Rev. 2.00) (Silynx QuietOps), Jul. 2007, 34 pages.

* cited by examiner

AUDIO LEVEL CONTROL

CROSS-REFERENCE TO RELATED APPLICATIONS

This application is a continuation of U.S. patent application Ser. No. 17/467,168, filed 3 Sep. 2021, which is a continuation of U.S. patent application Ser. No. 16/816,390, filed 12 Mar. 2020, now U.S. patent Ser. No. 11/277,700, which is a continuation of U.S. patent application Ser. No. 16/055,553, filed 6 Aug. 2018, now U.S. Pat. No. 10,667,067, which is a continuation of U.S. patent application Ser. No. 14/574,567, filed on Dec. 18, 2014, now U.S. Pat. No. 10,045,134, which is a continuation of U.S. patent application Ser. No. 11/763,281, filed 14 Jun. 2007, now U.S. Pat. No. 8,917,876, which is a continuation-in-part of U.S. patent application Ser. No. 11/757,152, filed 1 Jun. 2007, now U.S. Pat. No. 8,311,228, which claims the benefit of U.S. Provisional Application No. 60/804,650 filed on Jun. 14, 2006 the disclosure of each of which are hereby incorporated by reference in their entireties.

FIELD

The present application relates to a system for monitoring the sound pressure levels at a listener's ear and in particular, though not exclusively, to monitoring the sound pressure levels over time and to utilize that information to reduce hearing damage.

BACKGROUND

With the advent of an industrial society, people are exposed to noise pollution at greater and greater levels; both from background, such as street traffic, airplanes, construction sites and intentional exposure to high sound levels such as cell phones, MP3 players, and rock concerts. Studies show that ear damage, leading to permanent hearing impairment is not only increasing in the general population, but increasing at a significantly faster rate in younger populations.

The potential for hearing damage is a function of both the loudness and the duration of exposure to the sound stimulus. Safe listening durations at various loudness levels are known, and can be calculated by averaging audio output levels over time to yield a time-weighted average. Standard guidelines published by OSHA, NIOSH or other agencies are known. This calculation can be even further improved by or counting for aspects of the playback scenario, specifically the characteristics of the sound source and their proximity to the listener's ear.

Studies have also indicated that hearing damage is a cumulative phenomenon. Although hearing damage due to industrial or background noise exposure is more thoroughly understood, the risk of exposing one's self to excessive noise, especially with the use of headphones has also been recently studied. Protecting the ear from ambient noise is primarily done with the use of static earplugs that attempt to shield the inner ear from excessively high decibel noise. Background noise canceling earphones such as those produced by Bose—and others, attempt to protect the ear from excessive ambient noise by producing a counter noise wave to cancel out the ambient noise at the ear. These prior art devices have been less than satisfactory because they do not completely prevent high decibel noise from reaching the ear, and do not account for the duration of exposure to harmful sounds at the ear.

Active noise reduction at the ear to protect the ear from exposure to loud noises is discussed in U.S. published Application No. US2005/0254665. The art actively attenuates noise reaching the inner ear utilizing a control; a connection with an earpiece and attenuating the noise to the ear. However, there is no monitoring of the noise over time to account for the cumulative effect. Furthermore, there is no accounting for any restorative effects for sound pressure levels, which are healing to the ear rather than destructive.

Dosimeters, such as that described in U.S. published Application No. US2005/0254667 are known. The device periodically measures prior sound level within the ear canal. However, the device does not take into account the cumulative effect of the noise or the effect of any restorative period. Furthermore, no remedial action is taken as a result of the readings.

It is also known from the related art that headphones for consumer electronics have been provided with a predetermined maximum output level in an attempt to prevent ear damage. This approach is ineffective as it does not take into account listening duration and the calculation of risk for auditory injury. Other headphones are maximum-limited to produce levels that can still result in significant overexposure given enough time, or limit the user to levels, which may not be sufficient to achieve a short term listening level. In the latter case, consumer acceptance for the protective gear could be severely limited and a product would fail to survive in a competitive market and therefore be of no use.

Another alternative known in the art is to reduce the headphone output levels by increasing earphone impedance via an accessory placed between the media player and the earphones. The limitation of this approach is that it gives no consideration to the duration of exposure, and again either the user's chosen listening level cannot be achieved because the maximum level is too limited, or the level is sufficient to allow the user access to high enough sound levels, but risk overexposure due to potential duration of use.

Additionally, related art systems fail to show, suggest, or teach a method for sharing an audio transmission amongst enabled devices over a wireless communications system. Nor do the related art systems disclose a detailed registration process, through which the ear input SPL monitoring system can be customized for an individual user.

SUMMARY

At least one exemplary embodiment is directed to a SPL monitoring system comprising: an audio transducer, where the audio transducer is configured to receive sound pressure, and where the audio transducer outputs a plurality of electronic signals, where each signal represents sound pressure levels (SPLs) for a particular frequency band; a logic circuit, where time is broken into increments of time, where the logic circuit measures and stores in a memory storage system an exposure time duration when a signal's SPL exceeds a threshold value for the particular frequency band of the signal and stores the SPL level associated with each increment of time in the exposure time duration, and where the logic circuit measures and stores a recovery time duration when the signal's SPL drops below the threshold value for the particular frequency band of the signal and stores the SPL level associated with each increment of time in the recovery time duration, where the logic circuit calculates over an averaging time interval an average SPL dose within the averaging time interval, and where the logic circuit calculates a safe time duration over which a user can receive current sound pressure values; and an indicator element, where the indicator element produces a notification when an indicator level occurs, where the indicator level is at least one of: when the safe time duration has been exceeded; when a listening duration is within a certain percentage range of the safe time duration; when a listening duration is within various levels, where each level is represented by an indicator color and where each level represents a percentage range of the safe time duration; when the power is low; and when at least one feature is not working.

At least one exemplary embodiment is directed to an SPL monitoring information system comprising: a database stored on a memory storage system, where the database includes data, where the data is at least one of: a list of earpiece devices and associated instrument response functions; a user's audiogram compensation information; and an earpiece frequency response function; a retriever interface, where a request is obtained through the retriever interface by a sending unit; a logic circuit; and an output control unit, where the request includes a request for a subset of data, where the logic circuit compares the request with the data in the database and retrieves the subset of data and sends it to the output control unit, where the output control unit sends the subset of data to the sending unit.

Further areas of applicability of exemplary embodiments of the present application will become apparent from the detailed description provided hereinafter. It should be understood that the detailed description and specific examples, while indicating exemplary embodiments, are intended for purposes of illustration only and are not intended to limit the scope of the application.

BRIEF DESCRIPTION OF THE DRAWINGS

Exemplary embodiments of present application will become more fully understood from the detailed description and the accompanying drawings, wherein.

DETAILED DESCRIPTION OF EXEMPLARY EMBODIMENTS

Figure 1:
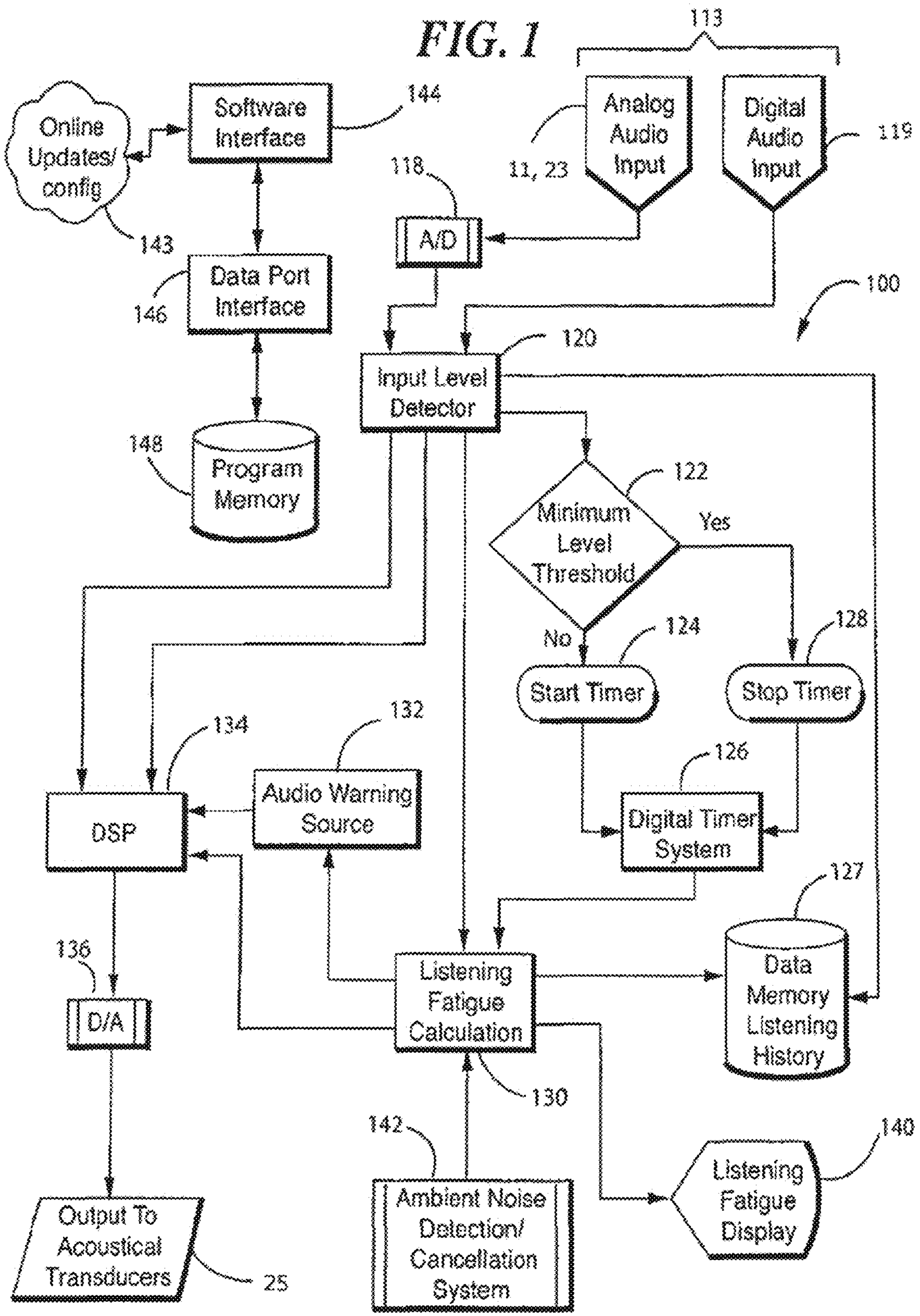
FIG. 1 is a block diagram of the system for measuring and determining exposure to sound over time at the ear constructed in accordance with a first exemplary embodiment of the application.

The following description of exemplary embodiment(s) is merely illustrative in nature and is in no way intended to limit the subject matter disclosed, its application, or uses.

Processes, techniques, apparatus, and materials as known by one of ordinary skill in the relevant rut may not be discussed in detail but are intended to be part of the enabling description where appropriate, for example closed cavity volume.

In an of the examples illustrated and discussed herein any specific values, for example the number of users, a particular type of wireless communication protocol, should be interpreted to be illustrative only and non-limiting. Thus, other examples of the exemplary embodiments could have different values or use other protocols.

Notice that similar reference numerals and letters refer to similar items in the following figures, and thus once an item is defined in one figure, it may not be discussed for following figures.

Sample Terminology

The following terminology presents examples only of meanings of commonly used terminology and is intended to aid in the understanding of exemplary embodiments, and is not meant to be limitative in nature.

Audiogram: An "Audiogram" can be a measured set of data describing a specific individual's ability to perceive different sound frequencies.

Attenuation: "Attenuation" can be defined as a reduction of the signal output level either by linear gain reduction, by dynamic range reduction, or a combination of both.

Client: A "Client" can be defined as a system that communicates with a Server and directly interfaces with a user.

Control Data: "Control Data" can be defined as information that dictates the operating parameters for a system or a set of systems. For the ear input SPL monitoring system described in at least one exemplary embodiment, Control Data includes minimum input threshold parameters, acoustical transducer characteristics, the dBv to dBspl transfer function, the time-weighted average noise exposure calculation parameters, the function relating time-weighted average noise exposure to recommended listening durations, and any filtering parameters that relate to Audiogram compensation, inverse Headphone response, personal preferences, audiological recommendations or other related data.

Headphones: "Headphones" can be a set of acoustical transducers intended as personal listening devices that are placed either over the pinnae, very near the ear canal, or inside the ear canal of the listener. This includes the Playback Hardware commonly referred to as "earbuds," or "headphones," as well as other earpiece devices.

Hearing Damage: "Hearing Damage" can be defined as any temporary threshold shift (TTS) or permanent threshold shift (PTS) in an individual's healing due to exposure to auditory stimuli.

Listening Habits Hi story: "Listening Habits History" can be defined as a record of a user's listening habits over time.

This record can include ear input SPL data, listening duration data, time between listening sessions, and other related data.

Playback Hardware: For example devices that can be used to play previously recorded or live streaming audio. Including, for example, Headphones, loudspeakers, personal. music players, and other listening devices.

Server: A "Server" can be defined as a system that controls centrally held data and communicates with Clients.

An SPL Monitoring System

Figure 2:
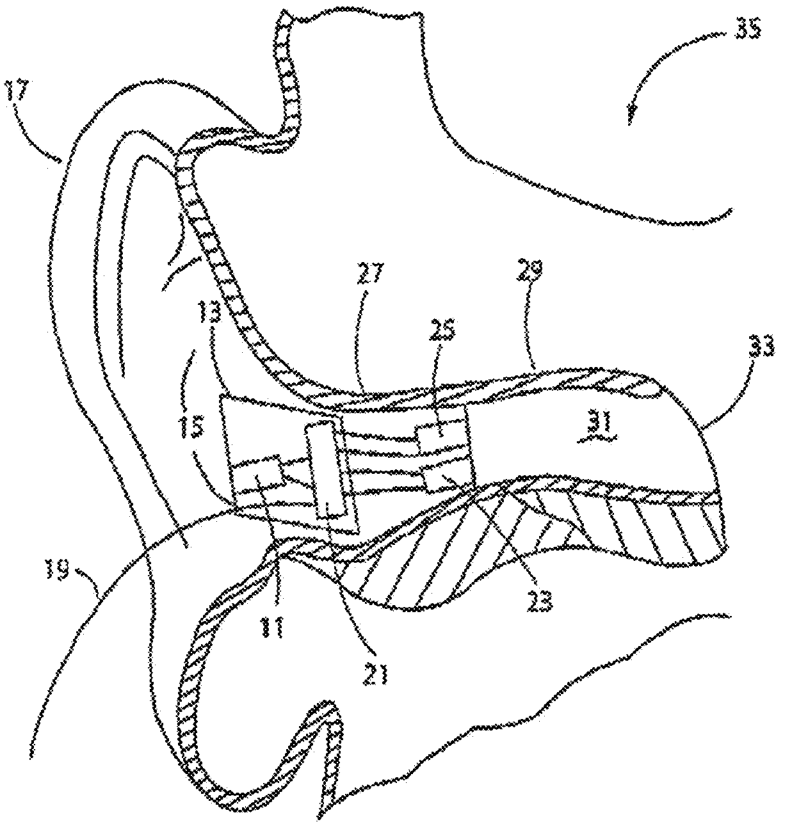
FIG. 2 is a block diagram of the system in accordance with at least one exemplary embodiment of the application in situ in the ear.

At least one exemplary embodiment is directed to measuring and determining the exposure to sound at the ear over time. Reference is made to FIG. 1 in which a system, generally indicated as 100, is constructed in accordance with at least one exemplary embodiment. System 100 includes an audio input device 113 for receiving sound at the ear. As will be discussed below, audio input 113 can include an analog audio input 11, 23 and a digital audio input 119. In at least one exemplary embodiment, audio input 113 receives audio input from at least one of three sources, namely; ambient noise around the ear, direct input noise such as a MP3 player or other device which can produce a digital audio input at digital audio input 119, and noise as detected within the ear canal 31 (FIG. 2). The audio input 113 outputs an audio signal corresponding to the received sound. Analog output signals from analog audio inputs 11, 23 are converted to a digital signal by an analog-to-digital (AID) converter 118 so that digital sound signals are input into a level detector 120.

Input level detector 120 determines the sound pressure level of the sound received at audio input 113. Input level detector 120 outputs a sound pressure level (SPL) signal, which is input to a minimum-level threshold detector 122. Minimum level threshold 122 determines whether or not the sound pressure level as detected by input level detector 120 exceeds a minimum level threshold. As will be discussed below, the minimum level threshold can be the effective quiet level of the individual, or some predetermined level substantially corresponding to a level, which is ear damage neutral over time or a level of interest, such as 80 dB, because of its effect on the ear. Therefore, if the minimum level threshold is detected as being exceeded, a loud signal is output to a start timer 124, which triggers a digital timer 126 to begin a clock. Conversely, if the minimum level threshold is detected as being below the minimum threshold, a quiet signal is output to a start timer 124, which triggers a digital timer 126 to begin a clock of a restorative period. If the sound pressure level is at the minimum threshold, no clock needs to be started because this is neutral to the desired effect. In a preferred embodiment, the clock signal is changed with every significant (more than 1 dB by way of example) change in sound pressure level to get an accurate profile of sound exposure over time.

Once the sound pressure level as detected at input detector level 120 is at the minimum level, a stop timer signal 128 is output to digital timer 126 to stop the clock corresponding to exposure to the loud level. Digital timer 126 outputs a clock value corresponding to the time period at which the minimum level threshold was not met, or in the proffered embodiment, for each period corresponding to a discrete level change.

A data memory or learning history databank 127 receives the clock value from digital timer 126 as well as the actual input level detected at input level detector 120 and determines a listening history or sound pressure level exposure history. The sound pressure level exposure history is a record of the user's exposure to sound pressure levels over time. Because the effect of exposure is cumulative, it is important that the exposure history be maintained. The listening history, as will be discussed below, can include real ear level data, listening duration data, time between listening sessions, absolute time, sound pressure level dose data, including any restorative sound level, number of acoustic transients and crest factor and other data.

The sound pressure level exposure history or listening history includes both the listening habits history and the environmental or ambient noise exposure history. The environmental noise exposure history is the exposure of a user to environmental noise over time as a result of the auditory stimuli inherent to the environment where the user is present. This can be highway traffic, construction site, even the restorative effect of the quiet of a library whereas, the listening habits history is associated for the purposes for this disclosure with user-directed auditory stimuli such as music, words, other noises, which a user intentionally encounters for a purpose such as communication, learning, and enjoyment. Therefore, database 127, as will be discussed below, stores the cumulative SPL exposure.

It should be noted that in at least one exemplary embodiment, minimum level threshold detector 122 also starts the timer when the sound pressure level is below the predetermined level. In this way, the restorative effect of below effective quiet noise is accumulated for determining overall exposure damage potential.

In effect, the only time that digital timer 126 is not running is when the detected sound pressure level signal is at the minimum threshold level. A listening fatigue calculator 130 receives the input level signal from input level detector 120 and data from the data memory listening history 127, and determines whether or not listening fatigue or hearing damage is likely to occur as a result of further exposure. Hearing damage is the injury to the hearing mechanism including conductive and sensorineural decrement in hearing threshold levels. It can be either temporary or permanent so long as it is a result of the noise exposure above Effective Quiet. In other words, listening fatigue calculator 130 will output a signal when a threshold determined as a function of exposure time and sound pressure level, as will be discussed in greater detail below, is achieved. At that point, a listening fatigue signal is output.

It should be noted that in an alternative embodiment, system 100 can make use of an ambient noise detection/cancellation system 142 as known in the art. These systems produce signals, which negate noise pressure levels at certain frequencies and/or certain levels to reduce the effect of undesired noise, whether environmental noise or user directed noise. It will have some effect in elongating the exposure time by negating the sound pressure level detected by input level detector 142.

In at least one exemplary embodiment, the listening fatigue signal is utilized to prevent damage and encourages some action by the user when exposure levels are near damaging levels. Therefore, in one non-limiting example, a listening fatigue display 140 is provided for receiving the listening fatigue signal and displaying to the user a prompt to discontinue exposure to the sound level from the damaging sound source or audio source.

In another non-limiting example, the listening fatigue signal is output to an audio warning source 132, which outputs an output audio warning to the user notifying the user that exposure to the sound source has reached critical levels.

In at least one exemplary, but non-limiting, embodiment, as will be discussed below, system 100 includes an output acoustical transducer 25 to provide an audio signal to the ear.

Output acoustical transducer 25 operates under the control of a digital signal processor 134. Digital signal processor 134 receives a digital audio signal from input level detector 120, which acts as a pass through for the digitized signals from audio input 113. Digital signal processor 134 passes the sound signals through to a digital to analog converter 136 to drive acoustical transducers 25 to recreate the sound received at audio input 113 in side the ear canal. in at least one exemplary embodiment as shown in FIG. 2. With such an exemplary embodiment, audio warning source 132 provides an output to digital sound processor 134 causing output acoustical transducer 25 to output a warning sound inside the ear of the user.

Lastly, in at least one further exemplary embodiment, listening fatigue calculator 130 outputs a listening fatigue signal to digital processor 134 which causes digital signal processor 134 to attenuate the sound signal prior to output to acoustical transducer 25 to reduce the signal output level by any of the linear gain reduction, dynamic range reduction, a combination of both, or a complete shutdown of transducer 25. Attenuation would be at least to the level, if not below, the effective quiet level to allow for ear recovery prior to damage.

It should be noted, that because personal hearing levels can change from person to person, and because both of the time intervals are a function of many variables, in a non-limiting example, to provide a dynamic ever-changing response, system 100 operates under software control. The configuration of the digital sound processor 134, listening fatigue calculator 130, the minimum level threshold detector 122, and the input level detector 120 are operated under software control.

In an exemplary embodiment, the control programs are stored in a program memory 148 for operating the firmware/hardware identified above. Furthermore, the program stored within memory 148 can be personalized as a result of testing of the user's ear, or by other modeling methods, in which system 100 includes a software interface 144 for receiving online or remote source updates and configurations. The software interface 144 communicates with a data port interface 146 within system 100, which allows the input of software updates to program memory 148. The updates can be transmitted across a distributed communications network, such as the Internet, where the updates take the form of on line updates and configurations 143.

It should be noted that there is multiple functionality distributed across system 100. In at least one exemplary embodiment, at least audio input 113 and acoustical transistor 25 are formed as an earpiece, which extends into the outer ear canal so that the processing of signals pertains to sound received at the ear. However, it is well within the scope of at least one exemplary embodiment to provide substantially all of the functionality in an earpiece so that system 100 is a "smart device."

Reference is now made to FIG. 2 in which system 100 in which the transducer configuration, that portion of system 100, which converts sound pressure level variations into electronic voltages or vice versa is shown. In this embodiment, acoustic transducers include microphones as an input and loudspeakers as an acoustical output.

FIG. 2 depicts the electro acoustical assembly 13 as an in-the-ear acoustic assembly or earpiece, as it would typically be placed in the ear canal 31 of ear 17 of user 35. The assembly is designed to be inserted into the user's ear canal 31, and to form an acoustic seal with the walls 29 of the ear canal at a location 27, between the entrance to the ear canal 15 and the tympanic membrane or eardrum 33. Such a seal is typically achieved by means of a soft and compliant housing of assembly 13. A seal is useful to the performance of the system in that it creates a closed cavity in ear canal 31 (e.g. of approximately 0.5 cc) in a non-limiting example between the in-ear assembly 13 and the ear's tympanic membrane 33.

As a result of this seal, the output transducer (speaker) 25 is able to generate a full range bass response time when reproducing sounds for the system user. A seal can also serve to significantly reduce the sound pressure level at the user's eardrum 33 resulting from the sound field at the entrance to the ear canal 15. A seal is also the basis for the sound isolating performance of the electroacoustic assembly 13. Located adjacent to speaker 25, is an ear canal microphone 23, which is also acoustically coupled to closed cavity 31. One of its functions is that of measuring the sound pressure level in cavity 31 as a part of testing the hearing acuity of the user as well as confirming the integrity of the acoustic seal and the working condition of itself and speaker 25. Audio input 11 (ambient microphone) is housed in assembly 13 and monitors sound pressure at the entrance to the occluded ear canal. All transducers receive or transmit audio signals to an ASIC 21 that undertakes at least a portion of the audio signal processing described above and provides a transceiver for audio via the wired or wireless communication path 19.

In the above description the operation of system 100 is driven by sound pressure level, i.e. sound levels are monitored for time periods or epochs during which the sound pressure level does not equal the minimum threshold or is constant. However, as will be discussed in connection with the next exemplary embodiments, system 100 can also operate utilizing fixed or variable sampling epochs determined as a function of one or more of time and changes in sound pressure level, sound pressure dosage level, a weighted sound pressure level, and restorative properties of the ear.

Figure 3:
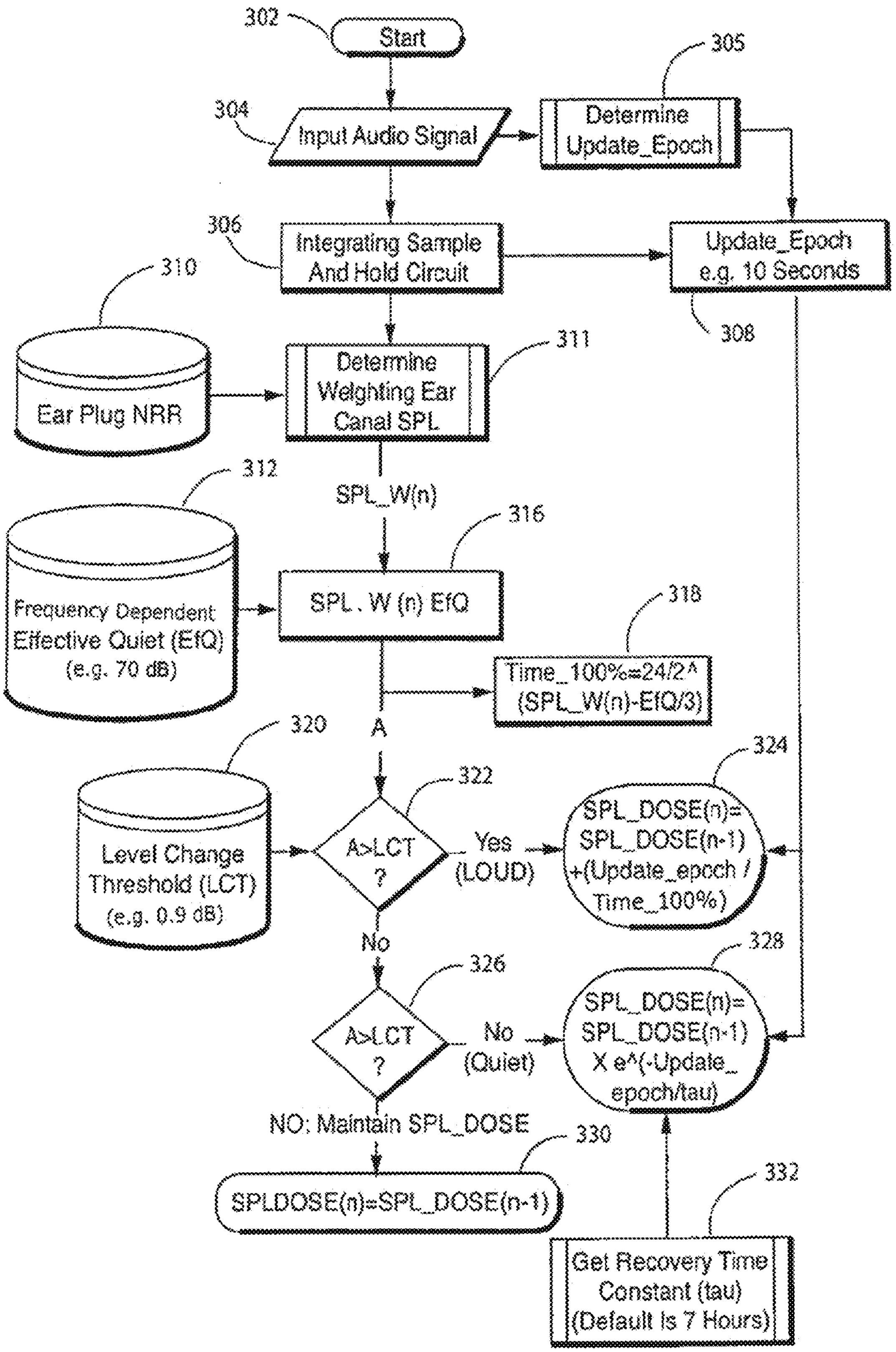
FIG. 3 is a flow chart for calculating listening fatigue in accordance with at least one embodiment of the application by measuring a quantity (e.g., the sound pressure level) over time as perceived at the ear.

Reference is now made to FIG. 3 in which a flow chart for monitoring the sound pressure level dose at various sample times n is provided. The process is started in a step 302. An input audio signal is generated in a step 304 at either the ear canal microphone 23 or the ambient sound microphone 11. Exposure time is a function of the sound pressure level, therefore, the epoch or time period used to measure ear exposure or, more importantly, the time-period for sampling sound pressure level is determined in a step 305. The update epoch is used in the SPL dose function determination as well as to affect the integration period for the sound pressure level calculation that, as will be discussed below, is used to calculate the weighted ear canal sound pressure level.

Figure 6:
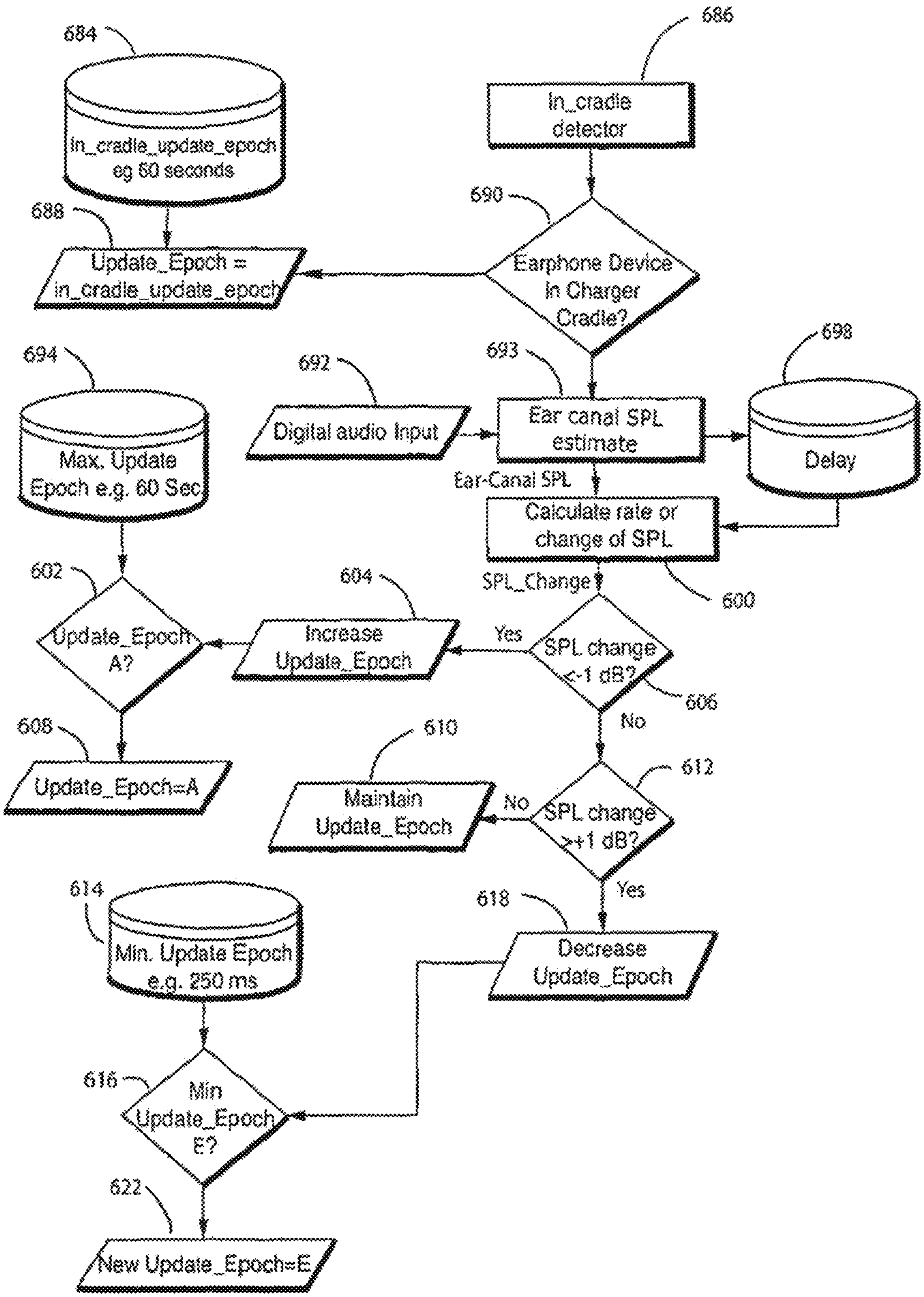
FIG. 6 is a flow chart for determining an update epoch in accordance with at least one exemplary embodiment of the application.
Figure 7:
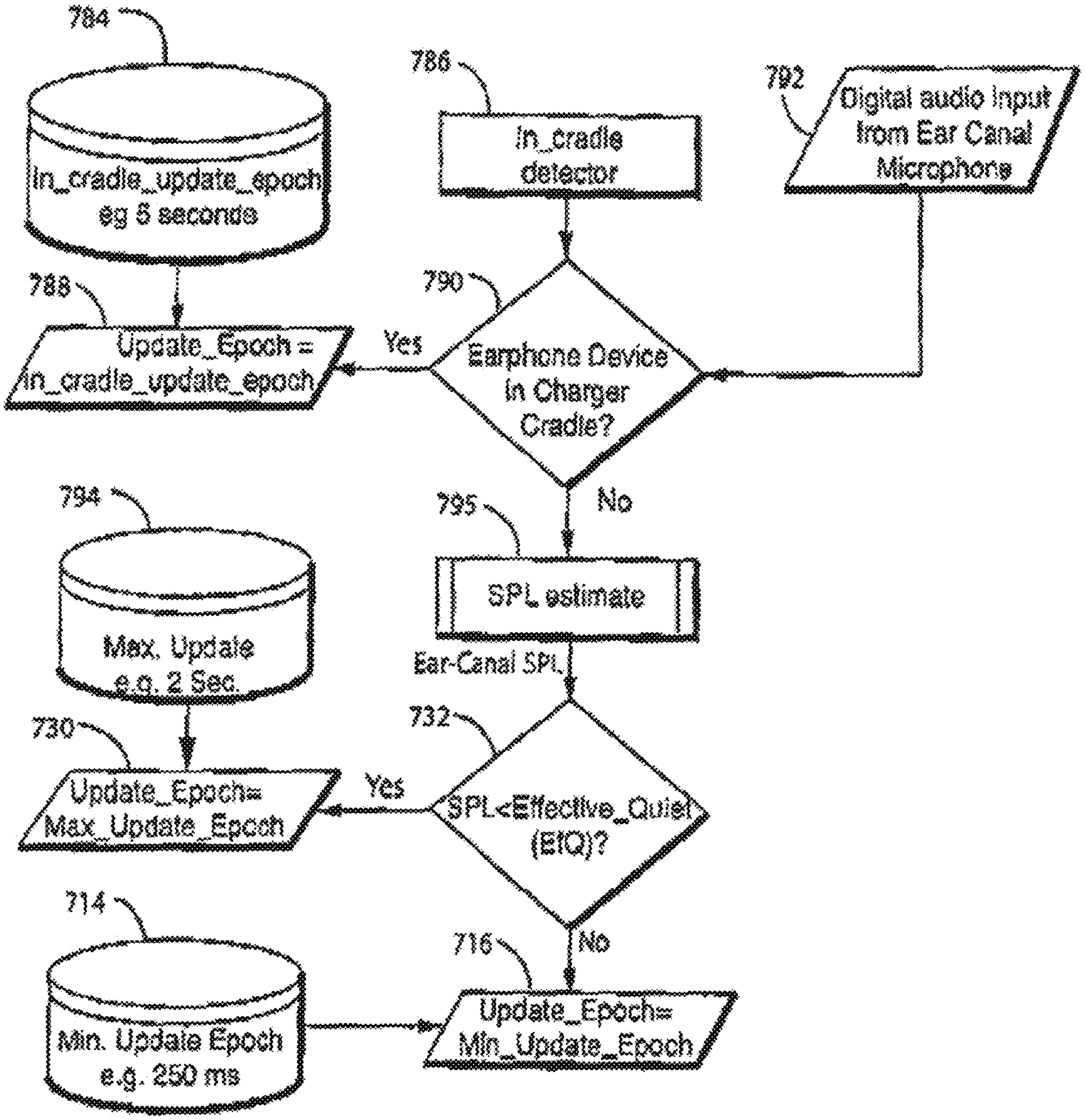
FIG. 7 is a flow chart for determining an update epoch in accordance with yet another exemplary embodiment of the application.

Reference is now made to FIGS. 6 and 7. In FIG. 6, a method is defined to change the update epoch as a function of the weighted ear canal sound pressure level, which will be discussed in greater detail below. System 100 is capable of determining when earpiece 13 is in a charger or communication cradle (i.e., not in use in the ear of the user). In a step 684, a predetermined standard is provided for the update epoch, 60 seconds in this example. In step 688, the update epoch is set as the in-cradle update epoch. The in-cradle state is detected is a step 686. If it is determined in a step 690 earpiece 13 is in a charger or cradle mode, then the update epoch is set at the in-cradle epoch; in the step 688.

However, if in step 690 it is determined that the earphone device is in use, in other words "not in the cradle", then, by default, an audio signal is input to earpiece 13 in step 692. In step 693, an ear canal sound pressure level is estimated as a function of the audio input at step 692. The current (n) ear canal sound pressure level estimate is stored as a delay level in a step 698. An audio input is determined at a later time when step 692 is repeated so that a second in-time ear canal sound pressure level estimate is determined.

In a step 600, the delayed (n−1) or previous sound pressure level is compared with the current (n) ear canal sound pressure level estimate to calculate a rate of change of the sound pressure level. The change level is calculated in units of dB per second. This process of step 692 through 600 is periodically repeated.

In a step 606, it is determined whether or not the sound pressure level change is less than a predetermined amount (substantially 1 dB by way of non-limiting example) between iterations, i.e., since the last time the ear canal sound pressure level is calculated. If the change is less than the predetermined level, then in step 604 the update epoch is increased. It is then determined in a step 602 whether or not the epoch update is greater than a predefined amount D set in step 694 as a maximum update epoch such as 60 seconds in a non-limiting example. If in fact, the update epoch has a value greater than the maximum update epoch D then the update epoch is set at the higher value D (step 608).

If it is determined in step 606 that the sound pressure level change is greater than −1 dB, but less than +1 dB as determined in step 612, then the update epoch value is maintained in a step 610. However, if it is determined that the sound pressure level change is greater than +1 dB, then the update epoch value is decreased in a step 618 to obtain more frequent couplings. A minimum predetermined update epoch value such as 250 microseconds is set in a step 614. At step 616, if the decreased update epoch determined in step 618 is less than, in other words an even smaller minimum time-period than the predetermined minimum update epoch E, then the new update epoch is set as the new minimum update epoch value (step 622). In this way, the sample period is continuously being adjusted as a function of the change in sound pressure level at the ear. As a result, if the noise is of a spike variety as opposed to constant value, the sampling interval will be changed to detect such spikes and protect the ear.

Reference is now made to FIG. 7 in which a method for changing the update epoch is illustrated as a function of the way that the ear canal sound pressure level estimate is provided. Again, in accordance with at least one exemplary embodiment, the update epoch is decreased when the ear canal sound pressure level is high or increasing.

The difference between the embodiment of FIG. 7 and the embodiment of FIG. 6 is that the update epoch is not continuously adjusted, but is more static. If the ear canal sound pressure level is less than effective quiet (a decibel level) which when exposed to the ear over time does not damage or restore the ear), then the update epoch is fixed at a predefined maximum epoch value and this is the value used by system 100 as will be discussed in connection with FIG. 3 below. In this embodiment, if the ear canal sound pressure level is determined to be greater then effective quiet, then the update epoch is fixed at a shorter minimum value and this is returned as the update epoch to be utilized.

In FIG. 7, specifically, as with FIG. 6, an in-cradle update epoch of 5 seconds by way of non-limiting example, is stored in system 100 in a step 784. In a step 788, the initial update epoch is set as the in-cradle update epoch. A maximum update epoch time, such as 2 seconds by way of non-limiting example, is stored in a step 794. In a step 714, an initial minimum update epoch (250 microseconds in this non-limiting example) is stored.

In a step 786 and step 790 it is determined whether or not system 100 is in a non-use state, i.e., being charged or in a cradle. If so, then the update epoch is set at the in-cradle update epoch. If not, then a digital audio signal is input from ear canal microphone 25 in step 792. A sound pressure level is estimated in step 795. It is then determined whether or not the ear canal sound pressure level is less than effective quiet in a step 732. If the sound pressure level is less than the effective quiet as determined in step 732, then the update epoch is set at the maximum update epoch in a step 730. If the sound pressure level is louder than the effective quite, then in step 716, the update epoch is set to the minimum update epoch.

Returning to FIG. 3, in a non-limiting exemplary embodiment, the update epoch is set at 10 seconds in a step 302 utilizing either a constant predetermined sample time, or either of the methodologies discussed above in connection with FIGS. 6 and 7. In a step 306, the input audio signal is sampled, held, and integrated over the duration of the epoch as determined in step 308. As a result, the update epoch affects the integration period utilized to calculate the sound pressure level dose as a function of the sound pressure level and/or as the weighted ear canal sound pressure level.

In a step 310, an earplug noise reduction rate is stored. The noise reduction rate corresponds to the attenuation effect of earpiece 13, or system 100, on sound as it is received at audio input 11 and output at the output transducer 25 or as it passes from the outer ear to the inner ear, if any exemplary embodiment has no ambient sound microphone 11. In a step 311, a weighting ear canal sound pressure level is determined, partially as a function of the earplug noise reduction rate value.

Figure 4:
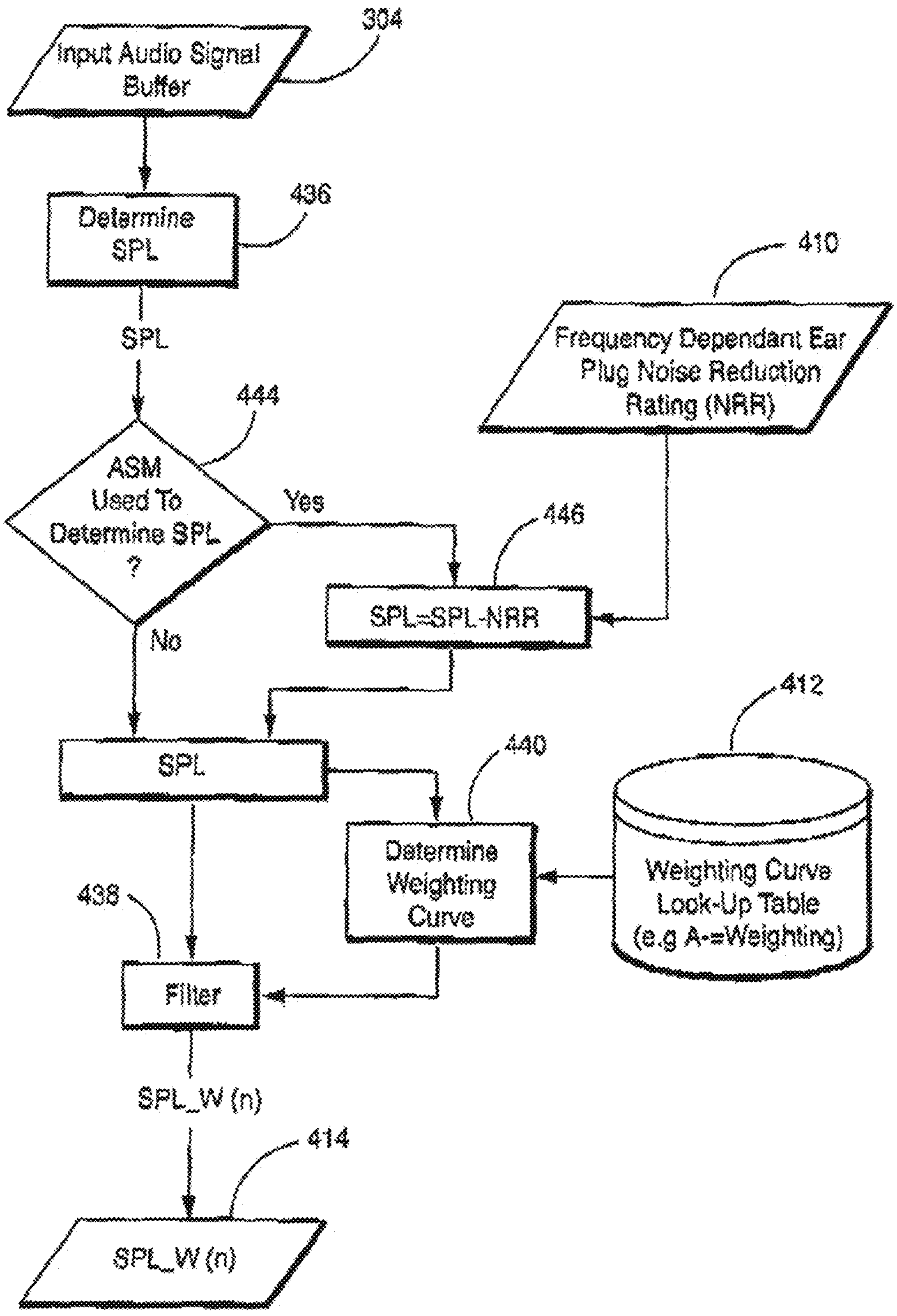
FIG. 4 is a flow chart for determining a weighted ear canal sound pressure level in accordance with another exemplary embodiment of the application.

Reference is now made to FIG. 4 where a method for determining the weighted ear canal sound pressure level in accordance with at least one exemplary embodiment is illustrated. Like numerals are utilized to indicate like structure for ease of discussion and understanding. Weighting is done to compensate for the manner in which sound is perceived by the ear as a function of frequency and pressure level. As sounds get louder, the ear hears lower frequencies more efficiently. By weighting, if the level of the sound of the field is low, the methodology and system utilized by at least one exemplary embodiment reduces the low frequency and high frequency sounds to better replicate the sound as perceived by the ear.

Specifically, a weighting curve lookup table, such as A-weighting, acts as a virtual band-pass filter for frequencies at sound pressure levels. In a step 304, the audio signal is input. In step 410, frequency-dependent earplug noise reduction ratings are stored. These values are frequency-dependent and in most cases, set as manufacturer-specific characteristics.

As discussed above, in a step 306, the input audio signal is shaped, buffered and integrated over the duration of each epoch. The sound pressure level of the shaped signal is then determined in a step 436. It is determined whether or not ambient sound microphone 11 was utilized to determine the sound pressure level in a step 444. If microphone 11 was utilized, then the frequency-dependent earplug noise reduction rating of earpiece 13 must be accounted for to determine the sound level within the ear. Therefore, the noise reduction rating, as stored in step 410, is utilized with the sound pressure level to determine a true sound pressure level (step 446) as follows:

$$SPL_{ACT}=SPL-NRR:$$

where sound pressure $SPL_{ACT}$ is the actual sound pressure level perceived at the ear, SPL is the sound pressure level determined in step 436 and NRR is the noise rate reduction value stored in step 410.

If the ambient sound microphone 11 is not used to determine the sound pressure level then the sound pressure level determined in step 436 is the actual sound pressure level. So that:

$$SPL_{ACT}=SPL$$

It is well within the scope of at least one exemplary embodiment to utilize the actual sound pressure level as determined so far to determine the effect of the sound pressure level sensed at the ear on the health of the ear. However, in at least one exemplary embodiment, the sound pressure level is weighted to better emulate the sound as heard within the ear. Therefore, in a step 412, a weighting curve lookup table is stored within system 100. In a step 440, the weighting curve is determined as a function of the actual sound pressure level as calculated or determined above in steps 436, 446 utilizing a weighting curve lookup table such as the A-weighting curve. The A-weighting curve is then applied as a filter in step 438 to the actual sound pressure level. A weighted sound pressure level for a sampled time period (SPL_W(n)) is obtained to be utilized in a step 414.

The weighting curve can be determined in step 440 by applying a frequency domain multiplication of the sound pressure level vector and the weighting curve stored in step 412. The weighting curves can be stored as a lookup table on computer memory, or can be calculated algorithmically. Alternatively, the input audio signal can be filtered with a time or frequency domain filter utilizing the weighting curve stored in step 412 and the sound pressure level as calculated. For low-level sound pressure levels, those less than 50 dB, by way of non-limiting example, a weighting curve, which attenuates low and high frequencies can be applied (similar to an A-weighting curve). For higher sound pressure levels, such as more than 80 dB, by way of non-limiting example, the weighting curve can be substantially flat or a C-weighting curve. The resulting weighted ear canal sound pressure level during any respective sampling epoch is returned as the system output SPL_W(n) in step 414.

Returning to FIG. 3, a safe listening lime is calculated by comparing the weighted sound pressure level with the effective quiet level (step 312) in step 316. Therefore, a value A corresponding to how far from safe listening the sound pressure level is, is determined by the equation:

$$A=SPL\_W(n)-EfQ$$

where EfQ is equal to the effective quiet time.

By utilizing this simple comparative function, fewer machinations and processes are needed. System 100 takes advantage of the fact that because the effective quiet time is neutral to the ear, sound pressure levels significantly above the effective quiet level are generally damaging and noise levels below the effective quiet are generally restorative.

In a step 318, the remaining safe listening time at the beginning of any current sampling epoch (Time_100%) is calculated. The remaining safe listening time is calculated as follows:

$$\text{Time\_100\%}=24/2\hat{}((SPL\_W(n)-EfQ/3)).$$

In this embodiment, rather than make use of the Sound Level (L), the period is a function of the loudness and quietness of the weighted sound pressure level. It should be noted that effective quiet is used in the above example, but any level of interest, such as 80 dB, or no sound level, i.e., SPL_W(n)−0, may be used. The weighted sound pressure level and effective quiet can be expressed as a frequency-dependent numerical array or a value scalar.

It is next determined whether or not the difference between the current weighted sound pressure level and the effective quiet is above a tolerable threshold or not, i.e., whether the weighted SPL in the eardrum is considered loud or not. A sound pressure level dose is calculated depending upon whether the sound level is loud or not. The sound pressure level dose is the measurement, which indicates an individual's cumulative exposure to sound pressure levels over time. It accounts for exposure to direct inputs such as MP3 players, phones, radios and other acoustic electronic devices, as well as exposure to environmental or background noise, also referred to as ambient noise. The SPL dose is expressed as a percentage of some maximum time-weighted average for sound pressure level exposure.

Because the sound pressure level dose is cumulative, there is no fixed time-period for ear fatigue or damage. At effective quiet, the sound pressure level exposure time would theoretically be infinite. While the time period for the sound pressure level dose becomes smaller and smaller with longer exposure to loud noise. A tolerable level change threshold corresponding to the amount of noise above or below the effective quiet, which has no great effect on the ear as compared to effective quiet is determined and stored in memory 148 in a step 320. In a step 322, the differential between the weighted sound pressure level and the effective quiet is compared to the level change threshold.

A differential value A, corresponding to the level change, is calculated as follows:

$$A=SPL\_W(n)-EfQ$$

If A is greater than the level change threshold, the noise is considered loud and the sound pressure level is calculated in a step 324 as follows:

$$SPL\ \text{Dose}=SPL\ \text{Dose}(n-1)+(\text{Update\_Epoch}/\text{Time\_100\%})$$

where SPL Dose(n−1) is the SPL Dose calculated during the last epoch; Update_Epoch is the time (in hours) since the last SPL Dose was calculated. As described above, Update_Epoch can be adaptive, e.g., shortened when the sound pressure level is louder; and Time_100%, the time period remaining for safe exposure is determined by the equation:

$$\text{Time\_100\%}=24\ \text{hours}/2^{*}((L-EfQ)/3)$$

where L=sound level (in dB) of the combination of Environmental Noise and Audio Playback. It should be noted that sound level (L) can be substituted for SPL_W(n).

It should be noted, as can be seen from the equation, that the time value becomes more important than the sound pressure level as updates are spread apart. However, this is to protect overexposure to harmful sounds because a less accurate sample size must account for the unknown. The wider the periodicity, the less accurate determination of actual exposure. Infrequent updates of the dose assume a relatively constant sound level, ignoring spikes and intervening restorative periods. Accordingly, sound pressure level and epoch periodicity are weighed against each other to protect the ear.

If in step 322 it is determined that the differential is not greater than the level change threshold, including negative values for A (which are restorative values), then in step 326 it is determined whether or not the differential, as determined in step 316, is less than the level change threshold in a step 322. If it is determined that the differential is not less than the level change threshold, then the received noise was the effective quiet level, i.e., the level change threshold equals zero and in a step 330, the current SPL Dose is maintained at the same level. There is no change to the dose level. However, if the differential A is less than the level change threshold then this is a restorative quiet as determined in step 326, so the SPL dose is determined in a Step 328 as follows:

$$SPL\ \text{Dose} = SPL\ \text{Dose}(n-1)*e\hat{\ }(-\text{Update\_epoch}/\tau)$$

Where: [1]τ (referred to as "tau" in the following diagrams) is equal to approximately 7 hours. In some embodiments, tau is adaptive for different users. In at least one exemplary embodiment, the level change threshold is set at substantially 0.9-1.0 dB.

In step 332, the recovery time constant tau is determined. It is not a function of exposure, but rather of recovery. It can be a default number or be determined as will be discussed below. As the SPL Dose is calculated by system 100, it is also monitored. Once the SPL Dose reaches a certain level, as it is a cumulative calculation, ear fatigue calculator 130 determines whether or not the SPL Dose corresponds to a fatigued ear, and if so, it outputs warnings as discussed in connection with FIG. 1.

Figure 5:
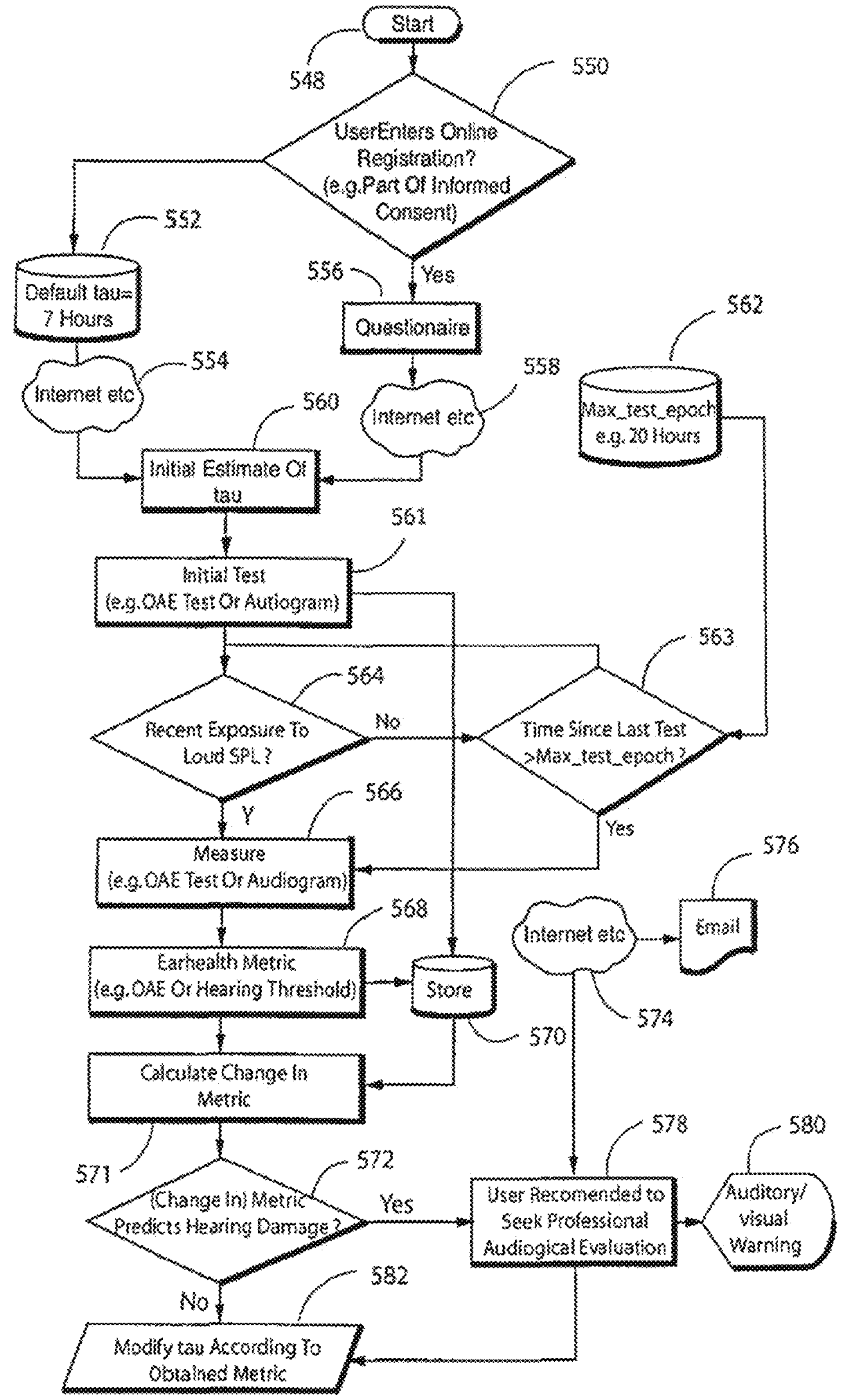
FIG. 5 is a flow chart for determining a personalized recovery time constant m accordance with another exemplary embodiment of the application.

Reference is now made to FIG. 5 which depicts an optional methodology for not only updating the recovery time constant (tau) for individual users, but to provide additional methods for acting upon detected damaging exposure. The process is started at a step 548. In a step 550, it is determined whether or not the user wishes to make use of a registration process, for example online, for setting a personalized update epoch through communication with a remote registration system. If the user declines the registration, then the default tau is set at 7 hours in a step 552. In a step 554, this default value is transmitted to system 100 via a. wired or wireless data communication network.

Alternatively, if the user registers in step 550, a questionnaire is presented in a step 556 in which the user informs system 100 regarding a user sound exposure history, age, work habits and other personal details that could affect the user's personal recovery function time, i.e., the time constant tau. The individual characteristics can be input to a formula or utilized as part of a look up table to determine the tau for the individual user. The estimate of tau determined in step 556 is transmitted to system 100 via a wireless or wired data communication system in a step 558. In step 560, the initial estimate of tau is set from the value determined in step 556.

An initial hearing test is performed in a step 561, which acquires data indicative of the user's heating sensitivity. The test may be an otoacoustic emission (OAE) test or audiogram administered utilizing the ear canal receiver or speaker 25. However, the test can also be administered over the Internet, telephone or other communication device capable of outputting sounds sent across a distributed network and enabling responsive communication. The data is stored in a computer memory as an initial test value in a step 570 and is used in further processing to detect a change in the user heating response.

In a step 564, it is determined whether the user has been recently exposed to loud sound pressure levels. This can be done utilizing the sound pressure level dose as stored or permanently calculated by system 100. If it is decided in step 564 that the user's ear canal sound pressure level is low, then in a step 563 it is determined whether the time since the last test is greater than a maximum test epoch. At the outset, the maximum test epoch is a set number determined in a step 562. In this non-limiting example, the maximum test epoch is set at 20 hours.

If it is determined that the time since the last test is greater than the maximum test epoch or, that there has been recent exposure to loud sound pressure level, then another test is administered in a step 566. The resulting test metrics are stored in steps 568, 570. In a step 571, the newly determined test metrics are compared to the initial test metrics to calculate any change in the metrics. In step 572, it is determined whether the change is predictive of hearing damage. If not, then in a step 582, the tau is modified according the obtained metric.

If it is determined that the hearing damage is predicted, then in a step 578 the user is recommended to remove themselves from the noise as discussed above with the operation of fatigue calculator 130 and furthermore, the user can be recommended to seek professional audiological evaluation in a step 578. This could be done by an in situ auditory or visual warning in step 580 by system 100. On the other hand, if system 100 is used in connection with a communications device such as a telephone or a personal digital assistant, an e-mail can be created in steps 574, 576; not only warning the user of potential damage, but notifying a health professional so that a follow up examination can be performed.

It should be noted that a change in the hearing metric (e.g., a hearing sensitivity curve) is measured by system 100. In response to the user's hearing metric, the recovery time constant tau is updated. For example, tau is shortened if the change in the user's hearing metric indicates the user has "sensitive ears", i.e., if, following loud sound exposure, the user's hearing sensitivity takes longer than seven hours to return to the individual's normal. This modified tau can be used to calculate the sound pressure level dose, in particular in restorative phase, to determine better overall sound pressure level exposure.

By providing a monitoring and protective system which, in at least one mode, continuously monitors sound pressure level at the ear until a potentially harmful exposure has occurred, rather than only monitoring for a predetermined time as with Noise Dose monitors which monitor for work shifts, a more accurate predictor of harm to the ear is provided. By utilizing a method, which determines exposure in part as a function of effective quiet exposure as well as loud noise exposure, an enhanced model of potential risk is achieved. By providing a series of warning mechanisms and preventive measures as a function of the determined potentially harmful dosage levels ear damage is more likely to be prevented. By providing the system in an earpiece which substantially occludes the ear and making use of audio inputs at the external and internal ear, a more accurate reading of noise level is provided and more control through a real time warning system is achievable.

It should be known that values for level change threshold, effective quiet time, and epoch were used above as examples. However, it should be noted that any values which when input and utilized in accordance with the methodologies above prevent permanent damage to the ear are within the scope of the application and the application should not be so limited to the specific examples above.

Additional Exemplary Embodiments

FIGS. 8-11 illustrate exemplary embodiments of systems according to at least one exemplary embodiment of the present application.

Figure 10:
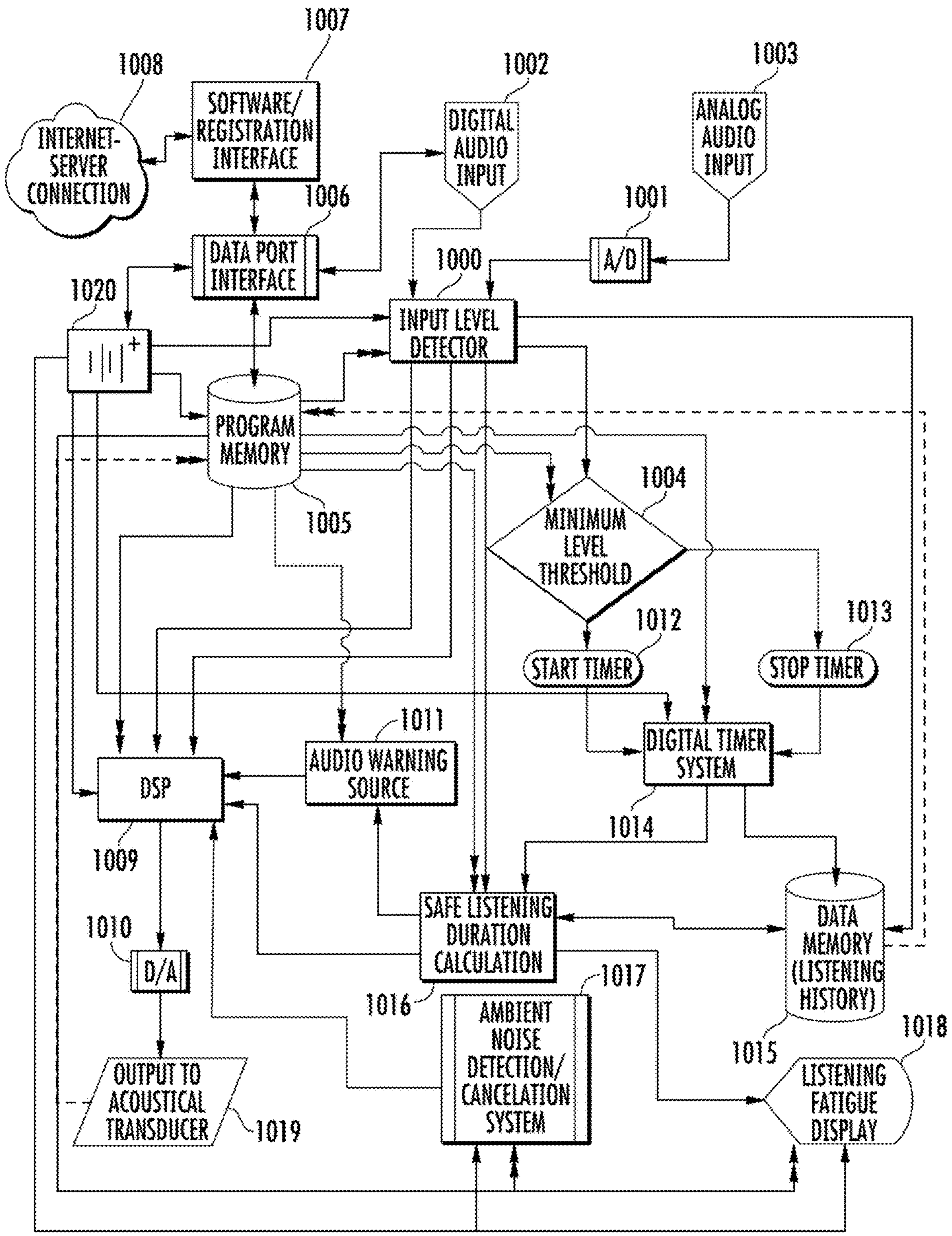
FIG. 10 illustrates in more detail the portion of the system of at least one exemplary embodiment of the present application that operates on the client side, as a piece of hardware, software, or firmware.

At least one exemplary embodiment is directed to an earguard monitoring system that includes any communication system able to communicate with an SPL monitoring system or an SPL monitoring information system.

illustrated in FIG. 10 is an ear input SPL monitoring system for monitoring the SPL exposure over time for a listener, the system can include all or some of the following parts such as: an analog audio input [1003] and an analog to digital converter [1001]; digital audio inputs; [1002] an audio input level monitoring system [1000]; a frequency band monitoring device, [1020], where several frequency bands can be monitored independently; a timer system [1014] that can be activated (for example via start timer [1012] and stop timer [1013]) by a minimum audio input threshold [1004]; a non-volatile updatable program memory storage system [1005] (e.g., RAM, memory stick, other electronic data recording medium as known by one of ordinary skill in the relevant arts), containing all necessary Control Data (e.g., threshold values); a non-volatile data memory storage system for storing data (e.g., timer data, audio output dBv data, calculated ear input SPL levels, and other data related to Listening Habits History) to track the user's Listening Habits History [1015]; a data connection system can be included and used for updating Control Data in the program memory [1006] (e.g., via USB, Bluetooth, or other data transfer methods); an ambient noise level detection system [1017]; a method, for example as described above, for estimating the SPL at the listener's ear input based on a default set of acoustical transducer characteristics (e.g., general instrument response function) or, after a registration process such as via software/registration interface [1007], specific acoustical transducer characteristics (e.g., specific instrument response function); a method for calculating the time-weighted average noise exposure for the listener from audio output level data, estimated SPL at ear data, timer data, and Playback Hardware characteristics based default Control Data settings or customized Control Data settings retrieved through a registration processes; a method for calculating a recommended maximum safe listening duration for the listener based on time-weighted average noise exposure calculations and default Control Data settings or customized Control Data settings retrieved through a registration processes [1016] via Internet-server connection [1008].

For example in at least one exemplary embodiment a logic circuit can calculate a safe time duration of listening at the current average acoustic level. In this non-limiting example, the time is broken into increments of time, where the logic circuit measures and stores in a memory storage system an exposure time duration when a signal's SPL exceeds a threshold value for the particular frequency band of the signal and stores the SPL level associated with each increment of time in the exposure time duration. The logic circuit can also measure and store a recovery time duration when the signal's SPL drops below the threshold value for the particular frequency band of the signal and stores the SPL level associated with each increment of time in the recovery time duration. The logic circuit can calculate over an averaging time interval (e.g., user selected, and average time based on exposure SPL level, a stored value for example a value selected by a user during registration with an accessible web based software system) an average SPL dose within the averaging time interval The logic circuit can then calculate a safe time duration over which a user can receive current sound pressure values. For example if a healthy daily SPL dose is selected to be a value MAX then at the current SPL dosage rate over the averaging time interval, the safe time duration can be determined to be the time it would take from now to reach the MAX value at the average SPL dose.

In at least one exemplary embodiment an indicator element (e.g., a series of LED lights, a warning beep, other visual and acoustical methods) can be used to indicate various scenarios for example; an indicator element, where the indicator element indicates at least one of: when the safe time duration has been exceeded; when a listening duration is within a certain percentage range of the safe time duration; when a listening duration is within various levels, where each level is represented by an indicator color and where each level represents a percentage range of the safe time duration; when a listening duration has exceeded a threshold duration, where the threshold duration is a threshold percentage of the safe time duration; and when the power is low or at least one feature is not working. In at least one exemplary embodiment the indicator element is an audio warning sound source and can include: a speech syn thesis system that generates spoken messages indicating the remaining listening duration deemed safe by the ear input SPL monitoring system; a sample playback system that produces a pre-recorded alert signal or spoken message indicating the remaining listening duration deemed safe by the ear input SPL monitoring system, or some related information; and a synthesis system that produces an alert signal relating to the remaining listening duration deemed safe by the ear input SPL monitoring system.

In at least one exemplary embodiment the indicator element is a display system which can include: a display system configured to indicate the level of listener noise exposure and the amount of listening time left before potential Hearing Damage; a color-coded indicator patch; and a LED display. The various indicator levels used can be stored in a memory storage device and can be user selected via a software system which then stores the user selections in the memory storage device.

An earpiece device can include a speaker that directs output audio signals to an ear canal (for example output to transducer [1019]), where when a notification occurs, at least one of the following occurs: an audio warning signal occurs; a visual display is updated with a warning message; and the speaker attenuates the output audio signal.

In at least one exemplary embodiment the Listening Habits History of the user is accounted for in the calculation of a recommended maximum safe listening duration.

At least one exemplary embodiment is directed to a system for automatically attenuating audio input signals that exceed a maximum safe output threshold, which is set by the Control Data [1009]. Threshold settings are based on audiological recommendations, Playback Hardware characteristics, user preferences, or any combination thereof and can be updated through the registration process described in at least one exemplary embodiment.

At least one exemplary embodiment can include an audio warning sound source that can take the form of one or more of the following: a speech synthesis system that generates spoken messages indicating the remaining listening duration deemed safe by the ear input SPL monitoring system, or some related information; a sample playback system that produces some pre-recorded alert signal or spoken message indicating the remaining listening duration deemed safe by the ear input SPL monitoring system, or some related information; a synthesis system that produces some alert signal relating to the remaining listening duration deemed safe by the ear input SPL monitoring system, or some related information.

Additionally at least one exemplary embodiment can include a display system for indicating the level of listener noise exposure and the amount of listening time left before potential Hearing Damage [1018] that can take the form of one or more of the following: a color-coded indicator patch; a LED display; and/or any appropriate digital display.

At least one further exemplary embodiment can include a digital signal processor for audio signal path attenuation, mixing audio warning signals with audio input, applying filtering to the audio signal path, and additional audio signal path processing indicated by the Control Data [1009] as well as a digital to analog converter [1010].

Exemplary embodiments can further include a method for a user to specify the behavior of the system when excessive levels of SPL exposure are detected. Depending on user specifications, the system either produces: a series of audio warning signals; updates a visual display with a warning message; automatically attenuates audio output using the DSP; and/or any combination of the above the methods describe above.

Figure 11:
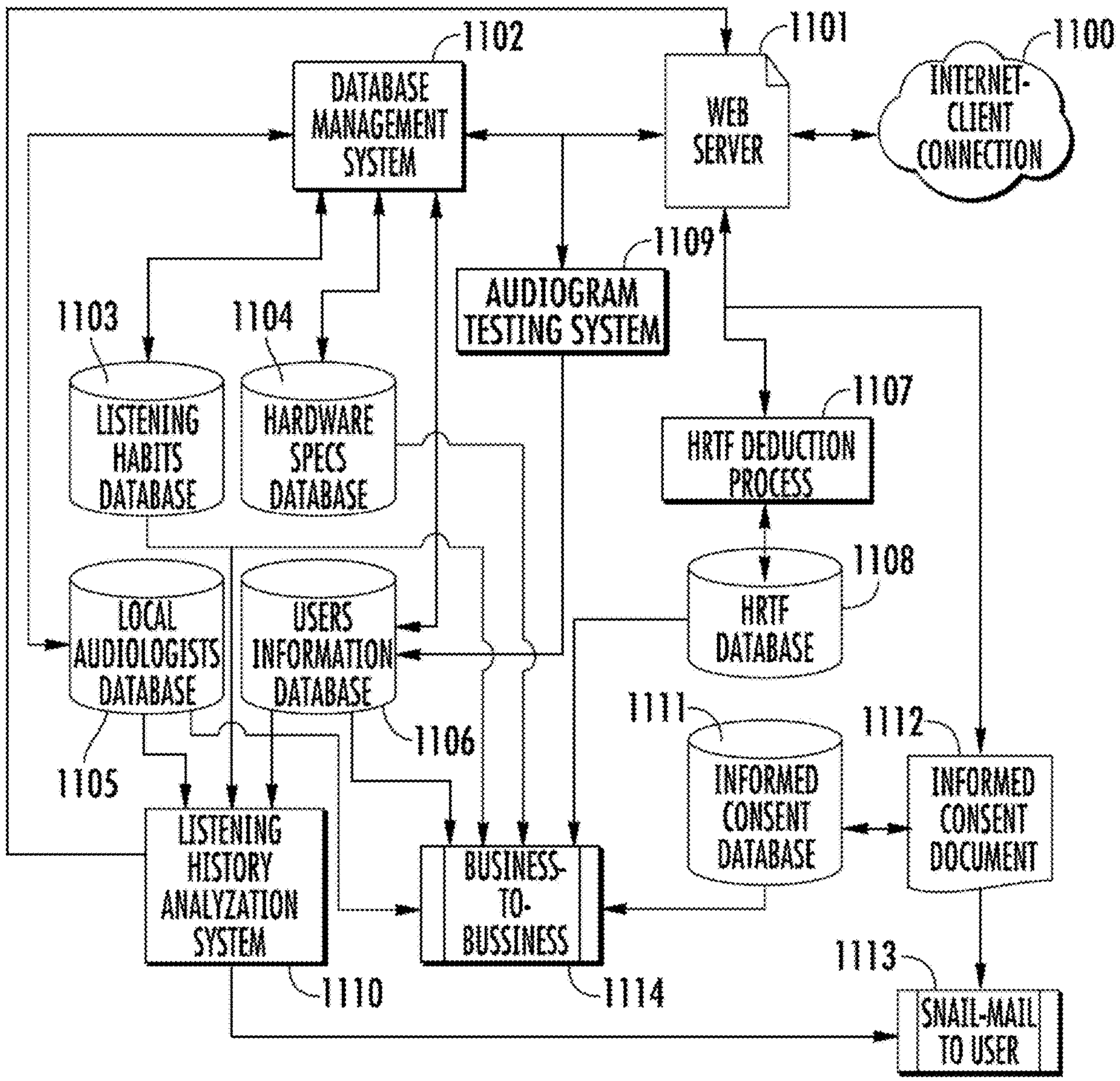
FIG. 11 illustrates in more detail the portion of the system of the present application that operates on the server side.

Referring to FIG. 11, additionally at least one exemplary embodiment can be used for Headphone listening scenarios, where an earpiece device (e.g., headphone, earbud, or any other device that is configured to deliver acoustic signals to the ear) the system further comprising: a database system [1102] containing information about the earpiece device characteristics, including the SPL output, the positioning of the acoustic transducers with respect to the listener's ear, frequency response compensation data, hardware photographs, price points, and other characteristics [1104].

The system can include an interface for retrieving earpiece device characteristics data (e.g., instrument response functions, frequency response characteristics of the earpiece) from the database (e.g., any database system can be used, or a simple data file ASCII or binary, or a spreadsheet) and inputting that data to the program memory (e.g., RAM) via a data connection [1100] (e.g., via a wire or wireless connection) for example to a web server [1101]. The earpiece device characteristics data (e.g., manufacturer's data, instrument response function, frequency response characteristics, and other earpiece data that can be used to control or modify acoustic signals to the ear) can be stored as a function of an earpiece (e.g., headphone) make and model (e.g., Bose, On-Ear, Quiet Comfort 3™) identification number that is read when the Headphones are connected to the system.

Where the system refers, in at least one exemplary embodiment, to a SPL monitoring information system which comprises: a database stored on an memory storage system, where the database includes data, where the data is at least one of: a list of earpiece devices and associated instrument response functions or other manufacturing information [1104]; a user's audiogram compensation information [1005] (which may be obtained, for example, by an audiogram testing system [1109]); and an earpiece frequency response function; a retriever interface, where a request is obtained through the retriever interface by a sending unit; a logic circuit; and an output control unit, where the request includes a request for a subset of data, where the logic circuit compares the request with the data (e.g., the instrument response function and a user's audiogram) in the database and retrieves the subset of data (e.g., the instrument response function) and sends it to the output control unit (e.g., a logic circuit controlling a Bluetooth wireless emitter) where the output control unit sends the subset of data to the sending unit (e.g., the headphone requesting the data).

The data in the database can contain any data useful for monitoring, modifying or controlling (Control Data) acoustic signals to an ear, but can also include data related to determining Control Data, for example, user information in a database [1106], demographic information, age, and gender, where for example a default user audiogram (a type of Control Data) is entered as data in the database as a default user audiogram based upon age. Data can also include positioning of acoustic transducers in an earpiece according to make and model with respect to the listener's ear, the listening habits history [1103] (e.g., stored SPL doses over time, averaged per day or other amounts of temporal averaging) of a registered user.

The output control unit can send the subset of data to the sending unit via many different methods, for example via snail-mail [1113], e-mail, text message, and a standard communication signal. Once a sending unit receives the subset of data the sending unit can vary its acoustic output characteristics, for example different frequencies can be enhanced (e.g., amplitude increased), based upon the subset of data (e.g., a user's audiogram indication of frequency dependent hearing loss). Note that U.S. Pat. Nos. 6,840,908 and 6,379,314 discuss a method for fast acquisition of an individual's Audiogram.

The sending unit (e.g., earpiece device) can modify or control its acoustic output properties by various methods, for example via the application of an appropriate Headphone frequency response compensation filter or an Audiogram compensation filter (an example of Control Data and a subset of data sent) to the audio signal input using a digital signal processor.

Figure 8:
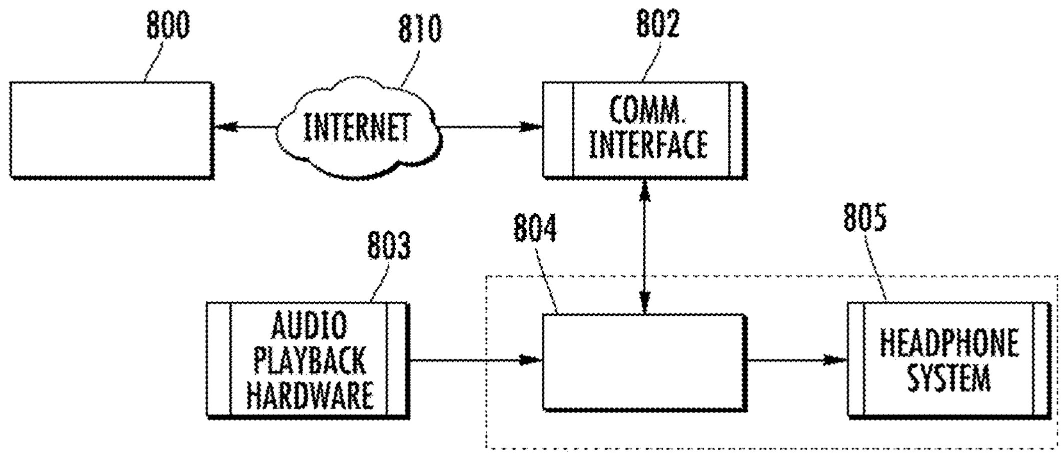
FIG. 8 illustrates the system according to at least one exemplary embodiment of the present application.

The SPL monitoring information system can be stored on or queried from an earpiece device, a Personal computer system, a Personal Music Player system, an automotive audio system, a home audio system, an avionics audio system, a personal video system, a mobile phone system, a personal digital assistant system, or a eye-glass frames system with acoustical transducers. The SPL monitoring information system (e.g., 800 and 900) can additionally be remotely accessed. For example FIG. 8 illustrates a combined earpiece device (804 and 805), which includes an earguard system 804 (e.g., a system that monitors acoustic output to the ear but also has the capability to communicate to control communications to the SPL monitoring system) and a headphone system 805, which can interact via a communication interface 802, through the internet 810 (e.g., via wired hookup or wirelessly) to a remote SPL monitoring information system 800. Note that FIG. 8 illustrates additional devices (e.g., audio playback hardware 803) that can be connected to the earguard system 804, where characteristics of the additional devices can be obtained via query of the additional devices or data stored in the SPL monitoring information system 800.

Note that using the earguard 804 system in an earpiece device, with the associated SPL monitoring information system (800 or 900), an audible warning signal (an example of an indicator element), some display information, or a combination of both can warn the user when the earpiece device may be insufficient for the measured ambient noise exposure over time.

Figure 9:
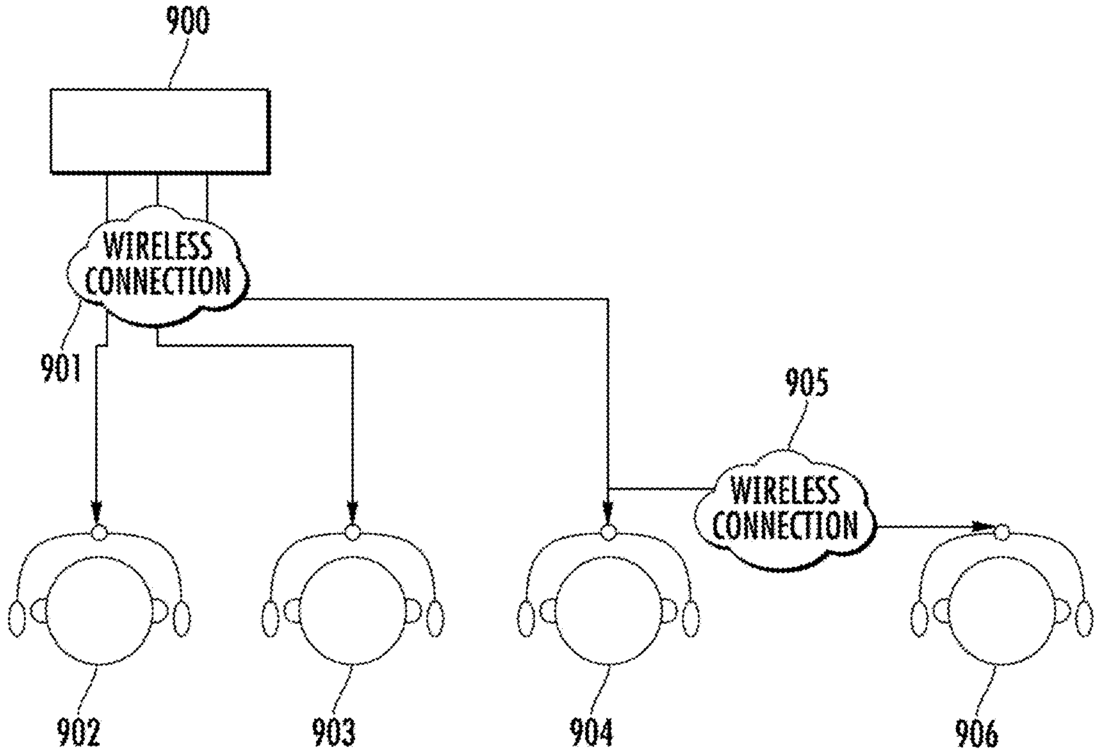
FIG. 9 illustrates how at least one exemplary embodiment of the present application is applied to share audio signals among multiple users.

FIG. 9 illustrates a possible scenario of use of the earguard system where earpiece devices (e.g., 902, 903, 904, and 906) communicate with each other (i.e., have an earguard system in the earpiece) as illustrated in 905 or directly (e.g., wirelessly 901) with a remote SPL monitoring information system 900. Thus such earpieces could share user data if that feature is enabled (e.g., user set or default). Additionally communication of an earguard system can be via the earpiece vi a cell phones, Mobile phone networks, or other communication systems. Additionally in at least one configuration an earguard system in an earpiece can query devices within range to seek other earguard systems for information. The request from one earguard can be passed along with that earguard's identifier (e.g., user registration number) and request to another earguard in range which will then pass to another through a chain until a wireless or wired connection with a remote SPL monitoring information system is obtained with the subset of data transmitted via earguard to earguard until the sender unit earguard is identified by it's identifier.

In at least one exemplary embodiment updated Control Data can be transmitted from the Server system to the system based on the registration information provided by the user. Updates to the Control Data can include modification of minimum input threshold parameters, acoustical transducer characteristics, the dBv to dBspl transfer function, the time-weighted average noise exposure calculation parameters, the function relating time-weighted average noise exposure to recommended listening durations, and any filtering parameters that relate to Audiogram compensation, inverse Headphone response, personal preferences, audiological recommendations or other data.

In at least one exemplary embodiment a quick Audiogram acquisition process can be included as part of the registration process via audiogram testing system [1109], and an Audiogram compensation filter can be included as part of the Control Data updates. Audiogram data can be encoded and decoded for transmission using a HIPAA compliant encoding system (for example via an informed consent document [1112] and an encoding process stored in database [1111]) using interface [1114].

At least one exemplary embodiment can also include a registration system to the SPL monitoring information system where a fast head related transfer function (HRTF) deduction process [1107] is included as part of the registration process, and Semi-Personalized HRTF data, stored for example in database [1108] is included as part of the Control Data updates. HRTF and Semi-Personalized HRTF are described in a "Method of Modifying Audio Content", application Ser. No. 11/751,259 filed 21 May 2007, the contents of which are hereby incorporated by reference in its entirety. Additionally the user can specify the devices he/she plans to use from a stored list, which will be added to her registered account.

In at least one exemplary embodiment the user can have his/her earpiece on, which is in communication with a remote SPL monitoring information system, where the user is modifying personal settings and listening to the effect on his/her earpiece in near real time, facilitating his/her choice of the best listening environment. A feedback system [1110], allowing the user to select the best listening experience from a number of candidate listening experiences, based on the spatial quality perceived in the HRTF-processed auditory test signal.

In at least one exemplary embodiment a SPL monitoring information system can include Listening Habit information [1103], for example which was sent via a Server every time the data port is connected to a communications network capable of connecting with the Server. Additionally the Listening Habits information can be entered during the registration process. The SPL monitoring information system can be set to send regular reports of statistical trends in Listening Habits Histories, Audiograms, and registration information across many users and many demographics, and can provide information to a given user relating their personal Listening Habits History, Audiogram results, and registration information to statistical trends and additionally can be set to send a notification to a registered user indicating when the said user should re-take an Audiogram test via audiogram testing system [1109].

While the present application has been described with reference to exemplary embodiments, it is to be understood that the application is not limited to the disclosed exemplary embodiments. The scope of the following claims is to be accorded the broadest interpretation so as to encompass all modifications, equivalent structures and functions of the relevant exemplary embodiments.

Thus, the description is merely exemplary in nature and, thus, variations that do not depart from the gist of the application are intended to be within the scope of the exemplary embodiments. Such variations are not to be regarded as a departure from the spirit and scope of the present application.

The invention claimed is:

1. A method comprising:

receiving a first signal, wherein the first signal is generated by an ambient sound microphone (ASM), wherein the ASM is part of an earphone;

receiving a second signal, wherein the second signal is generated by an ear canal microphone (ECM), wherein the ECM is part of the earphone;

sending a signal output to a speaker, wherein the speaker is part of the earphone;

storing a first portion of the first signal in memory, wherein the memory is part of the earphone;

storing a second portion of the second signal in the memory;

generating a third signal from either the first portion or the second portion or both;

calculating a sound pressure level (SPL) from the third signal, wherein a logic circuit calculates the sound pressure level, and wherein the logic circuit can be part of the earphone or part of a communication device wirelessly linked to the earphone;

retrieving a threshold value from memory; and reducing a level of the signal output when the SPL exceeds the threshold value.

2. The method according to claim 1, where the threshold value is for a predetermined frequency band.

3. The method according to claim 1, wherein reducing the level of the signal output is by using at least one of a linear gain reduction, or dynamic gain reduction, or setting the signal output to zero, or a combination thereof.

4. The method according to claim 1, wherein the SPL is calculated for a particular frequency band.

5. The method according to claim 1, wherein the level of the signal output is reduced to a maximum output level.

6. The method according to claim 5, wherein to the third signal is calculated from the second portion.

7. The method according to claim 6, further comprising:

generating an indicator level, wherein the indicator level is at least one of when the safe time duration has been exceeded, when a listening duration is within a certain percentage range of the safe time duration, when the listening duration is above a value, when a power is low, when a feature is not working, or a combination thereof.

8. The method according to claim 7, further comprising: sending notification when an indicator level is generated.

9. The method according to claim 1, further comprising: sending a noise cancellation signal to the speaker.

10. A method comprising:

sending an audio signal to a speaker, wherein the speaker is part of an earphone;

receiving an ear canal signal generated by an ear canal microphone;

calculating the sound pressure level (SPL) of the ear canal signal;

determining a sound exposure time when the SPL exceeds a sound pressure level threshold value;

updating an ECM_SPL dosage when the SPL exceeds the sound pressure level threshold value; and adjusting the audio signal sent to the speaker to maintain the ECM_SPL dosage below a target SPL dosage.

11. The method according to claim 10, where the sound pressure level threshold value is for a predetermined frequency band.

12. The method according to claim 10, further comprising:

determining a recovery time duration when the SPL is less than the sound pressure level threshold value.

13. The method according to claim 10, further comprising:

determining a safe time duration over which a user can receive current sound pressure values.

14. The method according to claim 13, further comprising:

generating an indicator level, wherein the indicator level is at least one of when the safe time duration has been exceeded, when a listening duration is within a certain percentage range of the safe time duration, when the listening duration is above a value, when a power is low, when a feature is not working, or a combination thereof.

15. The method according to claim 14, further comprising:

sending notification when an indicator level is generated.

* * * * *